US011319163B2

(12) United States Patent
Kollmuss et al.

(10) Patent No.: US 11,319,163 B2
(45) Date of Patent: May 3, 2022

(54) METHOD AND APPARATUS HANDLING PIECE GOODS MOVED IN AT LEAST ONE ROW ONE AFTER ANOTHER

(71) Applicant: KRONES Aktiengesellschaft, Neutraubling (DE)

(72) Inventors: Manuel Kollmuss, Raubling (DE); Erhard Beer, Ebbs (AT); Michael Astner, Brannenburg (DE); Arsalan Mehdi, Rosenheim (DE)

(73) Assignee: KRONES Aktiengesellschaft, Neutraubling (DE)

( * ) Notice: Subject to any disclaimer, the term of this patent is extended or adjusted under 35 U.S.C. 154(b) by 746 days.

(21) Appl. No.: 16/093,229

(22) PCT Filed: Feb. 21, 2017

(86) PCT No.: PCT/EP2017/053836
§ 371 (c)(1),
(2) Date: Oct. 12, 2018

(87) PCT Pub. No.: WO2017/182161
PCT Pub. Date: Oct. 26, 2017

(65) Prior Publication Data
US 2021/0221614 A1  Jul. 22, 2021

(30) Foreign Application Priority Data

Apr. 20, 2016  (DE) .................. 10 2017 206 639.0

(51) Int. Cl.
*B65G 47/08* (2006.01)
*B25J 9/00* (2006.01)
(Continued)

(52) U.S. Cl.
CPC .......... *B65G 47/086* (2013.01); *B25J 9/0093* (2013.01); *B25J 9/1687* (2013.01); *B25J 15/00* (2013.01);
(Continued)

(58) Field of Classification Search
CPC combination set(s) only.
See application file for complete search history.

(56) References Cited

U.S. PATENT DOCUMENTS 5,123,231 A * 6/1992 Fallas ..................... B65B 5/101
53/260
5,630,311 A * 5/1997 Flix ......................... B65B 21/06
198/419.3
(Continued)

FOREIGN PATENT DOCUMENTS

CN 103787059 A 5/2014
CN 102556440 B 1/2016
(Continued)

OTHER PUBLICATIONS

European Application No. 17709594.0—Office Action dated Jul. 15, 2020.
(Continued)

*Primary Examiner* — Kyle O Logan
(74) *Attorney, Agent, or Firm* — Simmons Perrine Moyer Bergman PLC

(57) ABSTRACT

The invention relates to a method and an apparatus (10) for handling piece goods (2) moved one after another in at least one row (1). Immediately consecutive piece goods (2) in a row (1) without spaces or with minimal spaces are transported as a closed formation (F). At least one transported piece good (2, 2*) is seized in a clamping and/or force-locking and/or form-locking manner from the closed formation (F); is spatially separated from the closed formation (F);
(Continued)

and is brought into a specified relative target position (P) and/or target alignment in relation to subsequent piece goods (2).

25 Claims, 47 Drawing Sheets

(51) Int. Cl.
  *B25J 9/16* (2006.01)
  *B25J 15/00* (2006.01)
  *B65G 47/90* (2006.01)
  *B65G 1/137* (2006.01)

(52) U.S. Cl.
  CPC ......... *B65G 1/1375* (2013.01); *B65G 47/902* (2013.01)

(56) References Cited

U.S. PATENT DOCUMENTS

| | | | | |
|---|---|---|---|---|
| 8,047,093 B2* | 11/2011 | Kinoshita | ............ | B25J 17/0266 74/490.03 |
| 8,066,468 B2* | 11/2011 | Klein | ................... | B65G 21/209 414/790.6 |
| 8,167,113 B2* | 5/2012 | Mougin | ................. | B65G 47/82 198/418.5 |
| 8,210,068 B2* | 7/2012 | Feng | ...................... | B25J 9/0051 74/490.05 |
| 8,448,411 B2* | 5/2013 | Huber | ..................... | B65B 35/44 53/398 |
| 9,708,089 B2* | 7/2017 | Lang | ....................... | B65B 35/40 |
| 2005/0246056 A1* | 11/2005 | Marks | .................. | B65G 57/245 700/213 |
| 2010/0147650 A1* | 6/2010 | Kaes | .................... | B65G 47/086 198/375 |
| 2012/0009053 A1* | 1/2012 | Boschi | ................. | B65G 47/086 414/799 |
| 2013/0282165 A1* | 10/2013 | Pankratov | .............. | B65G 57/09 700/217 |
| 2014/0119875 A1* | 5/2014 | Job | ....................... | B65G 47/918 414/752.1 |
| 2015/0034252 A1* | 2/2015 | Stuhlmann | .............. | B65B 17/02 156/566 |

FOREIGN PATENT DOCUMENTS

| | | |
|---|---|---|
| DE | 4439728 | 5/1996 |
| DE | 20108401 | 9/2002 |
| DE | 10219129 | 11/2003 |
| DE | 102009043970 | 3/2011 |
| DE | 102010020847 | 11/2011 |
| DE | 102011076864 | 12/2012 |
| DE | 102011080812 | 2/2013 |
| DE | 102013204095 | 9/2014 |
| DE | 102013207091 A1 | 10/2014 |
| DE | 102013208082 | 11/2014 |
| DE | 102013106004 | 12/2014 |
| DE | 102013108176 A1 | 2/2015 |
| DE | 102013113754 | 6/2015 |
| DE | 102016113448 | 2/2017 |
| EP | 1456101 | 9/2004 |
| EP | 1927559 | 6/2008 |
| EP | 2107018 | 10/2009 |
| EP | 2662293 | 11/2013 |
| EP | 2662319 | 11/2013 |
| EP | 2792626 | 10/2014 |
| FR | 2993870 | 1/2014 |
| JP | S62285817 | 12/1987 |
| WO | 2009149052 A1 | 12/2009 |
| WO | 2010106529 | 9/2010 |
| WO | 2011127367 | 10/2011 |
| WO | 2015014559 | 2/2015 |

OTHER PUBLICATIONS

European Application No. 17715061.2—Office Action dated Jul. 21, 2020.
Chinese First Office Action dated Dec. 2, 2019.
References Cited in Non-Final Office Action of related U.S. Appl. No. 16/093,321 dated Jun. 15, 2020.
First Chinese Office Action dated Dec. 27, 2019.
German Application No. DE 10 2017 206 639.0—Filed Apr. 20, 2016—Search Report dated May 7, 2017.
PCT Application: PCT/EP2017/053836 filed Feb. 21, 2017—International Search Report dated Jun. 13, 2017.
PCT Application: PCT/EP2017/056654 filed Feb. 21, 2017 (claiming the same German Priority Application)—International Search Report dated Jun. 14, 2017.
PCT/EP2017/053836 International Preliminary Report on Patentability dated Oct. 23, 2018.
PCT/EP2017/056654 International Preliminary Report on Patentability dated Oct. 23, 2018.

* cited by examiner

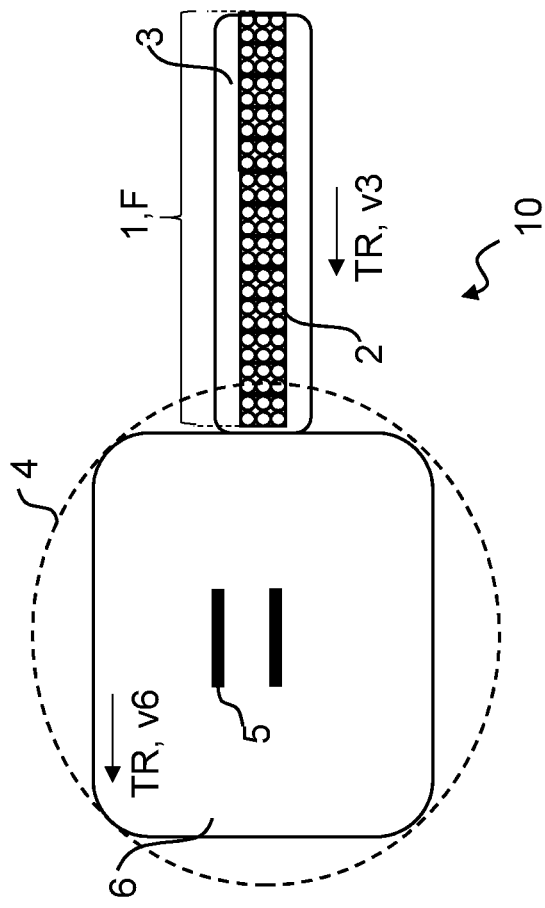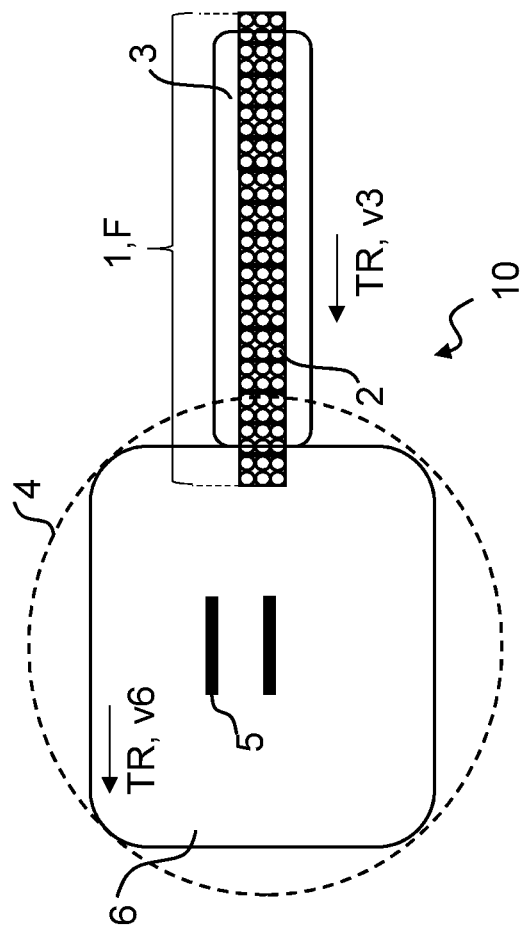

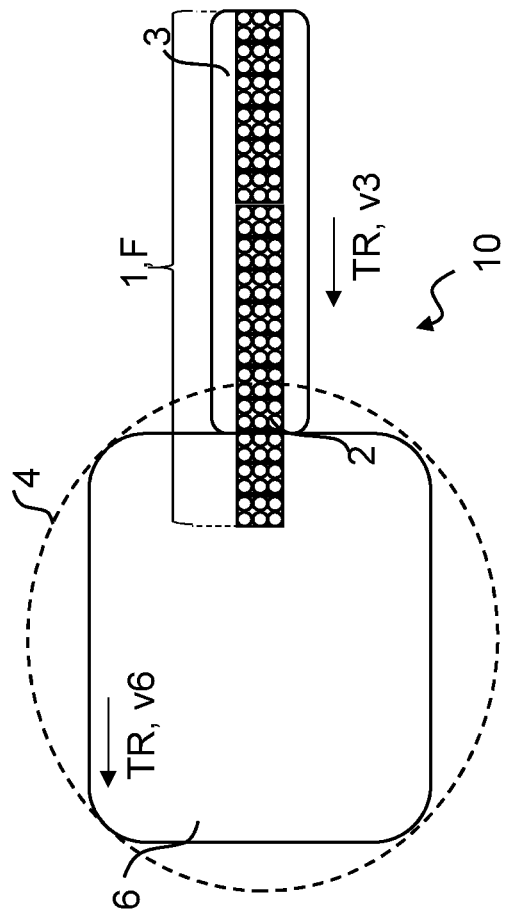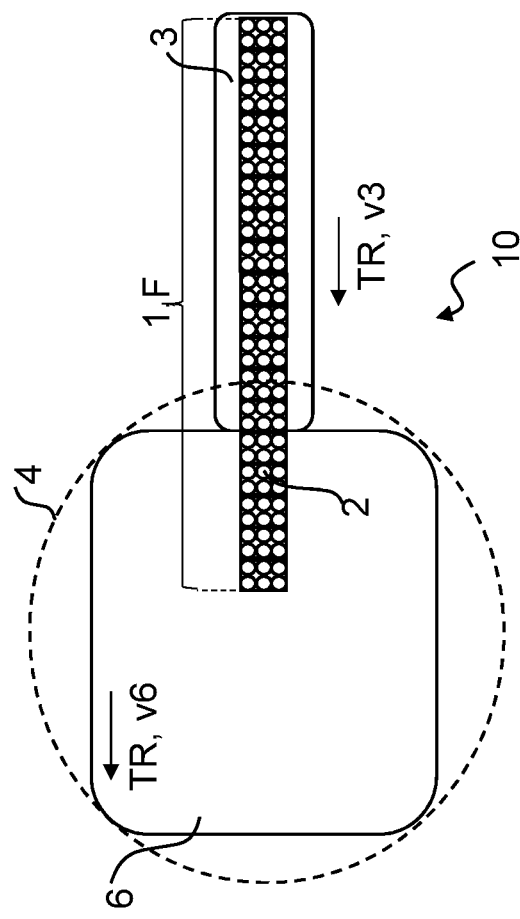

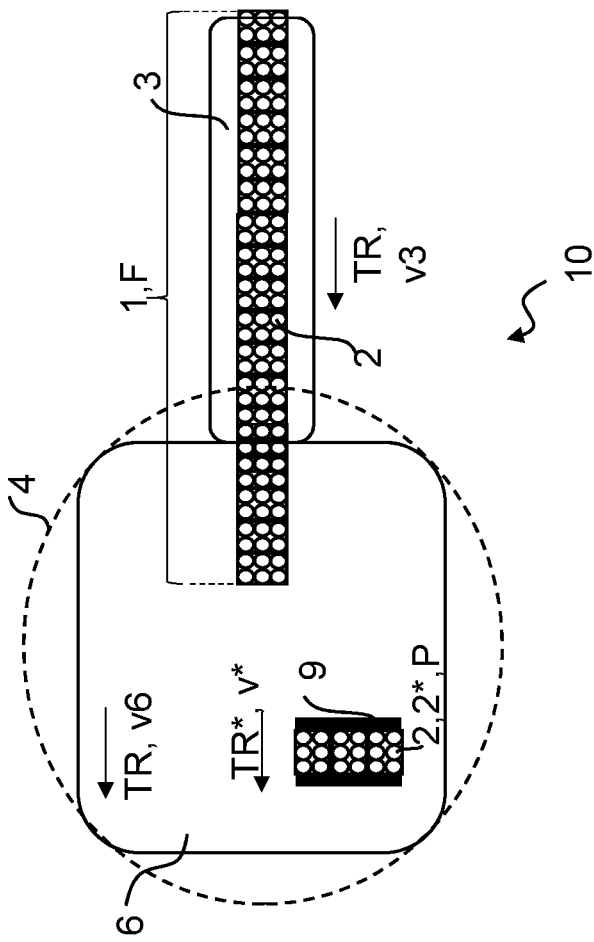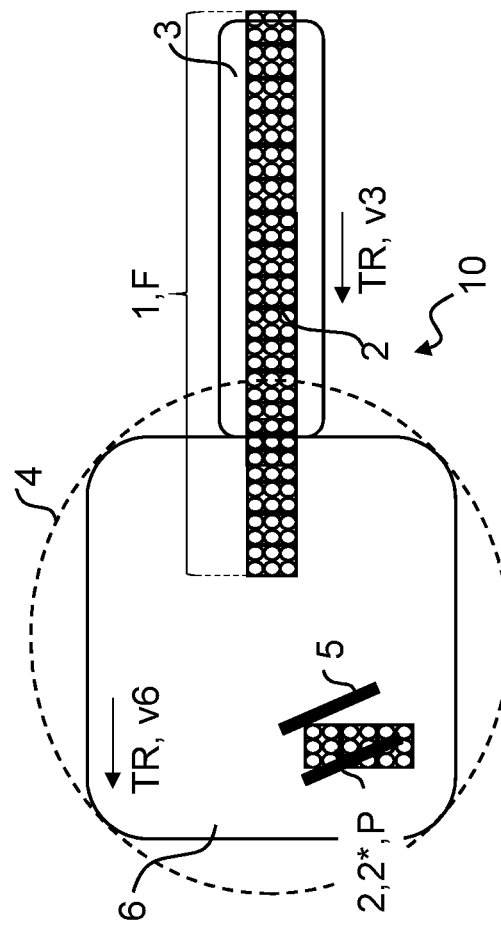

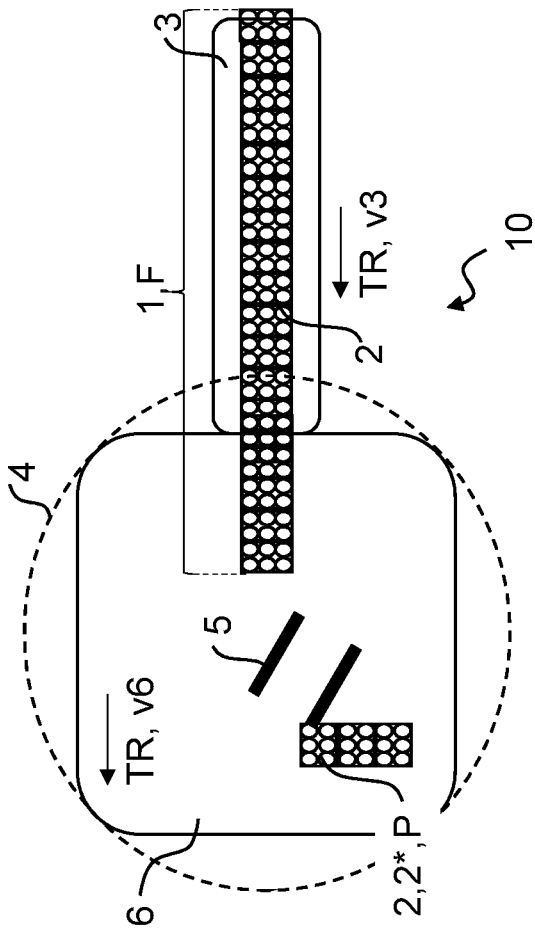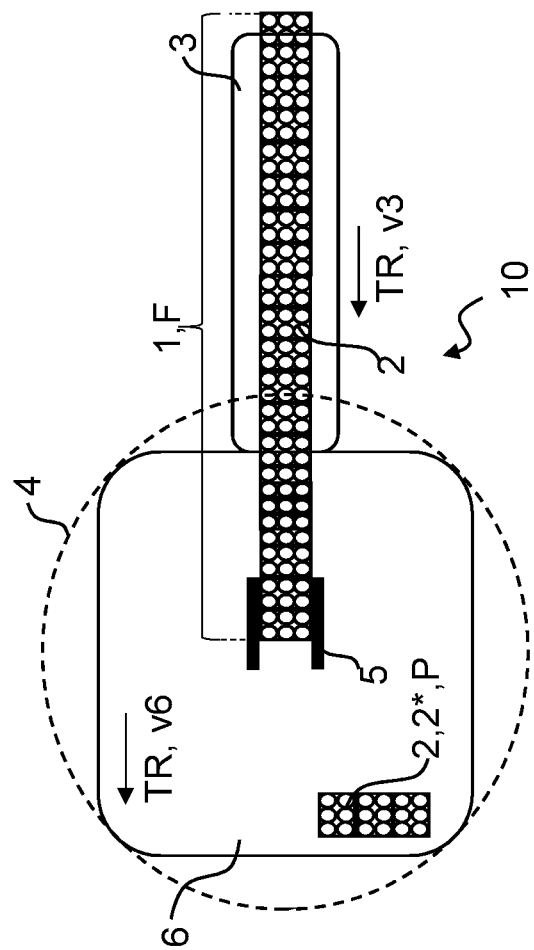

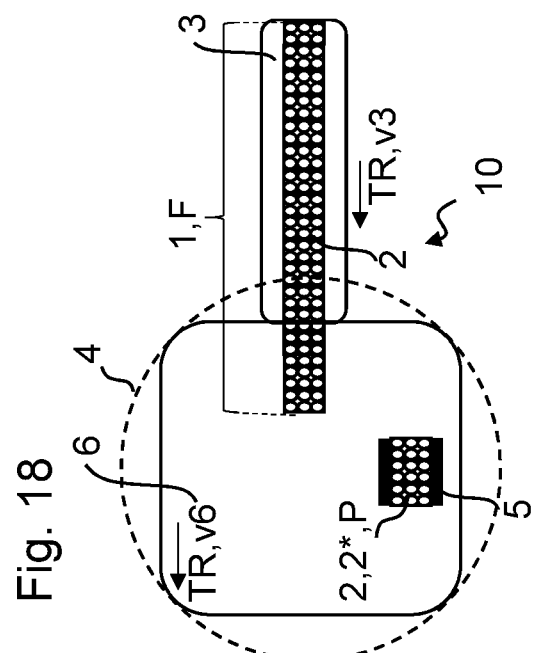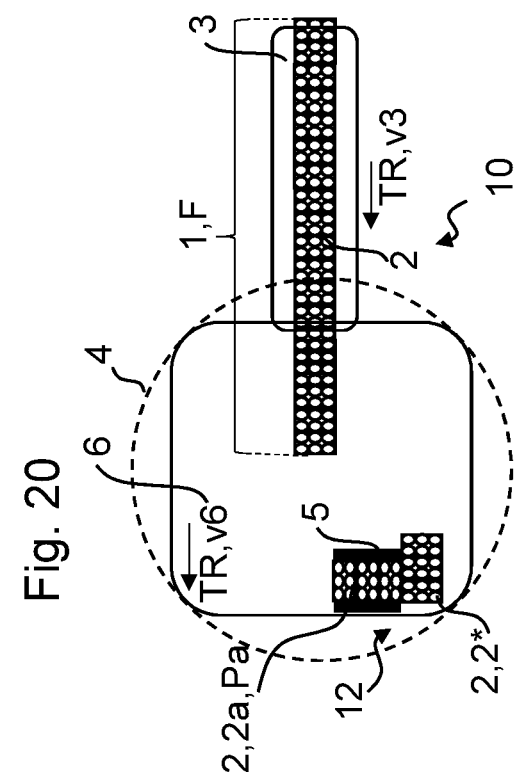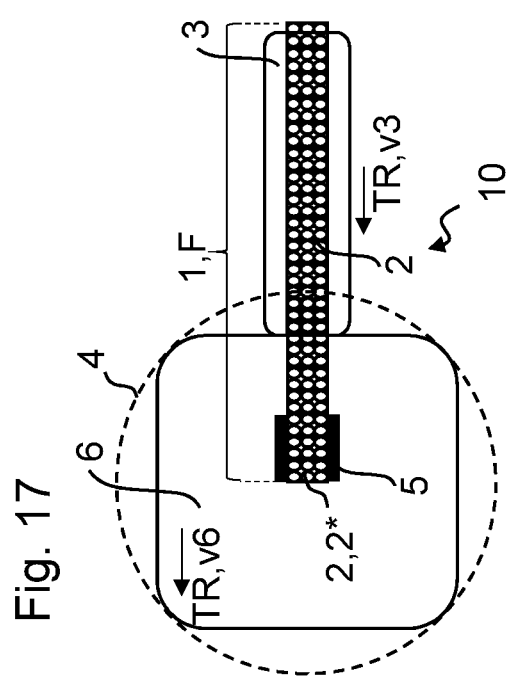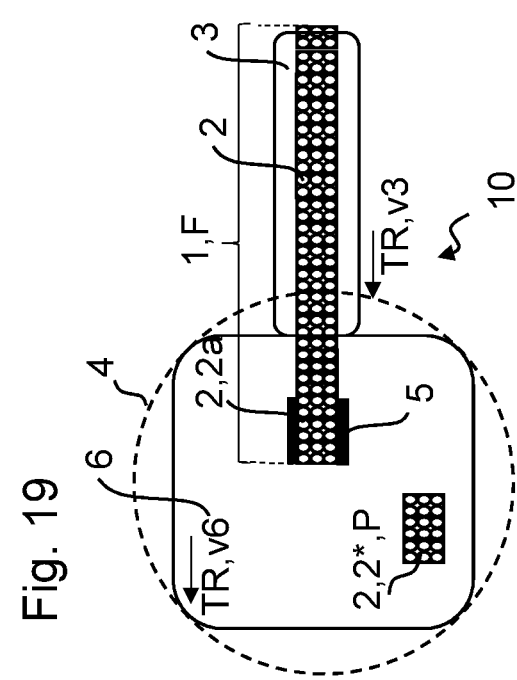

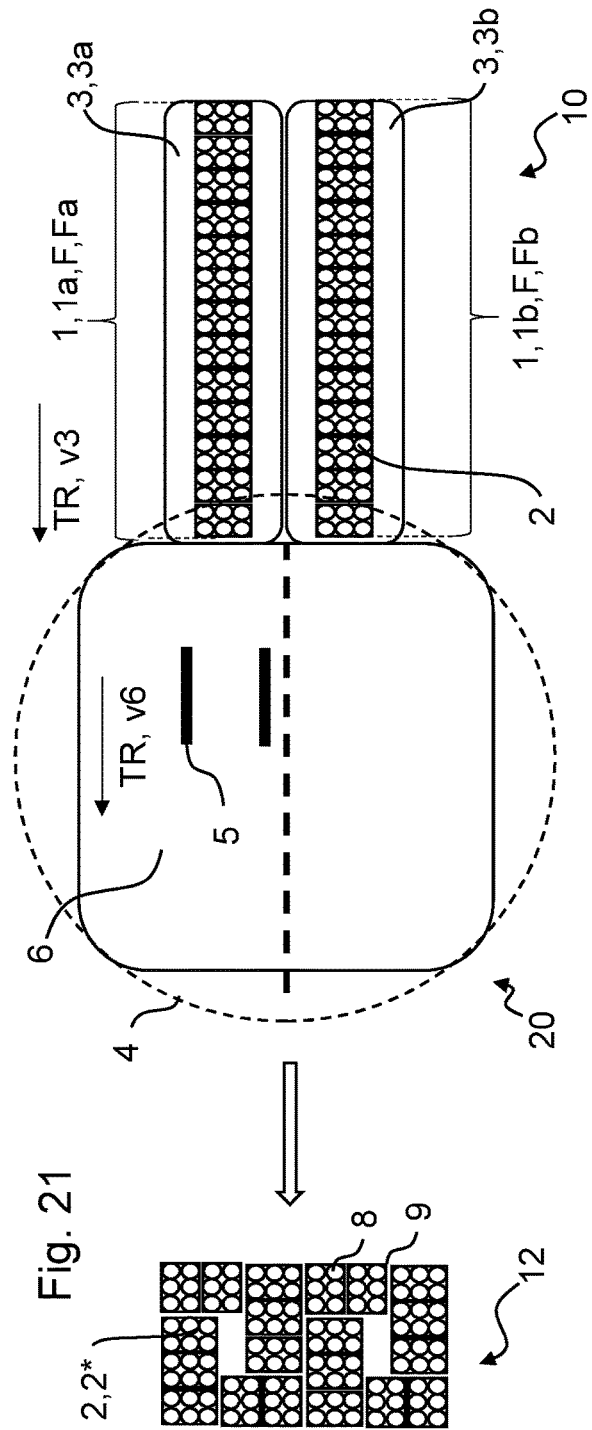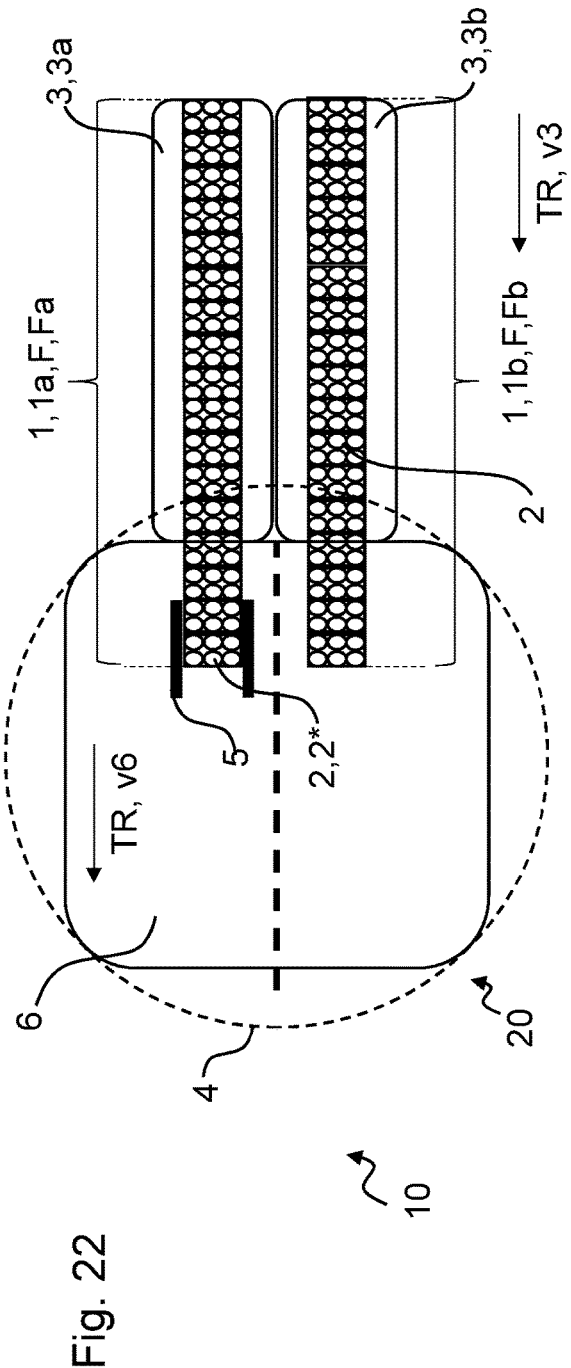

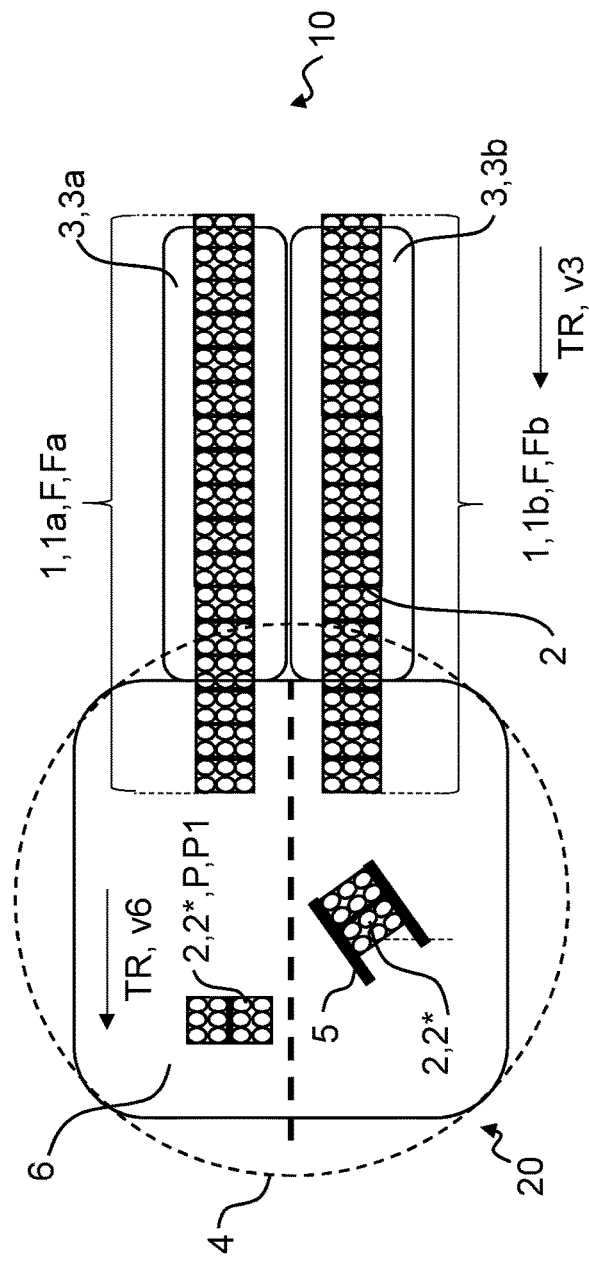

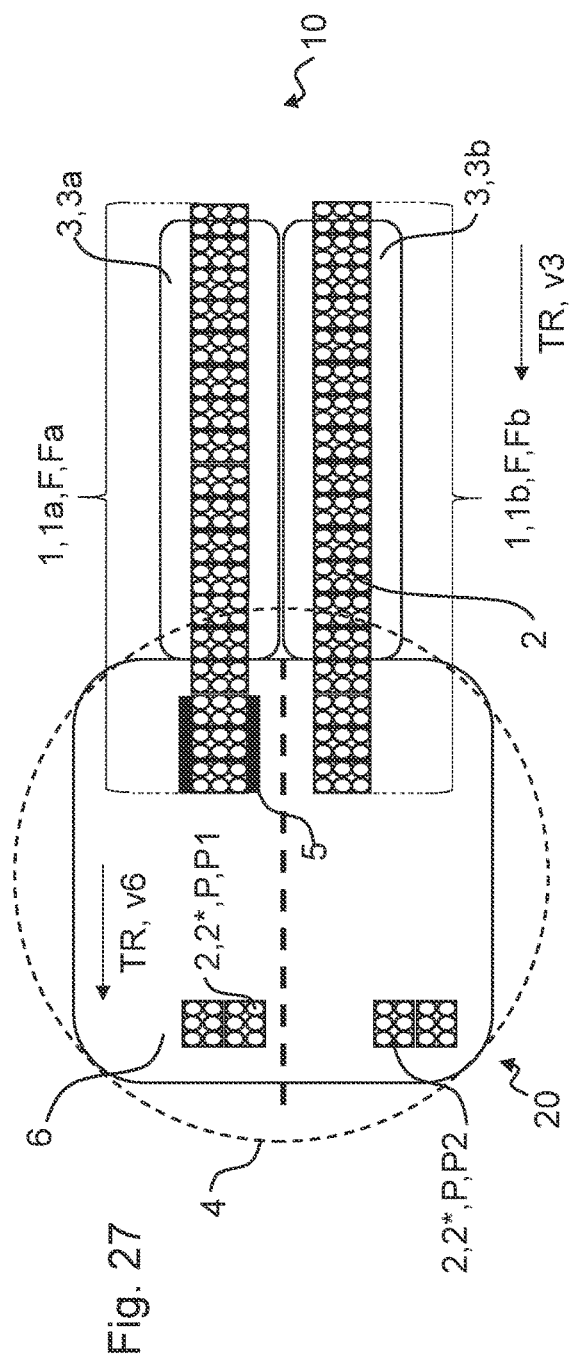
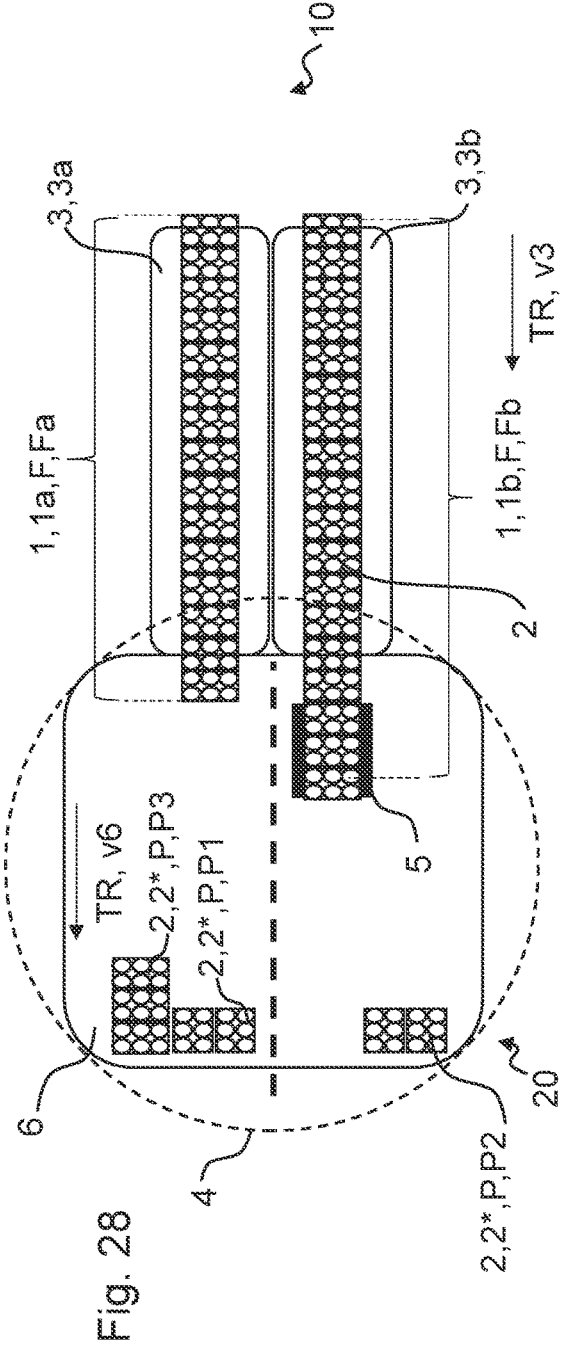

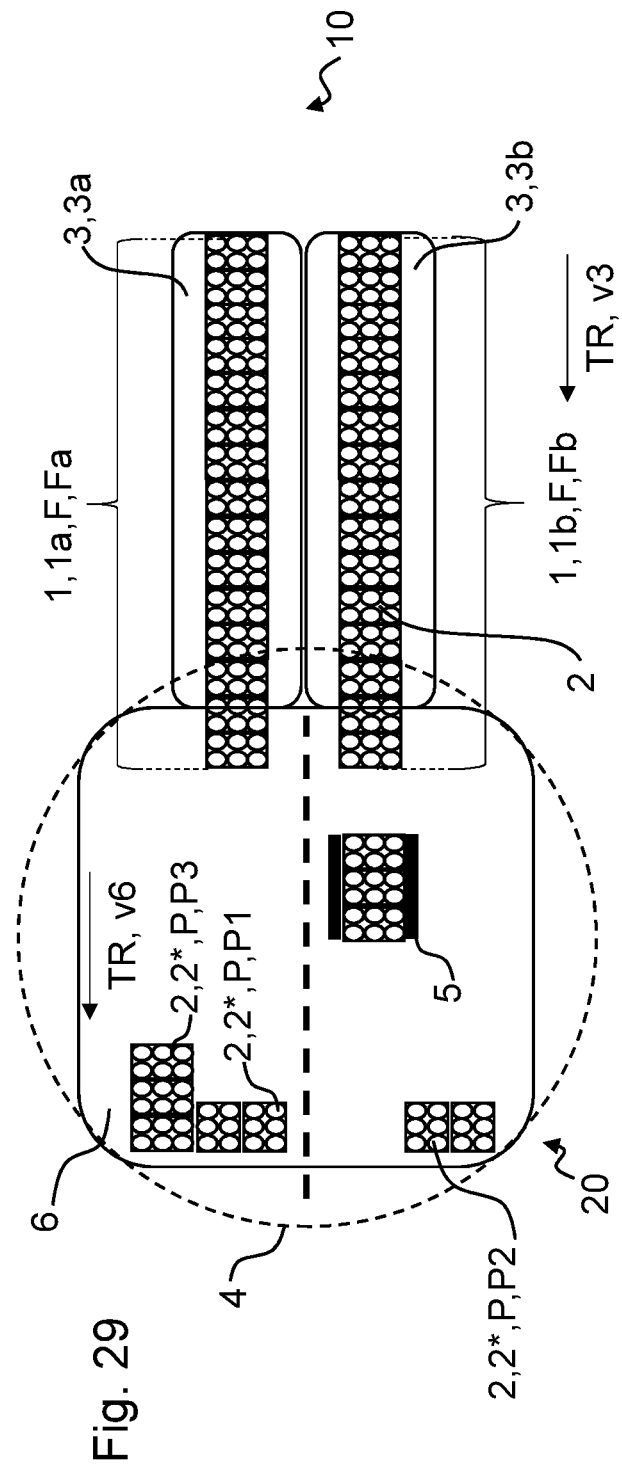

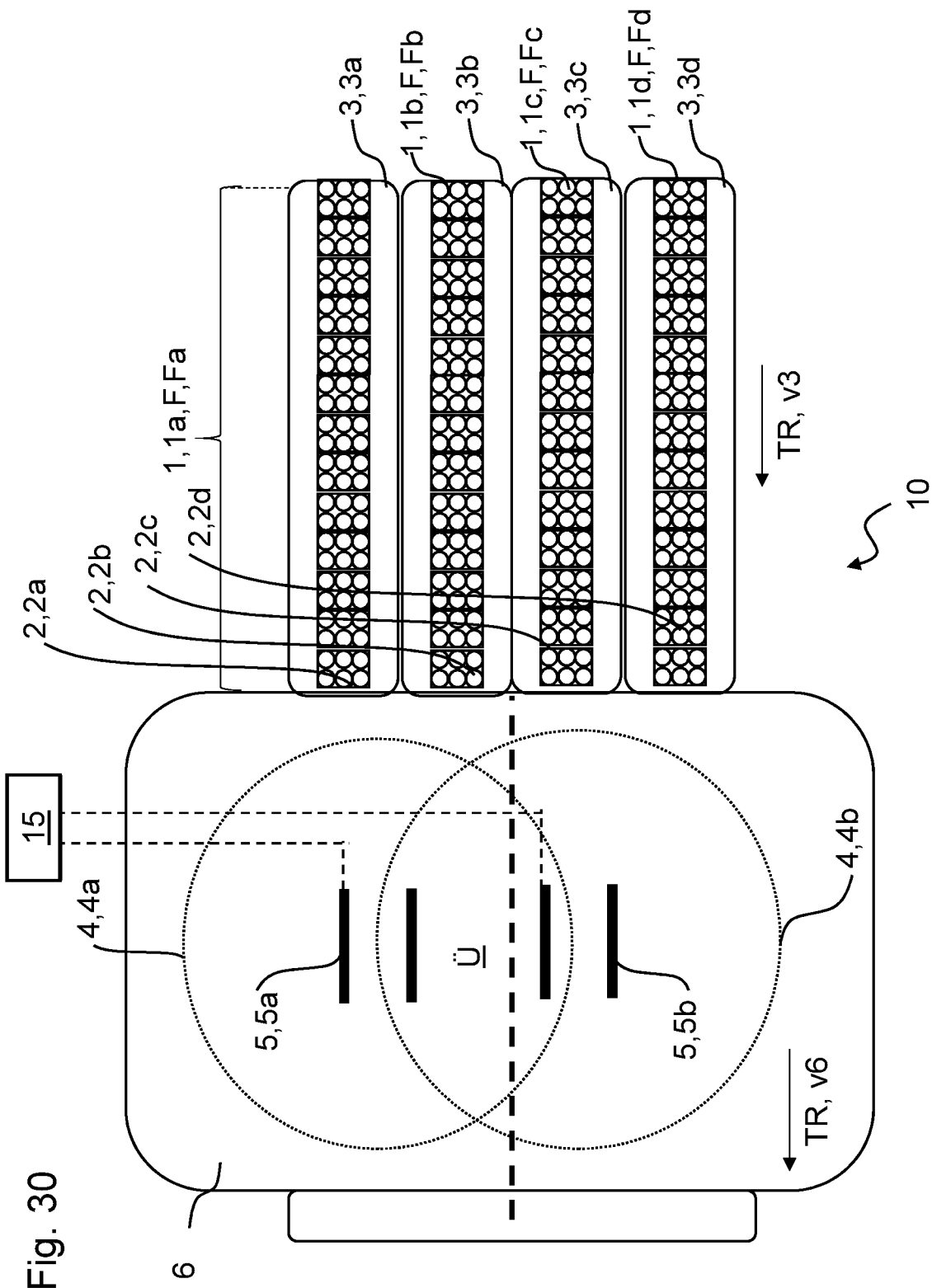

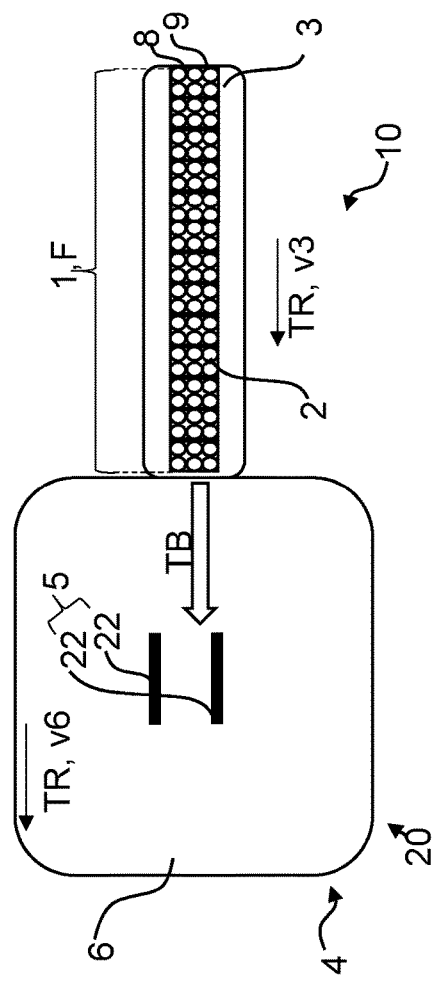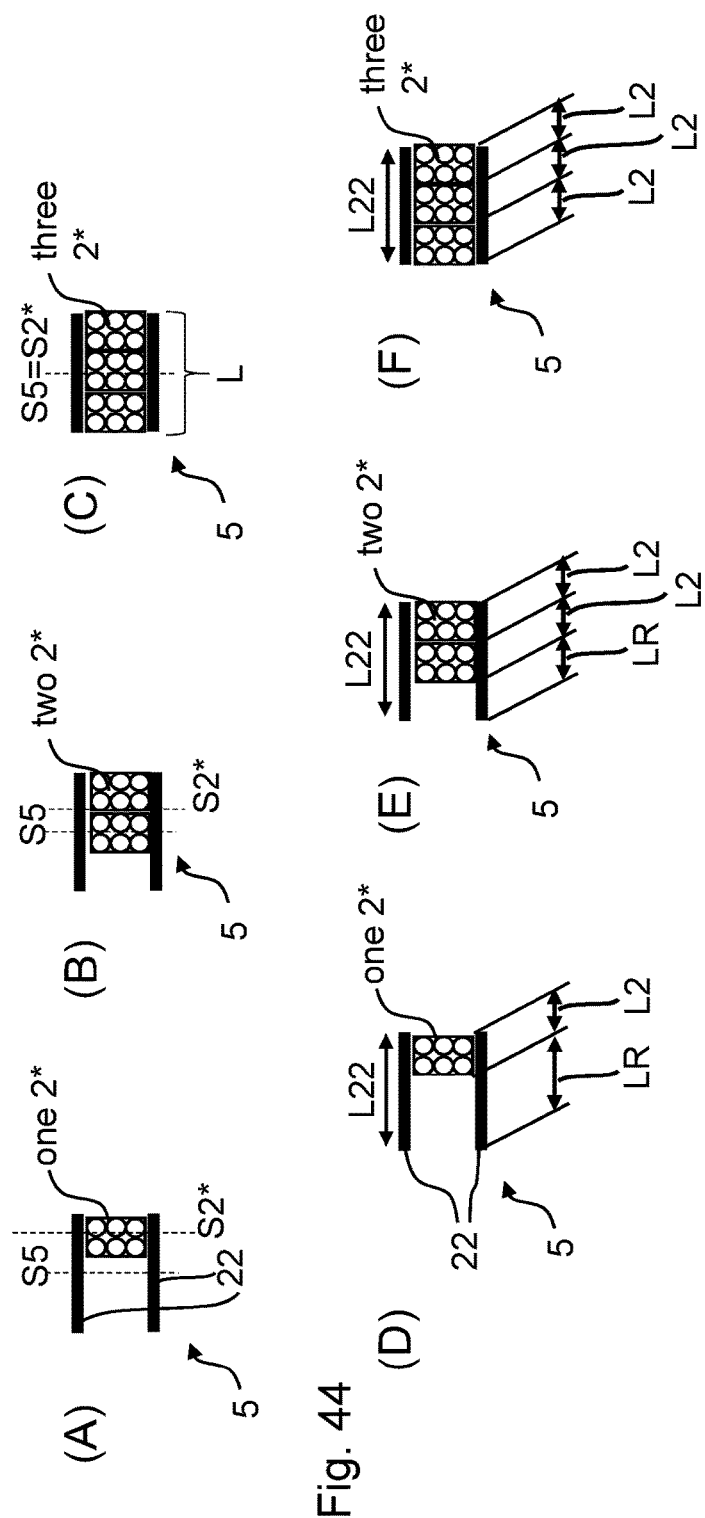
Fig. 43
Fig. 44

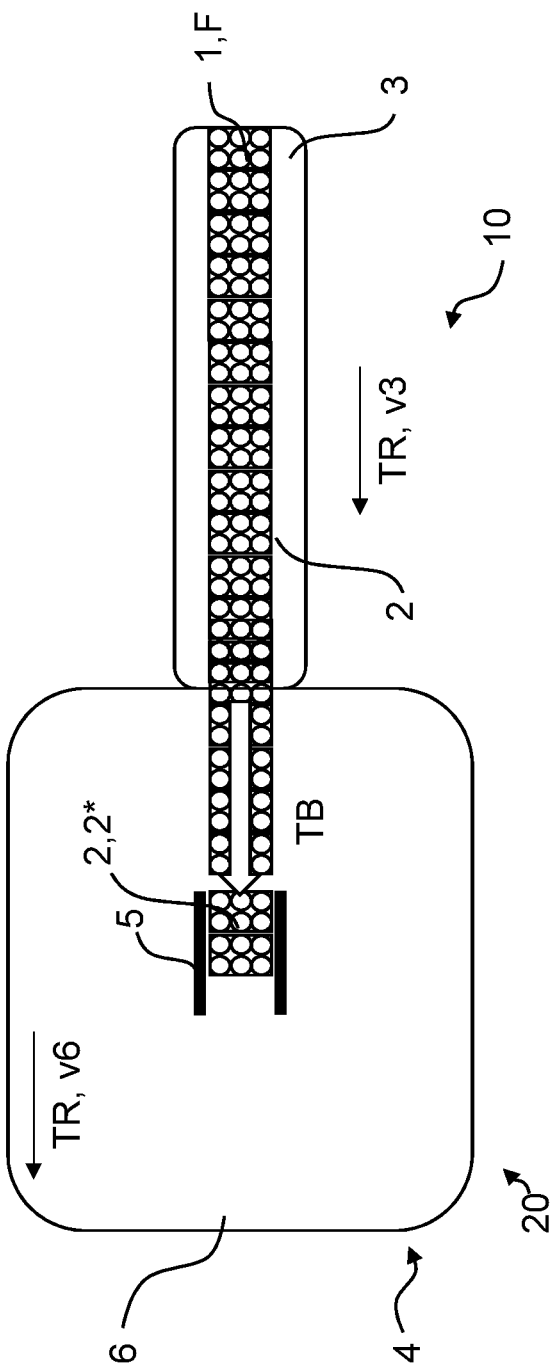
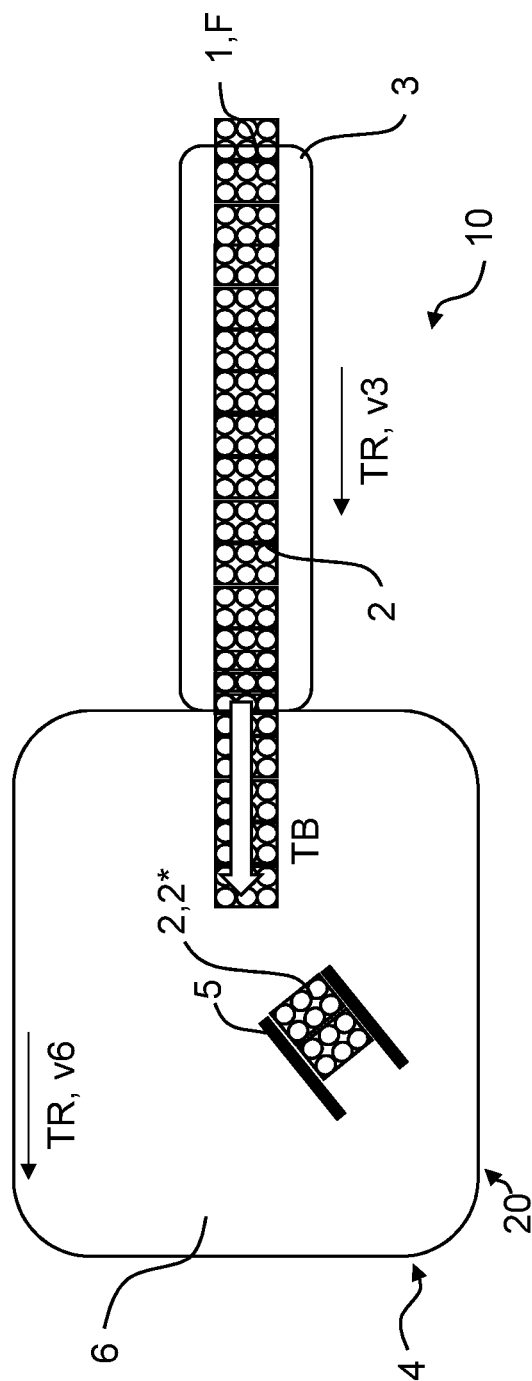

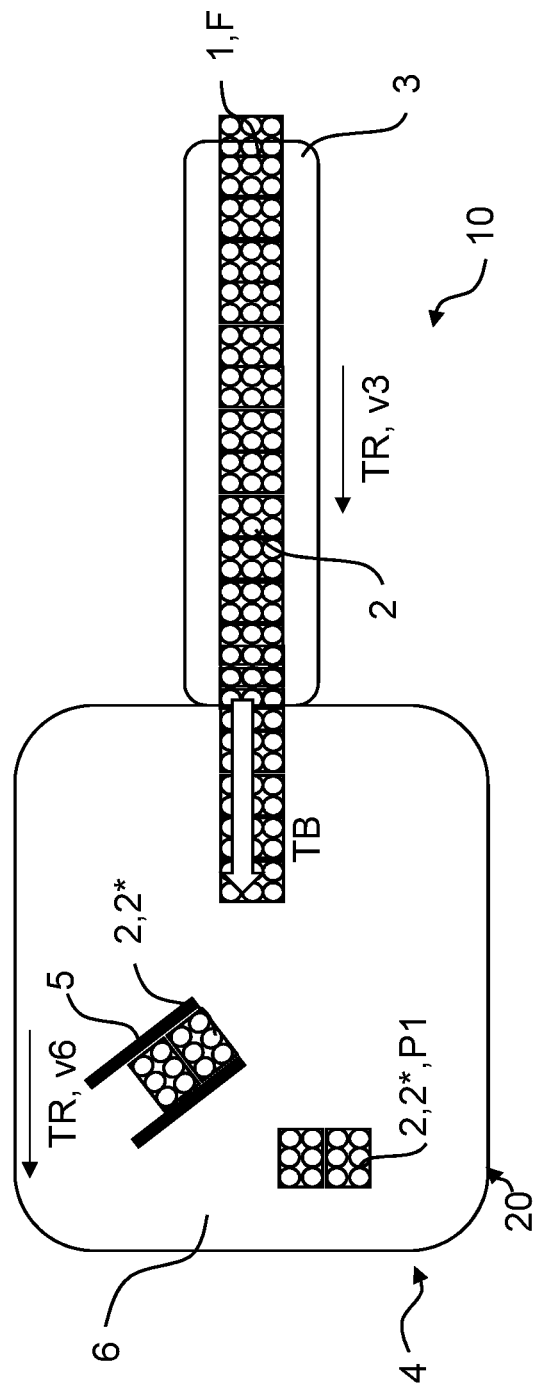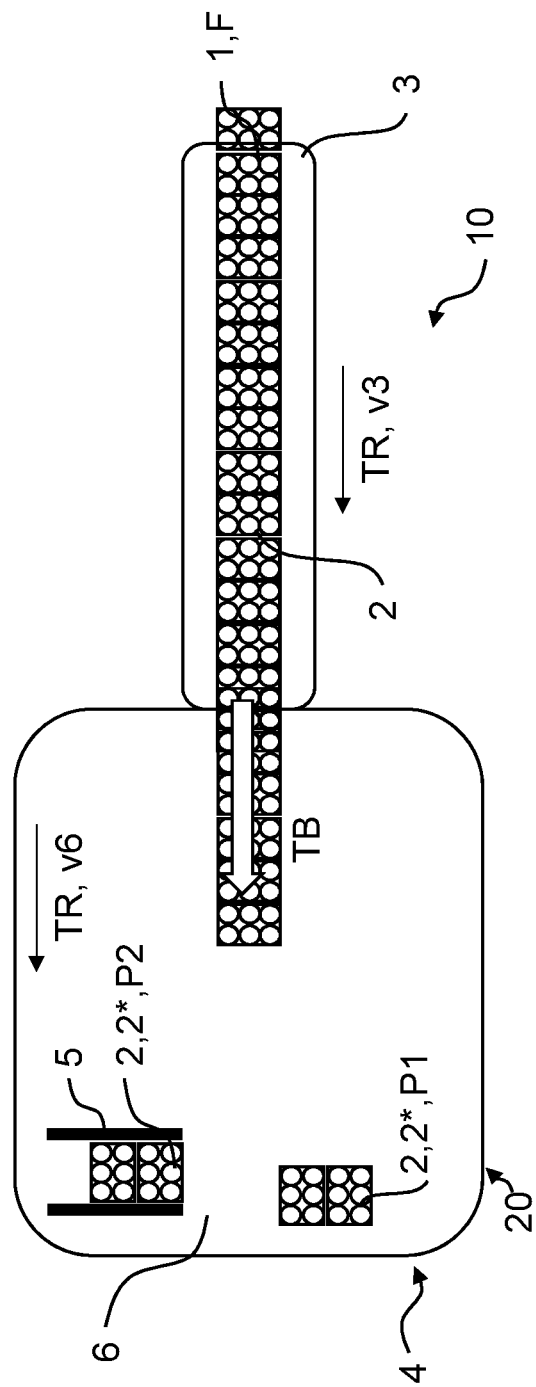

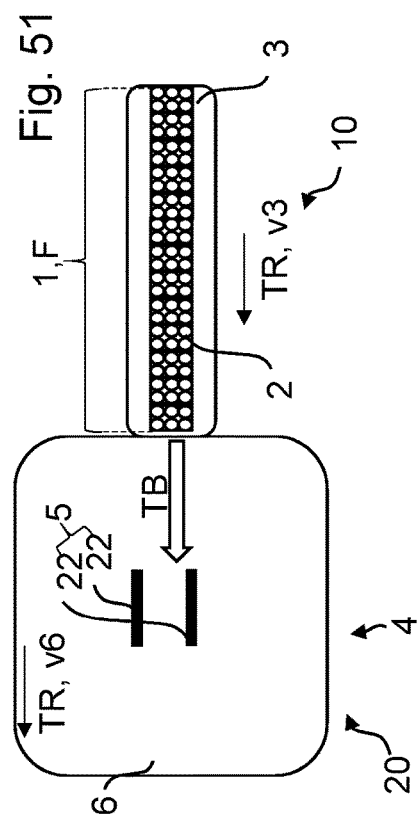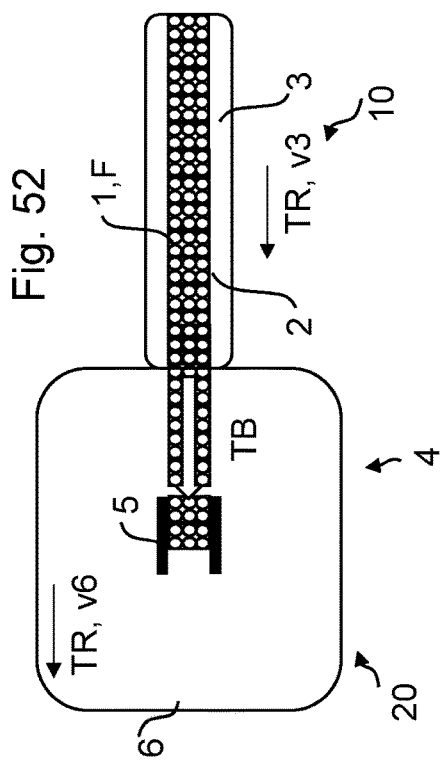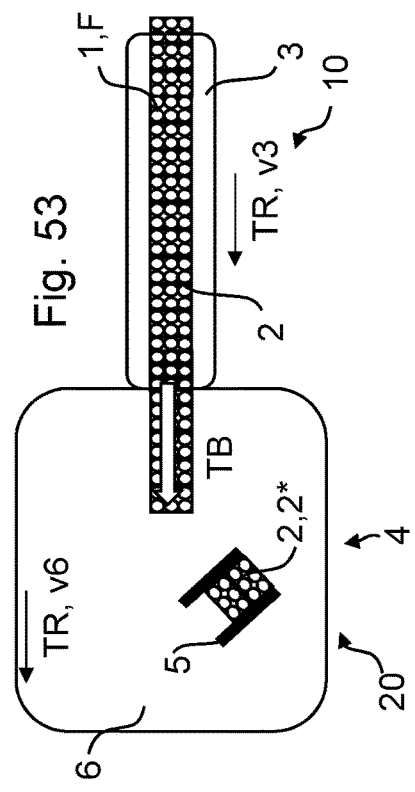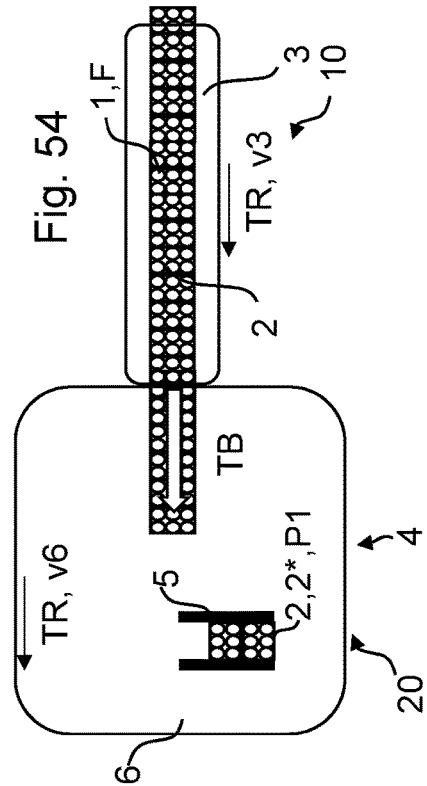

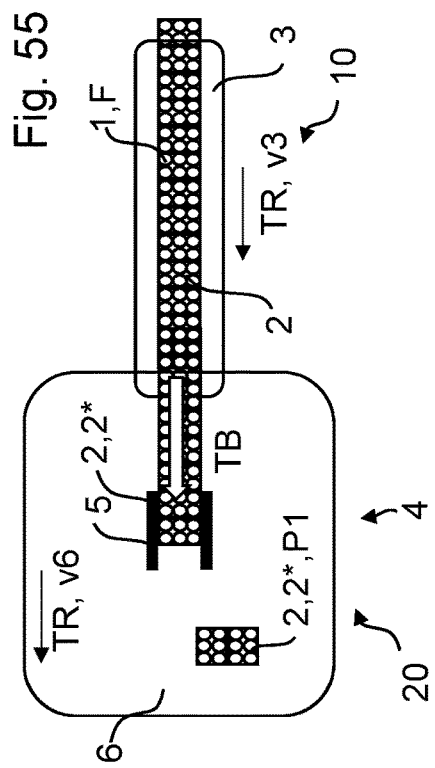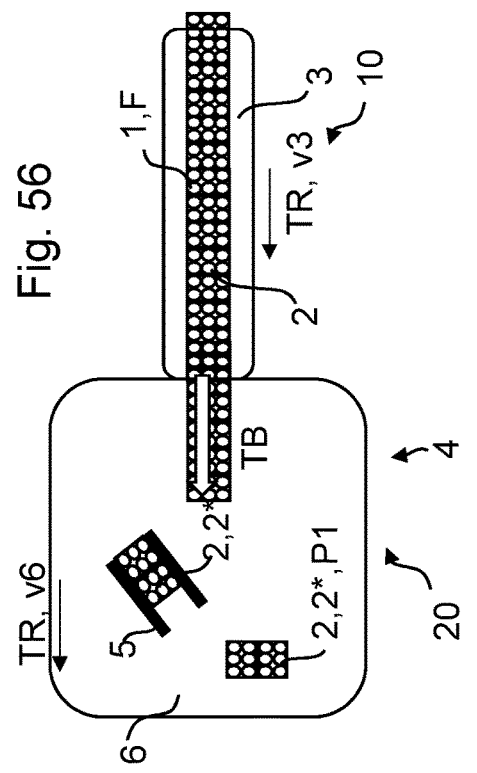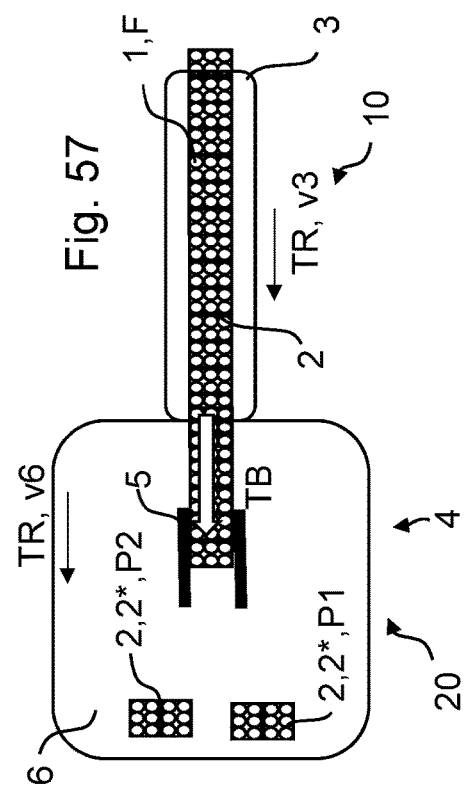

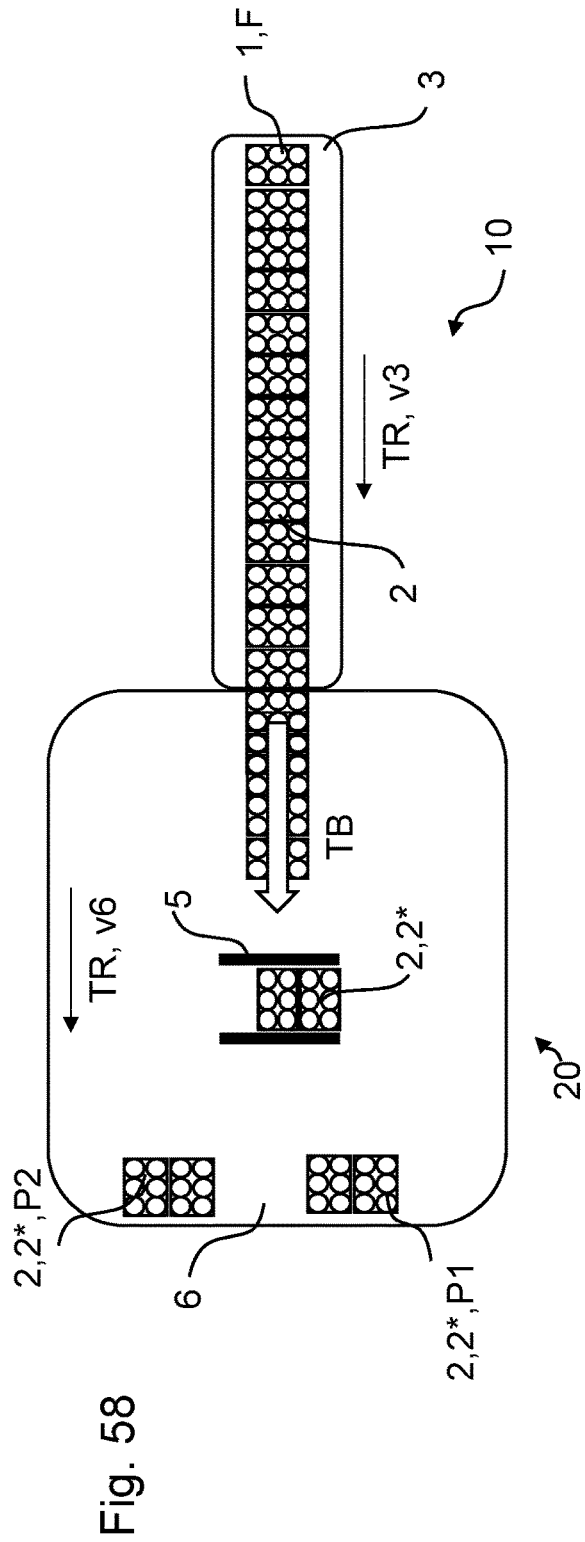
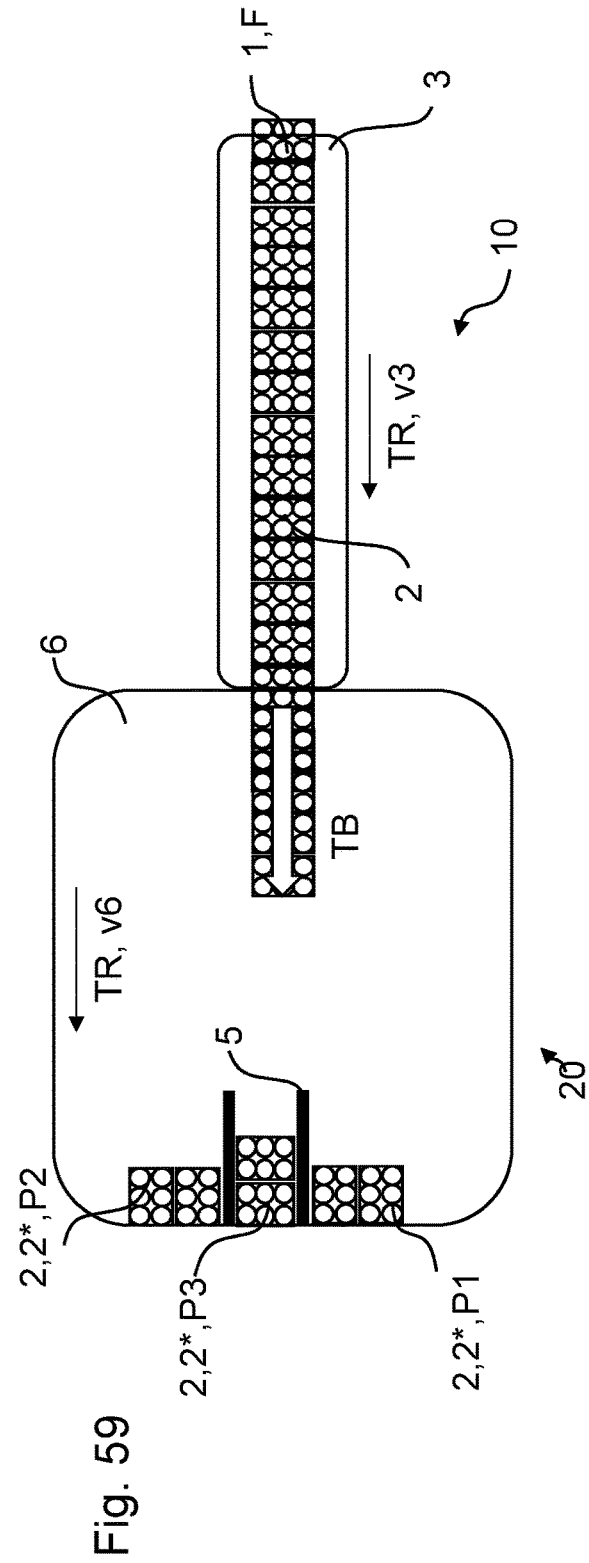
Fig. 58
Fig. 59

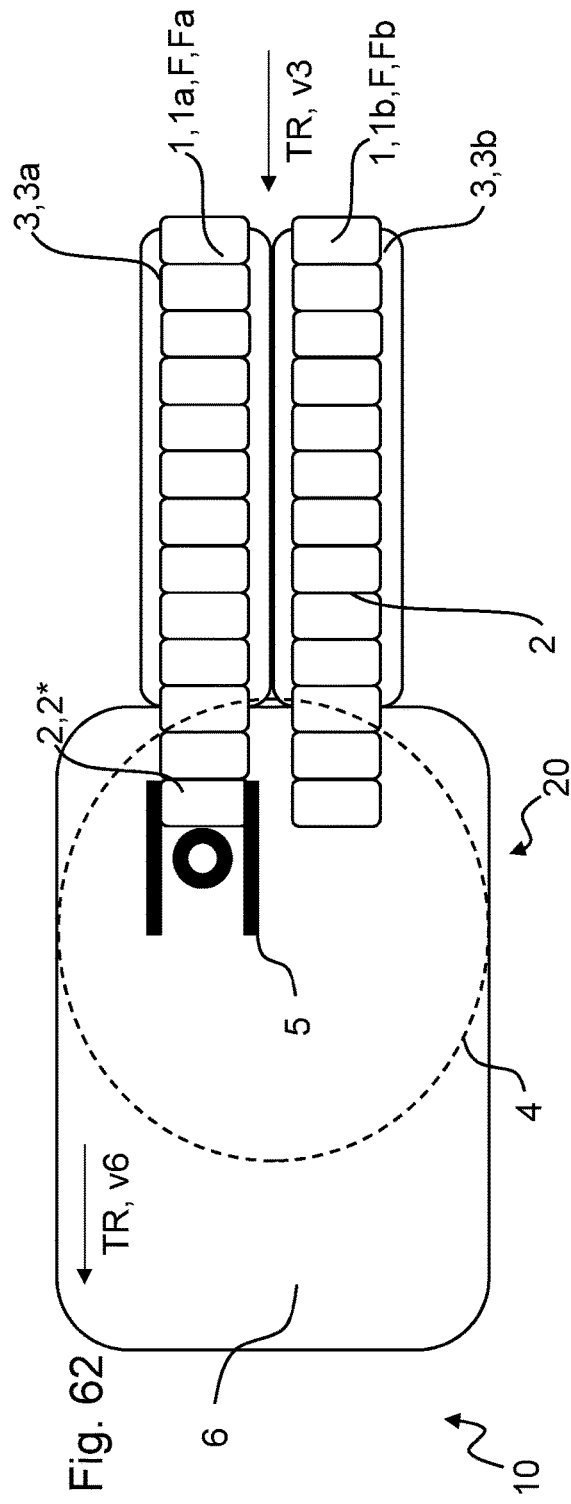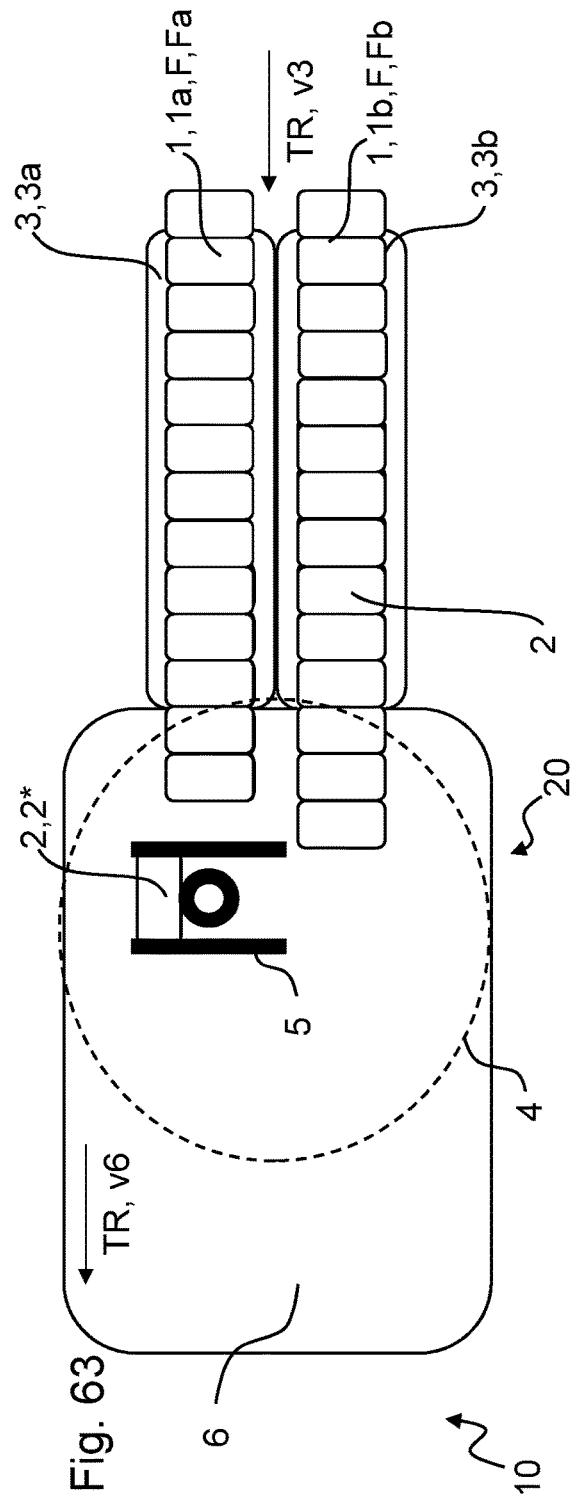

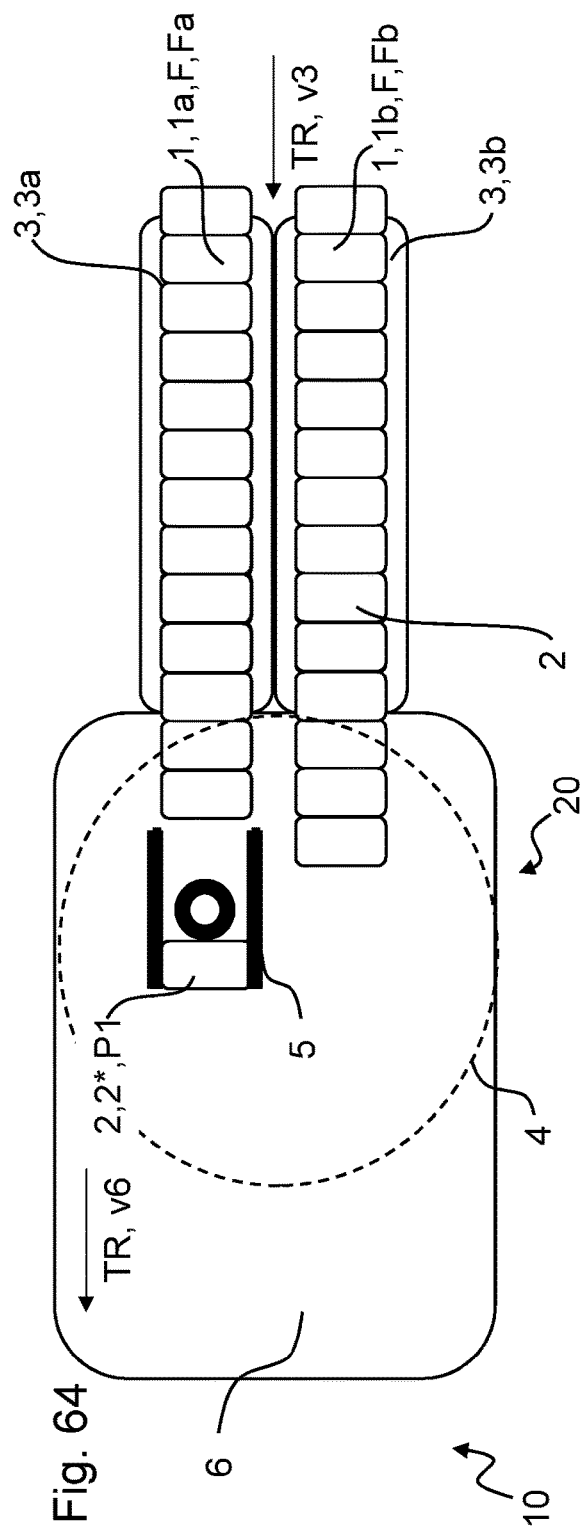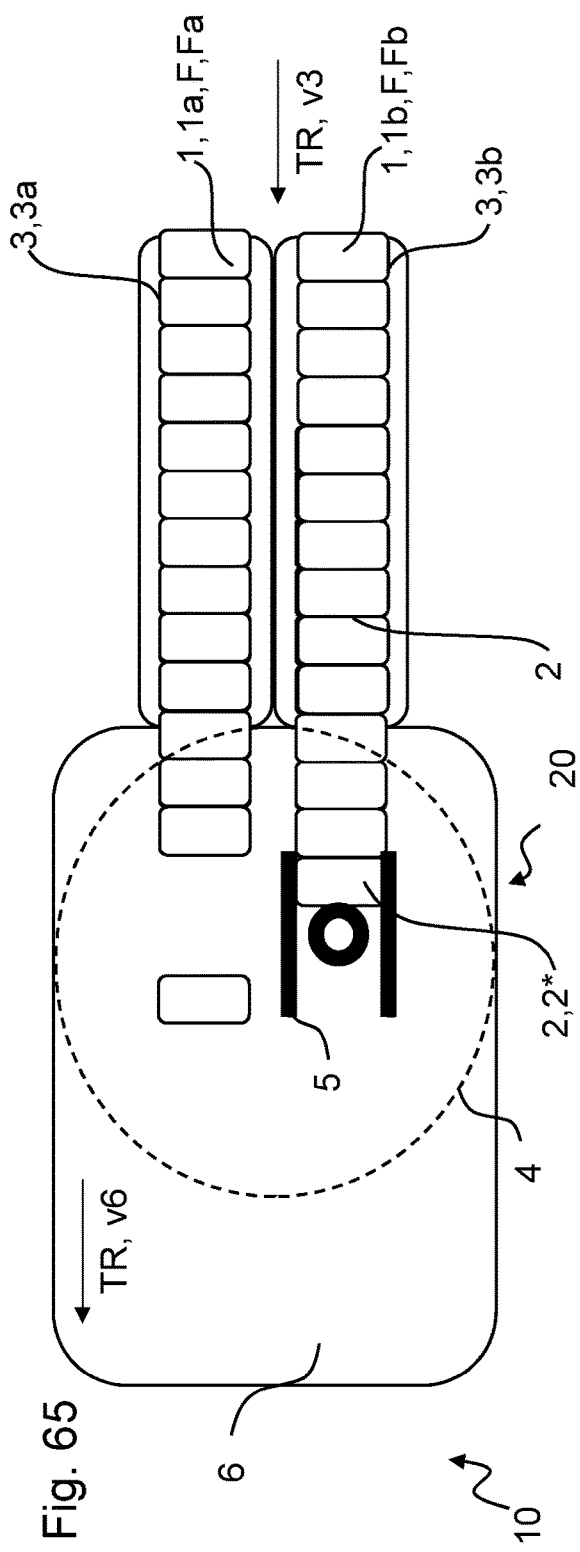

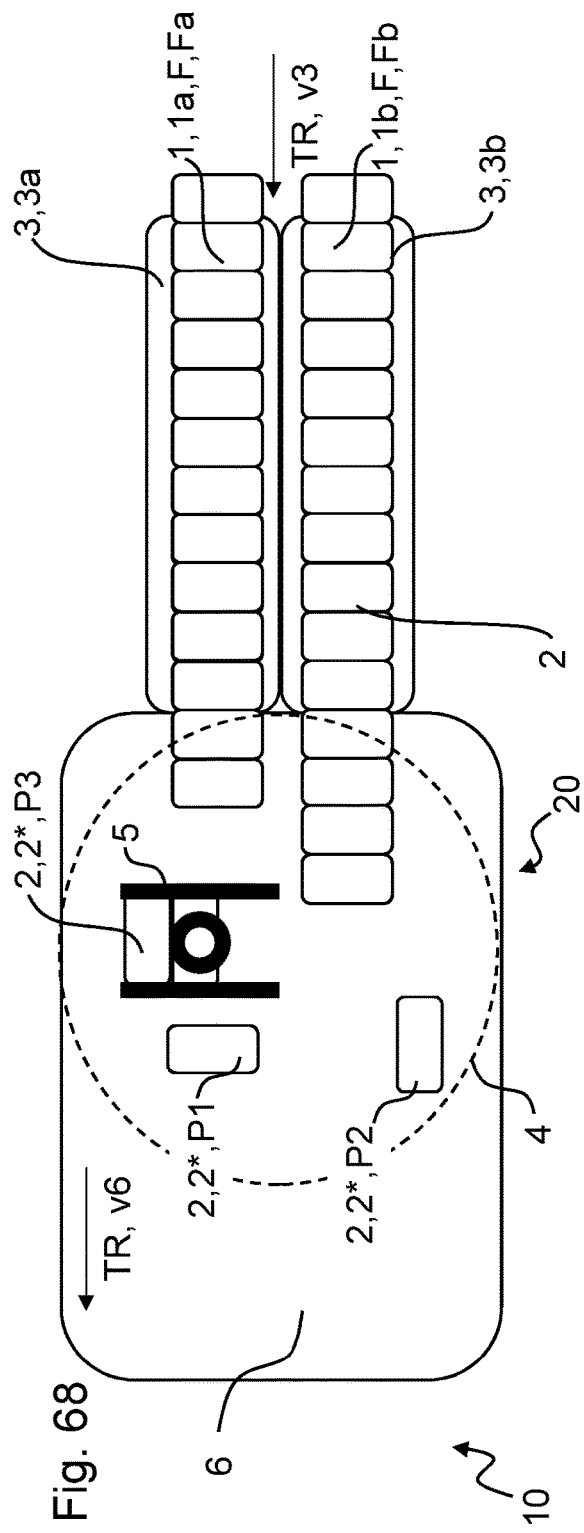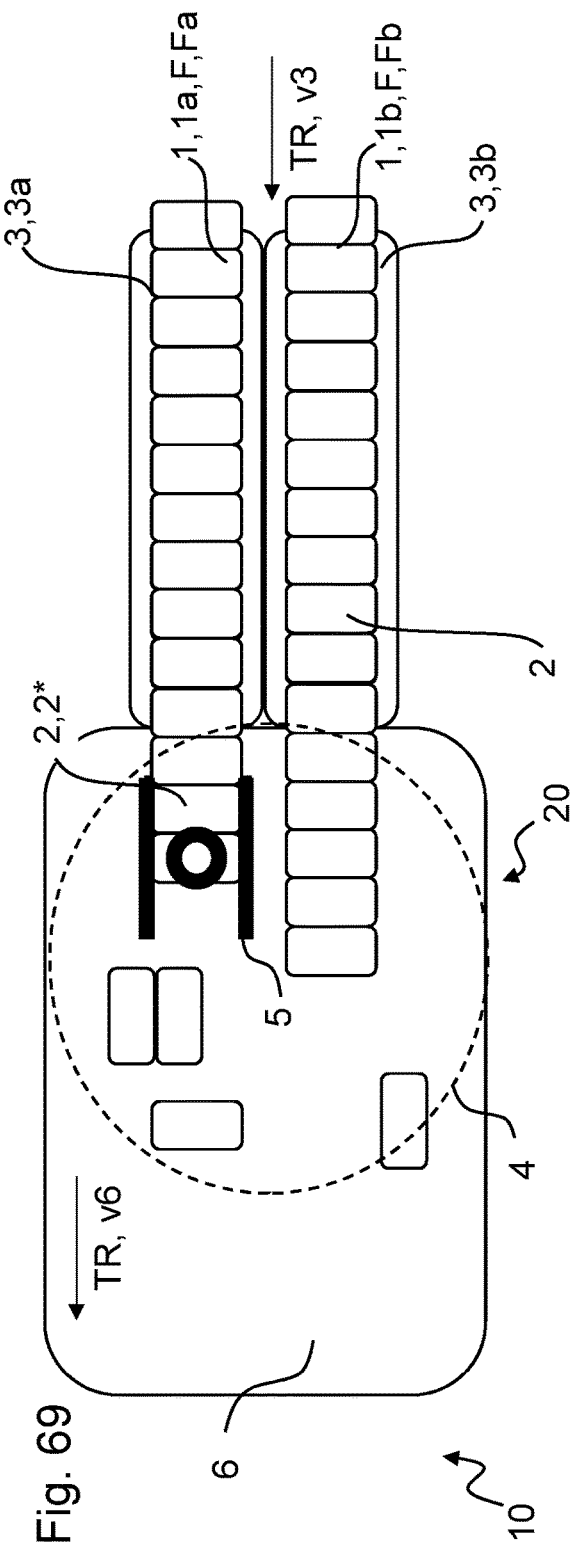

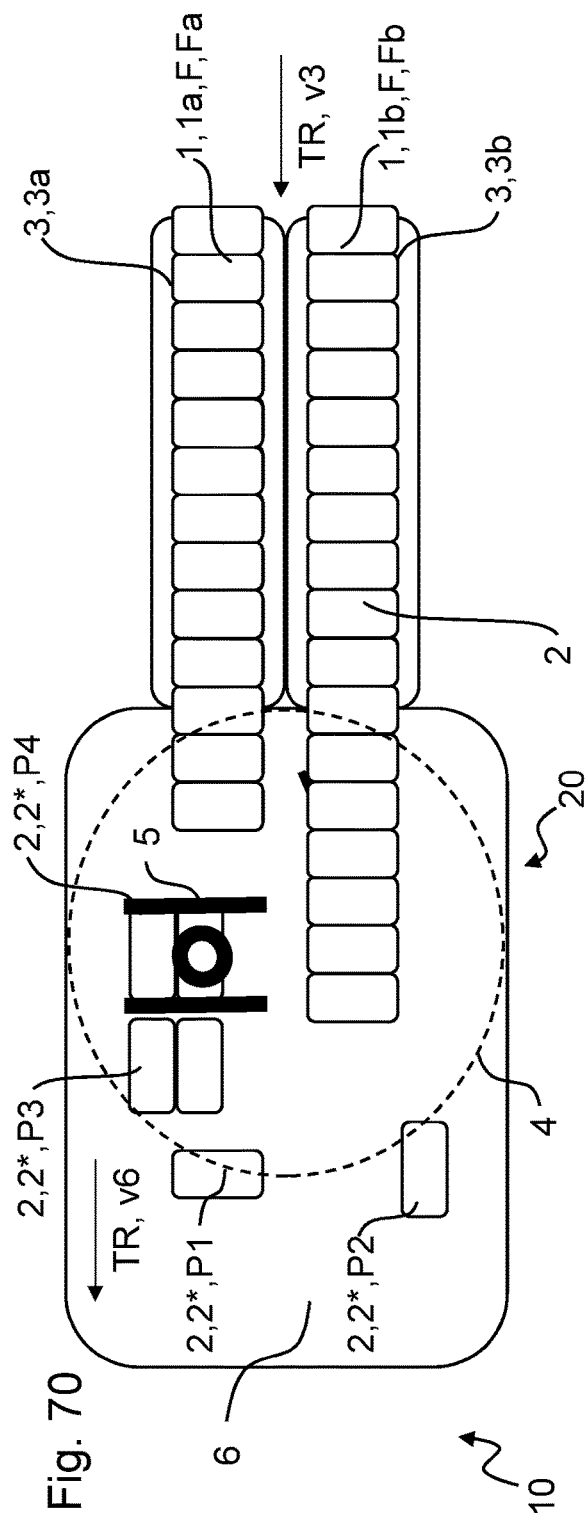
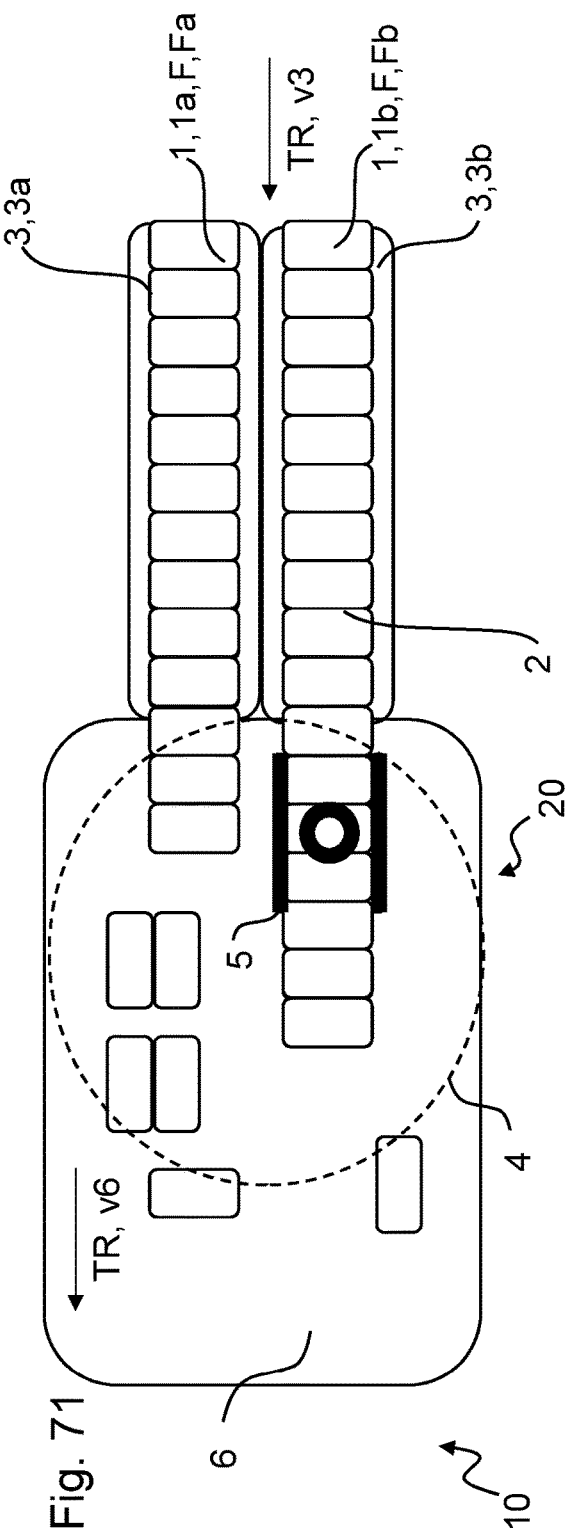

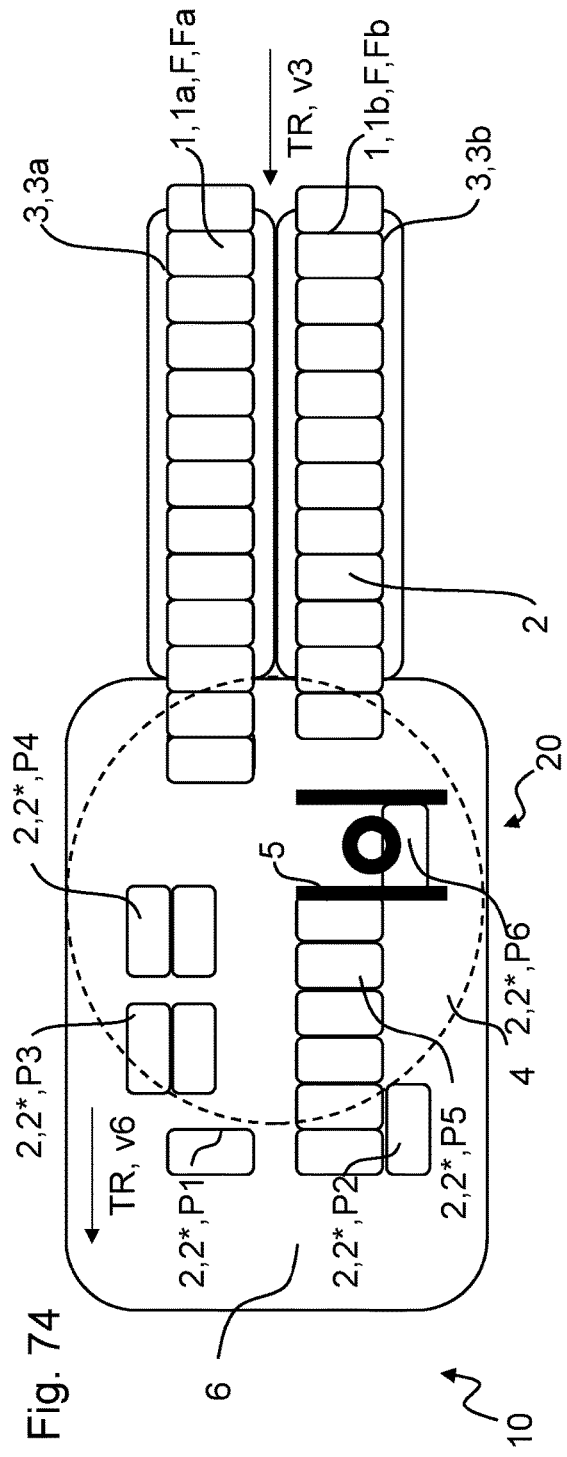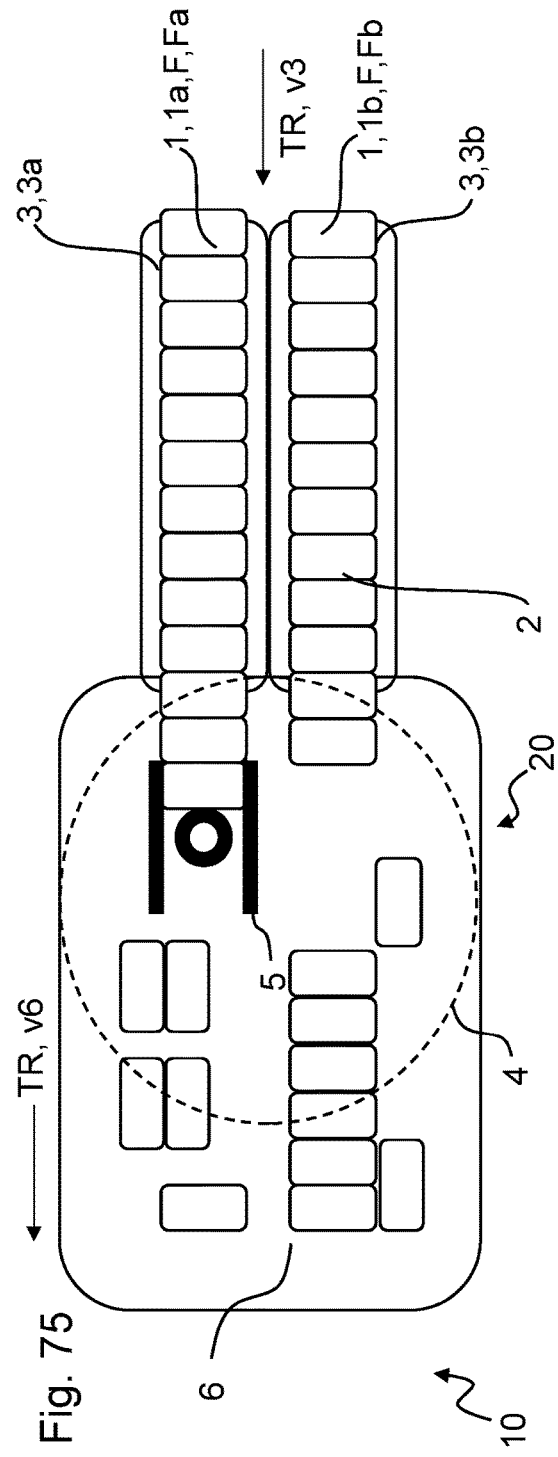

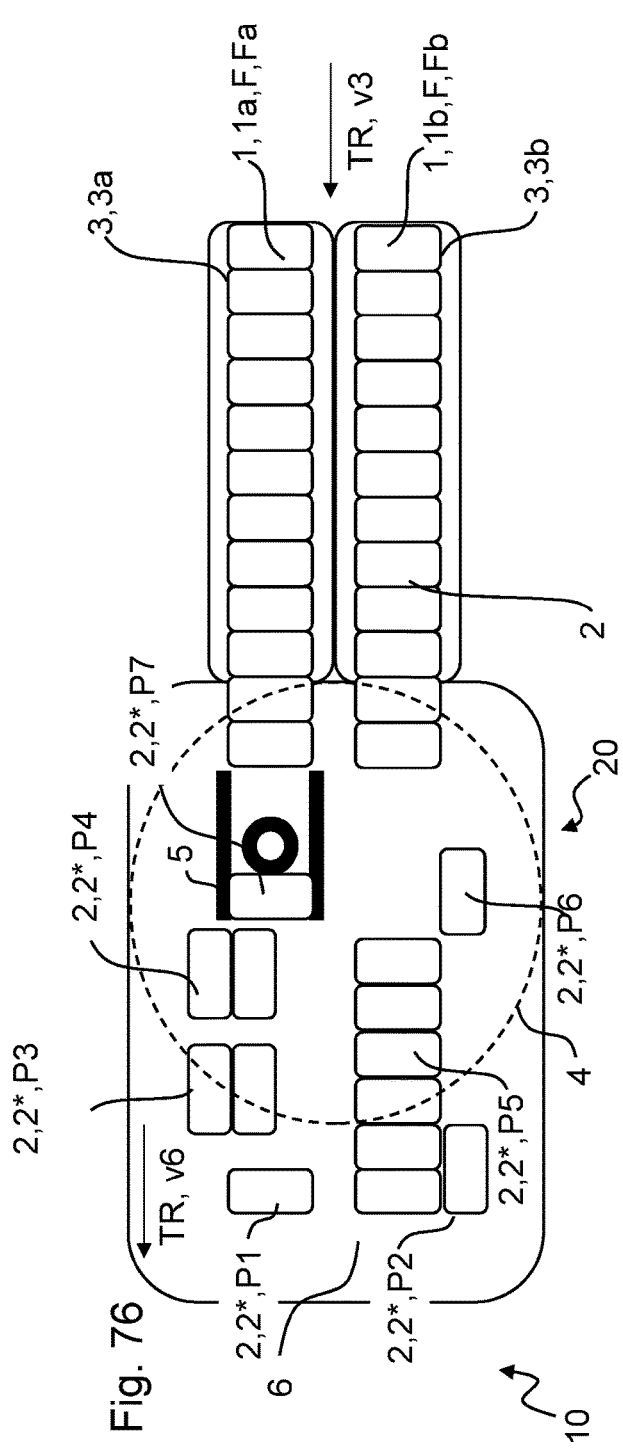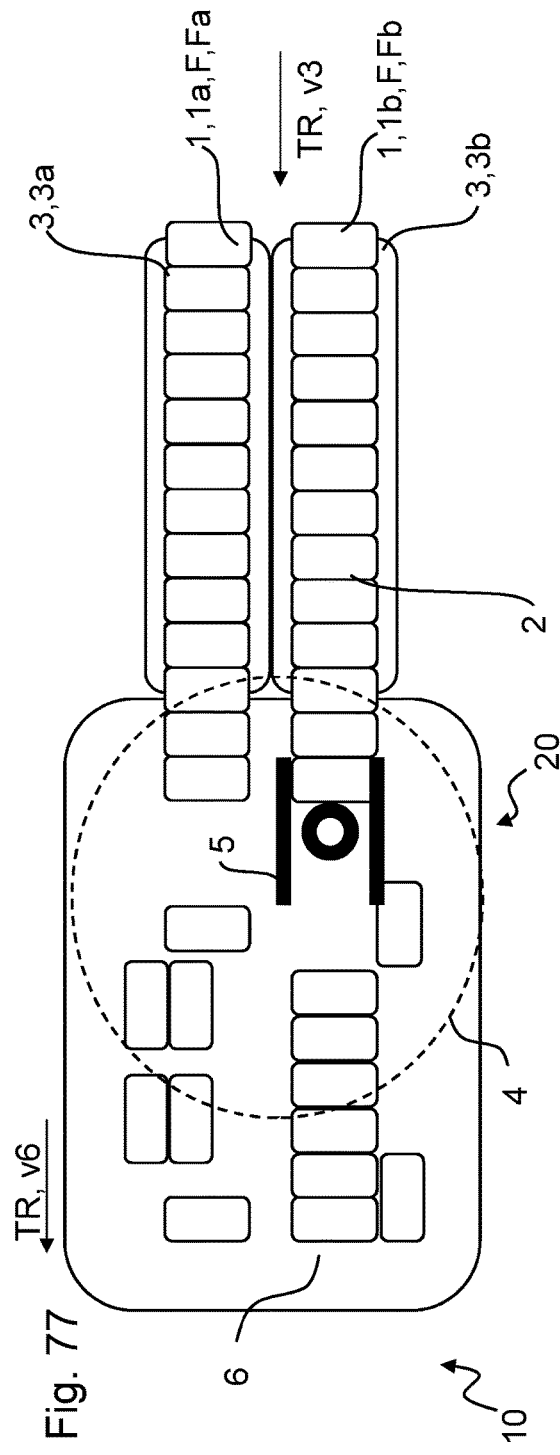

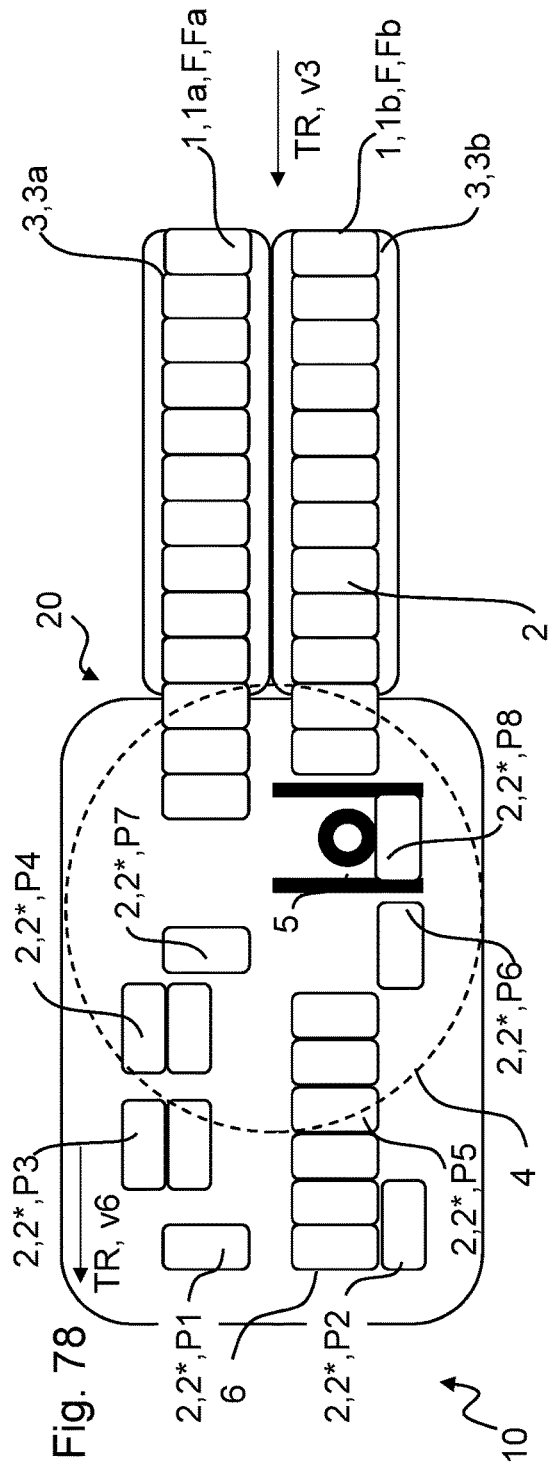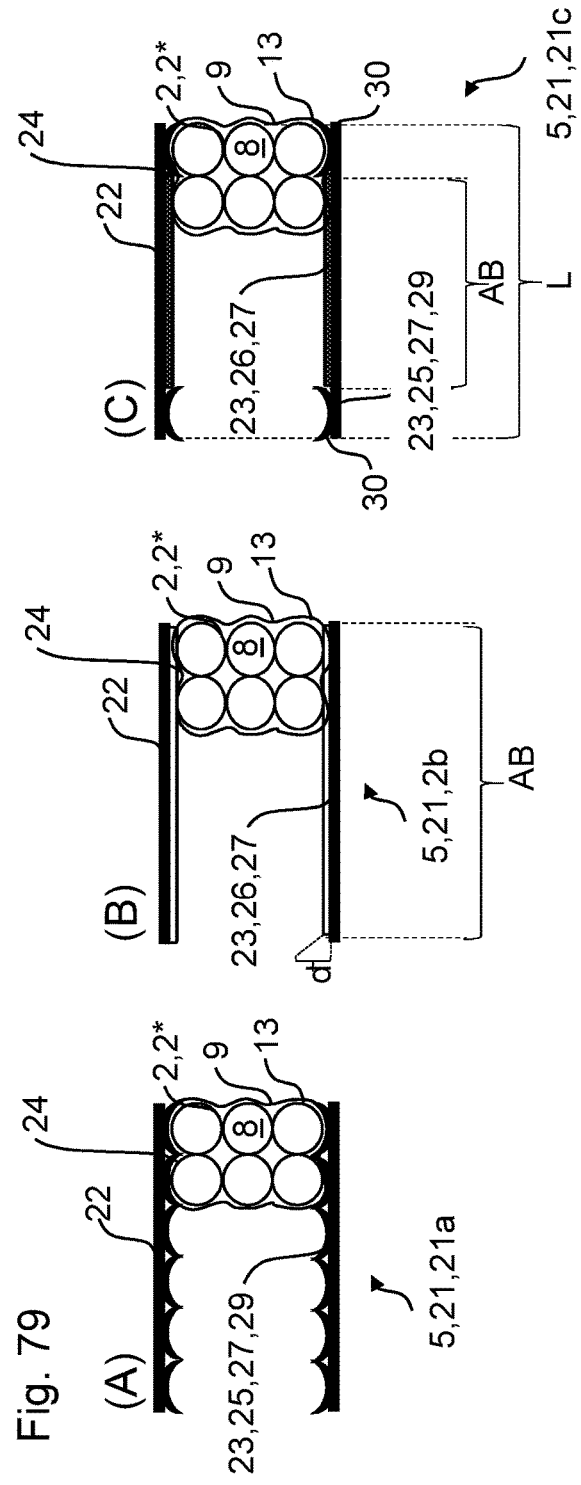

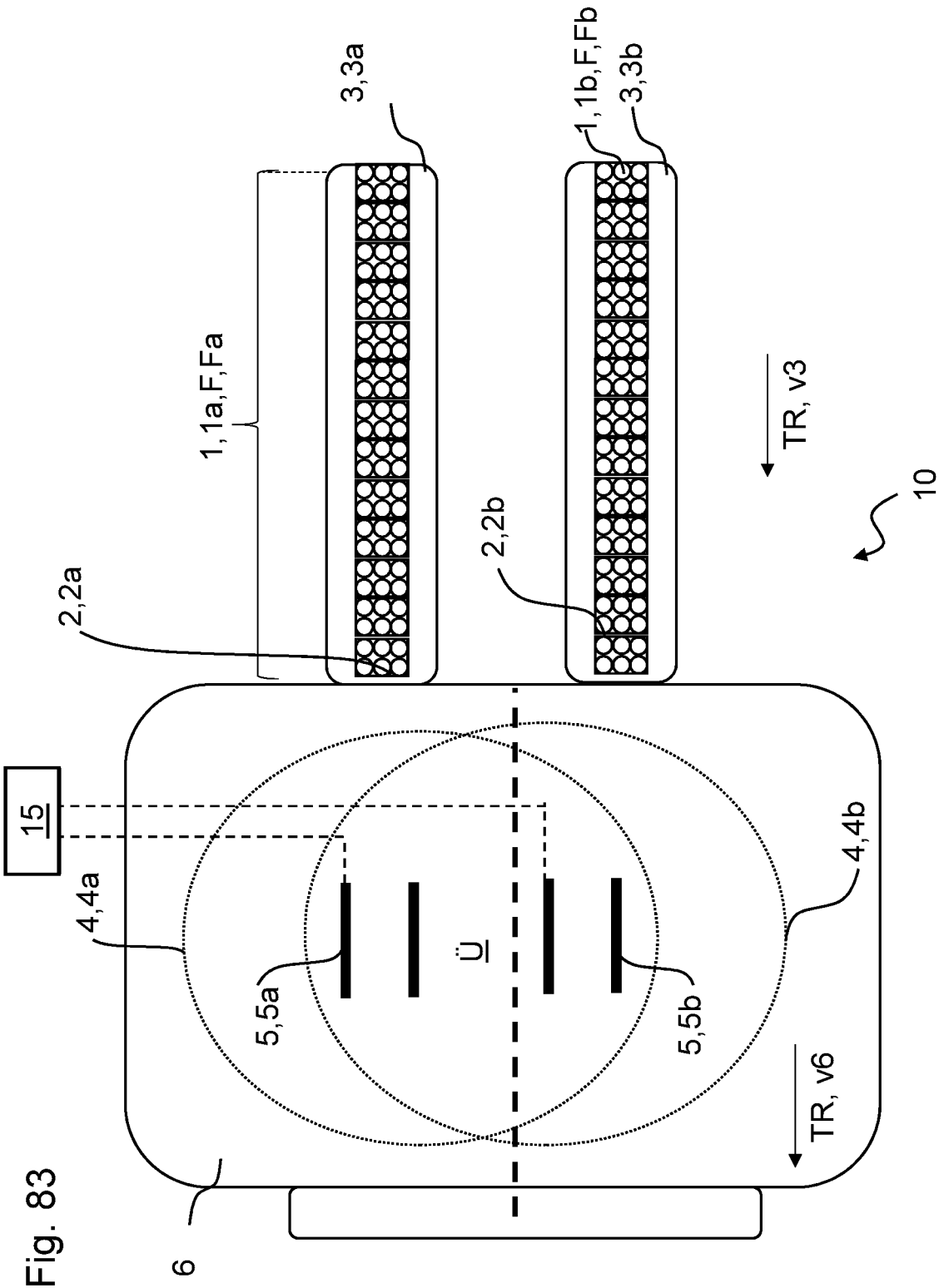

METHOD AND APPARATUS HANDLING PIECE GOODS MOVED IN AT LEAST ONE ROW ONE AFTER ANOTHER

CLAIM OF PRIORITY

The present application claims priority to international application PC/EP2017/053836, filed Feb. 21, 2017, which in turn claims priority to German application DE 10 2017 206 639.0, filed Apr. 20, 2016, which are incorporated by reference.

FIELD OF THE INVENTION

The present invention relates to a method for handling piece goods moved one after another in at least one row. The invention moreover relates to an apparatus for handling piece goods moved one after another in at least one row.

BACKGROUND OF THE INVENTION

In the known methods for packaging and/or palletizing piece goods, such as packages, bundles, or the like, these are first conveyed on transport devices conveying in lines, and are shifted, aligned, and/or assembled in a suitable manner for producing desired layer patterns that can be subsequently stacked in multiple layers on top of each other, for example on pallets prepared for this purpose. These treatment steps can be particularly useful with facilities for treating beverage containers. The piece goods in question can be, for example, packages, crates, cartons, bundles, or clusters. For the mentioned pallets to be safe for transport, the assembled layer patterns, which are also referred to as assembled cycles, have to meet certain requirements. In order to form such cycles, it is customarily necessary to perform preparatory procedures, which consist, for instance, in first conveying piece goods regularly or stepwise on a so-called dosing belt, in then grouping or gathering them on an intermediate transport belt, and in delivering them together and/or in groups from there to a layer-forming belt or a layer-forming table.

In the prior art it is known to deliver spaced-apart piece goods from a dosing belt onto a transport belt, which means that in each instance individual piece goods are delivered to the transport belt. This delivery can be carried out by each individual piece good being individually delivered onto the transport belt by way of a velocity difference between dosing belt and transport belt; a control by optical sensors, for example light barriers, can additionally be in place. It is likewise conceivable to deliver the piece goods in a spaced-apart manner from the transport belt by way of operating the layer-forming belt in a stepwise manner. In order to deliver in each instance individual piece goods from the transport belt onto the layer-forming belt in such a manner, the layer-forming belt can be operated in steps that are synchronized with the transport belt by exactly one length of a piece good in transport direction. These cycles or groups or parts of grouped piece goods can also be rotated on the transport belt according to the desired layer pattern in order to then be delivered to the layer-forming belt.

Prior art knows different embodiment variants for designing grouping tables that serve to bring together piece goods, such as cartons, shrink packs, trays, and plastic crates. Piece goods can be brought together by being assembled into a two-dimensional formation (block construction, e.g. pallet layer), for example. For this purpose, a roller conveyor, for instance, can be supplied linearly from one or several lanes. According to requirements, the piece goods can be rotated prior to or on the roller conveyor, and they can be arranged in the required positions mechanically by stop points. The piece goods positioned in such a way can then be pushed off from the roller conveyor in a direction orthogonal to the transport direction. Supplying, arranging, and pushing off the piece goods can in this context be regarded as a cycle. At least one cycle is needed to assemble one layer, normally, however, a plurality of cycles are needed. The partly discontinuous conveyance with its relatively abrupt speed changes or direction changes causes accordingly high mechanical stress on the piece goods, which is possibly detrimental to product-protective processing of the piece goods.

Document EP 1 456 101 A2 discloses an apparatus for forming rows from packaging goods for bundle palletizers. The bundle palletizer comprises at least one layer station and at least one palletizing station. The row forming apparatus comprises at least one positioning station, on which the packaging goods are arranged at desired spaces in at least one row during the transport. The positioning station connects to a staging conveyor associated with the layer station. At least one accumulating conveyor is disposed upstream from the positioning station, which has several conveyor sections arranged consecutively in transport direction with controllable and regulatable drives. The controllable and regulatable drives make it possible to achieve the desired spacing for the packaging goods. The row forming apparatus has at least one monitoring device for identifying and monitoring the spacing of the packaging goods. The construction of this known row forming apparatus is rather elaborate and complicated, especially as many belts are required for forming the spaces and/or for rotating the packaging goods.

An apparatus is known from U.S. Pat. No. 5,123,231 A for assembling articles into groups and subsequently packaging them. On a feeder belt and in each instance with predefined spaces, the articles are fed to a collection belt where the groups are assembled from an unvarying number of articles. The groups are then fed to a subsequent belt of a packaging device.

EP 1 927 559 A1 discloses a grouping table for bringing together bundles, in particular shrink packs, for the purpose of forming layers, the grouping table comprising a continuously drivable conveyor, disposed downstream therefrom a cyclically drivable step conveyor, disposed laterally next thereto a layer-forming station, and a push-off device associated with the step conveyor and acting orthogonal to the conveying direction for the groupwise transfer of the bundles onto the layer-forming station.

US 2005/0246056 A1 discloses a system for arranging packaging items into a layer that is deposited or stacked on a pallet in following handling procedures. It involves three linearly arranged conveyor belts. Via a first conveyor belt, the packaging items are supplied to the apparatus. The packaging items are disposed linearly on the first conveyor belt. With the second conveyor belt, the packaging items are spaced apart. Subsequently, the packaging items reach a third conveyor belt, where the arrangement of the packaging items is carried out. All three conveyor belts run at different, however, in each instance constant speeds. When a layer is completely assembled, it is transferred onto the pallet.

The known prior art as illustrated by different documents can have various disadvantages in practice. The particular velocity differences and high acceleration ramps and/or correspondingly steep deceleration ramps involve the risk that spacing apart or transferring the piece goods between dosing belt, transport belt, and also layer-forming belt cannot be carried out in the intended precise manner. Individual piece goods may even veer off or turn away from their specified positions. Moreover, the frictional resistance between the particular conveyor belt or transport belt and the underside of the particular piece good also plays a role that is not to be neglected, as it can lead to the spaces between the cycles not being precisely reproducible and thus turning out different. In addition, the distance that the individual spaces need to cover for the so-called procedure of cycling-in from the dosing belt onto the transport belt can result in loss of performance. All of these effects increase the time required for putting together a pallet.

In order to avoid these disadvantages, EP 2 107 018 A1 proposes a method and an apparatus intended for staging cycles of bundles and/or bundle groups safely, quickly, and at top quality, so that the rows for the layers of a pallet can be put together in an effective manner. The proposed apparatus serves for assembling and aligning bundle groups, and it comprises a dosing belt, a transport belt, and a belt for forming rows or layers. The dosing belt, the transport belt, and the belt for forming rows or layers are each provided with an own motor as a drive. The speed of the dosing belt is regulated by a control such that the bundles or bundle groups being transported one batch next to the other can be divided into a number of cycles of bundles or bundle groups on the transport belt. Predefined spaces are formed between the individual cycles. The belt for forming rows or layers can have a robot associated with it, which can shift and/or rotate the incoming cycles from the transport belt to form layers in or transversely to transport direction. In addition, the layer-forming belt is intended to enable the formation of a layer from a plurality of rows.

Furthermore, a method for forming palletizable layers from piece goods standing next to each other on a layer-forming station is known from DE 10 2011 080 812 A1. Associated with the layer-forming station is a program-controlled manipulator for collecting and/or transferring individual or several piece goods from at least two feed stations that are spatially apart or offset from one another and for positioning the piece goods by rotating and/or shifting them into specifiable release positions on the layer-forming station.

Manipulators of this type or also robots associated with the layer-forming belts can be designed as multi-axis robots, for example, such as are known from DE 10 2009 026 220 A1, for instance, in the context of grouping articles or beverage containers. A frequently used variant of suchlike manipulators are so-called gantry robots, which are often employed in a modular structure in packaging lines, in grouping units, or in palletizing stations. A conveyor belt extending horizontally in longitudinal direction of the conveying level, or a different endlessly circulating means, are types of frequently used transport means or conveying units, on which the objects and/or packages are disposed in predetermined or in randomly assumed positions. Such a module is known, for example, from DE 10 2009 043 970 A1. The gantry robots that are typically employed in such modules, as known, for instance, from DE 10 2010 020 847 A1, can be equipped with gripping apparatuses, for example, for lateral seizing of the piece goods to be handled or manipulated.

It is the primary object of all known handling systems to enable precise positioning of piece goods, packages, bundles, and/or articles for, as far as possible, failure-free and reliable preparation for layer forming, palletizing, and/or packaging. A secondary object that is, however, becoming increasingly important, lies in reducing the cycle times in this process without reducing the already achieved degree of precision and without having to accept decreases in terms of the reliability already achieved. The method is intended to enable processing of piece goods that are conveyed or transported in at least one row. The method is moreover intended to run at a higher speed than has been hitherto possible without creating disadvantages in terms of piece good positioning precision and/or manipulation reliability. The corresponding apparatus is intended to operate faster than the manipulation apparatuses known from prior art and at the same time with at least approximately the same reliability and approximately the same positioning precision.

These objects of the invention are achieved by the subject matter as described herein, that is, by a method and an apparatus for handling piece goods moved one after another in at least one row. Features of advantageous further developments of the invention are indicated herein.

SUMMARY OF THE INVENTION

The invention relates to a method and an apparatus or handling apparatus for handling piece goods moved one after another in at least one row. If therefore simply a "method", a "method variant", the "method according to the invention" or the like is referred to in the context of the present description, this is intended to generally mean the mentioned method for handling piece goods moved one after another in at least one row. If, furthermore, simply an "apparatus", a "handling apparatus", an "apparatus variant of the apparatus according to the invention" or the like is referred to in the context of the present description, this is intended to generally mean the mentioned apparatus for handling piece goods moved one after another in at least one row. If "handling of piece goods" is referred to here, in the exemplary embodiments, in the claims, and/or in the context of the entire description disclosure, this is intended to comprise handling, seizing, positioning, moving in space, rotating, aligning, etc., in particular in the context of a manipulator and/or movable parts of the manipulator that are disposed in a seizing space or seizing range and that can move there within definable limits. The term of handling, however, likewise comprises positioning steps, conveying steps, and/or any types of handling steps that can take place in the context of conveying devices, horizontal conveying devices, transport belts, etc. that are part of the apparatus according to the invention and/or are in operative connection and/or in a transport connection therewith, be they parts that are arranged downstream or upstream in transport direction and/or conveying direction, or be they integrated parts of the apparatus according to the invention.

If an "unchanged" or "new" alignment is referred to in the context of the presently described apparatus, this is intended to mean, in particular, the angular alignment of piece goods that are previously seized and moved and/or shifted and/or rotated by the manipulator. "Seizing" in the present context usually means gripping a piece good or a plurality of piece goods simultaneously in a physical, form-locking and/or force-locking and/or clamping manner, as well as the handling thereof up to the point of reaching the target position and/or target alignment.

The piece goods can be articles, packaging items, container sets, bundles, cartons, or the like moved one after another in one row. It can be provided, for example, that a plurality of articles of the same or of different kinds are gathered together in a bundle or in a mixed bundle by an external cardboard packaging, by a strapping or by a plurality of strappings, by a film packaging, or the like. Furthermore, a plurality of beverage containers held together, for example, by a shrink wrap, by a strapping tape or a plurality of strapping tapes, can in each instance form one piece good. The piece goods moved one after another in one row can in this context be formed to be the same or to be different, according to requirements of subsequent handling apparatuses.

The at least two immediately consecutive piece goods in a row without spaces or with minimal spaces being moved and/or being conveyed to an area—referred to, in particular, as manipulating range or seizing range—are transported as a closed formation. The term "closed formation" is intended to mean a largely unspaced succession of piece goods transported one after another. The closed formation in the sense of the present invention can be of finite length and comprise a limited number of piece goods, whereupon a space can follow, and upon such a space another such formation can follow which is subsequently transported. Such a sequence can be repeated, too, if applicable, a plurality or a multitude or an undefined number of times. The closed formation can also be transported as an endless formation that has no interruption and comprises an optional number of piece goods. At least one transported piece good is seized in a clamping and/or force-locking and/or form-locking manner from this closed formation; is spatially separated from the closed formation; and is brought into a specified relative target position and/or target alignment in relation to subsequent piece goods of the formation. If "seizing" of piece goods in a "clamping manner" is referred to in the context of the present invention, this is intended to also comprise seizing, gripping, or receiving piece goods in a force-locking and/or friction-locking manner. All the variants of receiving, seizing, and/or gripping piece goods can be likewise combined with seizing, gripping, or receiving the piece goods in a form-locking manner. If a "target position" and/or "target alignment" is referred to in the context of the present invention, this is intended to mean, in particular, that the piece goods are seized, shifted, and/or rotated; and it is also possible that the piece goods are optionally only shifted (without rotation) or only rotated (without shifting movement).

As a differing option that can nevertheless refer to some embodiment variants of the method according to the invention for handling piece goods moved one after another in at least one row and/or of the apparatus according to the invention for handling piece goods moved one after another in at least one row or also to a plurality of embodiment variants of this method or of this apparatus it is possible that the at least two immediately consecutive piece goods, in each instance without spaces or with minimal spaces from each other, in specified rows being moved and/or conveyed to an area—referred to, in particular, as manipulating range or seizing range—are in each instance conveyed or transported in cycled formations. The term "cycled formation" and/or "cycled infeed" is intended to refer to a largely regular succession of specified rows of piece goods that are transported one after another in the specified rows, where the specified spaces can occur, however, between consecutive rows; this being meant by the term "cycling of the infeed" or cycling of the formations". The closed and/or unspaced rows in the sense of the present invention can each be of finite length and comprise a limited number of piece goods, whereupon a space can follow, and upon such a space another such row with in each instance unspaced consecutive piece goods can follow, which row is subsequently transported. Such a sequence can be repeated, too, if applicable, a plurality or a multitude or an undefined number of times, preferably in regular sequence, however also in cyclically regular patterns or even in irregular succession. The closed rows of a formation cycled in such a way can generally each comprise any number of piece goods. At least one transported piece good is in each instance seized in a clamping and/or force-locking and/or form-locking manner from these closed rows of the cycled formations; is spatially separated from the unspaced row of the cycled formation; and is brought into a specified relative target position and/or target alignment in relation to subsequent piece goods of the formation, while a piece good, usually one located foremost, of the particular row is seized by the manipulator and picked off from the row.

As a further option that also differs from the aforementioned variants but can nevertheless refer to some embodiment variants of the method according to the invention for handling piece goods moved one after another in at least one row and/or of the apparatus according to the invention for handling piece goods moved one after another in at least one row or also to a plurality of embodiment variants of this method or of this apparatus it is possible that the at least two immediately consecutive piece goods in specified rows, in each instance with specified spaces therein between the individual piece goods, being moved and/or conveyed to an area—referred to, in particular, as manipulating range or seizing range—are in each instance transported in cycled formations. The term "cycled formation" and/or "cycled infeed" is intended to refer to a largely regular succession of piece goods conveyed in a row, where the piece goods are in each instance transported in a row one after another with specified spaces from each other. The rows with specified spaces added between the piece goods in the sense of the present invention can each be of finite length and comprise a limited number of piece goods, whereupon a larger space can follow, and upon such a larger space another such row with in each instance consecutive piece goods at specified spaces can follow, which row is subsequently transported. Such a sequence can be repeated, too, if applicable, a plurality or a multitude or an undefined number of times, preferably in regular sequence, however also in cyclically regular patterns or even in irregular succession. The cycled formations supplied with specified spaces between consecutive piece goods within one row can generally each comprise any number of piece goods. At least one transported piece good is in each instance seized in a clamping and/or force-locking and/or form-locking manner from these rows of the cycled formation; is spatially separated from the cycled formation; and is brought into a specified relative target position and/or target alignment in relation to subsequent piece goods of the formation, while a piece good, usually one located foremost, of the particular row is seized by the manipulator and picked off from the row.

It is preferably provided that in the moment of seizing at least one piece good, there is no back pressure or at the most a very small back pressure between this piece good and the directly following piece goods of the formation. If a back pressure does build up while the piece goods are advanced, this back pressure is preferably dissipated by suitable means prior to the seizing of at least one piece good; this can be achieved, for example, by selecting a suitable surface of the transport device for the piece goods moved in rows one after another. In particular, it can be provided that the surface of the transport device is rubberized in order to prevent slipping of the piece goods on the transport device or in order to dissipate or at least significantly reduce the back pressure of the constantly fed formation or piece good row.

When seizing the at least one piece good from the formation, this piece good is normally not decelerated in its movement in transport direction of the piece good row. Instead, the at least one piece good receives at least one additional velocity component and/or direction component after being seized by the manipulator of the apparatus; and the velocity component in this context must not be negative in relation to the speed of the piece goods in the formation, and the direction component must not be directed against the transport direction of the piece goods in the formation. Otherwise, there would be a risk of collision between the seized piece good and the following piece good that is now located foremost in the closed formation.

Furthermore, the method or a variant of the method can optionally provide that the immediately consecutive piece goods, in each instance without spaces or with minimal spaces, are transported in a plurality of rows, in particular in at least two rows, each as closed formations, and that at least one piece good from one of the at least two in each instance closed formations is seized in a clamping and/or form-locking and/or force-locking manner; is spatially separated from the closed formation; and is brought into the particular target position and/or target alignment in relation to subsequent piece goods by a manipulator. In particular, the at least one piece good is seized from one of the at least two arriving formations by exactly one manipulator based on a particular supply situation; is spatially separated from the closed formation; and is brought into the particular target position and/or target alignment in relation to subsequent piece goods by the exactly one manipulator. Preferably, in this embodiment of the method, there are more rows provided for feeding piece goods than there are manipulators. In particular, at least one manipulator thus has to process at least two rows of piece goods or formations. In addition, the method can optionally or additionally provide that the at least one piece good can be further transported, without interruption and/or speed change and/or direction change, upon reaching or immediately after reaching its target position and/or target alignment.

Alternatively, a further embodiment variant of the method can provide that the immediately consecutive piece goods in at least one row, preferably in a plurality of rows, in each instance without spaces or with minimal spaces, are transported as closed formations, and that the piece goods or individual piece goods or a plurality of piece goods are seized in a clamping and/or form-locking and/or force-locking manner from the at least one closed formation by way of a plurality of manipulators; are in each instance spatially separated from the closed formation; and are in this connection brought into a particular, specified relative target position and/or target alignment in relation to subsequent piece goods by the plurality of manipulators with a temporal overlap. It can be provided, for example, that the piece goods arrive in one row and pass over into the particular seizing range of at least two or more adjacently and/or parallelly disposed manipulators, each of which both take hold of the piece goods of the one row and bring the piece goods into the particular target positions and/or target alignments. In this context it can be provided, in particular, that the at least two manipulators have identical seizing ranges. It can be alternatively provided that the piece goods are transported in at least two rows in the particular closed formations to the plurality of manipulators. A variant of this method can moreover provide that in each instance at least one foremost transported piece good is seized in a clamping and/or form-locking or force-locking manner from the particular closed formation by the two or more manipulators; is spatially separated from the particular closed formation, and is brought into the particular specified relative target position and/or target alignment in relation to in each instance subsequent piece goods. By using two or more manipulators, it is possible to realize higher processing speeds and/or higher positioning speeds and thus shorter cycle times. In particular, when there are two or more preferably parallel rows or closed formations two or more manipulators can process the preferably parallel rows or closed formations faster such that significantly higher transport speeds are realizable than when only one manipulator is used.

These two or more manipulators disposed adjacent or parallel in transport direction of the piece goods can in phases, as required, operate with overlapping or at least partly interengaging ranges of movement and/or seizing ranges for the piece goods in which case the control rules for the movement controls of the manipulators should contain procedures for collision prevention. Such overlapping operating ranges or seizing ranges are particularly useful when piece goods are grouped or formed to layers such that an overall arrangement or a common layer pattern for subsequent packaging, palletizing, etc. is formed from a plurality of rows. It is particularly difficult to exactly predict and assign a position in relation to the movement range of one of two adjacent manipulators for the central sections of such a layer pattern because these central positions can be reached by both adjacent manipulators alike; for this reason, temporal overlaps of the movement ranges are at least temporarily useful for positioning movements of the manipulators. In this context it is important to coordinate the movement pattern of the manipulators with each other such that no collision of the manipulators occurs when they seize and position the piece goods.

In a further alternative embodiment variant of the method, or optionally a variant that can be combined with the previously described variants, in each instance at least one transported piece good is seized in a clamping and/or force-locking and/or form-locking manner from the closed formation in a plurality of temporally consecutive steps; is in each instance spatially separated from the closed formation by lateral rotation out of a straight movement path of the closed formation; and is brought into a particular specified relative target position and/or target alignment in relation to subsequent piece goods, with the result that a palletizable layer or layer arrangement or a pre-group for a palletizable layer or layer arrangement can be formed from the piece goods that have been brought in temporally consecutive steps into their particular target position and/or target alignment and/or from the piece goods that have been rotated.

If "pre-groups", a "palletizable layer", or a "palletizable layer arrangement" is referred to in this context and also in the context of the entire description, this is intended to generally mean all piece good assemblies within one horizontal plane—if applicable, stacked on top of each other in two or three planes, as well—that can be further transported toward handling stations and/or palletizing stations and/or packaging stations disposed downstream. For the method according to the invention, it can be generally assumed that there is initially a high degree of order among the piece goods, because they are conveyed in closed formations as a row or as rows to the manipulator or to the manipulators. There, this order is first largely broken up, because the piece goods are brought to different positions, whereby, however, the degree of order among the piece goods gradually increases again in transport direction. In the further course of the transport, which is not explained in detail here, the degree of order can again increase significantly if the layer arrangements or pre-groups are joined and/or pushed together, thus closing the spaces, and the layer arrangements are optionally gathered together as largely closed layers, for example in suitable outer packages. Optionally, however, the assembled piece goods can also be stacked and/or palletized in the particular layer arrangement and only subsequently be wrapped or supplied with outer packages.

It should also be noted that the term "palletizable layer" or "palletizable layer arrangement" also always comprises the partial layer or the partial layer arrangement and vice versa.

For the purpose of forming the palletizable layer or the pre-group for a palletizable layer, it is possible in one variant of this method that in at least two temporally consecutive steps, the in each instance at least one piece good seized in a clamping and/or force-locking and/or form-locking manner from the closed formation is in each instance spatially separated by lateral rotation out of the straight movement path of the closed formation, and is brought into a particular specified relative target position and/or target alignment in relation to the subsequent piece goods, in which context it is provided that the at least one piece good is moved by a right hand rotation (right sense of rotation or clockwise rotation, in particular, in rotation about a vertical axis of rotation) in the instance of being brought to the right side of the straight movement path of the closed formation; whereas the at least one piece good and/or a further piece good is moved by a left hand rotation (left sense of rotation or counterclockwise rotation, in particular, in rotation about a vertical axis of rotation) in the instance of being brought to the left side of the straight movement path of the closed formation. These different rotary movements can in each instance be carried out differently in manipulation steps that follow each other immediately and also in manipulation steps that follow each other spaced apart.

For the purpose of forming the palletizable layer or the pre-group for a palletizable layer, the method can moreover provide that in at least two temporally—immediately or spaced apart—consecutive steps, the in each instance at least one piece good seized in a clamping and/or form-locking and/or force-locking manner from the closed formation is in each instance spatially separated by lateral rotation out of the straight movement path of the closed formation, and is brought into a particular specified relative target position and/or target alignment in relation to the subsequent piece goods, in which context the at least one piece good in the course of a first of the at least two temporally consecutive steps is moved by a right hand rotation in the instance of being brought to the right side of the straight movement path of the closed formation; and in which context the at least one piece good in the course of a second of the at least two temporally consecutive steps is moved by a left hand rotation in the instance of being brought to the left side of the straight movement path of the closed formation.

An expedient alternative option, which will be described in more detail below on the basis of another embodiment variant of the method according to the invention, can also be to first distance the piece goods, which are located foremost and which are to be seized, by an acceleration phase of relatively short duration in transport direction or with a movement component parallel to the transport direction from the subsequent piece goods of the subsequent, closed formation, in particular, immediately prior to or upon initiation of the rotation, whereby the direction of rotation of a following positioning, in which an overlapping rotary movement of the seized piece goods is necessary or expedient can be carried out in a left hand rotation or in a right hand rotation according to other considerations of expediency. Such an option can be more advantageous for some intended layer patterns or product schemes than a schematic and/or purely program-controlled decision for a left hand rotation or a right hand rotation, which is to be carried out mainly according to the criterion of the movement direction—with piece goods that are to be shifted to the left or to the right in relation to the movement path. Likewise, it can be an expedient alternative option to first distance an individual piece good, which is located foremost and which is to be seized, by an acceleration phase of relatively short duration in transport direction or with a movement component parallel to the transport direction from the subsequent piece goods of the subsequent, closed formation, prior to initiating a rotary movement, whereby the direction of rotation of a following positioning, in which an overlapping rotary movement of the individual, seized piece good is necessary or expedient can be carried out in a left hand rotation or in a right hand rotation according to other considerations of expediency. Such an option can be more advantageous for some intended layer patterns or product schemes than a schematic and/or purely program-controlled decision for a left hand rotation or a right hand rotation, which is to be carried out mainly according to the criterion of the movement direction—with a piece good that is to be shifted to the left or to the right in relation to the movement path.

For the purpose of forming the palletizable layer or the pre-group for a palletizable layer, the method can moreover provide that in at least one of the temporally consecutive steps at least two piece goods are seized at least approximately simultaneously; are subsequently spatially separated from the closed formation by lateral rotation out of a straight movement path of the closed formation; and are together brought into their particular specified relative target position and/or target alignment in relation to the subsequent piece goods. This mentioned simultaneous seizing of a plurality of piece goods in practice refers to the common manipulation step of two or more piece goods removed from the formation, with the piece goods remaining during the manipulation step in their original adjacent arrangement that they already had in the row of the formation. This adjacent arrangement normally also remains in the pre-group or in the layer arrangement it can, however, also be broken up, if applicable, for example by a separate shifting procedure and/or rotating procedure that one or more of these piece goods can undergo.

For the purpose of forming the palletizable layer or the pre-group for a palletizable layer, it is possible that optionally, in at least two temporally consecutive steps, a different number or in each instance the same number of piece goods are seized in a clamping and/or form-locking and/or force-locking manner; are in each instance spatially separated from the closed formation by lateral rotation out of the straight movement path of the closed formation; and are brought into a particular specified relative target position and/or target alignment in relation to the subsequent piece goods. It is moreover possible that in the at least two temporally consecutive steps, in each instance one piece good transported foremost in the closed formation or a plurality of piece goods transported foremost in the closed formation is or are seized.

The method can be realized in an advantageous manner by carrying out the at least two temporally consecutive steps by way of a specific manipulator that is preferably designed as a delta kinematic robot. It can furthermore be advantageous for the method if the particular number of piece goods in the at least two temporally consecutive steps are each seized in a clamping and/or force-locking and/or form-locking manner by at least two clamping elements and/or gripping elements, located opposite each other, of the specific manipulator, and are released after having been brought into their particular specified target position by the at least two clamping elements and/or gripping elements located opposite each other. These clamping elements and/or gripping elements are formed as gripping jaws or the like, which are advanceable toward each other, for example, and which allow quick seizing, shifting, positioning, and releasing of the piece goods at the desired speed and with the desired positioning precision.

In a further alternative embodiment variant of the method according to the invention, or optionally a variant that can be combined with the previously described variants, the piece goods following one another in a row are transported as closed formation to a seizing range of the manipulator. As already mentioned, this seizing range is located within the movement range of the manipulator or it can even correspond to it. In the method, at least one transported piece good is moreover seized in the seizing range in a clamping and/or force-locking and/or form-locking manner from the closed formation by at least two clamping elements and/or gripping elements located opposite each other and associated with the at least one manipulator; is spatially separated from the closed formation by distancing in transport direction and by an at least brief acceleration with a movement component parallel to the straight movement path of the closed formation; and is brought into the specified relative target position and/or target alignment in relation to subsequent piece goods.

In this context, it is provided that at least one first vertical symmetry plane, defined by the piece good seized by the at least two clamping elements and/or gripping elements of the at least one manipulator and oriented about perpendicular to a transport direction of the piece goods and/or to a longitudinal extension direction of the closed formation, is spaced apart from a second vertical symmetry plane aligned about parallel thereto and defined by the manipulator or by the manipulator clamping elements and/or gripping elements. In this way it can be defined, in particular, that the one piece good seized by the manipulator is not seized and positioned there centrally or symmetrically in relation to the vertical central axis and/or axis of rotation of the manipulator or of the manipulator clamping elements and/or gripping elements while it is being shifted and/or brought toward the target position, if applicable, under simultaneous rotation. This applies likewise to two or more seized piece goods, which, in conjunction, can also be clamped in the manipulator eccentrically or asymmetrically.

This described occurrence of a distance between the described vertical symmetry planes can also be referred to as asynchronous picking off or as asynchronous seizing or generally as asynchronous processing of the piece goods to be seized and/or to be positioned and/or to be aligned, namely, in particular, because no complete loading of the manipulator or no complete loading or occupation of the space between the gripper jaws or within the gripper head maximally available for piece goods to be received and/or to be gripped is carried out in this context, but rather only a partial loading, a partial seizing, and/or a partial occupation of the loading capacity and/or reception capacity of the manipulator or of the manipulator clamping elements and/or gripping elements.

It should nevertheless be pointed out that generally such partial loading and/or partial occupation of the space available in the manipulator or for piece goods to be seized does not necessarily have to concur with a distancing between the symmetry planes by the total of piece goods received per seizing procedure and by the manipulator or the manipulator clamping elements and/or gripping elements that the seized piece goods can also each be positioned centrally in the manipulator or centrally between the manipulator clamping elements and/or gripping elements such that a remaining, possibly unused space that is not occupied by piece goods can remain at both narrow sides of a piece good or of the outward facing narrow sides of a group of two or three piece goods.

Within the method, that is to say, between two or more method steps, there is one variant that can possibly occur repeatedly or be useful, where these mentioned symmetry planes coincide or nearly coincide. This non-synchronous picking off is, however, usually not separately mentioned, because the complete loading and/or symmetric loading of the manipulator with a plurality of piece goods represents the normal case, to which most of the method aspects outlined in the context of the present description apply.

The manipulation steps normally following each other in this sequence—picking off a piece good or a plurality of piece goods, separating them from the closed formation, shifting them, and releasing the piece good or the plurality of piece goods-take place in the seizing range of the manipulator, and thus take place preferably within the outer limits of the maximum movement range of the manipulator or of the manipulator movable parts. The cycles are formed within the seizing range by the manipulator or by the manipulator's movable parts form. In the present context, these cycles are also referred to as pre-groups or layer arrangements and/or as partial layer arrangements.

If, in the present context, in particular in the context of a so-called asynchronous picking off, a "vertical symmetry plane" or "vertical symmetry planes" is referred to, relating mainly to the positions of the piece goods or to their relative positions to the manipulator or to the manipulator clamping elements and/or gripping elements these vertical symmetry planes are intended to be understood, according to the definition, as oriented perpendicular or approximately perpendicular to the horizontal conveying plane of a horizontal conveying device. These symmetry planes, that is to say, the first symmetry plane, the second, and, if applicable, further symmetry planes, are expediently also oriented perpendicular to the horizontally extending transport direction and/or about perpendicular to a longitudinal extension direction of the closed formation. If the reader imagines this transport direction as a horizontal vector arrow extending parallel to the horizontal support surface of the horizontal conveying device as well as parallel to the transport device that normally likewise extends horizontal or in sections horizontal, then this vector arrow pierces the perpendicular symmetry planes likewise essentially in perpendicular. As mentioned, these at least two symmetry planes—one is associated with the piece goods, the other with the manipulator—are located at a certain distance from one another if the manipulator is loaded asymmetrically or one-sided. If the symmetry planes coincide or approximately coincide, this represents the special case of the completely loaded and/or symmetrically loaded or centrally loaded manipulator.

It should be added at this point that the piece goods with which the mentioned first vertical symmetry plane is associated can in particular be the particular entirety of piece goods that are located in the manipulator or between the manipulator's two clamping jaws in the particular, relevant operating cycle. The entirety of piece goods can thus be characterized, if applicable and appropriate in the individual case, by the total volume and/or the mass point of the total of piece goods located in the manipulator and seized by the manipulator. Accordingly, the second vertical symmetry plane associated with the manipulator expediently is the symmetry plane that extends through the center point of the entirety of piece goods when the manipulator is completely loaded or when it is loaded according to its maximum seizing capacity which normally also implies a central, symmetric, and/or even load of piece goods. If a "center point of the entirety of piece goods" is referred to in the context of the location of the second vertical symmetry plane, then, according to the design of the piece goods, this can be, for example, the mass point of the entirety of piece goods seized in the manipulator, or it can be the volumetric center point of this entirety of piece goods.

It should be added that the second symmetry plane associated with the manipulator can likewise be associated with the manipulator clamping jaws, which can be advanced toward each other, such that a central or an eccentric arrangement of the piece goods or of the particular entirety of piece goods seized simultaneously between the clamping jaws, can be referred to if the first symmetry plane associated with the piece goods or with the entirety of in each instance seized piece goods, coincides with the second symmetry plane or is spaced apart therefrom.

Relating to all of the previously mentioned variants of symmetric or asymmetric arrangement of the piece goods and/or of the synchronous or asynchronous loading of the manipulator with piece goods, it should additionally be noted here that the second symmetry plane associated with the manipulator or with the manipulator clamping elements and/or gripping elements does not imperatively have to extend through an approximately vertical rotational axis of the manipulator, since the manipulator is not necessarily designed to be rotationally symmetric, but it can rather also have an asymmetric design if this is appropriate in terms of construction and/or dynamics.

An asymmetric gripping or seizing of the piece goods in the manipulator can also be characterized, for example, in that the length in transport direction of the total of seized piece goods is less than the total length of the gripping elements and/or clamping elements of the manipulator that are advanceable toward each other if the manipulator is aligned upon seizing the piece goods such that the longitudinal extension directions of the manipulator gripping elements and/or clamping elements are oriented approximately parallel to the transport direction, and such that a non-occupied length of the gripping elements and/or clamping elements of the manipulator at one end face of the piece goods is greater or smaller than at the oppositely located other end face. These non-occupied length measures, in contrast, approximately correspond when the manipulator is symmetrically loaded.

For a better understanding, the mentioned connection is described here once again with the aid of other denominations and in the context of the following equations and inequations. In the equations or inequations $L22$ designates the total length of the clamping jaws of the manipulator. Let $L2$ be the length of a piece good that is currently located between the clamping jaws of the manipulator. Let $LR$ accordingly be the particular residual length or vacant length between the clamping jaws of the manipulator that is not occupied by piece goods. With a clamping jaw length $L22$ corresponding to the threefold length of a piece good length $L2$, the general relation applies:

$$LR=(3-x)\cdot L2,$$

with x being the number of the piece goods clamped in each instance between the clamping jaws, that is to say, currently located in the manipulator Accordingly, with only one piece good located in the manipulator:

$$x=1,$$

the following special case applies:

$$LR=(3-x)\cdot L2=2\cdot L2$$

In a corresponding manner, with two piece goods located asymmetrically in the manipulator:

$$x=2,$$

the following special case applies:

$$LR=(3-x)\cdot L2=1\cdot L2=L2$$

In the special case of the symmetric loading of the manipulator with a total of three piece goods, with the above described symmetry planes coinciding, the following consequently applies:

$$x=3,$$

whereof a value of zero is calculated for the residual length $LR$:

$$LR=(3-x)\cdot L2=0\cdot L2=0$$

These deliberations are generally based on an asymmetric loading of the manipulator or on an asymmetric gripping, in which case the piece goods located between the clamping jaws are disposed at one edge of the clamping jaws such that the non-occupied residual length $LR$ only occurs on one side, not, however, on both sides of the piece goods located between the clamping jaws. Therefore, it can be moreover determined that an asymmetric loading of the manipulator or an asymmetric gripping exists if both of the following conditions apply:

$$L22 > x\cdot L2,$$

and $$LR \geq (L22-x\cdot L2)\cdot \tfrac{1}{2}$$

where x can generally assume the values zero, one, two, or three, whereas x, in order to fulfill the above inequations with asymmetric loading or with asymmetric gripping in the shown exemplary embodiment may only assume the values one (x=1) or two (x=2), as otherwise the manipulator would be vacant (with x=0) or the manipulator would be fully loaded and symmetrically loaded (with x=3).

For the sake of completeness, it should be noted here that an instance of symmetric gripping with a non-fully-occupied manipulator is conceivable such that between the clamping jaws, two piece goods could be disposed centrally, for example, such that the particular symmetry planes of the piece goods and of the manipulator could also coincide. This instance is not representable in the above formulae, even though the above inequation ($L22 > x\cdot L2$) could apply. In such a gripping situation, however, the entire residual length $LR$ would be distributed evenly to two edge sections between the clamping jaws such that the lower inequation [$LR \geq (L22-x\cdot L2)\cdot \tfrac{1}{2}$] would not be fulfilled.

Even if the present description frequently refers to a maximum reception capacity of up to three piece goods per manipulator or per gripper head the mentioned deliberations nevertheless analogously apply to manipulators with smaller or greater maximum reception capacity.

In one embodiment of the method, it can be provided that, in a plurality of temporally consecutive steps, in particular in at least two temporally consecutive steps, in each instance at least one transported piece good is seized in a clamping and/or form-locking and/or force-locking manner from the closed formation; is in each instance spatially separated from the closed formation by lateral rotation out of a straight movement path of the closed formation; and is brought into a particular specified relative target position and/or target alignment in relation to subsequent piece goods. The separation is carried out, for example, by distancing in transport direction, by an at least brief acceleration with a movement component parallel to the straight movement path of the closed formation and toward a particular specified relative target position and/or target alignment in relation to subsequent piece goods. In doing so, the corresponding piece goods are brought into their particular target position and/or target alignment in a plurality of temporally consecutive steps, in which process a rotation of the piece goods seized by the manipulator can be carried out, if applicable, and thus a palletizable layer, for example, is formed, or a pre-group for a palletizable layer, or also for an optional partial layer.

Alternatively or additionally, the piece goods, having been brought into their particular target position and/or target alignment in temporally consecutive steps, are, in particular in the seizing range of at least one manipulator of the apparatus, formed into two or more rows of piece goods that are further processable and/or suppliable to a packaging station or that are palletizable each individually or together. In this context, individual, several, or all piece goods can each be rotated, in particular in each instance by a rotation angle of 90° about a vertical. This case is not the rule, however, but rather occurs less frequently, because it relates to an option that cannot be regarded as the rule, where, instead of one palletizable layer, two rows or more are formed, each under a 90° rotation of the piece goods. Nevertheless, this case can represent an expedient option in some special situations of layer formation and/or row formation.

For the purpose of forming the palletizable layer or the pre-group for a palletizable layer according to one embodiment of the invention, at least two piece goods are seized at least approximately simultaneously in at least one of the temporally consecutive steps. These at least two piece goods are subsequently spatially separated from the closed formation together, and are brought together into their particular specified relative target position and/or target alignment in relation to the subsequent piece goods of the formation.

For the purpose of forming the palletizable layer or the pre-group for a palletizable layer, different numbers of piece goods are seized, preferably in at least two or more temporally consecutive steps, in a clamping and/or force-locking and/or form-locking manner; are in each instance spatially separated from the closed formation; and are brought into a particular specified relative target position and/or target alignment in relation to subsequent piece goods. This method phase can form an important step in connection with the asymmetric seizing of piece goods or with the asynchronous picking off of piece goods. In this context it can be provided that first, a first number of piece goods is seized and transferred to the target positions, for example, only one piece good, two, three, or more piece goods, whereupon a further number that can be different from the first number is seized, transferred, and deposited or positioned there, as applicable, in the target positions.

For the purpose of forming the palletizable layer or the pre-group for a palletizable layer according to one embodiment of the invention, in each instance one individual piece good is seized, in at least two or more temporally consecutive steps, in a clamping and/or force-locking and/or form-locking manner; is in each instance spatially separated from the closed formation; and is brought into a particular specified relative target position and/or target alignment in relation to the subsequent piece goods of the formation. This exemplary embodiment is to be understood alternatively, as a modification and/or as an additional option to some of the previously described embodiment variants, and it particularly relates to the option of forming palletizable layers by picking off only one individual piece good each time.

In the described method, preferably, in the at least two temporally consecutive steps, in each instance one piece good that is transported foremost in the closed formation or a plurality of piece goods that are transported foremost in the closed formation is/are seized; is/are separated from the formation; and is/are repositioned by the at least one manipulator of the apparatus.

The above-described special case of the completely loaded and/or symmetrically or centrally loaded manipulator can occur very frequently, however, it does not require any separate decisions regarding a preferred rotation direction of the manipulator when positioning the piece goods, in particular, if the mentioned criteria of path optimization and/or time optimization or path minimization and/or time minimization, as applicable, are additionally considered.

A decision for a left hand rotation or for a right hand rotation in a positioning of the at least one piece good under its simultaneous rotation can be made, in particular, according to the priorly processed criterion of path minimization. Optionally, a decision for a left hand rotation or for a right hand rotation in a positioning of the at least one piece good under its simultaneous rotation can also be made according to the priorly processed criterion of time optimization or time minimization, as applicable, for the particular positioning and/or according to the priorly processed criterion of time optimization or time minimization, as applicable, for forming the layer arrangement or the pre-group, as applicable, in which case this criterion of time optimization or time minimization can overlap the previously mentioned criterion of path optimization or path minimization in a dominant, equal, or subordinate manner. The relative ranking (dominant, equal, or subordinate) among the different criteria can also change if required, even within a single layer-forming process with the possibility of using additional criteria for this purpose. These additional criteria can lie in a variable positioning precision, in a reduction of acceleration peaks for the positioning movements, or in other external conditions, for example. For the benefit of achieving a high processing speed, it can possibly be expedient to dispense with a certain degree of precision in positioning piece goods. On the other hand, it can be expedient to avoid subjecting sensitive piece goods to high mechanical stress, which can be achieved by reducing the maximum permissible acceleration values, if applicable.

For the purpose of forming the palletizable layer or the pre-group for a palletizable layer, the method can optionally or additionally provide that in at least one of the temporally consecutive steps at least two piece goods are seized at least approximately simultaneously; are subsequently spatially separated from the closed formation by lateral rotation out of a straight movement path of the closed formation; and are together brought into their particular specified relative target position and/or target alignment in relation to the subsequent piece goods, in which case a decision for a left hand rotation or for a right hand rotation in a positioning of the two or more piece goods under their simultaneous rotation is made according to the priorly processed criteria of path minimization and/or time minimization.

For the purpose of forming the palletizable layer or the pre-group for a palletizable layer it can also be provided in at least two temporally consecutive steps that the in each instance at least one piece good is seized in a clamping and/or form-locking and/or force-locking manner is in each instance spatially separated from the closed formation by lateral rotation out of the straight movement path of the closed formation; and is brought into a particular specified relative target position and/or target alignment in relation to the subsequent piece goods, in which case the at least one piece good is moved by a left hand rotation in the instance of being brought to the right side of the straight movement path of the closed formation under the boundary condition of a minimized total distance between the particular seizing position and the particular target position.

In the described method variants, it can be provided, in particular, that the at least one piece good, which is seized with its first vertical symmetry plane offset toward the back, as seen in transport direction, in relation to the second vertical symmetry plane of the manipulator or the manipulator clamping elements and/or gripping elements is moved in the instance of being brought to the right side of the straight movement path of the closed formation with a simultaneous left hand rotation between the seizing position and the target position.

For the purpose of forming the palletizable layer or the pre-group for a palletizable layer it can moreover be provided in a further variant of the method that, in at least two temporally consecutive steps, the in each instance at least one piece good is seized in a clamping and/or form-locking manner is in each instance spatially separated from the closed formation by lateral rotation out of the straight movement path of the closed formation; and is brought into a particular specified relative target position and/or target alignment in relation to the subsequent piece goods, in which case the at least one piece good is moved by a right hand rotation in the instance of being brought to the left side of the straight movement path of the closed formation under the boundary condition of a minimized total distance between the particular seizing position and the particular target position.

Moreover, the at least one piece good, which is seized with its first vertical symmetry plane offset toward the back, as seen in transport direction, in relation to the second vertical symmetry plane of the manipulator or of the manipulator clamping elements and/or gripping elements can be moved in the instance of being brought to the left side of the straight movement path of the closed formation with a simultaneous right hand rotation between the particular seizing position and the particular target position.

The method can furthermore optionally provide that in at least two temporally consecutive steps in each instance one piece good transported foremost in the closed formation or a plurality of piece goods transported foremost in the closed formation are seized.

In the method, the at least two temporally consecutive steps can be carried out by way of a specific manipulator that is preferably designed as a delta kinematic robot. Optionally, the particular number of piece goods in the at least two temporally consecutive steps are each seized in a clamping and/or form-locking and/or force-locking manner by at least two clamping elements and/or gripping elements, located opposite each other, of the specific manipulator, and they are released after having been brought into their particular specified target position by the at least two clamping elements and/or gripping elements located opposite each other. Other manipulators can optionally be used, for example, such as are designed as gantry robots or as parts of such gantry robots. Other manipulators can be advantageously deployed, too, for example, such as are designed as multi-axis robots or as parts of such multi-axis robots.

A further advantageous option can lie in using an advanced movement option of the manipulator, in particular of the manipulator designed as delta kinematic robot or forming a part of a delta kinematic robot, which movement option can be more comprehensive than it has been shown here or than can be gathered from the context of the present description. For some positioning options and/or alignment options it can thus be expedient to rotate the manipulator or the manipulator clamping elements and/or gripping elements about an essentially vertical axis by a rotation angle of about 180°, whereby, for instance, the piece goods that are initially located in the rear sections, in transport direction, of the gripper head of the manipulator are rotated to the front in transport direction.

If the manipulator and/or the manipulator movable parts for seizing the piece goods—these can be, for example, parts of the gripper head of the manipulator—are rotatable about the vertical axis of rotation by at least 180°, this option can be used, if required, whereby it is also possible to reduce effective paths for the piece goods, in particular, however, for the manipulator, which can thus carry out positioning procedures and/or alignment procedures of the same type in shorter time, because in this way at least individual phases of the manipulator's complex positioning movements can be carried out with less deflections, which can altogether lead to an effective stroke reduction in the complex positioning movements of the manipulator or of the manipulator gripper head. Since the positioning movements of the manipulator are composed of a multitude of overlapping movement components and/or rotation components, a stroke reduction of individual or several such movement components or of partial sections of these movement components can mean an effective saving of time by cycle shortening.

According to a further method variant, it can be expedient that, in at least one step of a plurality of temporally consecutive manipulation steps, in each instance at least one transported piece good can be seized, and in each instance spatially separated from its straight movement path in original transport direction by a rotation about a vertical axis by a rotation angle of at least 90°, in particular, however, by approximately 180°, and can be brought into a particular specified relative target position and/or target alignment in relation to the subsequent piece goods. It can be particularly expedient to have the manipulator or the at least two manipulator clamping elements and/or gripping elements—after a rotation by approximately 180° about a vertical axis, after reaching a particular target position and/or target alignment, as well as after releasing the at least one piece good positioned there—seize at least one further piece good to be positioned and/or to be realigned from the row or from the closed formation without return rotation and/or without further rotation of the at least two clamping elements and/or gripping elements, and to subsequently bring this at least one seized piece good, with or without rotation of the manipulator or of the clamping elements and/or gripping elements about a vertical axis, into a further target position and/or target alignment within the seizing range. In particular, this optional method variant, where the manipulator can be repeatedly further rotated by 180° in consecutive manipulation steps without necessitating time- and/or space-consuming return rotations, allows material- and time-friendly manipulation procedures in which moreover the movement sequences of the manipulator and/or of the manipulator clamping elements and/or gripping elements can be optimized in terms of the available space within the seizing range and, in particular, in terms of avoiding any disturbing collisions with piece goods. Each saved return rotation of the manipulator or of the manipulator clamping elements and/or gripping elements enables piece goods to be guided closer without hereby causing a risk of collision, because in particular manipulators with larger reception capacities for three or four consecutively disposed piece goods, for example, require a relatively large space for possible rotation movements of the relatively expansive clamping elements and/or gripping elements, which—in return rotations of the gripper head in each instance by 180° after each previous positioning that comprised a rotation by 180°—led to a significant increase of the risk of collision with piece goods located in the seizing range. In order to eliminate such risk of collision, the manipulator has to perform more extensive evasive movements in return movements for receiving new piece goods at the front position of the succeedingly transported rows of formations, which movements lead to an undesired time lag for the return movements and return rotations.

A further advantageous option of the rotational movability of the manipulator or of the manipulator's moved and/or movable parts that can be associated with seizing the piece goods can lie in increasing the maximum rotation angle of the rotatable gripper head or of the sections of the manipulator seizing the piece goods. This rotatable section can rotate either infinitely in any direction of rotation—that is, in left hand rotation or in right hand rotation—, with nearly any or with any rotation angle, in order to select the in each instance optimal direction of rotation in combination with the optimized path selection and the in each instance optimal rotation angle, in order to in this manner position and/or align the piece goods in the in each instance desired location and/or in a selected optimal location of the layer pattern in the shortest possible time and/or on the shortest possible path. If required for mechanical reasons, the maximum rotation angle can also be limited, for example to an angle of less than 720°, to about 360°, or to less than 360° or to another expedient value, which can be, for example, between about 180° and about 360°.

In each of the described method variants it can be advantageous, if the in each instance non-seized piece goods of remaining piece goods moved in a row are further transported interruption-free and/or at unchanged transport speed during the seizing in a clamping and/or form-locking and/or force-locking manner, during the spatial separation, and/or during the transfer of the at least one piece good into a specified relative target position and/or target alignment.

Further embodiment variants of the method according to the invention are described below, which can be seen as alternative or cumulative with regard to the other method variants and/or which can be combined. Such a further variant of the method according to the invention thus provides that the at least one piece good, when seized in a clamping and/or form-locking and/or force-locking manner, is preceded by at least one further non-seized piece good that has not been separated from the closed formation, in which case the at least one piece good seized in a clamping and/or force-locking and/or form-locking manner is spatially separated from the closed formation and is brought into a specified relative target position and/or target alignment in relation to subsequent piece goods, and resulting herefrom, the at least one piece good is pushed together with the at least one further piece good into a particular at least one further target position and/or target alignment. This method variant opens further positioning possibilities in which the manipulator and/or the at least one piece good currently seized by the manipulator can additionally be employed and used as slider, for example, for already previously manipulated piece goods. Even method variants are conceivable, where the manipulator does not pick off the foremost transported piece good of the formation, but rather one behind it or a piece good located further in the rear, which in this case has to be lifted out or moved out from the row precisely in a lateral direction to the transport direction.

One variant of the method according to the invention can moreover provide that the at least one piece good reaches the target position and/or target alignment by a movement in linear direction, and, in this context, the at least one further piece good is pushed into the at least one further target position and/or target alignment in the identical linear direction. In this context, it can be preferably provided that the linear direction and a transport direction of the closed formation are aligned with each other.

The at least one further piece good can optionally be pushed into the at least one further target position and/or target alignment under surface contact with the at least one piece good. It can moreover be advantageous if the at least one piece good and the at least one further piece good maintain their surface contact after reaching the target position and/or target alignment.

One method variant can furthermore provide that two or more than two consecutively transported piece goods are seized from the closed formation; are spatially separated together; and are brought into a specified relative target position and/or target alignment in relation to subsequent piece goods, and resulting herefrom, the at least two or more than two consecutively transported piece goods are pushed together with the at least one further piece good into a particular further target position and/or target alignment.

According to a further embodiment, it can be provided that the manipulator—after shifting a group of seized piece goods and at least one piece good not seized by the manipulator, which non-seized piece good is in surface contact with a piece good seized by the manipulator—disengages from the group, then again seizes at least one piece good of this group, and rotates it and/or shifts it, or the like, in relation to the just previously manipulated group of piece goods.

According to a further embodiment, it can be provided that a piece good that has already been seized by a manipulator in a first step and has been brought into a first position or intermediate position and/or a piece good that has been brought into the first position or intermediate position by being shifted by a further piece good, is brought into the specified target position and/or target alignment by being seized again by the manipulator. The manipulator—between putting down this piece good and seizing it again and relocating it so that it reaches the target position—can, for example, seize, shift, rotate, etc. other piece goods; or it can also shift further piece goods by way of the meanwhile seized and/or gripped piece goods.

Likewise, a plurality of piece goods can first be brought simultaneously into the first position or intermediate position and brought into the particular specified target position and/or target alignment by being seized again by the manipulator. In this context it is also conceivable that the manipulator—between putting down these piece goods and seizing them again and relocating them in order to reach the particular target positions—can seize, shift, rotate, etc. other piece goods, or it can also shift further piece goods by using the meanwhile seized and/or gripped piece goods.

It can furthermore be provided that at least one piece good seized by the manipulator is used for shifting at least one further piece good into a specified target position and/or target alignment associated with this further piece good. The piece good that is still located in the manipulator is subsequently brought into the particular specified target position and/or target alignment of the piece good. In this process, it can be shifted and/or rotated or the like, for example, laterally in relation to the piece good that is not seized by the manipulator. Analogously, a plurality of piece goods can be seized simultaneously by the manipulator and can be used for shifting a further piece good or further piece goods into its particular specified target position and/or target alignment or into their particular specified target positions and/or target alignments; and subsequently, the piece goods that are still located in the manipulator are brought into their particular specified target positions and/or target alignments.

The described method step or the previously described method steps or also individual or previously described method steps are carried out in particular by an apparatus according to the invention, in particular, by a handling apparatus serving for handling piece goods moved one after another in at least one row, which apparatus comprises at least one first transport device and at least one manipulator. The at least one first transport device serves for feeding the immediately consecutive, in particular nearly unspaced row of piece goods disposed or moved in closed formation, to a seizing range of the at least one manipulator.

The at least one manipulator is typically/preferably designed for seizing and/or receiving at least one piece good of the formation within the manipulator seizing range in a clamping and/or form-locking and/or force-locking manner, as well as for separating and transferring the at least one piece good of the formation into a target position within the manipulator seizing range. The manipulator can be designed, for example, as parallel kinematic robot or as part of such, in particular as tripod or gantry robot, multi-axis robot, etc.

According to one embodiment, at least two clamping elements and/or gripping elements located opposite each other, in particular, located pairwise opposite each other, can be associated with the at least one manipulator, which clamping elements and/or gripping elements interact for seizing the particular at least one piece good or the plurality of seized piece goods in a clamping and/or force-locking and/or form-locking manner, as well as for separating and for transferring the particular at least one piece good or the plurality of seized piece goods together, in particular pairwise together, into the target position and/or target alignment. This definition of the clamping elements and gripping elements of the manipulator also comprises, for example, double grippers or multiple grippers or the like, which can have a plurality of gripping pairs, which, however, particularly interact pairwise in order to be able to receive, seize, and/or grip piece goods, for example, in a plurality of parallel, in particular, spaced-apart rows. It should thus be noted that the number of at least two clamping elements and/or gripping elements located opposite each other defines a minimum. It is therefore not ruled out that a plurality of clamping elements and/or gripping elements can be designed in the defined manner, if required; it is also not ruled out that two or more elements are present. According to one embodiment, the manipulator thus has at least one gripper head with clamping jaws that are rigid, movable, and/or advanceable toward each other, between which clamping jaws the at least one piece good can be clamped and can thereby be accordingly moved to the target position.

In the apparatus or the handling apparatus for handling piece goods moved one after another in at least one row, it is moreover provided that at least one of two clamping elements and/or gripping elements, located opposite each other, of the at least one manipulator is formed for seizing the at least one piece good in a force-locking and/or form-locking manner. Furthermore, since besides seizing "in a form-locking manner", seizing of the piece goods "in a clamping manner" is also frequently referred to in the present description, it should be noted here that this is intended to comprise seizing in a force-locking manner, as well, because, as a rule, it is not exactly determinable and, in particular, not exactly delimitable among the individual gripping processes how the actual power transmission from the gripping elements to the piece goods, to the bundles, etc. takes place. A form-locking seizing with a simultaneous light clamping usually also implies an at least slight force lock.

It can furthermore be provided for the apparatus or the handling apparatus that at least one of two clamping elements and/or gripping elements, located opposite each other, of the at least one manipulator at least in some areas corresponds with an outer contour, at least at a contact surface and/or at the contact areas of the at least one piece good to be seized in a force-locking and/or form-locking manner. These corresponding contours can, in particular, imply that the contours are at least in some sections matched to each other and at least in some sections benefit a form lock between the contact surfaces and/or contact areas of the particular seized piece good and the surfaces of the clamping elements and/or gripping elements facing toward the piece goods by the particular surfaces being matched to each other or planarly or linearly lying against each other.

Furthermore, for the purpose of seizing the at least one piece good in a force-locking and/or form-locking manner, the apparatus can be designed such that at least one of the two clamping elements and/or gripping elements located opposite each other forms at least one contact surface, at least one contact surface pair, and/or at least one contact area for the at least one piece good to be seized in a force-locking and/or form-locking manner. When seizing the at least one piece good, this contact surface, contact surface pair, and/or at least one contact area is bringable into abutment, in a planar and/or strip-shaped and/or linear and/or punctual manner, on the outer cover surface of the piece good, with the outer cover surface being cylindrical, conical, and/or concavely or polygonally curved, or also contoured otherwise. It should be noted here that the surfaces of the clamping elements and/or gripping elements brought into contact with the piece goods or facing toward the piece goods by no means need to have convex contours; but rather all conceivable and/or expedient contour variants for these contact surfaces or contact surface pairs or contact areas are possible and hereby considered to be disclosed. These contours can for all intents and purposes also be convex in parts or convex in sections, etc. Likewise conceivable are innumerable other variants, for example, step-shaped, stair-shaped, triangular, etc. contours, which can be important for polygonal or irregular outer contours of containers, for example. Smaller edges in stair-shaped arrangement or in pairwise arrangement that only grip at the corners can, in this context, also be expedient.

In one embodiment variant of the apparatus described here, the at least one of two clamping elements and/or gripping elements located opposite each other for seizing the at least one piece good in a force-locking and/or form-locking manner forms at least two contact surfaces, at least two contact surface pairs, and/or at least two contact areas for the at least one piece good to be seized in a force-locking and/or form-locking manner, in particular, for two or more piece goods to be seized in a force-locking and/or form-locking manner, which contact surfaces, contact surface pairs, and/or contact areas are disposed spaced apart from each other at oppositely located end sections of the particular at least one of two clamping elements and/or gripping elements located opposite each other. These spaced-apart end sections of the clamping elements and/or gripping elements refer, in particular, to the contour areas located at the particular gripping jaw ends in longitudinal extension direction as were defined above for seizing the piece goods in a form-locking and/or force-locking manner. Disposed between these end sections that are, by definition, spaced apart from each other, there can be areas without such contours or with less developed contours, as the piece goods support and stabilize each other due to their contact, in particular, when a plurality of piece goods, in particular, three or more piece goods are seized simultaneously.

The clamping elements and/or gripping elements of the manipulator can, in particular, have counterfaces or form such counterfaces that absorb largely all occurring forces and moments during the acceleration while the particular piece good is being relocated, or that support each other and/or the piece good.

It can be advantageous for at least one of two clamping elements and/or gripping elements located opposite each other to have at least one functional element that is designed to be reversibly elastically deformable and to supply an abutment area for seizing the at least one piece good in a clamping, form-locking, and/or force-locking manner. Combined components are also conceivable for this purpose or as functional element for example such with concave surfaces with elastic areas, suitably formed rubber elements, etc. It can furthermore be advantageous for the abutment area of the at least one functional element of the at least one clamping element and/or gripping element to extend along a portion of at least 30%, in particular of at least 50%, of a length in longitudinal extent of the particular clamping element and/or gripping element.

Finally, the apparatus can comprise an embodiment variant in which the abutment area is disposed between the at least two contact surfaces, between the at least two contact surface pairs, and/or between the at least two contact areas for the at least one piece good to be seized in a force-locking and/or form-locking manner, in particular for two or more piece goods to be seized in a force-locking and/or form-locking manner. These at least two contact surfaces, contact surface pairs, and/or contact areas are preferably formed to be in each instance spaced apart from each other at oppositely located end sections of the particular at least one of two clamping elements and/or gripping elements located opposite each other.

If "clamping elements and/or gripping elements located opposite each other" is referred to in the present context, this is intended to mean, in particular, clamping jaws of a gripper head or the like that are advanceable toward each other and that seize the piece good at its longitudinal sides. Numerous other gripping principles and/or seizing principles, possibly also combined ones, are also expedient. A vacuum gripper, for example combined with movable mechanical gripping elements, can thus be optionally used as a support. Generally, the term "manipulator" or "clamping elements and/or gripping elements" comprises any seizing elements and/or manipulation elements that can be suitable and accordingly equipped for the described interaction with the piece goods.

Furthermore described is a method for handling piece goods moved one after another in at least one row, where the immediately consecutive piece goods in a row without spaces or with minimal spaces are transported as closed formation, and at least one transported piece good is seized in a clamping and/or form-locking manner from the closed formation by at least two clamping elements and/or gripping elements located opposite each other, in particular, located pairwise opposite each other; is spatially separated from the closed formation; and is brought into a specified relative target position and/or target alignment in relation to subsequent piece goods. However, it should be mentioned that seizing only one piece good represents the slightly less frequent case, also the exception whereas the slightly more frequently occurring case or the case that can be referred to as normal case is the simultaneous seizing of two, three, or more piece goods transported one after another in closed formation, with those piece goods usually being seized then that in each instance reach the manipulator in the foremost position of the row.

In the method, the at least one transported piece good is seized in a clamping, force-locking, and/or form-locking manner by an advance movement of the at least two clamping elements and/or gripping elements located opposite each other and/or located pairwise opposite each other, after which the piece good or the plurality of piece goods is spatially separated from the closed formation by a common movement of the at least two clamping elements and/or gripping elements, and is brought into the specified relative target position and/or target alignment in relation to subsequent piece goods by way of the at least two clamping elements and/or gripping elements.

It is preferably provided in the method that during the seizing procedure a force-locking and/or form-locking connection is formed and maintained between the at least one piece good and at least one of the at least two clamping elements and/or gripping elements located opposite each other for at least as long until the at least one piece good has been brought into the target position and/or target alignment. Optionally, this force-locking and/or form-locking connection can be loosened or undone prior to reaching the target position, too, in particular, if the final target position and/or the final alignment for the piece good or for the plurality of piece goods is intended to be reached only by further manipulation steps, for example, by shifting the piece goods within the seizing range using other piece goods. In such multi-stage positioning procedures, the manipulator can be used simultaneously or in temporally consecutive phases as gripper and/or as slider.

It can preferably be provided for the method that, during the forming of the force-locking and/or form-locking connection, at least one of two clamping elements and/or gripping elements located opposite each other corresponds with an outer contour, at least at a contact surface and/or at the contact areas of the at least one piece good to be seized in a force-locking and/or form-locking manner. For forming the force-locking and/or form-locking connection, it is optionally possible that at least one contact surface, at least one contact surface pair, and/or at least one contact area of the at least one of two clamping elements and/or gripping elements located opposite each other is brought into abutment, in a planar and/or strip-shaped and/or linear and/or punctual manner, on a corresponding outer cover surface of the at least one piece good, with the outer cover surface being cylindrical, conical, and/or concavely or polygonally curved, or contoured.

It can be furthermore expedient for an embodiment of the method in this context, if, for the purpose of the forming or during the formation of the force-locking and/or form-locking connection, at least one contact surface, at least one contact surface pair, and/or at least one contact area of a first clamping element and/or gripping element as well as one further contact surface, one further contact surface pair, and/or one further contact area of a second clamping element and/or gripping element located opposite the first clamping element and/or gripping element are each brought into abutment, in a planar and/or strip-shaped and/or linear and/or punctual manner, on a corresponding outer cover surface of the at least one piece good, with the outer cover surface being cylindrical, conical, and/or concavely or polygonally curved, or contoured.

These very broadly defined terms "corresponding contours" or "contours corresponding in sections" essentially refer to the gripping jaws, the clamping elements and/or gripping elements of the manipulator, and the piece goods to be seized being designed such that their forms match each other or are adapted to each other. If these contours do not match up, the piece goods cannot be seized and manipulated with the intended precision and with the required reliability. On the other hand, the piece goods, which can be formed by bundle formations, for example, of nearly any form of individual articles, even by exceptionally and/or irregularly shaped piece goods can have the most diverse of contours, outer cover surfaces, inclines, undercuts, etc., which can possibly be difficult to seize for regularly shaped clamping jaws, gripper elements, or clamping elements of the manipulator that are designed in the customary or known manner. In order to make even these different contours of the piece goods handleable for the manipulator according to the invention, the manipulator clamping elements and/or gripping elements are equipped and/or designed in the manner described, which also comprises the replaceability of the gripping parts when a change of product takes place in the processing sequence, that is, when piece goods have to be processed that have other contours than the piece goods in the preceding processing phases.

In addition, the method can provide that the at least one piece good is seized in a clamping manner by way of the at least two clamping elements and/or gripping elements located opposite each other, with the at least one piece good making contact with an abutment area of at least one functional element of the two clamping elements and/or gripping elements located opposite each other. In this case, the at least one functional element is simultaneously reversibly elastically deformed due to being seized in a clamping manner. The contact and the reversible elastic deformation are preferably maintained until the at least one piece good has been brought into the target position and/or target alignment. This at least one elastic element or the reversibly elastic element can be formed, for example, by a rubber element or by a composite material with the desired elastic characteristics and having sufficient portions of an elastomeric material. The reversibly elastic characteristics primarily serve for an even better matching of the joined contours, thus also serving for a better support and a better hold of the seized piece goods between the clamping elements and/or gripping elements and also for prevent the piece goods from falling out of the clamped gripping jaws of the manipulator and/or from shifting there.

A further embodiment variant of the method according to the invention provides that upon or during seizing, at least, however, in a phase of seizing, a form-locking connection is formed between the at least one piece good and at least one of two clamping elements and/or gripping elements located opposite each other. This form-locking connection is preferably maintained until the at least one piece good has been brought into the target position and/or target alignment; however, the connection can also be undone slightly earlier for example when the above-mentioned conditions for sectional sliding or pushing of individual piece goods apply. In the method it can moreover be provided that the at least one piece good is seized in a clamping manner by way of the two clamping elements and/or gripping elements located opposite each other, with the at least one piece good making contact with an abutment area of at least one functional element of the two clamping elements and/or gripping elements located opposite each other. This at least one functional element is reversibly elastically deformed as a result of being seized in a clamping manner. The contact and the reversible elastic deformation are maintained for at least as long until the at least one piece good has been brought into the target position and/or target alignment.

The term "manipulator" used in the context of the present description essentially refers to a handling device that is suitable for gripping, shifting, rotating, and/or relocating piece goods, articles, or bundles, and that can be based, in particular, on a so-called delta robot or parallel kinematic robot, which, in the three-armed version increasingly used in practice, can also be referred to as tripod. Each of the arms of such a tripod or delta robot consists of an upper arm swivelably arranged at the base so as to be driven about a frame-fixed swivel axis and of a lower arm that is articulatedly connected to the upper arm and to the coupling element. In this context, the lower arm is usually designed to be passive and without a drive for being swiveled in relation to the upper arm or to the coupling element. One or more of the lower arms can be connected to the particularly associated upper arms and to the coupling element by way of ball joints, for example. Such an individual lower arm is freely swivelable and has no inherent stability. All upper arms of a delta robot are each mounted to be swivelable about swivel axes that are located preferably within a common plane, and they can all be driven and equipped with separate drive motors. Three lower arms connected to the coupling element and to their particularly associated upper arm in any position form a triangle of forces that can only be moved when the three upper arms each perform the swiveling movements calculated for them about their frame-fixed swivel axes synchronously or simultaneously. Two or more swivel axes can run parallel to each other; as a rule, all swivel axes have two intersection points with other swivel axes.

For the purpose of guiding the coupling element in at least one specified alignment relative to the base, at least one of the lower arms can consist of two linkage elements, also termed ulna and radius, which form a parallelogram linkage. In this context, the coupling element serves as a working platform, which is also referred to in practice as a tool center point (TCP). At this TCP, a manipulator can be arranged in the form of gripping arms or the like handling devices, for example, which are advanceable toward each other, such that the manipulator can seize articles, bundles, or the like piece goods and rotate, shift, or lift them from a support surface.

The manipulator arranged on the working platform or on the TCP can optionally be mounted to be rotatable so that the manipulator can be aligned or so that a desired rotation of the articles or piece goods can be performed. Instead of a drivable rotatable mounting of the manipulator on the coupling element, it is generally also conceivable to arrange the manipulator non-rotatably at the coupling element and to twist the entire coupling element relative to the base with a corresponding compensation movement of the arms using a telescopic shaft. This is, however, associated with the disadvantage of having a limited angle of rotation for the coupling element. This limitation results from reaching the end stops of the articulated connections of the upper arms and/or of the coupling element with the lower arms and/or with the mutual contact of adjacent lower arms. Various aspects of similar handling devices with tripods are already described in the prior art, for example, in DE 10 2010 006 155 A1, in DE 10 2013 208 082 A1, and in U.S. Pat. No. 8,210,068 B1.

The known parallel kinematic robot or so-called tripods can cover a particular robot's available working space, which results from the length of the upper arms, the distance between the upper arm attachment and the center point of a frame-fixed base, the length of the lower arms, the distance between the lower arm attachment and the center point of the so-called tool center point on the tool carrier, and the maximum swivel range of the upper arms. In z direction relative to the tool center point, this working space covers a cylinder with a spherical segment adjoining to the cylinder's lower edge. The working space is furthermore limited, if applicable, at the upper edge by maximum swivel angles of cardan telescopic drive shafts. This working space can approximately correspond to the seizing range, but it can also be smaller or larger than the so-called seizing range in the sense of the present invention. In order to be able to seize, grip, and manipulate the piece goods located within the seizing range, it is expedient to select the working space in which the TCP of the tripod can move to be slightly larger than the seizing range.

The known delta kinematic robots or rather so-called tripods have a high precision and can moreover be operated for handling the particular piece goods at a high speed. Known tripods have movable and controllable manipulators in order to be able to receive the particular piece goods and release them after handling or positioning. These manipulators can thus be controlled pneumatically, hydraulically, or electrically, for example, and for this purpose, line connections are coupled to the corresponding manipulator. It is possible, however, that these line connections limit the freedom of movement of the tripods. In addition, the line connections must be installed securely to exclude the risk of the line connections being damaged during operation of the tripod. Not least due to the complicated coupling between the manipulator and an associated actuator do the delta kinematic robots as hitherto employed have a complex structure and a partially restricted freedom of movement.

In a further exemplary embodiment, the present invention, in contrast, provides an apparatus for handling and/or for manipulating articles, groups, bundles, or piece goods, which will be described below on the basis of various embodiment details. In addition, one embodiment variant of the invention provides a method for handling and/or for manipulating articles, groups, bundles, or piece goods, the method being carried out with such an apparatus that has an upper suspension to which at least three rotatably driven positioning arms are attached, where the at least three positioning arms each consist of at least two arm sections swivelable relative to each other and operable independently of one another. The apparatus further comprises a manipulator that comprises one or more grippers that temporarily hold and/or release the articles and that is mechanically coupled to the at least three positioning arms such that a position of the manipulator can be specified by a movement of one or more of the at least three positioning arms. Also, the apparatus provides a linear guide in contact with the manipulator and the suspension, each by way of a cardanic-type joint, with the linear guide designed as rotatable first shaft non-rotatingly in contact with the manipulator, and with the manipulator being rotated by a rotational movement of the first shaft together with this shaft. An actuating device is moreover provided, designed as second shaft and passing through the linear guide, by way of which the one or more grippers can be controlled for temporary gripping and releasing of articles, in which context the actuating device designed as second shaft is rotated relative to the linear guide for the control of the one or more grippers, and in which context the second shaft, in the instance of a rotation of the first shaft that is non-rotatingly in contact with the rotatable manipulator, based on a status of the grippers, performs either a rotation, optionally synchronously, in the same direction with the first shaft, or a compensatory rotation or counter rotation to the first shaft.

In this way it is possible to ensure that, according to requirements, a rotation of the first shaft rotating the manipulator causes a compensatory rotation or counter rotation of the second shaft in order to maintain the actuation of or to release the grippers. It is thereby likewise made possible that a rotation of the first shaft rotating the manipulator causes a rotary movement of the second shaft, in the same direction or synchronously, in order to change the actuation status or release status of the grippers.

The manipulator can be rotated by a rotational movement of the first shaft by preferably up to 360°, preferentially, however, also by more than 360°. The actuating device designed as second shaft can be, in particular, oriented approximately concentrically to the linear guide, in which case this orientation is continuously maintained throughout a positioning of the manipulator by way of one or more of the at least three positioning arms. By way of the described arrangement, the manipulator can rotate into nearly any desired direction of rotation and at nearly any or unrestricted rotation angles of multiples of 360°.

One variant of the method according to the invention can in addition provide that the actuating device designed as second shaft is in contact with the one or more grippers by way of a gearing mechanism with at least one transmission step, in which case the gearing mechanism transmits a torque of the actuating device designed as second shaft to a positioning movement of the one or more grippers. The one or more grippers can comprise, for example, at least two oppositely located clamping jaws, which are moved relative to each other in a relative rotary movement between the actuating device designed as second shaft and the linear guide, whereby articles, piece goods, or bundles can be gripped and shifted, rotated or lifted and relocated.

The at least one actuating device designed as second shaft can optionally be controlled by way of a separate actuator, which is positioned non-rotatingly on the upper suspension.

By this invention variant it can be realized that additional drive possibilities for robots or tripods are introduced into the so-called tool center point or the tool carrier without necessarily resulting in disadvantages in the actuation logic. In one embodiment variant, where two coaxial shafts are installed between the center of the suspension and the tool center point, two or more actuation possibilities or positioning possibilities can be transmitted in the tool center point, for example in the form of rotary movements. A rotary movement of one shaft can be used, for example, for closing the clamping jaws, while, independently thereof, a rotary movement of a coaxial shaft can be used for rotating a complete gripper. If in each instance only one rotary movement is to be performed in this context, for example a rotation of the gripper, then the clamping jaws open or close by a stop of the particular other shaft in relation to the one mentioned first, as thereby a relative movement between the two shafts is carried out.

According to an embodiment variant of the method according to the invention, the second shaft, which serves for closing and opening the gripper, has to perform a compensatory movement when the gripper is rotated by actuation of the first shaft. This compensatory movement is carried out as a relative movement in relation to the first shaft in same sense (parallel) rotation, in counter rotation, or synchronously. The direction of the compensatory movement is to be carried out according to the desired mode of operation. If the grippers are closed, for example, by a counterclockwise rotary movement, and the gripper is rotated counterclockwise, then the second shaft likewise has to perform a counterclockwise rotation, when the gripper rotates, in order to prevent an opening of the clamping jaws. A clockwise rotation is to be realized accordingly. The required rotation directions of the shafts depend on the technical realization of carrying out the rotary movement of the second shaft in a linear movement of the clamping jaws. By performing a compensatory movement, it is altogether possible to achieve and ensure the desired mode of operation of the tool, for example, of the gripper.

In preferred embodiments, the piece goods or articles can be transported on a horizontal conveying device while they are being handled, and in the process, they can be gripped by the manipulator. After gripping, the manipulator can effect a rotation and/or a lateral offset diagonally to the transport direction of the horizontal conveying device and/or a delay and/or an acceleration of the particularly gripped articles in relation to a transport speed of the horizontal conveying device.

For the purpose of particularly driving each of the at least three positioning arms of the apparatus, each of them can have an own actuator associated with it, which is preferentially configured as an electric motor and which effects a rotating movement of the positioning arms. The positioning arms can each be flange-mounted directly to their particularly associated actuator. The actuators can be supported by the upper suspension. In particular, the actuators can then be arranged at the upper suspension in a hanging position. The axes of rotation of the at least three positioning arms can run parallel to each other. The actuators of the at least three positioning arms can be linked to a control unit, which specifies a movement of one or more of the at least three positioning arms for the specific positioning of the manipulator, which is to be described in more detail below.

The previously already mentioned manipulator of the apparatus according to the invention comprises one or more grippers and it is mechanically coupled with the at least three positioning arms. In this context, in each instance at least one joint can be expediently arranged between the at least three positioning arms and the manipulator. In this manner, a position of the manipulator can be specified by a movement of one or more of the at least three positioning arms. In particularly preferred embodiments, the at least three positioning arms are articulatedly connected to a support ring, which is guided around the linear guide as well as a around an actuating device designed as shaft, and which is furthermore in a mechanically coupled contact with the manipulator. The mechanical coupling between the support ring and the manipulator can allow a relative rotation of the manipulator in relation to the support ring.

One embodiment variant of the apparatus according to the invention can further comprise a linear guide that is in contact with the manipulator and the suspension, in each instance via a cardanic-type joint. In particularly preferred embodiments, the position of the linear guide can be selected such that the linear guide is located between all of the at least three positioning arms or such that all of the at least three positioning arms are arranged around the linear guide. In simple embodiments, the particular cardanic-type joint can be formed as cardan joint. The term "cardanic-type joint", however, is to be understood in a broad sense such that ball joints, for example, and/or other cardanic-type joints can be provided in the context of conceivable embodiments of the apparatus according to the invention.

Moreover, at least one actuating device is provided as component of the apparatus. The one or more grippers can be controlled by way of this at least one actuating device. For this purpose, the one or more grippers can be in mechanical engagement with the at least one actuating device. Normally, the at least one actuating device is designed as shaft passing through the linear guide, which shaft can be rotated relative to the linear guide for the control of the one or more grippers. In particularly preferred embodiments, the at least one actuating device designed as shaft can pass entirely through the linear guide. An own actuator can be associated with the at least one actuating device designed as shaft for the rotating movement of the at least one actuating device designed as shaft, the actuator, if applicable, being in contact with the previously already mentioned control unit. Such an arrangement of the actuating device designed as shaft, and a control of the one or more grippers via a rotary movement of the shaft relative to the linear guide, make it possible to dispense with inconvenient line connections in the range of the manipulator.

It is furthermore expedient to arrange the linear guide and the actuating device designed as shaft concentrically to one another. The concentric arrangement between the at least one actuating device designed as shaft and the linear guide can be continuously maintained even when the manipulator is being positioned or when the at least three positioning arms are moved.

The linear guide can optionally comprise at least two housing parts that are telescopic or telescopically connected to each other in which case the at least one actuating device designed as shaft passes through these at least two telescopically interconnected housing parts. It is clear to the addressed skilled person that in other conceivable embodiments, the linear guide can also be formed from three, four, or more than four housing parts that are telescopic or telescopically connected to each other. In particular, the at least two telescopic housing parts can each have a hollow cylindrical design, at least in some sections.

As already mentioned, the at least one actuating device designed as shaft can optionally have an own actuator associated with it, via which the shaft can be controlled or rotated. In this context, it is conceivable that the own actuator is positioned at and/or in the area of the upper suspension. For example, an axis of rotation of the shaft can extend through the own actuator and/or through the center of gravity of the actuator. Where appropriate, the actuator can thus be flange-mounted by way of an intermediately disposed cardanic-type joint to the at least one actuating device designed as shaft. In particular, the actuator can be non-rotatingly connected to the upper suspension.

In further embodiments, the linear guide can be designed as further shaft that is non-rotatingly connected to the manipulator such that the manipulator can be rotated by a rotational movement of the further shaft. In particular, the at least one actuating device designed as shaft and the linear guide designed as further shaft can in this context be rotated independently of one another. The at least one actuating device designed as shaft and the linear guide designed as further shaft can furthermore have axes of rotation that are approximately concurrent or close to one another.

In addition, the one or more grippers can comprise at least two opposite clamping jaws, of which the relative space for gripping and releasing articles can be specified by the at least one actuating device designed as shaft. It is possible, for example, that only one of the oppositely located clamping jaws is actively moved by the at least one actuating device designed as shaft, whereas no active movement of the particular opposite clamping jaw is effected by the at least one actuating device. In other conceivable embodiments, the apparatus can have one ore more transmission elements for converting a rotating movement of the at least one actuating device designed as shaft to an active adjustment of all of the at least two opposite clamping jaws. The particular piece goods or articles can be seized and gripped by the clamping jaws and subsequently be relocated and positioned and/or aligned by a movement of the manipulator. As repeatedly mentioned elsewhere, the piece goods are in this context normally transported on the horizontal conveying device or within the seizing range; are seized and gripped by the apparatus or the manipulator; and are shifted, relocated, positioned, and/or realigned on the horizontal conveying device. In this context, the piece goods or articles can optionally be delayed or accelerated in relation to a transport speed of the horizontal conveying device, and, where appropriate, they can be rotated and/or relocated diagonally to a conveying direction of the horizontal conveying device.

Furthermore, a gearing mechanism with at least one transmission step can be intermediately disposed between the at least one actuating device designed as shaft and the one or more grippers. Hereby, the control of the one or more grippers with high precision can be carried out, in which case the torque to be exerted by way of the shaft for gripping articles can be kept low.

The apparatus according to the invention with the delta kinematic robot for controlling, moving, and handling the mentioned manipulator is suited for numerous embodiment variants of the method according to the invention for handling piece goods, articles, bundles, or the like. Features described above relating to various embodiments of the apparatus according to the invention can in this context likewise be provided in conceivable embodiments of the method according to the invention. In addition, features that will be described below regarding various embodiments of the method according to the invention can be provided in conceivable embodiments of the apparatus according to the invention.

The variants of the method according to the invention as described below are implemented using an apparatus, which comprises an upper suspension to which at least three rotatably driven positioning arms are fastened. The at least three positioning arms each consist of at least two arm sections, which are swiveable relative to each other and which can be operated independently of one another or which can be adjusted independently of one another. Each particular adjustment can be specified by way of a control unit. The apparatus that is suitable for implementing the method according to the invention furthermore has a manipulator, which comprises one or more grippers and which is mechanically coupled to the at least three positioning arms such that a position of the manipulator can be specified by a movement of one or more of the at least three positioning arms. This apparatus can further comprise a linear guide that is in contact with the manipulator and the suspension, in each instance via a cardanic-type joint. In addition, there is at least one actuating device designed as shaft, which passes through the linear guide, in particular, in an approximately coaxial arrangement. The actuating device designed as shaft is thus at least in sections accommodated in the linear guide. Furthermore, the one or more grippers can be controlled via the at least one actuating device designed as shaft, which is in this case rotated relative to the linear guide for the purpose of controlling the one or more grippers.

In particularly preferred embodiments, the linear guide can be designed as further shaft that is non-rotatingly in contact with the manipulator. The manipulator can be rotated together with the further shaft by a rotational movement of the further shaft. In a rotational movement of the further shaft, the manipulator can thus be rotated by the same rotation angle.

It is furthermore possible that the manipulator is rotated by 360° and/or more than 360° by a rotational movement of the further shaft. If articles are intended to be rotated by the manipulator by slightly more than 180°, it can be useful to continue to rotate the manipulator after the release of the articles in the same direction of rotation by a total of 360° and, in doing so, return it to the original rotary position. Embodiments offering the possibility of rotating the manipulator by 360° allow the method to be carried out with an increased throughput of handling articles. It can be provided in the context of the method that the manipulator is only rotated in one direction of rotation and that a rotation in the opposite direction of rotation is consistently not performed.

The actuating device designed as shaft can, in particular, be oriented coaxially to the linear guide and continuously maintain this orientation throughout a positioning of the manipulator by way of one or more of the at least three positioning arms. If the linear guide is designed as further shaft, the further shaft and the actuating device designed as at least one shaft have concurrent or approximately concurrent axes of rotation.

It can moreover be provided that the actuating device designed as shaft is in contact with the one or more grippers by way of a gearing mechanism with at least one transmission step, in which case the gearing mechanism transmits a torque of the actuating device designed as shaft to a positioning movement of the one or more grippers.

In particularly preferred embodiments, the one or more grippers can comprise at least two clamping jaws located opposite each other that are moved relative to each other upon a relative rotary movement between shaft and linear guide. Each of the clamping jaws can have flexible contact elements that, upon gripping articles, are brought into abutment on the particular articles in a force-impinged manner.

It is also possible that the at least one actuating device designed as shaft is controlled by way of an actuator positioned non-rotatingly on the upper suspension.

As in all embodiments, the piece goods can be transported on a horizontal conveying device while they are being handled, and in the process, they can be gripped by the manipulator. After gripping, the manipulator can effect a rotation and/or a lateral offset diagonally to the transport direction of the horizontal conveying device and/or a delay and/or an acceleration of the particularly gripped articles in relation to a transport speed of the horizontal conveying device.

A preferred embodiment provides that, while the at least one piece good is being seized and transferred into a new target position and/or target alignment, the non-seized piece goods of the closed formation are in each instance further transported interruption-free and/or at unchanged transport speed. This typically applies for at least until the seized piece good has been brought into its target position and/or target alignment such that the next following piece good can be seized by the manipulator, meanwhile having been returned to the formation, and the piece good can be brought into its particular target position and/or target alignment. This procedure is repeated until the different target positions and/or target alignments of the successively positioned and/or aligned piece goods form a specified or desired arrangement or grouping. This arrangement or grouping can represent, in particular, a layer pattern that makes it possible, for example, to stack and/or palletize the piece goods assembled in such a way into layers.

According to one embodiment of the present invention, at least one foremost transported piece good is seized in a clamping and/or force-locking and/or form-locking manner from the closed formation; is spatially separated from the closed formation; and is brought into a specified relative target position and/or target alignment in relation to subsequent piece goods of the formation. Preferably, or rather frequently, two or more than two consecutively transported piece goods are seized simultaneously and accordingly manipulated or brought into the particular target positions. In particular, the manipulator of the above described apparatus is accordingly designed for receiving, in a clamping and/or form-locking manner, piece goods in a specific number or in a specific maximum number and positioned or positionable foremost in the particular closed formation, as well as for separating the piece goods and transferring the piece goods into a target position and/or target alignment.

After the seized piece good or piece goods has/have reached and/or assumed its/their target positions and/or target alignments, they are further transported preferably without interruption and/or without change of speed and/or without change of transport direction, and are fed to a packaging apparatus, a palletizing station, and/or to other processing apparatuses.

In the particular manipulation step for reaching the target position and/or target alignment, at least one further velocity component and/or direction component in relation to a transport speed of the closed formation is imparted to the at least one seized piece good. This is particularly carried out in the seizing range of the manipulator of the apparatus. The change of velocity and/or direction is imparted to the at least one seized piece good, in particular, by the manipulator. The manipulator can additionally be designed for rotating the at least one seized piece good. The above-described gripper head, for example, is located at a swivel joint and can change the alignment of the piece goods seized between the clamping jaws via rotation by a specified angle of, for example, 90°.

According to an alternative embodiment of the invention, the seized piece goods, after having reached and/or assumed their target position and/or target alignment, are further transported, preferably without interruption, however at a changed speed and/or with a changed transport direction, and are fed to a packaging apparatus, a palletizing station, or other further processing apparatuses, for example.

This further transport can be carried out, for example, by way of suitable device in the seizing range of the manipulator and associated with the relative target position. Thus, it can be provided that an additional conveyor, for example, a further conveyor belt, is disposed at the target position in the seizing range of the manipulator, which conveyor moves at a different speed than the transport device for the piece goods arriving in formation. Furthermore or alternatively, it can be provided that such a further conveyor moves in a movement direction aligned at an angle to the transport direction of the transport device.

According to the arrangement produced by the described manipulation steps, this can also have been a pre-group, which requires further pushing together of the piece goods in order to obtain a palletizable layer arrangement. The spaces that can still remain between several or also all individual piece goods in such a pre-group are closed by pushing together the piece goods in this way. Since these spaces normally impede stable palletizing, they are removed/closed after pre-grouping.

According to one embodiment of the invention, the immediately consecutive piece goods in a row without spaces or, if applicable, with minimal and/or variable spaces at least in some places, are transported as closed formation by at least one transport device into a seizing range of at least one manipulator, which is prepared and equipped for seizing in each instance at least one piece good; for spatially separating the at least one piece good; and for transferring it into the specified relative target position and/or target alignment in relation to the subsequent piece goods of the formation, in which case the at least one manipulator or a part of the at least one manipulator designed for receiving or seizing piece goods moves, at least when seizing the at least one piece good and/or when releasing it in the target position and/or target alignment, at a speed that approximately or exactly corresponds to the transport speed at which the closed formation moves. In the space of time therebetween the manipulator can, in particular, carry out a changed speed and/or a different movement direction. The term "space of time therebetween" can mean both the positioning move on the way to the target position and/or target alignment and a return move of the manipulator freed from the piece good or piece goods after the manipulator has deposited the piece goods or the at least one piece good at the target position and is preparing to pick up the next piece good or the next piece goods from the closed formation. In this return movement, the manipulator can, within the scope of its movability, move along nearly any paths and/or at any speeds as long as it is ensured that the manipulator does not collide with already positioned or aligned piece goods and/or with piece goods of the closed formation.

In the time slot of the movement from receiving at least one piece good from the formation to the target position and/or target alignment, the speed of the manipulator can be increased, for example, in relation to the transport speed of the formation while the movement of the manipulator is carried out in a movement direction that is in an alignment with the transport direction of the formation. The at least one piece good seized by the manipulator is then disposed in its target position in alignment with the formation and is spaced apart therefrom.

If the speed of the manipulator or of the movable part of the manipulator seizing the piece goods, is increased in relation the transport speed of the formation, and if the movement direction has an additional component orthogonal or diagonal to the transport direction of the formation, then the at least one piece good seized by the manipulator or by the movable part of the manipulator seizing the piece goods, is moved into a target position in the seizing range of the manipulator, which target position is located spaced apart and laterally shifted in relation to the formation.

If the speed of the manipulator or of the movable part of the manipulator seizing the piece goods, corresponds to the transport speed of the formation, and if the movement direction has an additional component orthogonal or diagonal to the transport direction of the formation, then the at least one piece good seized by the manipulator or by the movable part of the manipulator seizing the piece goods, is moved into a target position in the seizing range of the manipulator or of the movable manipulator part in which target position the piece good is located laterally shifted in relation to the formation, with only a small relative space existing or having been formed, as seen in transport direction in relation to the formation.

Preferably or optionally in a plurality of temporally consecutive manipulation steps, in each instance at least one transported piece good is seized in a clamping and/or force-locking and/or form-locking manner from the closed formation; is spatially separated from the closed formation; and is brought into a particular specified relative target position and/or target alignment in relation to the subsequent piece goods of the formation. According to one embodiment of the invention, at least one second row of piece goods is formed in this case from a plurality of successively seized piece goods or piece good groups the second row subsequently moving further along spaced apart from the formation and preferably at the same speed as the formation. The spacing can be formed, for example, as a space between two aligned rows of piece goods. That is to say that the piece goods seized by the manipulator are briefly accelerated and, in particular, moved by the manipulator in transport direction at a speed that is increased in relation to the transport speed of the formation such that a space forms between the piece goods moved by the manipulator and the piece goods of the formation.

According to a further embodiment of the invention, at least one second row of piece goods is formed in this case from a plurality of successively seized piece goods or piece good groups the second row subsequently moving further along laterally spaced apart to the formation and preferably at the same speed as the formation.

Alternatively, piece goods or piece good groups that have been separated from the formation are, in a plurality of temporally consecutive manipulation steps, brought into particular specified relative target positions such that a group for a palletizable layer or partial layer is formed thereof.

According to a further embodiment of the invention, it is provided that the piece goods reach the seizing range of the manipulator of the apparatus and/or reach the target position and/or target alignment within the seizing range of the manipulator by at least one horizontal conveying device of the apparatus or the handling apparatus that is driven preferably interruption-free and/or at continuous speed. This horizontal conveying device, which normally extends at least along a short path section upstream from the seizing range and/or at least along a short path section downstream from the seizing range of the manipulator, typically has at least one transport apparatus disposed upstream from it.

In particular, the piece goods arriving in at least one row or as formation are conveyed and/or transferred to the seizing range of the manipulator and/or to the horizontal conveying device by the mentioned transport device that is driven preferably interruption-free and/or at continuous transport speed. Optionally, two or more such transport devices can be used, which can particularly be parallelly disposed.

Preferably, the horizontal conveying device is associated with the seizing range of the at least one manipulator and/or at least largely corresponds to the seizing range of the manipulator. According to one embodiment of the invention, the horizontal conveying device produces a continuous feed in transport direction of the formation. It is furthermore provided that the horizontal conveying device moves or runs at a constant speed, in which case the speed of the horizontal conveying device can approximately or exactly correspond to the transport speed of the at least one transport device and thus to the transport speed of the piece goods located in the closed formation. In analogy to the transport device, the horizontal conveying device can be, for example, an endless conveyor, a conveyor mat, or the like, on the top side of which the piece goods are transported. As will become clear in the following from the figures, the horizontal conveying device can optionally also be a so-called transporting table, sliding table, grouping table, or the like, that can provide for the largely or approximately constant movement of the piece goods located thereon and/or of the piece goods shifted thereon into the particular target position and/or rotated into the particular target alignment by the manipulator. It can be alternatively provided that the horizontal conveying device consists, for example, of a plurality of adjacently disposed conveyor belts all moving at the same speed.

It is also not imperative that transport device and horizontal conveying device are formed by two conveyors that are driven independently of one another. Instead, it can be optionally provided that these are only spatially separate areas of one single conveyor that follow one another in conveying direction. A first transport area in this case serves, in particular, for feeding the at least largely unspaced piece goods arranged as formation in at least one row. A second manipulating range or horizontal conveyor range then serves, in particular, for manipulating at least one piece good of the formation or of a group of adjacent piece goods of the formation by way of the manipulator. In this context it is important that the piece goods of the formation, which, although located in the seizing range of the manipulator, are however not (yet) seized and being processed by the manipulator, are moved further along approximately continuously and preferably at a constant speed.

In the context of the present description, the horizontal conveying device is frequently defined in interaction and/or in spatial or functional connection with the particular target positions for the piece goods. Therefore, in order to avoid ambiguity, the target position is frequently exactly defined and its connection to the horizontal conveying device described in the description. In this manner, it is clarified in some passages that the target positions and/or target alignments are normally reached by the positioning movements of the manipulator. This can either be carried out in a direct way. The final target positions can, however, also be reached indirectly, for example by piece goods that are seized by the manipulator being used as slider for already pre-positioned piece goods. Here, the manipulator also acts as positioning tool, however, by interposing seized piece goods that are subsequently likewise to be to be positioned.

According to one embodiment of the invention, the at least one manipulator or a part of the at least one manipulator provided for the transfer of the at least one piece good to the target position and/or target alignment, moves at approximately the same speed or at the same speed as the at least one horizontal conveying device that is driven preferably interruption-free, upon a complete transfer of the at least one piece good to the target position and/or to the target alignment. This applies preferably at least while the piece good or piece goods are being seized and immediately before and after this moment, and this can also be referred to as "sync-up" of the manipulator to the moving piece goods of the formation.

In this instance as well as generally in the context of the present invention, this part of the manipulator provided for the transfer of the at least one piece good to the target position and/or target alignment can be, for example, a tool head, a gripper head, or the like, which is, for example, attached and mounted on movably mounted cantilever arms, which in turn are typically mounted in a frame-fixed manner on a frame or the like. Such a manipulator suspension or manipulator arrangement—also known as parallel kinematic arrangement—enables the desired movability of the head (also: of the manipulator), which can seize, shift, position, place, rotate, etc. the piece goods in the desired manner for moving toward the target positions and/or target alignments for the piece goods.

Other suitable manipulator configurations are, however, also conceivable, for example, such as are carried out with gantry robot guidings or the like. These other manipulator configurations can optionally relate to individual, several, or all embodiment variants mentioned in the context of the present invention.

Since the horizontal conveying device preferably moves at the same speed as the transport device, the speed of the manipulator or of the movable part of the manipulator that seizes and positions the particular piece goods corresponds to the transport speed of the formation and/or to the speed of the horizontal conveying device or to the transport speed of the transport device at least in the moment of receiving, taking over, or seizing the particular piece good or the plurality of piece goods. In this instance, the manipulator or the movable part of the manipulator seizing the piece goods imparts to the seized piece goods, in particular, only one additional movement component, which is perpendicular or diagonal to the transport direction, whereby the seized piece goods are shifted lateral to the formation or in lateral direction in relation to the longitudinal extension direction of the formation in which instance typically no or only a small relative space to the formation is formed. If a "perpendicular movement component" is referred to in the present context, this refers to the parts currently moving in transport direction, which is also why this can be referred to as vectorial velocity component perpendicular to the main movement direction of the formation.

According to one embodiment, the horizontal conveying device that is driven interruption-free immediately follows the at least one transport device in transport direction, and the speed of the at least one horizontal conveying device that is driven preferably interruption-free and the transport speed of the at least one transport device approximately or exactly correspond to one another. The at least one transport device can be formed, for example, by at least one supply belt or by a plurality of parallel supply belts that preferably lead immediately up to the horizontal conveying device and, in particular, form the above-mentioned first transport area. According to the invention and in contrast to the known prior art, normally no pre-grouping of the piece goods is carried out in the first transport area, but rather simultaneously with the positioning of the piece goods by seizing, shifting, and/or rotating, reaching the target positions and/or target alignments, and subsequent disengaging of the manipulator from the in each instance positioned and/or aligned piece goods. From the entire description it is thus clear that a pre-grouping in the customary sense, as a procedure that can be clearly identified and/or distinguished from the procedure of layer formation, does not take place here at all, but rather dissolves into the course of movements between separating the particular piece goods from the formation and reaching the target positions.

In particular, a spatial separation between the first transport area and the so-called second manipulating range is provided in the apparatus used, however, these areas preferably immediately abut on each other in spatial terms and immediately follow one another in transport direction. The manipulating range in this context largely corresponds to the seizing range of the manipulator of the apparatus or to the seizing range of the part of the manipulator that is brought into contact or immediately interacts with the piece goods. According to the method, it is provided that the piece goods of the formation do not reach the seizing range of the at least one manipulator before they are in the range of the at least one horizontal conveying device that is driven preferably interruption-free and/or at continuous speed, that is to say, not before they are in the second manipulating range. If it is not assumed that pre-grouping as a part of the manipulation procedures cannot be separately identified, the piece goods of the formation are, if at all, grouped after arrival in the manipulating range or in the range of the horizontal conveying device or in the seizing range of the manipulator, as mentioned above. Furthermore, within the seizing range of the at least one manipulator, at least one piece good seized in each instance by the at least one manipulator can be transferred, pushed, and/or rotated into the target position and/or target alignment in each instance in one single, in particular, interruption-free manipulation step.

As already mentioned repeatedly elsewhere in the present description, the so-called cycles, that is to say, the layer arrangements and/or partial layer arrangements of the piece goods, optionally also the preparatory arrangements therefor or the so-called pre-groups, are, in the present invention, only formed after arrival in the actual manipulation module, in particular by the onset of picking off and the following positioning of the piece goods within the seizing range of the manipulator. This restriction of manipulation procedures, positioning procedures, and/or alignment procedures that the piece goods undergo to the seizing range or to the movement range of the manipulator is additionally supported in that the horizontal conveying device that is driven preferably interruption-free follows in transport direction immediately after the at least one transport device, and in that the speed of the at least one horizontal conveying device that is driven preferably interruption-free and the transport speed of the at least one transport device approximately or exactly correspond to one another. As already mentioned above, the at least one transport device according to an embodiment variant of the apparatus according to the invention or of the method according to the invention is formed, for example, by an endlessly circulating supply belt or by a plurality of such parallel supply belts which in spatial and/or functional terms lead immediately up to the horizontal conveying device and thus form the above-mentioned first transport area. This first transport area can differ from the known prior art in important aspects, since, according to the invention, no pre-grouping or cycle formation of the piece goods takes place here yet. In the present invention it is rather provided that pre-grouping or cycle formation is carried out essentially simultaneously with the positioning of the piece goods—by seizing, shifting, and/or rotating, reaching the target positions and/or target alignments, and subsequent disengaging of the manipulator from the in each instance positioned and/or aligned piece goods—within the so-called grouping module, which is, in particular, formed by the horizontal conveying device and the at least one manipulator arranged thereabove. In this way it is clear that pre-grouping or cycle formation in the customary sense, as a procedure that can be distinguished clearly identifiably from the procedure of layer formation, does not take place in an identifiable manner in the present invention, but that pre-grouping, if at all, rather dissolves into the course of movements between separating the particular piece goods from the formation and reaching the target positions.

The spatial separation as preferred, according to the invention, between the first transport area and the so-called second manipulating range, with these areas, however, preferably spatially immediately abutting on each other and immediately following one another in transport direction, enables faster manipulating and positioning of the piece goods from closed formations without any concurring disadvantages in terms of positioning precision. This is essentially enabled or supported by the manipulating range largely corresponding to the seizing range of the manipulator of the apparatus or to the seizing range of the part of the manipulator that is brought into contact or immediately interacts with the piece goods. As also already mentioned, the method can provide that the piece goods of the formation do not reach the seizing range of the manipulator before they are in the range of the at least one horizontal conveying device that is driven preferably interruption-free and/or at continuous speed, that is to say, not before they are in the second manipulating range. As mentioned above, the piece goods of the formation are normally not grouped before they are in the manipulating range or in the range of the horizontal conveying device or in the seizing range of the manipulator. According to the selected degree for breaking down the entire manipulation procedures, it could at best be assumed that pre-grouping as a part of the manipulation procedures cannot be separately identified.

In one of numerous conceivable embodiment variants, the apparatus according to the invention can comprise exactly one manipulator as well as at least two transport devices. By way of these at least two transport devices, in each instance immediately consecutive piece goods of a particular row can be transported nearly without spaces or without spaces, as a closed formation, into a seizing range of the manipulator. In this way, the manipulator can receive at least one piece good selectively, based on a particular supply situation, in a clamping and/or force-locking and/or form-locking manner from a closed formation having been transported into the manipulator seizing range, can separate it, and can transfer it into the particular target position and/or target alignment. This procedure can be repeated any number of times.

In the apparatus according to the invention, the at least two transport devices can be driven, in particular, approximately interruption-free and preferably at a constant transport speed. Furthermore, the apparatus can comprise at least one horizontal conveying device, with which the particular target position for the at least one piece good is associated. It can moreover be advantageous for the at least one horizontal conveying device of the apparatus according to the invention to be driven interruption-free and preferably at a constant speed. It can be an additional advantage if the transport speed of the transport devices and the speed of the horizontal conveying device, which in this case correspond to the transport speed of the piece goods, are the same or approximately the same.

In a method where piece goods moved one after another are transported in a plurality of rows into the seizing range of at least one manipulator, it may be advantageous for the piece goods transported by the at least two closed formations to the manipulator to be transported—according to usefulness and/or conveying situation—in a non-aligned arrangement where they are each offset from one another and/or where they are disposed transversely to a transport direction. In particular, they can be positioned in different feed positions in transport direction. In such conveying situations, it can be expedient if the manipulator in each instance picks off at least one piece good from the one of the at least two closed formations of the particular rows for which piece good a distance to be covered to its particular target position and/or target alignment is minimal in relation to a distance for other piece goods to be seized in the context of the pre-group and/or layer arrangement to be disposed for the palletizable layer to be formed.

Such a non-aligned arrangement of the piece goods of the two or more parallel rows with the piece goods offset or disposed transversely to a transport direction can likewise refer to a temporally offset supply of piece goods in the at least two rows. The feed can then, for example, start earlier in one of the two or more rows than the feed in the other row or other rows. In such conveying situations, it is also possible, if required, to in each instance pick off different numbers of piece goods from the two or more rows. A further useful boundary condition can then lie in the fact that longer manipulator paths can be accepted if the particular piece good to be seized has already progressed further within the seizing range. According to positioning progress, it can moreover be useful to also accept longer paths for the manipulator when the gradually filling layer pattern of the palletizable layer to be formed makes this necessary or even indispensable in the individual case.

In an alternatives embodiment variant of the apparatus according to the invention, more than one manipulator is present for handling and positioning the piece goods arriving in transport direction in at least one row via at least one transport device. This variant of the apparatus comprises a plurality of manipulators for piece goods as well as a plurality of transport devices with parallel transport directions. By way of this plurality of transport devices, in each instance immediately consecutive piece goods of a particular row are transported nearly without spaces, as a closed formation, into particular seizing ranges of the plurality of manipulators such that all seizing ranges of the plurality of manipulators can each reach at least one row with a closed formation of transported piece goods. If a "plurality of transport devices" is referred to in this context, this definition is intended to comprise a variant in which two or more rows with closed formations of piece goods are transported next to each other on a joint transport device and are conveyed to the two or more manipulators or to the manipulator seizing ranges. The plurality of manipulators are moreover each formed for seizing or receiving, in each instance at least one piece good in a clamping and/or form-locking and/or force-locking manner from the closed formation that was transported into the seizing range of the particular manipulator as well as for separating and transferring the at least one piece good.

Advantageously, but by no means imperatively, the seizing ranges of the plurality of manipulators can, at least in some areas, be formed to be perpendicular to the transport directions of the plurality of transport devices that are adjacent to each other. The alignments can also have other angles or be in principle undefined or variable.

In addition, it can be provided in a further embodiment variant of the apparatus according to the invention that seizing ranges of the plurality of manipulators overlap in some areas, in which case immediately consecutive piece goods of the particular row are transportable, by at least one of the plurality of transport devices, nearly without spaces, as a closed formation, into the overlapping range of the plurality of manipulators. It can moreover be provided that the manipulators with the overlapping seizing ranges are coordinated with each other for receiving the particular piece goods, which have been transported as closed formation into the overlapping range, in a clamping and/or form-locking and/or force-locking manner, as well as for separating the piece goods and transferring them into a particular target position and/or target alignment.

The apparatus according to the invention can optionally comprise a control device that is in contact with the plurality of manipulators, in which case the control device has information on a group to be formed from a multitude of piece goods for a palletizable layer. In this context it can moreover be advantageous if the particular target positions and/or target alignments of the piece goods form a part of the information and assign a specific position and/or a relative orientation in the particular group to the particular at least one piece good. Additionally or optionally, it can be moreover provided that the plurality of manipulators, in a manner coordinated with each other and in consideration of the information, can be controlled by way of the control device for in each instance receiving at least one particular piece good in a clamping and/or form-locking and/or force-locking manner from the closed formations, which have been transported by the plurality of transport devices into the seizing ranges, as well as for separating the piece good and transferring it into a particular target position and/or target alignment.

As an alternative to the previously described apparatus, this apparatus can optionally also comprise a control device that is in contact with the plurality of manipulators, in which case the control device has information on a row to be formed from a multitude of piece goods or on a plurality of rows to be formed from a multitude of piece goods, in which case the particular target positions and/or target alignments of the piece goods form a part of the information and assign a specific position and/or a relative orientation for the particular row to be formed or for the particular plurality of rows to be formed to the particular at least one piece good, and in which case the plurality of manipulators, in a manner coordinated with each other and in consideration of the information, can be controlled by way of the control device for in each instance receiving at least one particular piece good in a clamping and/or force-locking and/or form-locking manner from the closed formation, which has been transported by the plurality of transport devices into the seizing ranges, as well as for separating the piece good and transferring it into a particular target position and/or target alignment.

Optionally, only one manipulator can be provided in the apparatus according to the invention, as is explained in more detail elsewhere in the present description. However, there can alternatively also be a plurality of manipulators that are each designed for receiving, in a clamping and/or form-locking and/or force-locking manner, particular piece goods in a specific number and positioned foremost in the closed formation, as well as for separating the piece goods and transferring the piece goods into a particular target position and/or target alignment. In addition, the plurality of manipulators can each be designed for rotating at least one piece good of the closed formation.

As mentioned above in the context of the at least one manipulator of a variant of the apparatus, the plurality of manipulators can each be designed, for example, as parallel kinematic robot, or can each be part of such.

In an alternative and/or additional embodiment variant of the apparatus according to the invention, the at least one manipulator or manipulator section for forming a palletizable layer from piece goods or for forming a pre-group for a palletizable layer from piece goods, which manipulator or manipulator section is movable, shiftable, and/or rotatable within the seizing range, can be designed for carrying out a plurality of temporally consecutive steps. In these steps, in each instance at least one piece good is seized in a in a clamping and/or force-locking and/or form-locking manner by way of the at least one manipulator, is in each instance spatially separated from the closed formation by lateral rotation out of a straight movement path of the closed formation; and is transferred into a particular target position and/or target alignment by the at least one manipulator.

In this apparatus, the at least one manipulator can preferably have a specific reception capacity for a plurality of piece goods and can be controllable for seizing a particular specific number of piece goods for the plurality of steps in a manner in each instance coordinated to the palletizable layer or pre-group of a palletizable layer to be formed. For different positioning steps, the particular number of piece goods can either correspond to the reception capacity of the manipulator or be less than the reception capacity.

For easier handling of the piece goods, it can be advantageous if the at least one manipulator has—as described above—two clamping elements and/or gripping elements located opposite each other for the particular seizing of the specific number of piece goods and for the release of the particular specific number of piece goods in the target position and/or target alignment.

The apparatus can alternatively or additionally also provide that the at least one manipulator for forming a palletizable layer from piece goods or for forming a pre-group for a palletizable layer from piece goods—which manipulator is movable, shiftable, and/or rotatable within the seizing range, and which manipulator is at least partly formed by a delta kinematic robot and/or has such a delta kinematic robot—is designed for carrying out a plurality of temporally consecutive steps. In these steps, in each instance at least one piece good can be seized in a clamping and/or force-locking and/or form-locking manner by way of the at least one manipulator; can be in each instance spatially separated from the closed formation with simultaneous distancing in transport direction and under an at least brief acceleration with a movement component parallel to the straight movement path of the closed formation and/or by lateral rotation out of a straight movement path of the closed formation; and can be transferred into a particular target position and/or target alignment by the at least one manipulator.

In this context, the at least one manipulator can, in particular, have a specific reception capacity for a plurality of piece goods and can be controllable for seizing a particular specific number of piece goods for the plurality of steps in a manner in each instance coordinated to the palletizable layer or pre-group of a palletizable layer to be formed, in which case this number can, for different positioning steps, correspond to the manipulator's piece goods reception capacity or it can be less than the manipulator's maximum piece goods reception capacity. In order to be able to seize and manipulate the piece goods, the at least one manipulator can have, for example, two manipulator clamping elements and/or gripping elements located opposite each other for the particular seizing of a specific number of piece goods and for the release of the particular specific number of piece goods in the target position and/or target alignment. If the piece goods are to be seized simultaneously in a plurality of rows, this can also be, for example, a double gripper or a multiple gripper that has more than two clamping elements and/or gripping elements, which are movable relative to each other and/or at least pairwise advanceable toward each other.

In addition, the apparatus can provide that the at least one manipulator is designed for seizing, in a clamping and/or form-locking manner, particular piece goods in a specific number and positioned foremost in the closed formation, as well as for separating the piece goods and transferring the piece goods into a target position and/or target alignment.

Further variants of the apparatus according to the invention are described below. As already mentioned elsewhere, these variants can be seen as variants in their own right or they can be seen in combination with other variants, in an alternative or a cumulative manner. One variant of the apparatus thus provides that the at least one manipulator is designed for seizing at least one piece good, which succeeds a foremost disposed piece good of the closed formation, in a clamping and/or form-locking manner such that the at least one manipulator at first or at least temporarily leaves the foremost disposed piece good in its place or in its movement without seizing it. In this variant, the at least one manipulator is moreover designed for pushing the foremost disposed piece good into a particular target position and/or target alignment provided for the foremost disposed piece good.

Generally, to most of the method steps described here or to most of the described options of the apparatus according to the invention or of the method according to the invention the option can be added of pushing the already positioned piece goods and/or the piece goods that are realigned after a rotation or partial rotation. This is intended to imply that the manipulator first positions an individual piece good within the seizing range and/or realigns an individual piece good after a rotation or partial rotation; disengages from the piece good; and retrieves and seizes a further piece good from the closed formation, as a rule a piece good that is located foremost in transport direction. The piece good previously already positioned in the seizing range, that is, the piece good being further conveyed in transport direction standing upright on the horizontal conveying device, can be shifted as desired by this piece good that is held and/or clamped in the manipulator and/or by parts of the manipulator, without the piece good having to be separately seized, clamped, and/or gripped for this purpose by the manipulator. The option of pushing the piece goods can likewise imply that the manipulator first positions two, three, or more piece goods simultaneously within the seizing range, and thus on the horizontal conveying device, and/or realigns the two, three, or more piece goods after a joint rotation or partial rotation; disengages from these piece goods; and retrieves and seizes a further piece good from the closed formation, as a rule a piece good that is located foremost in transport direction. The piece goods previously already positioned in the seizing range, that is, the piece goods being further conveyed in transport direction standing upright on the horizontal conveying device, can be shifted as desired by this piece good that is held and/or clamped in the manipulator and/or by parts of the manipulator, without the piece goods having to be separately seized, clamped, and/or gripped for this purpose by the manipulator.

The option of pushing the piece goods can, however, likewise imply that the manipulator first positions two, three, or more piece goods simultaneously within the seizing range, and thus on the horizontal conveying device, and/or realigns the two, three, or more piece goods after a joint rotation or partial rotation; disengages from these piece goods; and retrieves and seizes a further piece good from the closed formation, as a rule a piece good that is located foremost in transport direction. At least one of the piece goods previously already positioned in the seizing range, that is, the piece good being further conveyed in transport direction standing upright on the horizontal conveying device, can be shifted as desired by this piece good that is held and/or clamped in the manipulator and/or by parts of the manipulator, without this one piece good, or the two or three of the previously positioned piece goods, having to be separately seized, clamped, and/or gripped for this purpose by the manipulator. The option of pushing the piece goods can finally optionally imply that the manipulator first positions two, three, or more piece goods simultaneously within the seizing range, and thus on the horizontal conveying device, and/or realigns the two, three, or more piece goods after a joint rotation or partial rotation; disengages from these piece goods; and retrieves and seizes two or three further piece goods from the closed formation, as a rule the piece goods that are located foremost in transport direction. The piece goods previously already positioned in the seizing range, that is, the piece goods being further conveyed in transport direction standing upright on the horizontal conveying device, can be shifted as desired by these piece goods that are held and/or clamped in the manipulator and/or by parts of the manipulator, without the piece goods having to be separately seized, clamped, and/or gripped for this purpose by the manipulator. Optionally, also only one single piece good or a part of the previously positioned piece goods can be subsequently shifted.

If "shifting" or "subsequent shifting" of previously already positioned piece goods and/or piece goods deposited by the manipulator within the seizing range and/or realigned piece goods is referred to in the present context, this is intended to optionally also comprise any changes of angle in relation to the previously assumed position, that is, any realignments of the piece goods by subsequent pushing and/or rotating influences from the manipulator and/or from piece goods that are being seized, clamped, and or held by the manipulator, as has already been explained previously on the basis of several variants.

As is evident, in all of these mentioned method variants of pushing and/or of multiple influences on the piece goods, the at least one manipulator is designed for pushing the previously already positioned piece good or the previously already positioned piece goods into a particular new target position and/or renewed target alignment provided for the previously already positioned and/or realigned piece good.

For all described method variants and/or apparatus variants of the present invention, it can optionally apply that the at least one manipulator can optionally or as needed be lifted up with a vertical direction component, too, and be lowered with a vertical direction component for receiving the at least one piece good. In this instance, the piece goods can at least during the positioning procedure at least in phases lose the touching contact to the surface of the horizontal conveying device, and this can be expedient for friction reduction and/or for producing specified and reproducible resistances against all positioning movements. Since friction effects are superimposed upon all inertia forces in the manipulator movements if the piece goods are not lifted up, but rather only shifted, and since the friction forces can change according to the variable ambient conditions and, if applicable, changing surface properties at the boundary layers of the parts moving relative to each other, whereas the inertia forces essentially only depend on the moved masses and centers of mass of the piece goods, lifting the piece goods at least in phases can contribute to a more precise calculability of the forces and moments to be applied as well as, in particular, of the forces and moments occurring in the manipulating movements.

For all described variants of the present invention, be they method variants or apparatus variants, it can be provided as further option that the at least one manipulator can optionally or as needed also be lifted up in vertical direction to a height above the height level of the piece goods to be seized and/or to be positioned and/or to be aligned, and can be lowered back down from this height for receiving the at least one further piece good. In this manner, newly seized piece goods can be lifted out of the closed formation from nearly any positions, can be lifted above further piece goods, and can subsequently be positioned, if these piece goods to be seized from the closed formation are already in the seizing range of the manipulator and thus within the manipulator's reach. In addition, piece goods can be seized in this manner, moved above already positioned piece goods, and be put down and positioned in transport direction upstream from these already positioned piece goods and/or can be rotated and/or aligned as desired.

In addition, the at least one manipulator can be designed to be movable linearly and aligned to a conveying direction of the at least one transport device for the purpose of transferring the at least one piece good into its particular target position and for pushing the foremost disposed piece good in its particular target position and/or target alignment.

Finally, a further apparatus variant can have or comprise a control device by way of which the at least one manipulator is controllable for the seizing of the at least one piece good in a clamping and/or force-locking and/or form-locking manner; for the spatial separation of the at least one piece good from the closed formation; as well as for bringing the at least one piece good into the specified target position and/or target alignment, in which case the control device has information or has information stored on a group to be formed from a multitude of piece goods for a palletizable layer, and in which case the particular target positions and/or target alignments of the piece goods form a part of the information and assign a specific position and/or a relative orientation in the particular group to the particular at least one piece good as well as to the particular foremost disposed piece good.

In the method according to the invention, it is provided that, in a plurality of temporally consecutive steps, in each instance at least one transported piece good is seized from the closed formation; is in each instance spatially separated from the closed formation by straight acceleration in or approximately in a longitudinal extension direction of the closed formation and/or by a rotation out of a straight movement path of the closed formation; and is brought into a particular specified relative target position and/or target alignment in relation to subsequent piece goods by at least one manipulator. In this context, at least one further velocity component and/or direction component and/or rotation component in relation to a transport speed of the closed formation is imparted to the at least one seized piece good. It should be noted that the velocity component in this context may not be negative in relation to the speed of the piece goods in the formation, and the direction component may not be directed against the transport direction of the piece goods in the formation. Otherwise, there would be a risk of collision between the seized piece good and the following piece good that is now located foremost in the closed formation. For rotating the at least one seized piece good, the manipulator of the apparatus can be designed, for example, as a gripper head on a swivel joint and can change the alignment of the piece goods seized between the clamping jaws through rotation by a specified angle of, for example, 90°.

According to a further embodiment of the method, it is provided that the at least one transported piece good is brought into the specified relative target position and/or target alignment in relation to the subsequent piece goods under simultaneous rotary movement by an angle of at least approximately 90° or of at least approximately 180°. The method can furthermore provide that the rotary movement is preferably carried out about an approximately vertical axis located between the particular at least one piece good seized in a clamping and/or force-locking and/or form-locking manner and the particular specified target position.

Moreover, at least one foremost transported piece good can be seized in a clamping and/or force-locking and/or form-locking manner from the closed formation, and can be rotated by an angle of at least approximately 90° or of at least approximately 180° about the axis, in which case this axis can be located, in particular, between the particular at least one piece good seized in a clamping and/or force-locking and/or form-locking manner and the particular specified target position. It can moreover be optionally provided that the axis of the rotary movement is moved toward the particular specified target position at least intermittently and/or in sections in the course of the rotary movement. Optionally, the axis can be moved at least intermittently in the course of the rotary movement toward the particular specified target position at a speed that is greater than the transport speed of the closed formation. It can additionally be expedient that the axis remains in a specific position at least intermittently in the course of the rotary movement.

A further embodiment variant of the method provides that the axis is moved at least intermittently in the course of the rotary movement toward the particular specified target position at a speed that is greater than the transport speed of the closed formation, with the axis temporally subsequently remaining in a specific position at least intermittently in the course of the rotary movement.

The method can optionally provide that at least one transported piece good is seized in a clamping and/or form-locking manner from the closed formation; is spatially separated from the closed formation; and is brought into a particular, specified relative target position and/or target alignment in relation to subsequent piece goods, this being repeated a number of times in succession, with the result that a pre-group or a group for a palletizable layer or partial layer is formed from a plurality of piece goods.

In at least two consecutive steps for the particular moving along of piece goods from the closed formation into the in each instance provided target positions and/or target alignments, the rotary movements of the at least one manipulator can be carried out in each instance with the same sense of rotation, in particular or optionally under further rotation of the manipulator beyond a rotation angle of 180°. In particular, the at least one manipulator of an apparatus or handling apparatus for handling piece goods moved one after another in at least one row, can, for transferring the piece good into the specified relative target position and/or target alignment, apply a rotary movement by an angle of at least approximately 90° or of at least approximately 180° to the at least one transported piece good. In addition, the at least one manipulator supplies a preferably approximately vertical axis for the rotary movement and is designed for receiving the at least one piece good offset in relation to the axis in a clamping and/or force-locking and/or form-locking manner. It can be additionally provided that the at least one manipulator is designed to be movable together with the axis and the particular at least one piece good received in a clamping and/or form-locking manner at least intermittently overlapping with the rotary movement toward the particular target position.

Optionally, the at least one manipulator can be movable together with the axis and the particular at least one piece good received in a clamping and/or form-locking manner at least intermittently overlapping with the rotary movement toward the particular target position at a speed, in which case this speed is greater than the transport speed of the closed formation. In addition, the at least one manipulator can be designed for receiving, in a clamping and/or force-locking and/or form-locking manner, a specific number of the particular piece goods positioned foremost in the closed formation, as well as for separating the piece goods and transferring the piece goods to a target position and/or target alignment.

It can preferably be moreover provided that the apparatus or the handling apparatus comprises a control device for controlling the manipulator, which control device can, in particular, be formed by a processor-controlled control unit that can be equipped with variable and/or programmable control programs. This control device, in particular, controls the manipulator such that this manipulator seizes at least one piece good in a clamping and/or force-locking and/or form-locking manner from a closed formation; spatially separates the at least one seized piece good from the formation; and brings it into the particular specified target position and/or target alignment. This control device optionally also controls two or more manipulators such that these manipulators seize in each instance at least one piece good in a clamping and/or form-locking and/or force-locking manner from the particular closed formation; spatially separate the in each instance at least one seized piece good from the particular formation; and bring it into the particular specified target positions and/or target alignments.

The control device contains information on a great multitude of variants; more precisely, information, in particular, on a group to be formed from a multitude of piece goods for a palletizable layer or also for different layer patterns can be stored in the control device. In this context, the particular target positions and/or target alignments of the piece goods form a part of the information and assign a specific position and/or a relative orientation in the particular group to the particular at least one piece good.

According to an alternative and/or additional embodiment, information is stored in the control device on an arrangement to be formed from a multitude of piece goods with at least one further row of a plurality of piece goods. In this context, the particular target positions and/or target alignments of the piece goods form a part of the information and assign a specific position and/or a relative orientation in the particular further row to the particular at least one piece good.

A particular advantage of the method and the apparatus lies therein that the manipulator can perform a grouping and/or alignment of at least one piece good from a formation of unspaced and continuously supplied piece goods in one single manipulation step. It is thus possible to dispense with customarily known apparatuses, in which piece good groups are first separated and/or distanced from an infeed and subsequently rotated and/or laterally shifted and/or disposed in specified target positions, where the separation of individual piece goods or piece good groups from the arriving formation can be carried out by the manipulator itself or also by separate pre-grouping elements.

In this way, the present invention differs from gantry robot systems as known from the prior art, which can likewise produce palletizable layer patterns. In these known palletizing variants, which particularly work with gantry robot systems, a pre-grouping is usually carried out before the piece goods reach the seizing range of the gantry system, because such gantry robot systems, for reasons of a limitation of the maximum operating speed of the gantry system, normally do not expediently process an unspaced supply of piece goods/bundles. The present invention, in contrast, has the particular advantage that it manages the pre-grouping and the positioning for the layer formation in one integrated (seamless) single positioning step, thus accounting to a not inessential degree for the intended time saving in relation to the variants as known from the prior art.

The method according to the invention and the apparatus according to the invention thus make it possible to save operating costs in the ongoing packaging operation and/or palletizing operation as well as to save system costs, since fewer drives are required in the piece good infeed. The capacity and thus the throughput can moreover be significantly increased in relation to the customarily known systems.

It should finally be noted that aspects of modifications of the apparatus according to the invention as previously described on the basis of numerous embodiment variants can likewise apply to the method or to one of the embodiment variants or also to combinations of a plurality of these embodiment variants as also previously described on the basis of numerous embodiment variants. Thus, all of these aspects, modifications, and variants associated with the apparatus are intended to apply likewise to aspects, modifications, variants, and/or details of the invention disclosed for the method variants. It applies vice versa in the same manner that aspects of modifications of the method according to the invention as previously described on the basis of numerous embodiment variants can likewise apply to the apparatus or to one of the embodiment variants or also to combinations of a plurality of these embodiment variants as also previously described on the basis of numerous embodiment variants. Thus, all of these aspects, modifications, and variants associated with the method are intended to apply likewise to aspects, modifications, variants, and/or details of the invention disclosed for the apparatus variants.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIGS. 1 to 12 schematically show a temporal procedure of a first exemplary embodiment of a method for handling piece goods moved one after another in at least one row by a corresponding handling apparatus.

FIGS. 17 to 20 show a third example of use for a temporal procedure of a method for handling piece goods moved one after another in at least one row by a corresponding handling apparatus.

FIGS. 21 to 29 schematically show a temporal procedure of a fourth exemplary embodiment of a method for handling piece goods moved one after another in two parallel rows by a corresponding handling apparatus.

FIGS. 30 to 42 schematically show a temporal procedure of a fifth exemplary embodiment of a method for handling piece goods moved one after another in a plurality of parallel rows by a corresponding handling apparatus.

FIGS. 43 and 45 to 50 schematically show a temporal procedure of a sixth embodiment of a method for handling piece goods moved one after another in at least one row by a corresponding handling apparatus.

FIGS. 44A to 44F each show the seizing of a different number of piece goods by a manipulator of the handling apparatus.

FIGS. 51 to 59 schematically show a temporal procedure of three consecutive method steps of a seventh embodiment of a method for handling piece goods moved one after another in at least one row by a corresponding handling apparatus.

FIGS. 61 to 78 schematically show a temporal procedure of an eighth embodiment of a method for handling piece goods moved one after another in two parallel rows by a corresponding handling apparatus for preparing a layer of piece goods according to FIG. 60.

FIGS. 79A to 79C schematically show different embodiments of grippers or gripper heads of a manipulator.

FIG. 83 shows an alternative arrangement for carrying out a second embodiment variant of the method according to the invention by a correspondingly equipped handling apparatus.

Figure 5:
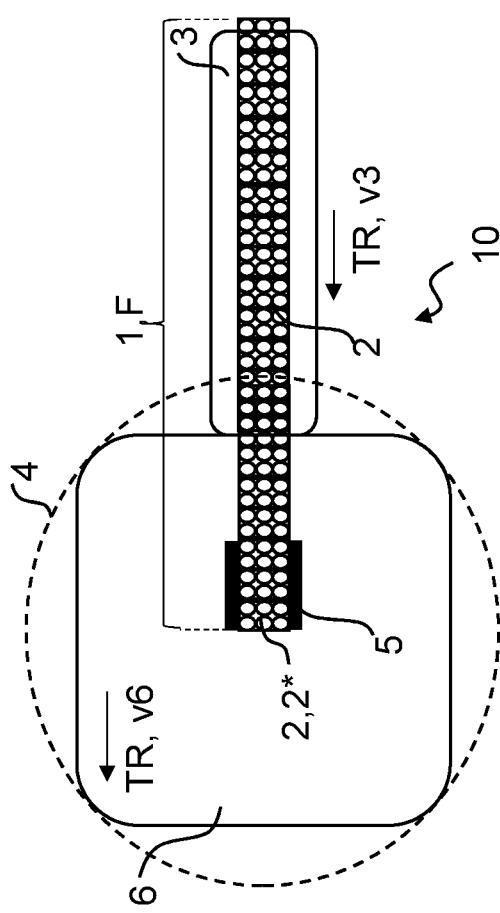
Figure 6:
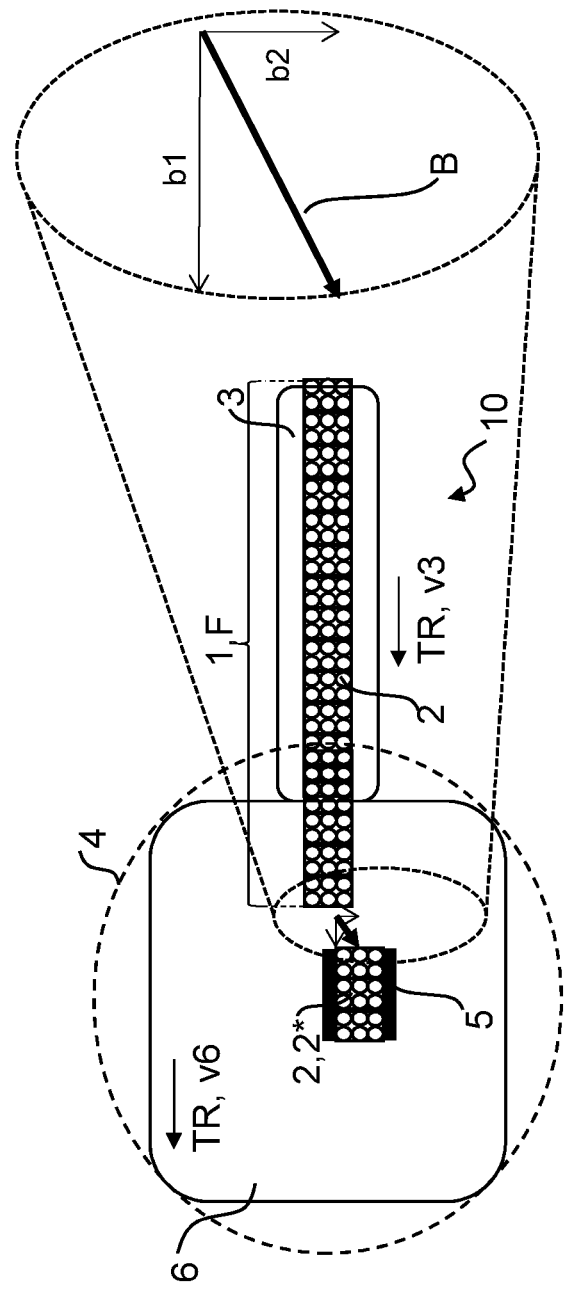
Figure 7:
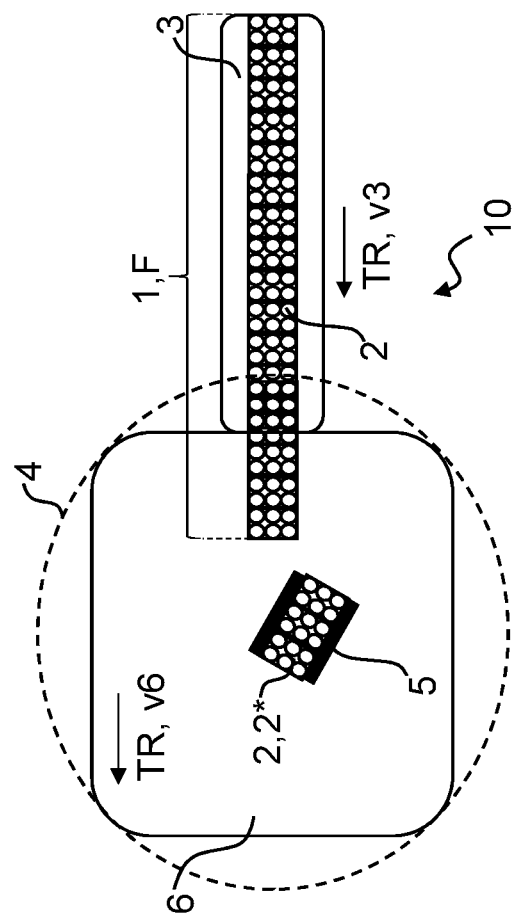
Figure 8:
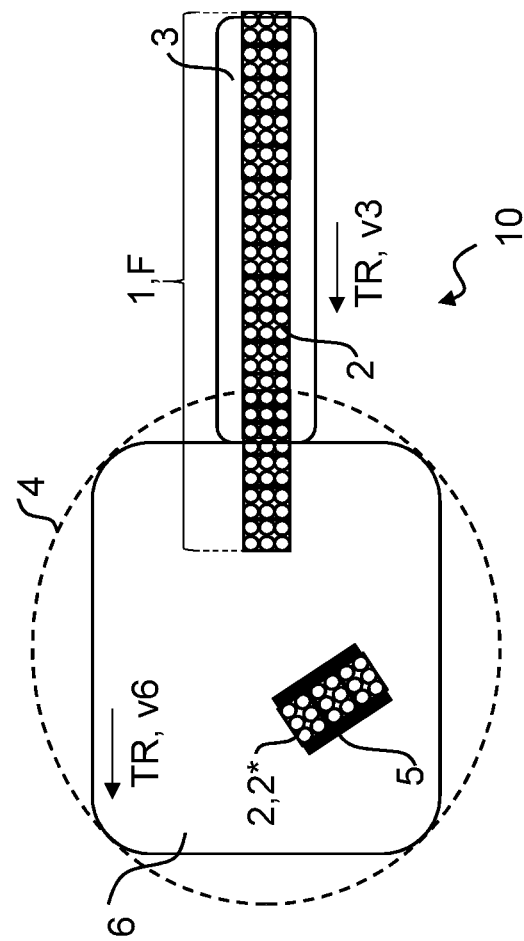

The same or equivalent elements of the invention are in each instance designated using identical reference characters. Furthermore and for the sake of clarity, only the reference characters relevant for describing the individual figures are used. It should be understood that drawings of the detailed description and specific examples of the embodiments of the apparatus and of the method according to the invention are intended for purposes of illustration only and are not intended to limit the scope of the invention or of the inventive idea.

DETAILED DESCRIPTION OF THE INVENTION

FIGS. 1 to 12 schematically show an expedient temporal procedure of a first exemplary embodiment of the method for handling piece goods 2 moved one after another in at least one row 1 by a corresponding handling apparatus 10.

The rows 1 of piece goods 2 shown here in FIGS. 1 to 20 can be uninterruptedly continuously conveyed in this arrangement in transport direction TR, for example. Alternatively, rows can be delivered that each comprise the number of piece goods 2 required, for example, for forming a layer of piece goods for further processing. Such a row can be followed by further similar or shorter or longer rows, in which case there can be spaces between consecutive rows. The spaces and the lengths of the particular rows expediently comply with the particularly desired layer pattern or with the processing speed of the employed manipulator 5 or with the maximum movement speeds of the movable parts of the manipulator 5 which movement speeds are to be continuously maintained during regular operation. Equally conceivable, however, are also endless rows 1 with a sequence of in principle endlessly consecutive piece goods, which are conveyed into a seizing range 4 of the manipulator 5 until a planned or unplanned facility stop takes place. If "unspaced succession" or "immediately consecutive piece goods 2" is referred to in the present context, this is intended to comprise both the case of mutually touching piece goods 2 and the case of slightly spaced-apart piece goods 2, where these cases can be random and/or ascribed to slight size deviations of the piece goods 2, etc.

Piece goods 2 in terms of the present invention or of the described exemplary embodiment can be, for example, individual articles, packages, or bundles. Packages or bundles can be, for example, shrink wrap bundles and/or strapped bundles or the like, with a plurality of articles, such as, in particular, containers, liquid containers and/or beverage containers that are normally gathered together in bundles.

The shown handling apparatus 10 comprises a first transport device 3, by way of which immediately consecutive piece goods 2 in a first row 1 are transported interruption-free and/or at continuous transport speed v3 into a seizing range 4 of at least one manipulator 5 of the handling apparatus 10. In the present context, the seizing range 4 refers, in particular, to the maximum and/or to the in each instance program-controlled specified movement range of the manipulator 5. As is discernible from FIG. 1ff, the seizing range 4 or the outer spatial limitation of the seizing range 4 can be larger than indicated by the outer limits of the horizontal conveying device 6 on the approximately horizontal upper side of which the piece goods 2, 2* are conveyed and/or positioned and/or shifted by the manipulator 5. Normally, however, the seizing range 4 of the manipulator 5 is the expedient range of movement where the piece goods 2, 2*, 2a to be seized can be located and/or where the piece goods 2, 2*, 2a to be deposited can be positioned.

The transport device 3 is, for example, at least one conveyor belt or at least one other suitable conveying device on which the piece goods 2 are transported preferably (in each instance) in one row, where no or only a minor, possibly process-related and/or specified space exists between in each instance directly consecutive piece goods 2. In particular, the transport device 3 can be formed by an endlessly circulating conveyor belt, an endless conveyor chain, or the like, so that the piece goods 2 can therewith be delivered and conveyed to the horizontal conveying device 6. The piece goods 2 located in row 1 on the transport device 3 thus arrive in the seizing range 4 of the manipulator 5 in a so-called closed formation F.

As already mentioned, it is optionally possible that the piece goods 2 are transported in multiple rows, in particular in a plurality of parallel rows, to the seizing range 4 of the manipulator 5 on a transport device 3 or on a plurality of parallel disposed transport devices 3. The parallel rows can in this case be transported spaced apart from each other or largely without spaces from each other on the at least one transport device 3.

The manipulator 5 is designed and equipped for receiving piece goods 2, 2\* in a clamping and/or form-locking and/or force-locking manner within the seizing range 4. The piece goods 2 seized by the manipulator 5—that is, the seized piece goods 2 that are usually foremost in the formation F—are referred to below with the reference character 2\* for the purpose of distinguishing them from the other piece goods 2 disposed in the formation F or also in the entire formation. The manipulator 5 grips, for example, at least one, preferably at least two or three of the successively disposed piece goods 2, 2\* arriving in closed formation F; separates the piece goods 2, 2\* from the single-row formation F of piece goods; and transfers the separated piece good 2\* or the separated group of two or three piece goods 2\* disposed unspaced in a row, each into a target position P and/or a target alignment (cf. FIG. 5*ff*). In this case it can be provided that the piece good 2\* or the group of piece goods 2\* is laterally shifted in relation to the arriving formation F of piece goods 2, and/or it can be provided that the piece good 2\* or the group of piece goods 2\* is spaced apart in transport direction TR from the formation F of piece goods 2 by the manipulator 5 and/or that the piece good 2\* or the group of piece goods 2\* is rotated in relation to the piece goods 2 of the formation F, or the like.

If a manipulator 5 is generalizingly referred to in the present case or also generally in the context of the present invention, this part of the manipulator 5 provided for the transfer of at least one piece good **2, 2\*, 2***a* to the target position P, Pa and/or target alignment, can concretely be, for example, a tool head, a gripper head, or the like, which is, for example, attached and mounted on movably mounted cantilever arms, which in turn are typically mounted in a frame-fixed manner on a frame or the like. Such a manipulator suspension or manipulator arrangement, as the case may be—also known as parallel kinematic arrangement—enables the desired movability of the gripper head (also: of the manipulator 5), which can seize, shift, position, place, rotate, etc. the piece goods **2, 2\*, 2***a* in the desired manner for moving toward the particular target positions P, Pa and/or target alignments for the piece goods **2, 2\*, 2***a*. Other suitable manipulator configurations are, however, equally conceivable, for example, such as are carried out with gantry robot guiding or the like. These other manipulator configurations can optionally relate to individual, several, or all embodiment variants mentioned in the context of the present description of figures and/or of the entire description of the invention.

If parallel rows of piece goods 2 are transported via the transport device 3 to the seizing range 4 of the manipulator 5, it can be provided, for example, that the manipulator 5 or the movable parts of the manipulator 5 and/or the parts of the manipulator 5 interacting with the piece goods **2, 2\*, 2***a*, can in each instance grip and process at least one piece good 2 of each parallel row 1.

The schematic top view of FIG. 1 in particular shows the piece goods 2 arriving via the transport device 3 as row 1 or in essentially unspaced formation F. The piece goods are moved in transport direction TR at a transport speed v3 toward the seizing range 4 of the manipulator 5 of the handling apparatus 10. The transport device 3 is, in particular, a horizontal conveying device, for example, a conveyor belt or the like.

The schematic top views of the FIGS. 2 to 4 show the transport, continued unspaced in transport direction TR, of the row 1 or formation F reaching the seizing range 4 of the handling apparatus 10 or of the manipulator 5. In particular, the piece goods 2 of row 1 are further transported in the seizing range 4 on the horizontal conveying device 6, without interruption and at unchanged speed v6, and, in particular, before being positioned or seized by the manipulator 5, as well as, normally, also after reaching the particular target position P (cf. FIG. 9).

As already mentioned above, associated with the seizing range 4 is, in particular, a horizontal conveying device 6, the surface of which supports the piece goods 2, 2\* and moves at a speed v6. In particular, the speed v6 of the horizontal conveying device 6 can correspond to the transport speed v3 of the transport device 3. Optionally, the transport speed v3 and the speed v6 can also slightly differ, if it can be ensured that the uninterrupted conveyance of the piece goods 2, 2\* to the horizontal conveying device 6 is maintained. The piece goods 2 arriving in row 1 or in formation F via the transport device 3 can be pushed over onto the horizontal conveying device 6 and be further conveyed there without interruption, at least with differing v3 and v6, due to the back pressure of the subsequent piece goods 2, resulting from the higher transport speed v3. In this case, however, it is necessary to dissipate this back pressure by suitable measures, for example by a rubberized conveyor belt of the horizontal conveying device 6 and/or by a rubberized conveyor belt of the transport device 3, optionally also by a so-called braking belt located between the transport device 3 and the horizontal conveying device 6, the braking belt being characterized by a piece good 2 supporting surface with a particularly high coefficient of friction. These or other suitable measures provide for precise positioning of the particular piece goods 2 at the particular place of seizing in the seizing range 4 such that a precise takeover by the manipulator 5 can be ensured. However, it should be emphasized that such measures for dissipating a possibly present or resulting back pressure are not desirable, even if they are indispensable or expedient to be used according to the selected configuration of the movable parts.

The schematic top views of FIGS. 5 to 9 show consecutive process steps of a simultaneous picking off of a total of three piece goods 2 from the formation F by a grasp of the manipulator 5. In particular, the manipulator 5 seizes the first three piece goods 2, 2\* of the formation F, that is to say, the piece goods 2, 2\* of formation F located foremost in transport direction TR.

In this exemplary embodiment and/or in the context of the entire present invention, the manipulator 5 can be formed, for example, by a gripper head 20 with lateral clamping jaws 22 or the like (cf. FIGS. 44 and 79), or it can comprise such a gripper head 20 with lateral clamping jaws 22, which are typically advanceable toward each other when seizing the piece goods 2\* in order to seize or clamp the piece goods in a form-locking and/or force-locking manner, and on the other hand, the clamping jaws 22 can in each instance be opened again on reaching the target position P. Therefore, if a manipulator 5 and/or a gripper or gripper head is referred to in the present context or in the present description, these terms can also be used as synonyms; if applicable, the gripper or gripper head is also to be seen as subassembly or component of the manipulator 5, which is to be understood as more comprehensive.

In the illustrated exemplary embodiment, the gripper or gripper head of the manipulator 5 can contact the first three piece goods 2 or 2* of the formation F, can seize them in a clamping and/or force-locking and/or form-locking manner, and can, in particular, spatially separate them from the formation F. The piece goods 2* are subsequently brought into a specified relative target position P (cf. FIG. 9) or Pa ((cf. FIG. 20) in relation to the subsequent piece goods 2 in the formation F by the manipulator 5. In this context, an overlapping rotation of the piece goods 2* can be carried out such that the target alignment of the piece goods 2* can likewise be changed in relation to the piece goods 2 of formation F (cf. in particular the FIGS. 7 to 12 as well as 19 and 20).

Preferably, the seized piece goods 2* are in this context transferred, pushed, and/or rotated in one single, in particular, interruption-free manipulation step into the target position P, Pa, and/or target alignment.

In this context, it can be additionally and optionally provided that the manipulator 5 lifts up the seized piece goods 2* by a small amount, brings them, in particular, out of the support contact with the top side of the horizontal conveying device 6, conveys them to the target position P, Pa, and subsequently deposits them on the horizontal conveying device 6 within the seizing range 4. This relocating movement can be overlapped by a rotary movement of the manipulator 5 together with the seized piece goods 2 or 2*, as applicable. It can be alternatively provided that the manipulator 5 shifts the piece goods 2* on the horizontal conveying device 6 without completely lifting them off from the surface, in particular, by the manipulator 5 applying a velocity component and/or a direction component to the piece goods 2* that have been picked off. In this case, an overlapping rotary movement of the manipulator 5 can again be provided.

Regarding the described rotary movements, it can be mentioned that the manipulator 5 or the manipulator gripper or the manipulator gripper head can optionally rotate by a desired alignment angle for the piece goods 2 or 2* optionally, for example, by 45°, by, for example, about 90°, or also by other rotation angles. An endless rotatability of the gripper head of the manipulator 5 can be particularly advantageous because in this way, a fast further rotation during the return movement to the formation F can be carried out in rotations, for example, by 180° or by 90°, where the further rotation possibly requires a shorter time than a return rotation in the opposite sense of rotation. By such an endless rotatability of the gripper head with, in principle, unlimited rotation angle, it is thus possible to always select in each instance the rotation directions that can be carried out faster; this relates both to the positioning of the seized piece goods 2 or 2* and to "empty runs" in the return movements of the manipulator 5 toward the formation F in order to receive further piece goods 2 or at least one further piece good 2 there.

In the manipulation steps described here, it is particularly provided that the manipulator 5 or the manipulator gripper head, as applicable, at least when seizing the three piece goods 2* and when releasing them in the target position P and target alignment, is moved at a positioning speed corresponding approximately to or corresponding to transport speed v3 at which the closed formation F of the piece goods 2 is moving.

As illustrated in the FIGS. 10 to 12, the manipulator 5 subsequently disengages from the piece goods 2* disposed in their target position P, for example by opening the above-described clamping jaws, and after a return movement, the manipulator 5 can then pick off further subsequent piece goods 2 from the formation F, as was already described on the basis of the FIG. 5 ff.

While the three piece goods 2* seized by the manipulator 5 are being brought into the target position P by the manipulator 5, the remaining piece goods 2 of the formation F are further transported interruption-free and/or at unchanged transport speed v3 on the transport device 3 and/or at unchanged speed v6 of the horizontal conveying device 6.

In the time slot between the manipulator 5 seizing the three piece goods 2* and releasing them in the target position P, the speed of the manipulator 5 is in many cases increased in relation to the transport speed v3 of the formation F, because the piece goods 2* are distanced from the remaining formation F. The movement direction B of the manipulator 5 results from a vector addition of a first movement component b1 parallel to the transport direction TR of the formation F and a second movement component b2 perpendicular to the transport direction TR of the formation F, as this is particularly illustrated by FIG. 6. The piece goods 2* seized by the manipulator 5 are thereby moved into the specified target position P—which is generally located in the seizing range 4 of the manipulator 5. The target position P is located spaced apart upstream in transport direction TR from formation F and laterally shifted in relation to the formation F, at least in the shown exemplary embodiment (cf. FIG. 9).

After the piece goods 2* have reached their target position P and the manipulator 5 has disengaged from the piece goods 2*, the piece goods 2* are further moved on the horizontal conveying device 6 in transport direction TR and at the speed v6. The target position P, in particular, is a position relative to the subsequent piece goods 2, the positions of which were not changed by the manipulator 5, where optionally the direction of rotation can have been changed (cf. FIG. 6 ff), or the piece goods 2* can have been shifted frontward without rotary movement in direction TR (missing movement component b2; not shown here). Since the speed v6 of the horizontal conveying device 6 corresponds to the transport speed v3 of the transport device 3 in the embodiment described here, and since the transport directions TR of the transport device 3 and of the horizontal conveying device 6 likewise correspond to each other, the piece goods 2*, with their positions and/or alignments having been changed by the manipulator 5, are further transported, without interruption and/or without speed change and/or direction change, upon or immediately after reaching their target position P.

The manipulator 5 can then seize further piece goods 2 from the formation F and bring them into a specified relative target position. When controlled by a control device (not illustrated), these mentioned manipulation steps can be repeated once, multiply, or endlessly, optionally in a different variant each time and with numerous modifications. The target position of these further piece goods 2 is particularly such that, for example, a second row forms at a new position from the piece goods 2, 2* seized in consecutive manipulation steps (also cf. FIGS. 13 to 16). In this context, the movement is always to be taken into account that the piece goods 2*, the positions of which have been changed in the first step, meanwhile perform due to the speed v6 of the horizontal conveying device 6.

The target position P, Pa of the further piece goods 2 can also be specified such that a group for a palletizable layer or partial layer 12 is formed, the group resulting from a plurality of piece goods 2, 2*, due to a plurality of manipulation steps, where in each instance piece goods 2 are picked off from the formation F by the manipulator 5 (also cf. FIGS. 17 to 20 in this context).

FIGS. 13 to 16 show a second example of use for a temporal procedure of a method or of the method according to the invention for handling piece goods 2 moved one after another in at least one row 1 by a correspondingly prepared or equipped handling apparatus 10.

Figure 13:
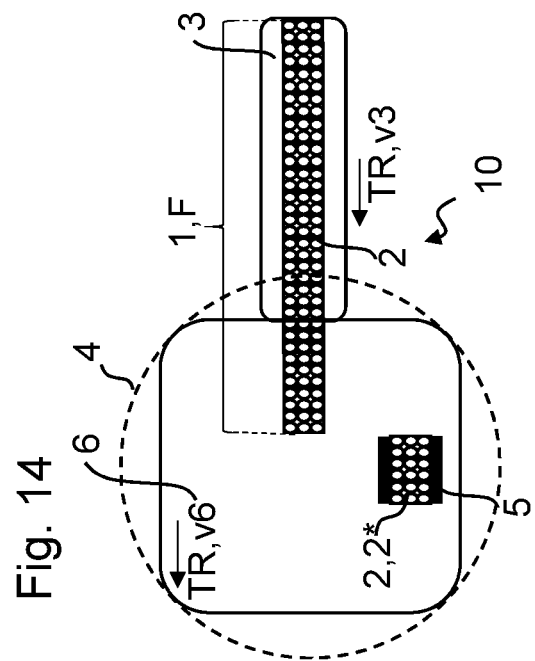
FIGS. 13 to 16 show a further example of use for a temporal procedure of a second exemplary embodiment of a method for handling piece goods moved one after another in at least one row by a corresponding handling apparatus.
Figure 14:
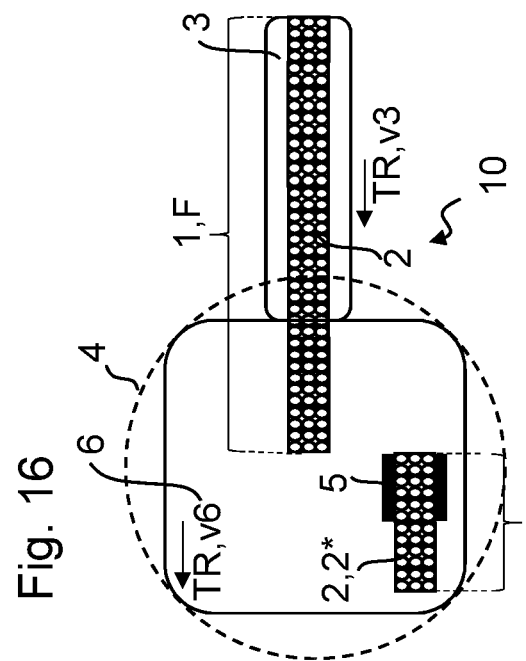
Figure 15:
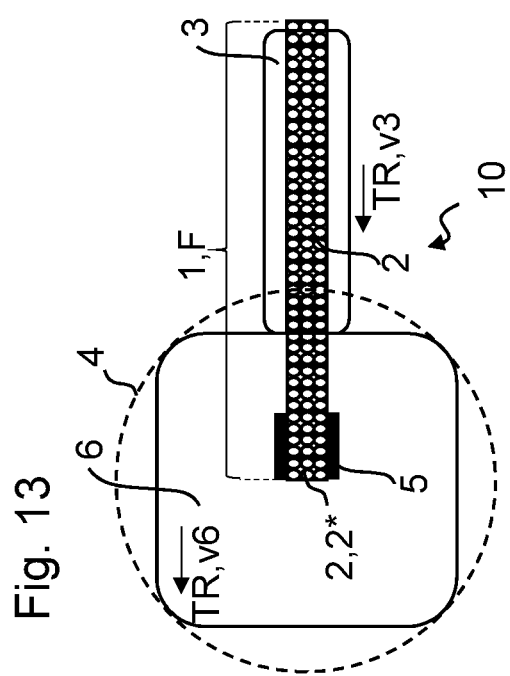
Figure 16:
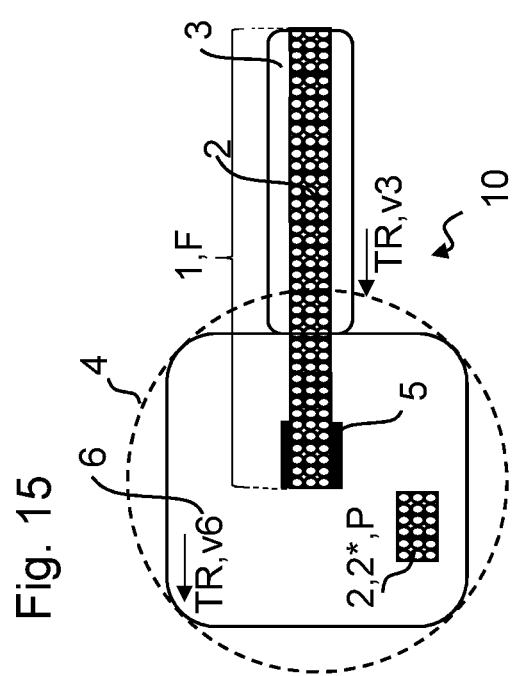

In this context, the manipulator 5 of the handling apparatus 10 or of a part of the at least one manipulator 5 provided for the transfer of the at least one piece good 2* into the target position P and/or target alignment moves together with the seized piece goods 2 at approximately the same speed or at the same speed as a speed v6 of the horizontal conveying device 6, while the seized piece good 2* is being conveyed into the provided target position P. In particular, the seized piece good 2* is shifted out of the formation F perpendicular to the formation F, meanwhile, however, having the same velocity component in transport direction TR as the formation F (FIGS. 13, 14). Here, the perpendicular shift relates to the formation F, which is meanwhile moved further along at the speed v6 or transport speed v3.

Subsequently, the next three piece goods 2, 2* succeeding in the formation F are seized by the manipulator 5 (cf. FIG. 15) and likewise shifted perpendicular to the formation F such that the piece goods 2, 2* seized in the second manipulation step are disposed in one row 11 aligned to the piece goods 2* that were seized and positioned first by the manipulator 5. Here, the perpendicular shift again relates to the formation F, which is being moved further along during the shift at the speed v6 or transport speed v3. The aim of these shifts can again be to form a layer or partial layer allowing the following palletizing of the piece goods 2, 2*, 2a assembled in such a way (cf. in particular FIG. 20).

FIGS. 17 to 20 show a third example of use for a temporal procedure of a method or of the method according to the invention for handling piece goods 2 moved one after another in at least one row 1 by a corresponding handling apparatus 10.

In a first manipulation step (according to FIGS. 17 and 18), the three piece goods 2* of the formation F are seized by the manipulator 5 of the handling apparatus 10 and are disposed in a target position P shifted laterally in relation to the formation F. Three further piece goods 2a of the formation F are subsequently seized by the manipulator 5 and transferred into a target position Pa. In this context, the piece goods 2a are additionally rotated (here for example by about 90°) such that the piece goods 2a have a different alignment in their target position Pa than in the formation F. The combination of manipulation steps in which the alignment of the piece goods 2* remains unchanged in relation to the alignment within the formation F, with manipulation steps in which the alignment of the piece goods 2a is changed by rotation, can be particularly advantageously used in the formation of pre-groups, in the formation of partial layers 12, or in the formation of palletizable layers.

Also, nearly any combinations—as seen in a cumulative, mirrored, and/or alternative, etc. manner—of the described manipulation steps can be expediently used to achieve desired layer patterns such that the piece good arrangements assembled in layers in such a way can be subsequently further treated and/or palletized.

FIGS. 21 to 29 schematically show a temporal procedure of a fourth exemplary embodiment of a method for handling piece goods 2 moved one after another in two parallel rows 1, 1a, 1b by a corresponding handling apparatus 10. The piece goods 2 are bundles, in each instance of six beverage containers 8, which are held together, for example, by a shrink wrap 9.

The handling apparatus 10 comprises two parallelly disposed first transport devices 3, 3a, 3b, by way of which immediately consecutive piece goods 2 in two parallel rows 1, 1a, 1b can be transported interruption-free and/or at continuous transport speed v3 into a seizing range 4 of at least one movable, shiftable, and/or rotatable manipulator 5 of the handling apparatus 10. In particular, it is provided that exactly one seizing range 4 of a manipulator 5 of the handling apparatus 10 is assigned to the two parallel first transport devices 3a, 3b. In each of the rows 1a, 1b, the piece goods 2 thus arrive in the seizing range 4 of the one manipulator 5 in each instance in a so-called closed formation F, Fa, Fb.

FIG. 21 particularly shows the piece goods 2 arriving via the transport devices 3a, 3b in two parallel rows 1a, 1b or in essentially unspaced formations Fa, Fb. Furthermore illustrated in FIG. 21 is a layer 12 to be formed from piece goods. FIGS. 22 to 29 schematically illustrate individual steps of forming the layer 12.

The description of the FIGS. 1 to 20 can be referred to regarding the characteristics of manipulator 5, transport devices 3a, 3b, seizing range 4, and horizontal conveying device 6.

The manipulator 5 is designed for receiving piece goods 2, 2* in a clamping and/or force-locking and/or form-locking manner within the seizing range 4. The manipulator 5 grips, for example, at least one, according to FIG. 22 at least two successively disposed piece goods 2 of the arriving closed formation Fa; separates the piece goods 2 from the single-row formation Fa; and transfers the separated piece good 2* or the separated group of two piece goods 2* disposed unspaced in a row into a first target position P1 and/or a target alignment (cf. FIGS. 23, 24). In this context, the group of piece goods 2* is spaced apart in transport direction TR from the formation Fa of the piece goods 2 by the manipulator 5; in addition, the group of piece goods 2* is rotated in relation to the piece goods 2 of the formation Fa.

FIG. 22 shows the transport, continued unspaced in transport direction TR, of the row 1 or formation F reaching the seizing range 4 of the handling apparatus 10. In particular, the piece goods 2 of the particular row 1a, 1b are further transported in the seizing range 4 on the horizontal conveying device 6 without interruption and at unchanged speed v6.

Figure 23:
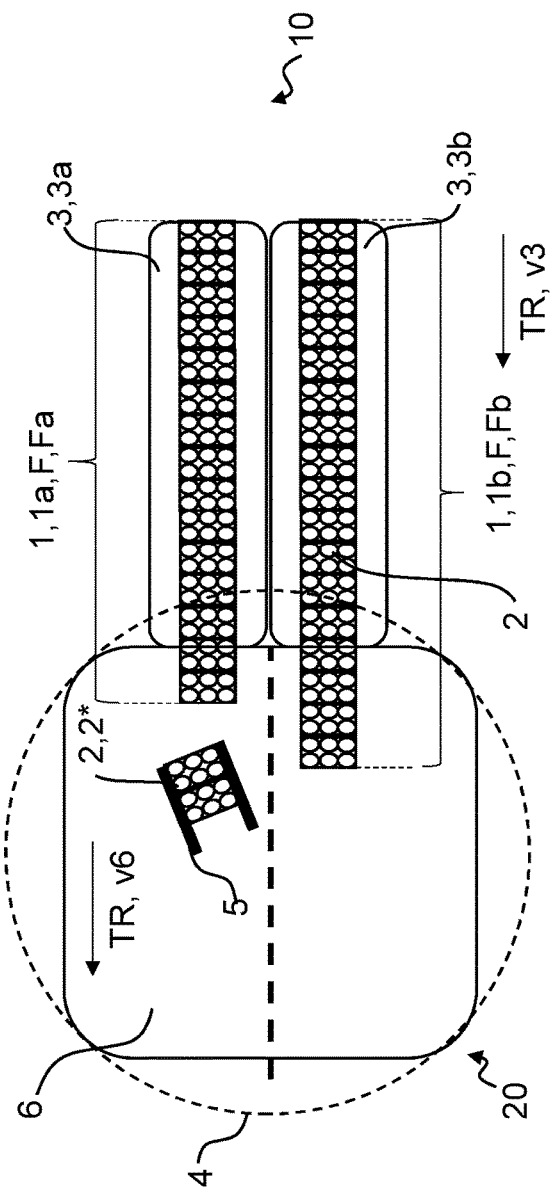
Figure 24:
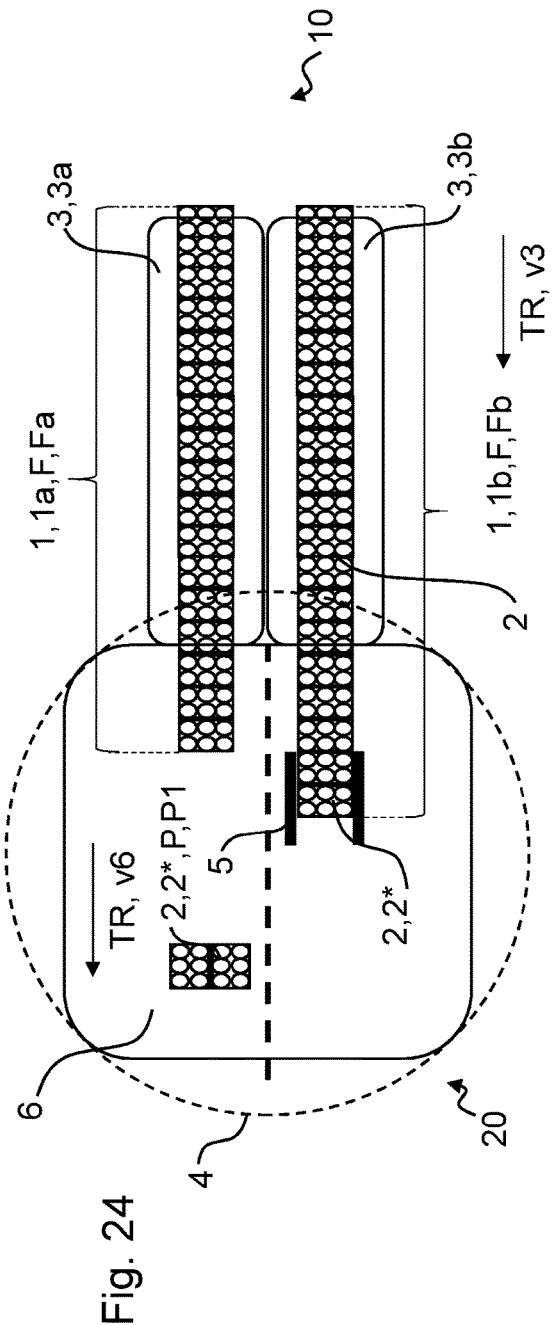

FIGS. 23, 24 show the manipulator 5 picking off the first two piece goods 2 from the formation Fa. The manipulator 5 is, for example, lowered from above down to the piece goods 2 to be seized and the manipulator 5 grips the piece goods 2. The manipulator 5 is, for example, a gripper head with lateral clamping jaws or the like, which in the illustrated exemplary embodiment contacts the first two piece goods 2 of formation Fa, seizes them in a clamping and/or form-locking manner, and separates them from the formation Fa. The piece goods 2* are subsequently brought into a specified relative target position P, P1 (cf. FIG. 24) in relation to the subsequent piece goods 2 in the formation Fa by the manipulator 5. In this context, a rotation of the piece goods 2* is carried out such that the target alignment of the piece goods 2* is changed in relation to the alignment of the piece goods 2 of the formation Fa.

Preferably, the seized piece goods 2* are in this context transferred, pushed, and/or rotated in one single, in particular, interruption-free manipulation step into the target position P1 and/or target alignment. In all manipulation steps described here, it can be provided that the manipulator 5 lifts up the seized piece goods 2*, for example, conveys them to the target position P, and deposits them on the horizontal conveying device 6 within the seizing range 4. It can be alternatively provided that the manipulator 5 shifts the piece goods 2* on the horizontal conveying device 6 by applying, in particular, a velocity component and/or a direction component to the piece goods 2* that have been picked off.

The target position P1 is, in particular and as already described above, a position relative to the formation Fa.

The 90° rotation of a unit of two piece goods 2, 2* seized by the manipulator 5, as illustrated in the FIGS. 22 to 24, is optimized, in particular, in terms of saving paths and time, in particular in the context of an asymmetric seizing of piece goods 2, 2* or of an asynchronous picking off of piece goods 2, 2*. In picking off two piece goods 2, 2* by a manipulator 5, as illustrated in the FIGS. 22 to 24, which manipulator 5 can seize up to three piece goods 2 according to the illustrated exemplary embodiment, at least one first vertical symmetry plane of the unit of two piece goods 2, 2* seized by the manipulator 5 is spaced apart from a second vertical symmetry plane that is defined by the manipulator 5 or by the manipulator clamping elements and/or gripping elements, as the case may be; and this is in the present context also referred to as so-called asynchronous or asymmetric picking off.

Because the picking off of piece goods 2, 2* from the closed and/or cycled formation F of the piece good rows 1 being conveyed to the seizing range 4 is frequently carried out asynchronously, it is possible to define specific expedient restrictions regarding the movement patterns of the manipulator 5 immediately following the picking off and seizing of piece goods 2 from the formation F. If the gripper head of the manipulator 5 is loaded with piece goods 2, 2* in the described asymmetric manner or in so-called asynchronous loading, by which the distancing of the particular first or second symmetry planes is meant, as the case may be—these are the particular vertical symmetry planes that are oriented approximately perpendicular to the transport direction TR or to the longitudinal extension direction of the piece good formation—, not every rotation direction variant is expediently performable in the instance of a shift to the left or to the right, which shift can in each instance be overlapped by a rotation, if applicable, because this could possibly lead to an unnecessarily long shift path that the manipulator 5 would altogether have to perform.

In the instance of the manipulator 5 loaded according to FIG. 22 asymmetrically with a unit of two piece goods 2, 2* of the formation Fa, the manipulator 5 is preferably briefly accelerated in transport direction TR in order to separate and at least slightly space apart the asymmetrically loaded manipulator 5 from the piece goods 2 of the formation Fa that continue to arrive. This space is necessary for disposing the unit of two seized piece goods 2, 2* in a target position P1 that is largely located in alignment upstream from the formation Fa, with the disposing taking place in the context of a counterclockwise rotational movement or a rotational movement to the left, which is additionally overlapped by a movement component in transport direction TR, if applicable. The spacing of the piece goods 2, 2* from the formation Fa by a brief acceleration of the manipulator prior to the 90° rotation—being carried out for producing a target alignment of the unit of two piece goods 2, 2* of the formation Fa—is necessary, in particular, in order to prevent a collision of the piece goods 2, 2* seized by the manipulator 5 with the succeeding piece goods 2 of the formation Fa. According to the illustrated exemplary embodiment, the rotation to the left of the asymmetrically seized unit of two piece goods 2, 2* of the formation Fa is advantageous with regard to the path distance to be covered by the manipulator 5. This aspect likewise leads to a noticeable saving of time and thus to an increased throughput in product processing.

The manipulator 5 subsequently disengages from the piece goods 2* that are disposed in their target position P1 and in the next step picks off two piece goods 2* from the formation Fb (FIG. 24). While the two piece goods 2* from the formation Fb are being brought into the target position P2 by the manipulator 5, the piece goods 2 of the formations Fa and Fb, as well as the piece goods 2* disposed in the target position P1, are transported further interruption-free and/or at unchanged transport speed v3 on the transport devices 3a, 3b or at unchanged speed v6 on the horizontal conveying device 6.

The manipulator 5 loaded according to FIG. 24 asymmetrically with a unit of two piece goods 2, 2* of the formation Fb is accelerated in relation to the formation Fb in transport direction TR in an overlapping movement and is simultaneously rotated to the left by 90° in order to dispose the unit of two seized piece goods 2, 2* in a target position P2 to the left of an alignment of the transport device 3b of the piece goods 2 of the formation Fb in order to prevent a collision of the piece goods 2, 2* seized by the manipulator 5 with the succeeding piece goods 2 of the formation Fb. By the rotation of the manipulator 5 to the left while the piece goods 2, 2* seized by the manipulator 5 are being brought into a target position P2, which is located to the left of an alignment of the transport device 3b, in which case a movement component of the manipulator 5 in transport direction TR of the formation Fb is simultaneously carried out with a velocity component corresponding to the transport speed of the piece goods 2 of the formation Fb, it can be ensured that the succeeding piece goods 2 of the formation Fb do not collide with the manipulator 5 or with the piece goods 2, 2* seized by the manipulator 5.

After the piece goods 2* have reached their target position P1, P2 and the manipulator 5 has disengaged from the piece goods 2*, the piece goods 2* are further moved on the horizontal conveying device 6 in transport direction TR and at the speed v6. In particular, the target position P2 is likewise a position relative to the subsequent piece goods 2, the positions of which were not changed by the manipulator 5.

The manipulator 5 according to FIG. 27 now grips three further piece goods 2* from the formation Fa and brings them—according to FIG. 28—into a specified third target position P3 according to the layer 12 to be produced illustrated in FIG. 21. FIGS. 28 and 29 already show the next step in which the manipulator 5 then picks off three piece goods 2* from the formation Fb in order to transfer the piece goods 2* into a specified fourth target position (not illustrated).

The combination of horizontal conveying device 6 and the at least one manipulator 5 arranged above the horizontal conveying device 6 form a so-called grouping module 20. Piece goods 2, for example, bundles of beverage containers, are fed to the grouping module 20 on at least one transport device 3, preferentially at a constant speed v3. The piece goods 2 are transferred, in particular unspaced, from the at least one transport device 3 into the grouping module 20 and constantly moved further along by the horizontal conveying device 6. The manipulator 5, which is arranged above the horizontal conveying device 6 in the grouping module 20, alternately seizes a specified number of piece goods 2, 2* and positions them on particular target positions P1, P2, P3. During the positioning of the piece goods 2* seized by the manipulator 5, the at least one transport device 3 and the horizontal conveying device 6 continue to be operated constantly.

In this context, the speed v3, v6 is selected such that the manipulator 5 has sufficient time, within its available operating range, to shift the piece goods 2*. Preferentially, the manipulator 5 consists of a delta kinematic robot in order to realize highly dynamic shifting movements and to enable cycle times to be as fast as possible.

In particular, at least two parallel rows 1a, 1b of piece goods 2 are here continuously fed to a grouping module consisting of the movable, shiftable, and/or rotatable manipulator 5 and the horizontal conveying device 6. The manipulator 5 processes the piece goods 2 of the arriving formations Fa, Fb sequentially by alternately seizing groups of two or three piece goods 2, 2* of the formations Fa, Fb and conveying them into their target positions P1 to P3. This results in a significant increase of the throughput with a simultaneously compact design.

If, moreover, "two or more parallel rows 1, 1a, 1b" are referred to in the present context, in which rows in each instance piece goods 2 or 2* are conveyed to the horizontal conveying device 6 in order to be seized there within the seizing range 4 of the manipulator 5 and to be conveyed, shifted, and/or rotated into their particular target positions P, P1, P2, and/or P3, this is not imperatively intended to mean that the particular piece goods 2 or 2* of the at least two rows 1, 1a, and/or 1b have to be positioned in exactly the same feed positions in transport direction TR. According to usefulness and/or conveying situation, the manipulator 5 can likewise handle arrangements where the piece goods 2 or 2* transported by the at least two closed formations F to the manipulator 5 are transported in a non-aligned arrangement where they are each offset from one another and/or where they are disposed transversely to a transport direction TR. In such conveying situations, it can be expedient if the manipulator 5 in each instance picks off at least one piece good 2 or 2* from the one of the at least two closed formations F of the particular rows 1, 1a, and/or 1b, for which piece good 2 or 2* a distance to be covered to its particular target position P, P1, P2, P3 and/or target alignment is minimal in relation to a distance for other piece goods 2 or 2* to be seized in the context of the pre-group and/or layer arrangement to be disposed for the palletizable layer 12 to be formed.

Such a non-aligned arrangement of the piece goods 2 or 2* of the two or more parallel rows 1, 1a, and/or 1b with the piece goods 2 or 2* offset or disposed transversely to a transport direction TR can likewise refer to a temporally offset supply of piece goods 2, 2* in the two rows 1, 1a, 1b. The feed can then, for example, start earlier in one of the two or more rows 1, 1a, 1b than the feed in the other row 1, 1a, 1b or other rows 1, 1a, 1b. In such conveying situations, it is also possible, if required, to in each instance pick off different numbers of piece goods 2 or 2* from the two or more rows 1, 1a, 1b. A further useful boundary condition can then lie in the fact that longer manipulator paths can be accepted if the particular piece good 2 or 2* to be seized has already progressed further within the seizing range 4. According to positioning progress, it can moreover be useful to also accept longer paths for the manipulator 5 when the gradually filling layer pattern of the palletizable layer 12 to be formed makes this necessary or even indispensable in the individual case.

FIGS. 30 to 42 schematically show a temporal procedure of a fifth exemplary embodiment of a method for handling piece goods 2 moved one after another in at least one row 1, in particular in a plurality of parallel rows 1a, 1b, 1c, 1d by a movable, shiftable, and/or rotatable manipulator 5 of a corresponding handling apparatus 10. In the illustrated exemplary embodiment, the piece goods 2 are bundles, in each instance of six beverage containers 8, which are held together, for example, by a shrink wrap 9.

The description of the previous figures can be referred to regarding the characteristics of manipulator 5, transport devices 3a, 3b, seizing range 4, and horizontal conveying device 6.

The handling apparatus 10 illustrated in the exemplary embodiment comprises four parallelly arranged first transport devices 3, 3a, 3b, 3c, 3d for the parallel transport, by way of which immediately consecutive piece goods 2 in four parallel rows 1, 1a, 1b, 1c, 1d are transported interruption-free and/or at continuous transport speed v3 into a seizing range 4 of at least one manipulator 5 of the handling apparatus 10. In particular, the handling apparatus 10 described here comprises two manipulators 5, 5a, 5b that each have one seizing range 4a, 4b. The seizing ranges 4a, 4b of the two manipulators 5a, 5b are, for example, at least in some areas perpendicular to the transport directions TR of the plurality of adjacent transport devices 3a, 3b, 3c, 3d.

It is preferably provided that the two seizing ranges 4a, 4b partly overlap in an overlap range Ü. The overlap range Ü is exemplarily specified in FIG. 30. For the purpose of clarity, not all reference characters are illustrated in all of the FIGS. 30 to 42.

In the illustrated exemplary embodiment, it is provided that one seizing range 4a of a first manipulator 5a of the handling apparatus 10 is assigned to the two parallel first transport devices 3a, 3b, and that one seizing range 4b of a second manipulator 5b of the handling apparatus 10 is assigned to the two parallel second transport devices 3c, 3d. But there can also be further overlaps such that the manipulator 5b, for example, can also take hold of the piece goods 2, 2b being moved by the transport device 3b. That is to say that, according to one embodiment of the invention, immediately consecutive piece goods 2 of the particular row 1, 1a, 1b, 1c, 1d are transported by at least one of the plurality of transport devices 3, 3a, 3b, 3c, 3d nearly without spaces, as a closed formation F, Fa, Fb, Fc, Fd, into the overlapping range U of the plurality of manipulators 5.

In this context it is important to coordinate the movement pattern of the manipulators 5a, 5b with each other such that no collision of the manipulators 5a, 5b occurs when they seize and position the piece goods 2. This is achieved, in particular, by a control device 15, illustrated exemplarily in FIG. 30, which is in contact with both manipulators 5a, 5b. The control device holds information on a group to be formed from a multitude of piece goods 2 for a palletizable layer 12 (cf. FIG. 42). The particular target positions P1 to P9 and/or target alignments of the groups of piece goods 2* seized in each instance by the manipulators 5a, 5b form a part of the information and assign a specific position and/or relative orientation in the particular group to the particular at least one piece good 2*. The manipulators 5a, 5b are correspondingly controlled to each seize and reposition a specified number of piece goods 2*.

The transport devices 3a, 3b, 3c, 3d are each, for example, a conveyor belt or another suitable conveying device on which the piece goods 2 are transported preferably in one row, where no or only a minor, possibly process-related space exists between in each instance directly consecutive piece goods 2. In each of the rows 1a, 1b, 1c, 1d, the piece goods 2 thus arrive in the seizing ranges 4a, 4b of the manipulators 5a, 5b in each instance in a so-called closed formation F, Fa, Fb, Fc, Fd.

FIG. 30 in particular shows the piece goods 2 arriving via the transport devices 3a, 3b, 3c, 3d in four parallel rows 1a, 1b, 1c, 1d or in essentially unspaced formations Fa, Fb, Fc, Fd. FIGS. 31 to 42 schematically illustrate individual steps to forming the layer 12 (cf. in particular FIG. 42).

Figure 31:
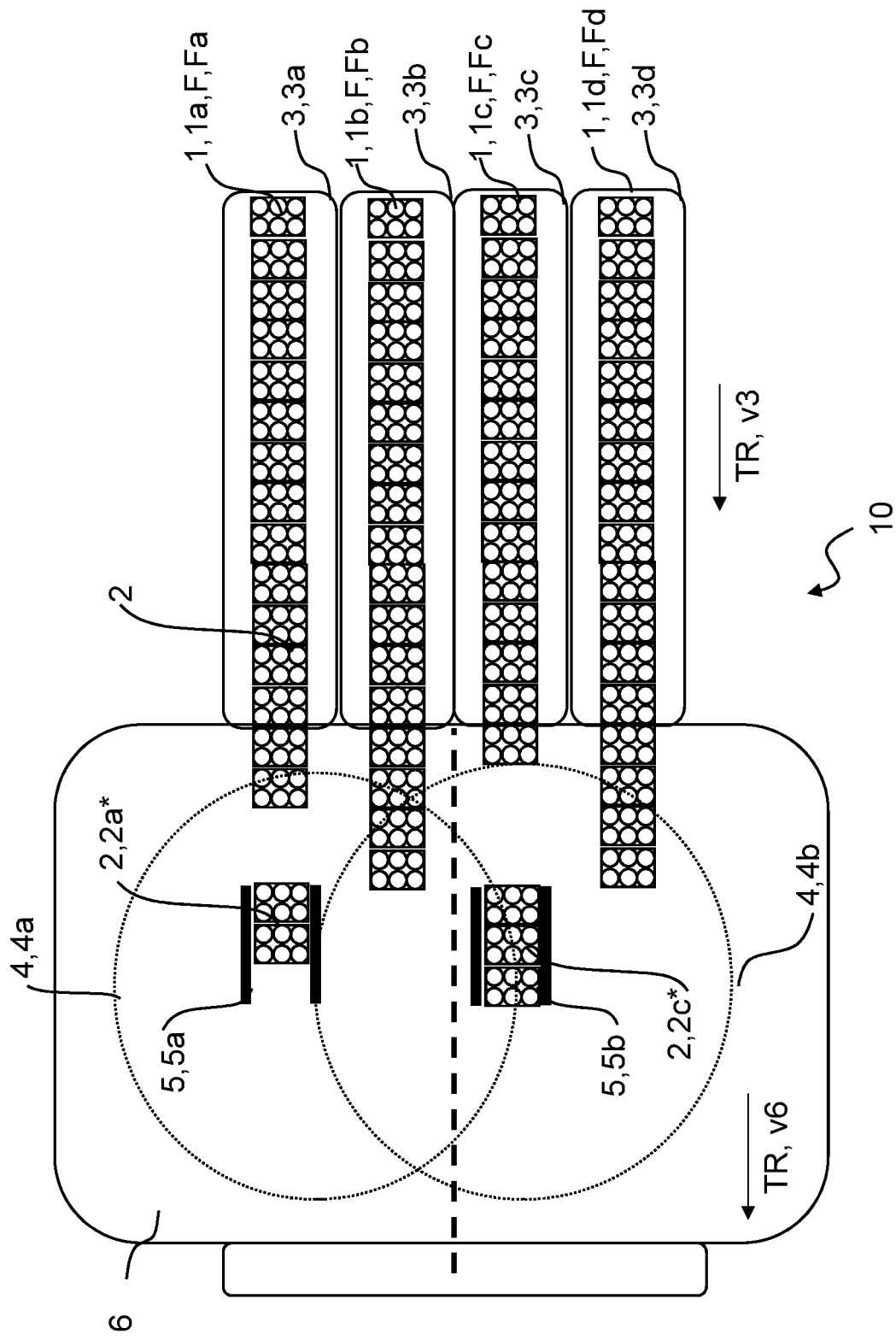
Figure 32:
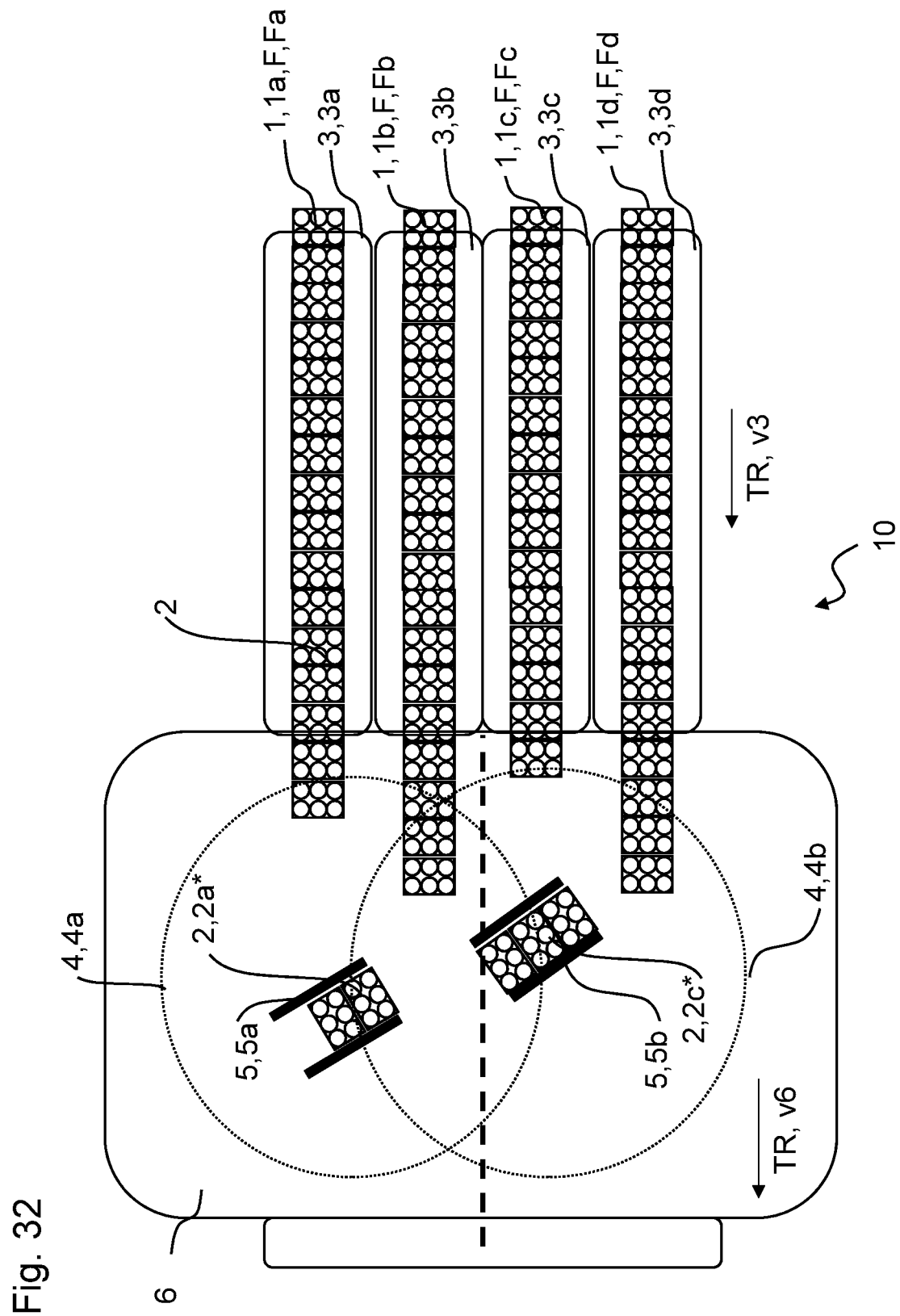
Figure 33:
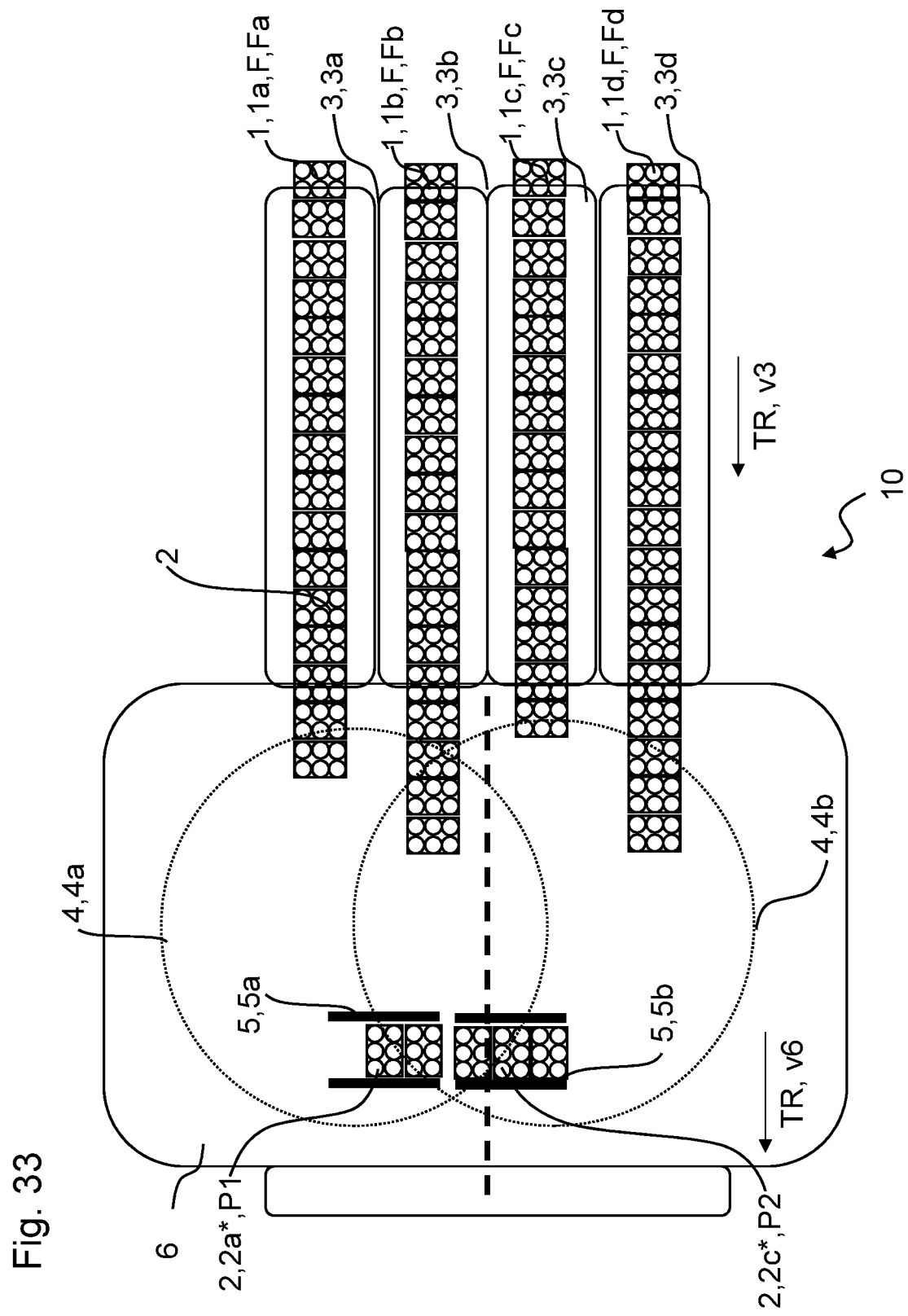

In FIG. 31, it is illustrated that the manipulator 5a has seized the first two piece goods 2a of the formation Fa fed by the transport device 3a and has already spaced them apart from the formation Fa. Simultaneously, the manipulator 5b seized the first three piece goods 2c of the formation Fc fed by the transport device 3c and spaced them apart from the formation Fc. As illustrated in the FIGS. 32, 33, the piece goods 2a*, 2c* seized by the manipulators 5a, 5b are transferred under rotation into their particular specified target position P1, P2 and/or target alignment. In this context, the groups of two piece goods 2a* or piece goods 2c*, as applicable, are each disposed in transport direction TR of their formation Fa, Fc and laterally offset therefrom by the manipulators 5a, 5b. By the rotation, the piece goods 2a*, 2c* seized by the manipulators moreover obtain a different target alignment.

While the piece goods 2a*, 2c* are being transferred into their target positions P1, P2 and target alignment by the manipulators 5a, 5b, the formations Fa, Fb, Fc, and Fd continue to be fed continuously and unspaced in transport direction TR to the seizing ranges 4a, 4b of the handling apparatus 10. The piece goods 2 of the rows 1 continue to be further transported without interruption and at unchanged transport speed into the seizing ranges 4a, 4b.

Figure 34:
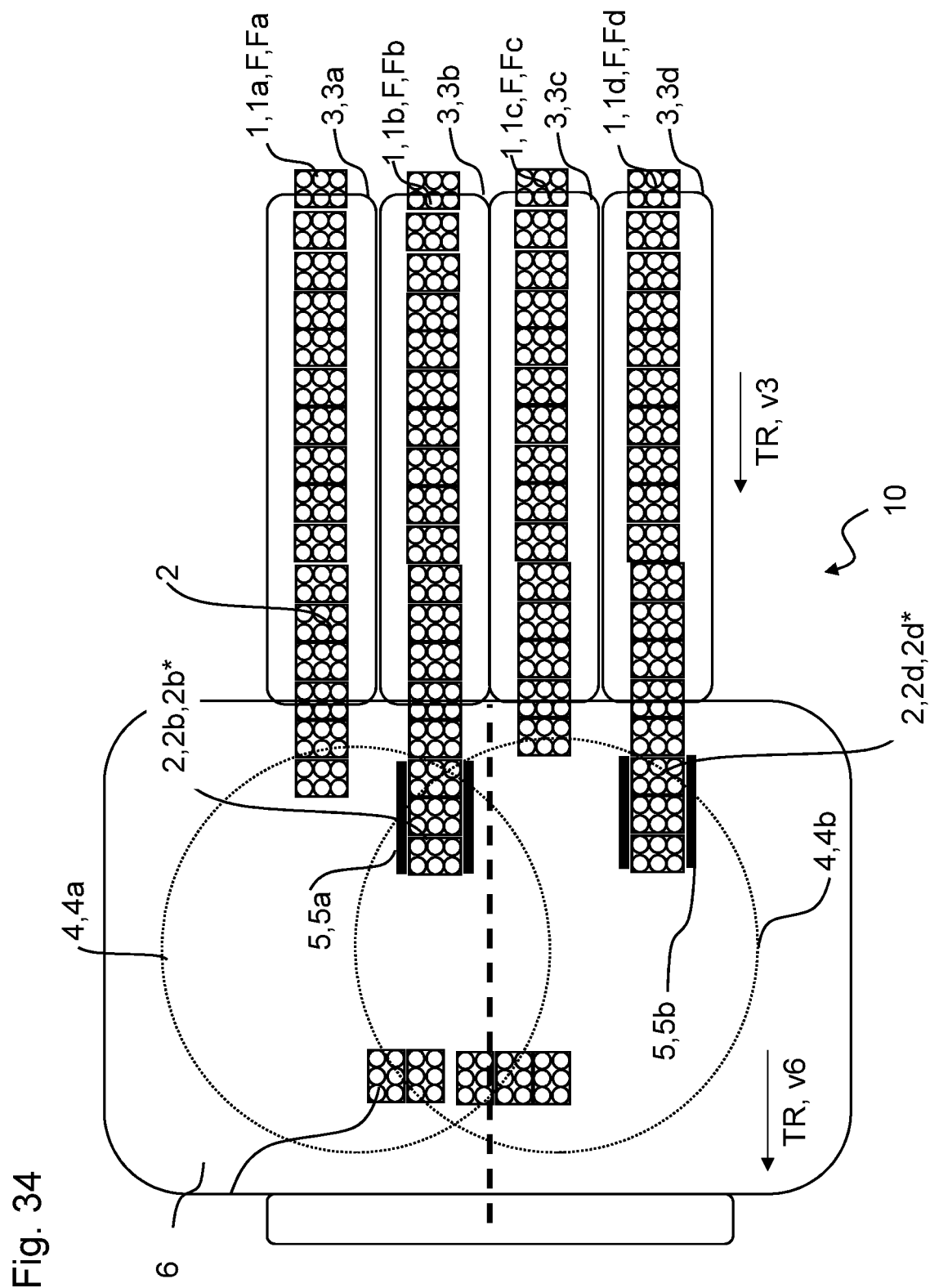
Figure 35:
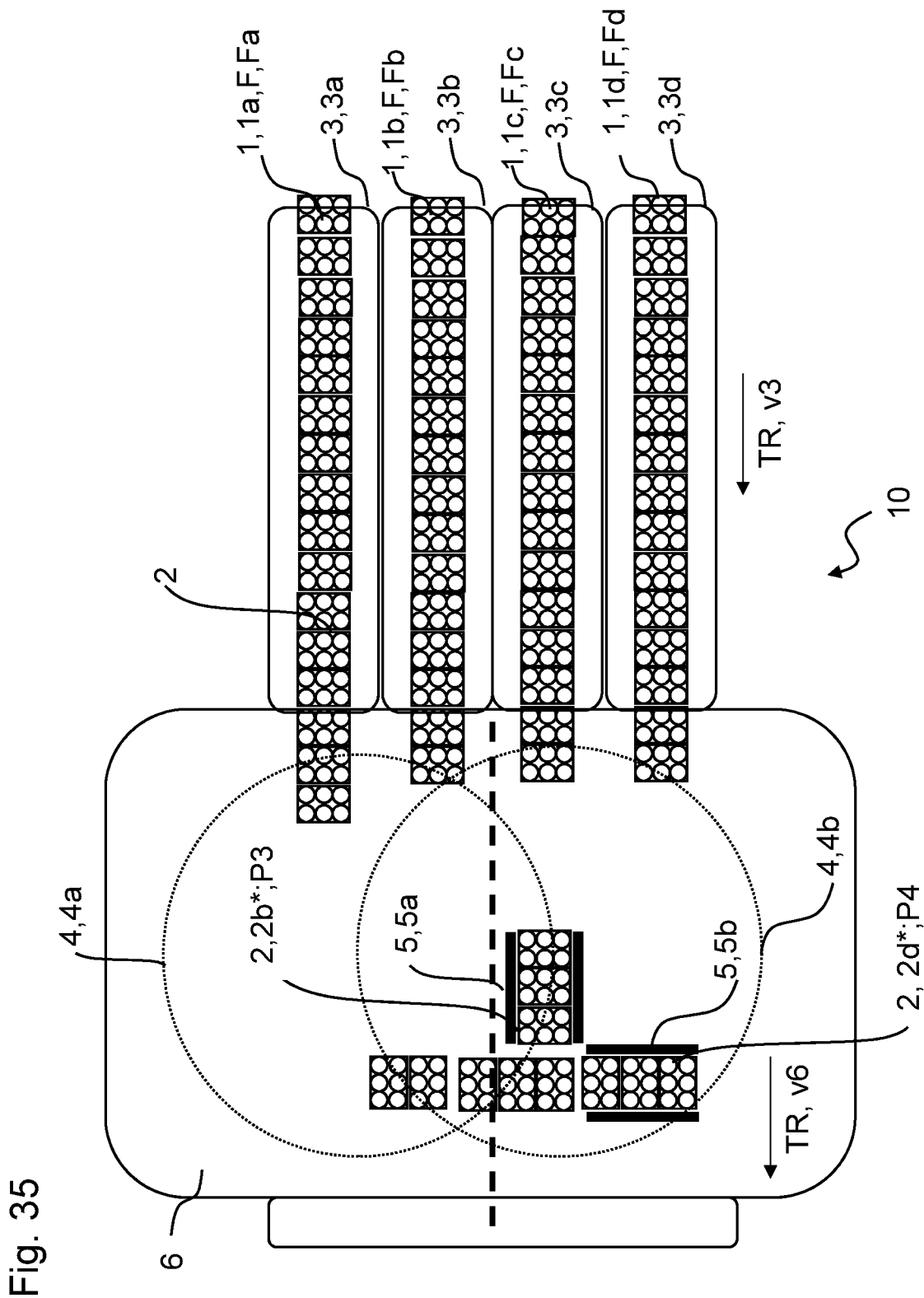

The manipulators 5a, 5b subsequently disengage from the groups of piece goods 2a*, 2c* that have been conveyed into their target positions P1, P2 in order to then pick off further piece goods 2 from the arriving formations F, as is illustrated in the FIGS. 34 and 35. In particular, the manipulator 5a now seizes three piece goods 2b, 2b* from the arriving formation Fb and the manipulator 5b seizes three piece goods 2d, 2d* from the arriving formation Fd. The manipulators 5a, 5b are each lowered, for example, from above to the piece goods 2 to be seized, they grip piece goods 2, and transfer the groups of in each instance three piece goods 2b* and 2d* into their particular target positions P3, P4. In the shown variant, the group of three piece goods 2b* is disposed or positioned in transport direction TR its formation Fb of and laterally offset therefrom. The group of three piece goods 2c* is disposed or positioned in transport direction TR of and laterally offset from its formation Fc; the group of three piece goods 2c* is moreover rotated by 90° by the manipulator 5b.

Figure 36:
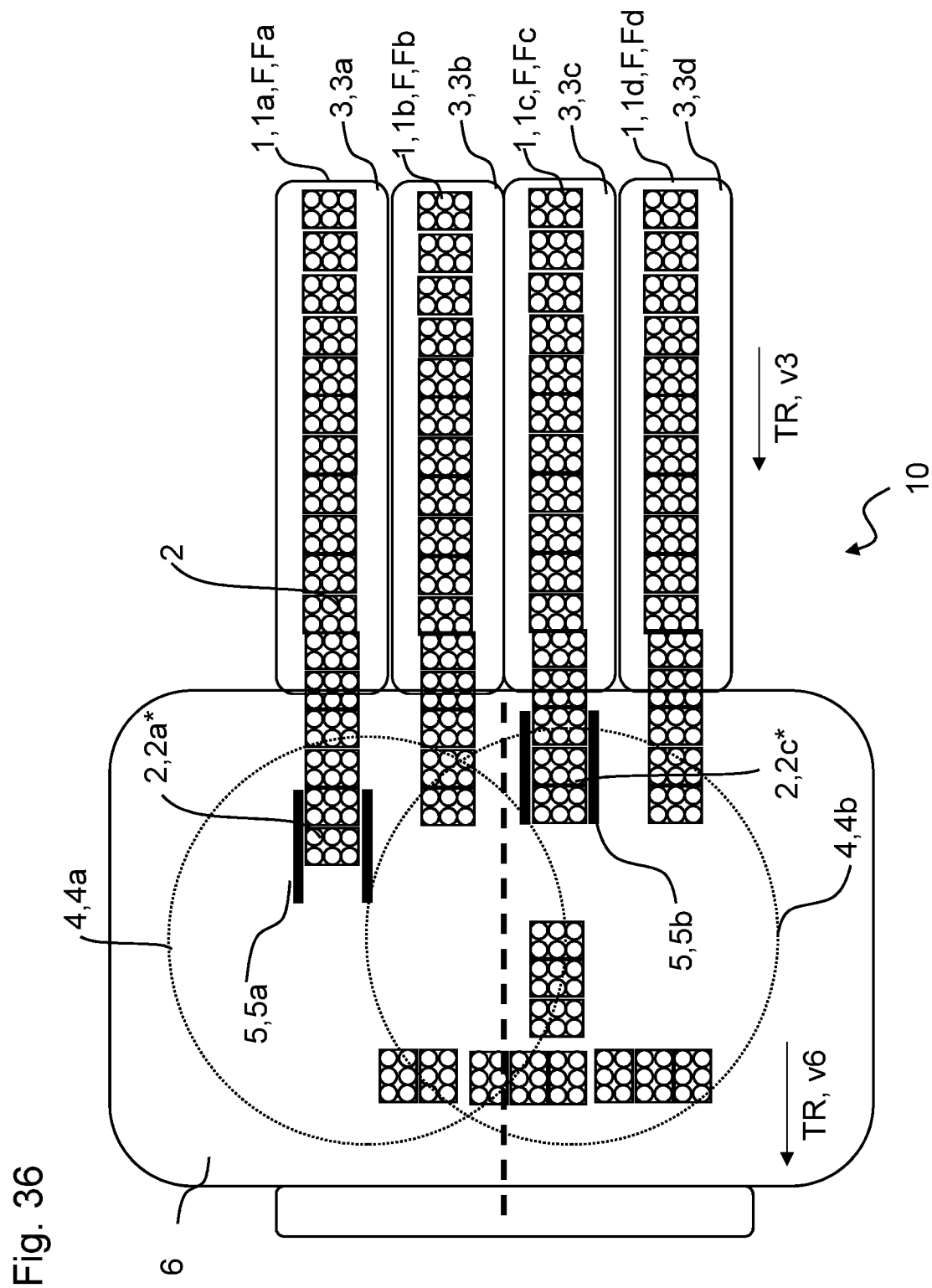
Figure 37:
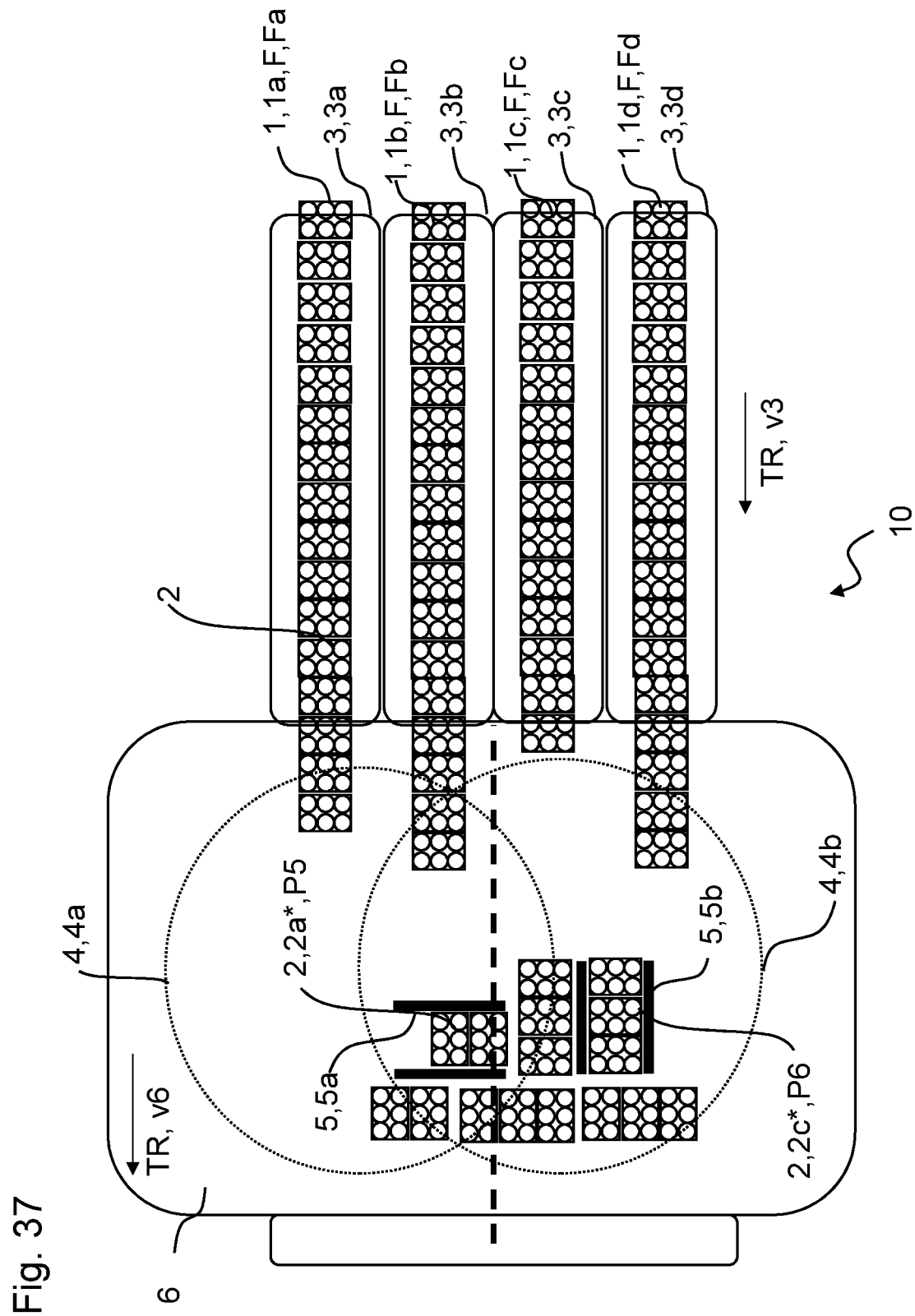

The manipulators 5a, 5b subsequently disengage from the groups of piece goods 2b*, 2d* that have been conveyed into their target positions P3, P4 in order to then pick off further piece goods 2 from the arriving formations F, as is illustrated in the FIGS. 36, 37. In particular, the manipulator 5a now seizes three piece goods 2a, 2a* from the arriving formation Fa and the manipulator 5b seizes three piece goods 2c, 2c* from the arriving formation Fc. The manipulators 5a and 5b transfer the in each instance seized piece goods 2a, 2a* or 2c, 2c* into the particular target positions P5 or P6. In this context, the group of three piece goods 2c* is disposed or positioned in transport direction TR of and laterally offset from its corresponding formation Fc. The group of two piece goods 2a* is disposed or positioned in transport direction TR of and laterally offset from its formation Fa. In addition to or in overlapping influence of the lateral offset, the group of two piece goods 2a* is rotated by the manipulator 5a by 90°.

Figure 38:
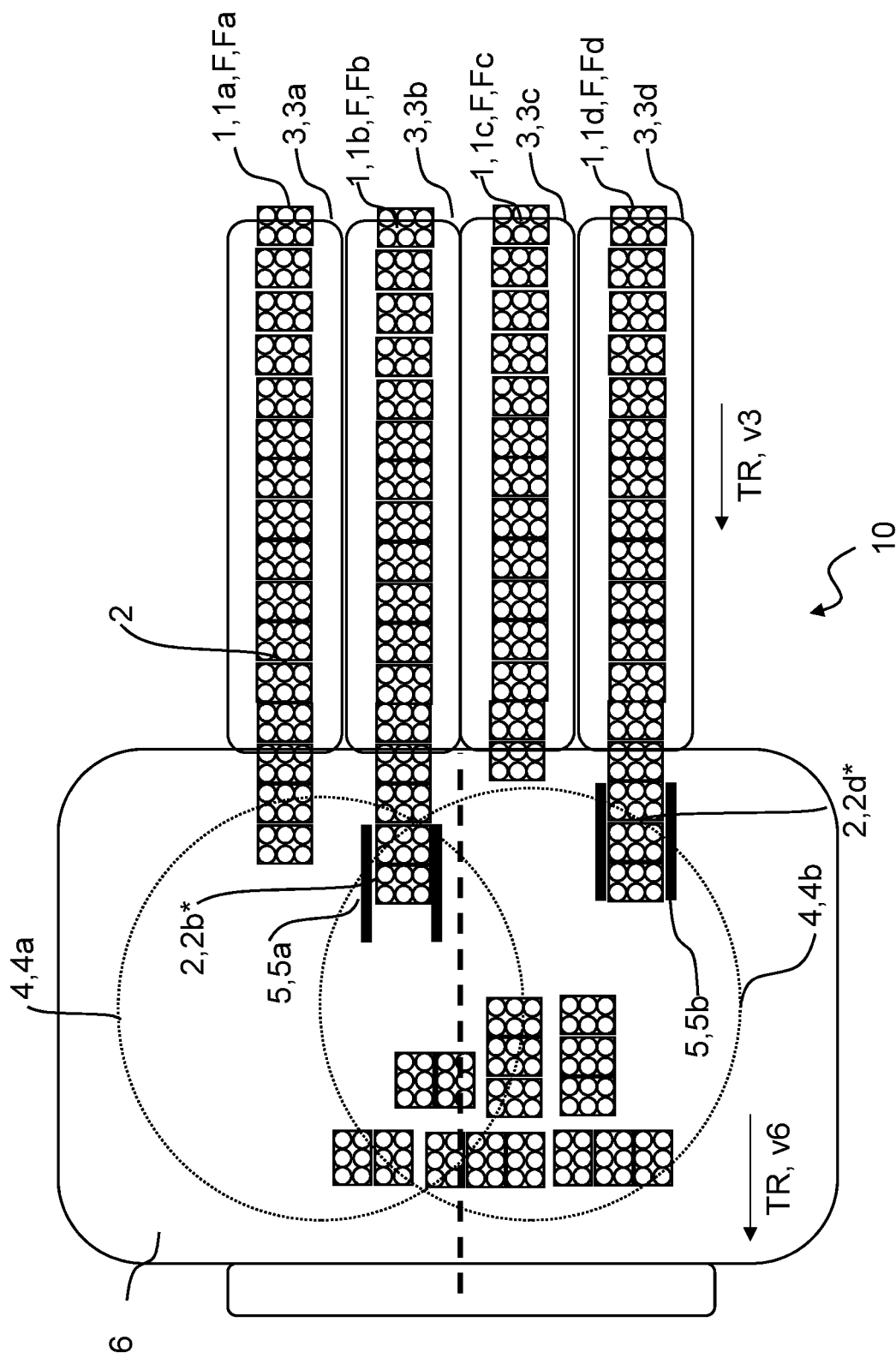
Figure 39:
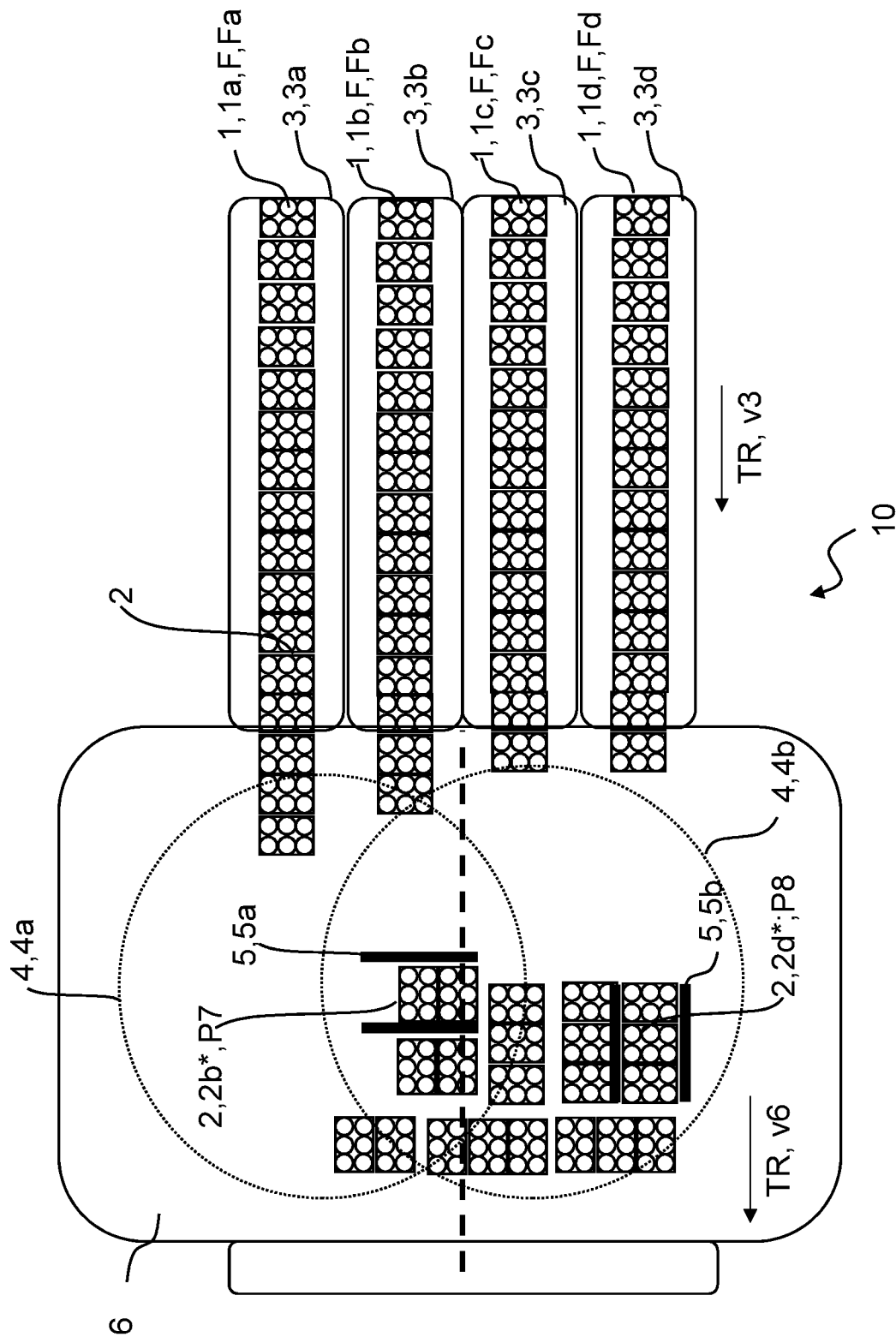

Subsequently thereto and as illustrated in the FIGS. 38, 39, the manipulator 5a again seizes two piece goods 2b* from the arriving formation Fb and the manipulator 5b seizes three piece goods 2d* from the arriving formation Fd and transfers them into the target positions P7, P8. In this context, the group of three piece goods 2d* is disposed in transport direction TR of its formation Fd and laterally offset therefrom. The group of two piece goods 2b* is disposed or positioned in transport direction TR of its formation Fb and laterally offset therefrom. In addition, the group of two piece goods 2b* is rotated by the manipulator 5a by 90°.

Figure 40:
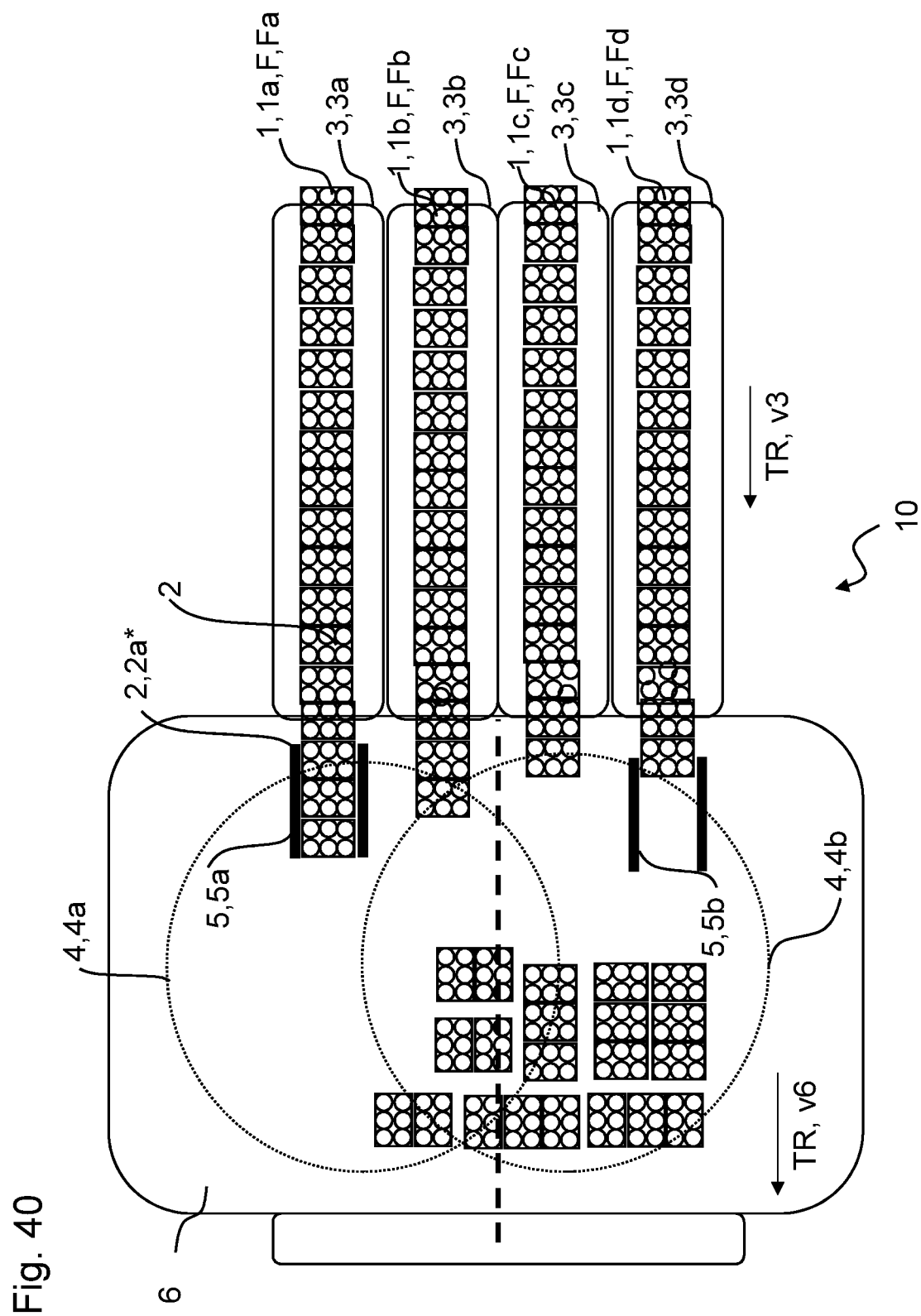
Figure 41:
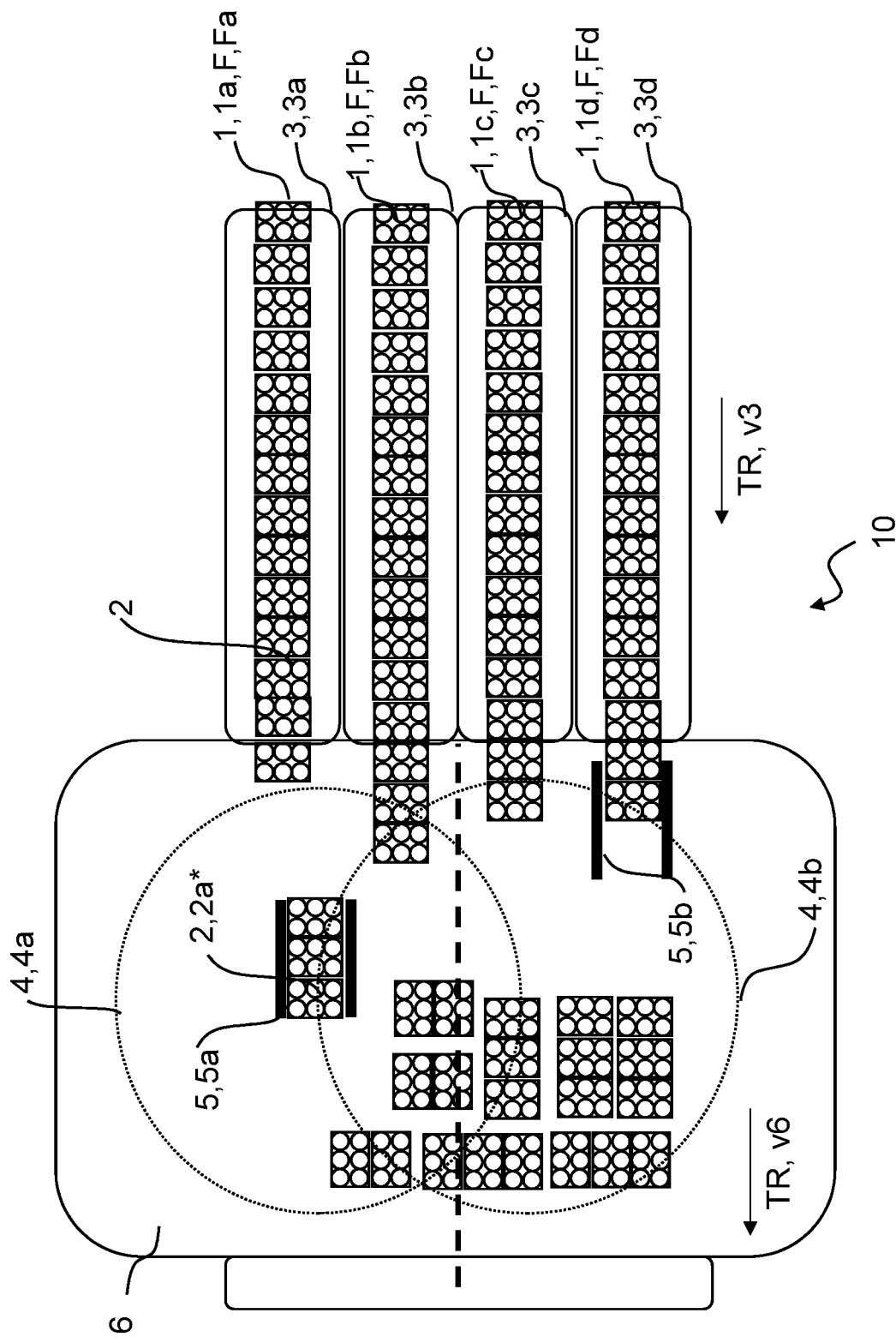
Figure 42:
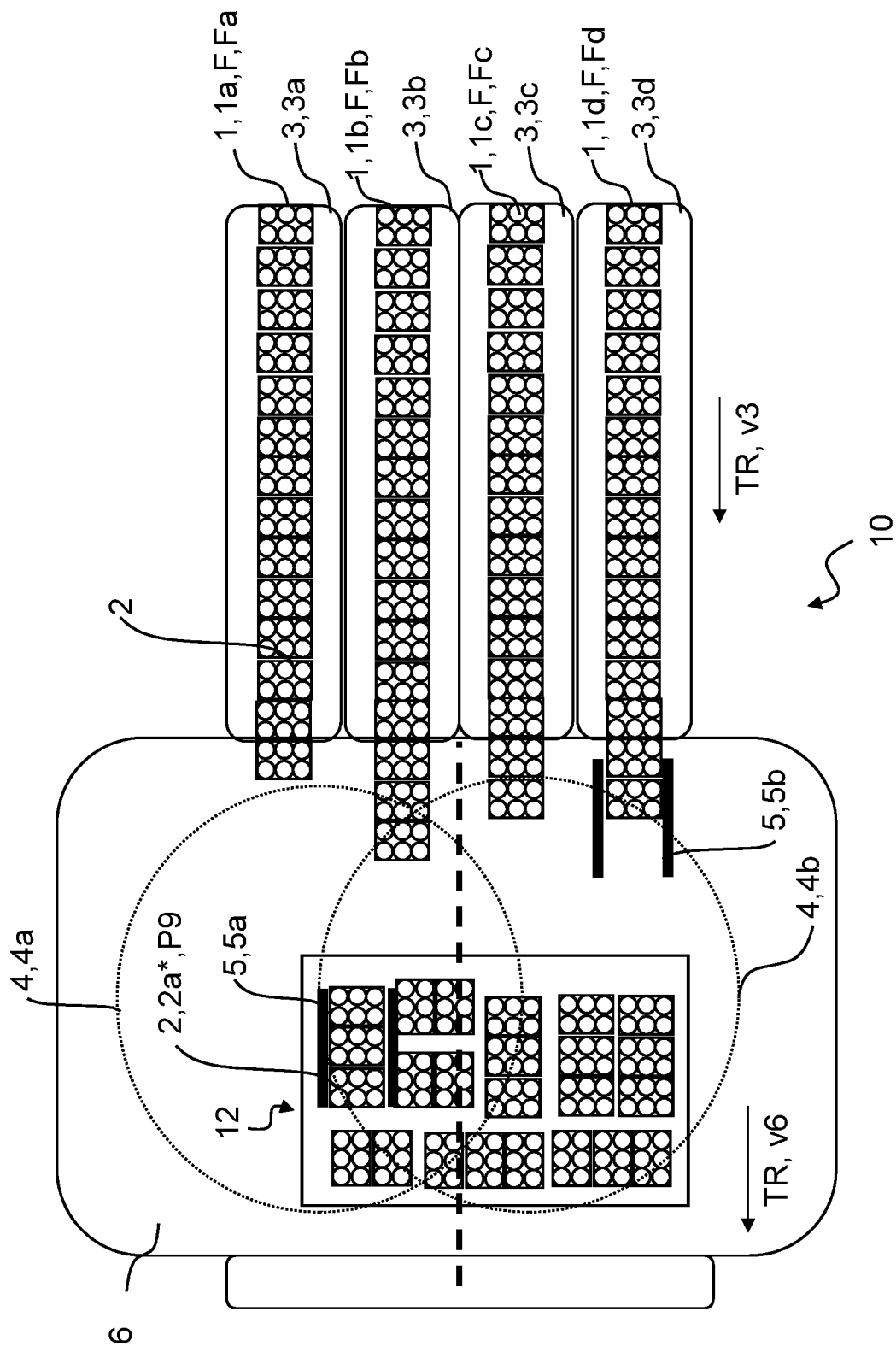

In a further manipulation step illustrated in FIGS. 40 to 42, the three piece goods 2a* are picked off from the arriving formation Fa and transferred into the target position P9. The piece good groups disposed in their target positions P1 to P9 now form a layer 12, which can be transferred, for example, by a downstream disposed palletizing station onto a pallet (not illustrated). Meanwhile, the manipulator 5b is already being positioned in the range of an arriving formation Fd in order to be able to directly start forming a further layer 12.

From the FIGS. 30 to 42, it is clearly discernible that the piece goods 2*, once they have been seized by a manipulator 5a, 5b, are transferred, pushed, and/or rotated into their particular target position P1 to P9 and/or target alignment in each instance in one single, in particular interruption-free manipulation step (as was already described in the context of the previous figures). The target position is, in particular, a relative position in relation to the particular initial formation F. In this context, the description of the previous figures is again referred to.

An increased throughput and thus a faster formation of layers is possible due to the parallel arrangement of a plurality of infeeds for rows 1 of piece goods 2 and due to the use of a plurality of manipulators 5—where one manipulator 5 can pick off at least piece goods 2 of a row 1, it being preferably provided that one manipulator 5 can pick off piece goods 2 from at least two adjacent rows 1. Entire interlocking layers of piece goods 2, 2* can be formed particularly quick and easy according to the specified arrangement by way of the parallel arrangement of the previously described grouping systems and/or handling systems with overlapping operating ranges. The parallel arrangement leads to a compact design with a relatively low space requirement.

Illustrated in the FIGS. 30 to 42 on the basis of schematic drawings was the temporal procedure of a fifth embodiment variant of a method according to the invention for handling piece goods 2 moved one after another in a plurality of parallel rows 1a, 1b, 1c, 1d by two parallel, movable, shiftable, and/or rotatable manipulators 5 of a corresponding handling apparatus 10. As mentioned, the schematically indicated piece goods 2 or 2* can be bundles of six beverage containers each that are held together by a shrink wrap, for example.

FIG. 83, in contrast, shows an alternative arrangement for carrying out a further embodiment variant of the method according to the invention by a correspondingly equipped handling apparatus 10. In this variant of the apparatus 10 or of the method according to the invention, it is also provided that two movable, shiftable, and/or rotatable manipulators 5 disposed parallelly adjacent to each other and a total of two parallel-running transport devices 3 or 3a and 3b with parallel transport directions TR are present, by way of which in each instance immediately consecutive piece goods 2, 2a, 2b of a respective row 1, 1a, 1b are transportable nearly without spaces as closed formations F into the two seizing ranges 4, 4a or 4b of the two manipulators 5, 5a and 5b such that the two seizing ranges 4a and 4b of the two manipulators 5a and 5b in each instance reach one row 1a or 1b with a closed formation Fa or Fb of transported piece goods 2a or 2b.

The handling apparatus 10 illustrated in the exemplary embodiment of FIG. 83 comprises two parallelly arranged transport devices 3, 3a, and 3b for the parallel transport, by way of which immediately consecutive piece goods 2, 2a or 2b in two parallel rows 1, 1a or 1b are transported interruption-free and/or at continuous transport speed v3 into the particular seizing range 4, 4a or 4b of the two manipulators 5, 5a or 5b of the handling apparatus 10. The seizing ranges 4a, 4b of the two manipulators 5a, 5b are, for example, at least in some areas perpendicular to the transport directions TR of the two adjacent transport devices 3a and 3b.

In this embodiment variant it is again provided that the two seizing ranges 4a and 4b partly overlap in an overlap range Ü. The overlap range Ü is indicated by the reference character Ü in FIG. 83. In the illustrated exemplary embodiment, it is provided that the first transport device 3a has the first seizing range 4a of the first manipulator 5a of the handling apparatus 10 assigned to it, and that the thereto parallel second transport device 3b has the second seizing range 4b of the second manipulator 5b of the handling apparatus 10 assigned to it. In this context it is important to coordinate the movement pattern of the manipulators 5a, 5b with each other such that no collision of the manipulators 5a, 5b occurs when they seize and position the piece goods 2, 2a, 2b. This collision prevention is achieved, in particular, by the exemplarily illustrated control device 15, which is in contact with both manipulators 5a, 5b. The control device 15 holds information on a group to be formed from a multitude of piece goods 2 for a palletizable layer 12 (cf. FIG. 42, for example). The particular target positions and/or target alignments and the groups of piece goods 2, 2a, 2b seized in each instance by the manipulators 5a, 5b form a part of the information and assign a specific position and/or relative orientation in the particular group to the particular at least one piece good 2, 2a, 2b. The manipulators 5a, 5b are correspondingly controlled to each seize and reposition a specified number of piece goods 2, 2a or 2b.

The seizing ranges 4a and 4b of the two manipulators 5a and 5b can at least temporarily temporally overlap, which is indicated by the overlap range Ü. As suggested by the seizing ranges 4a and 4b according to FIG. 83 that are indicated by an oval, each of the two manipulators 5a and 5b can optionally remove piece goods 2, 2a, 2b from the row 2, 1a or 1b assigned to the particular manipulator; each of the two manipulators 5a and 5b can however also optionally remove piece goods 2, 2b or 2a from the in each instance other row 1, 1b or 1a if this is expedient for reasons of saving of time and/or for reasons of collision prevention. The two manipulators 5a and 5b thus at least temporarily and/or as required share the overlap range Ü, which is to be considered their common range, and can there optionally remove piece goods 2, 2a, 2b from one of the two rows 1, 1a, 1b, which is specified by the control device 15 according to suitable control criteria.

The remaining movement patterns of the embodiment variant shown in FIG. 83 can resemble or correspond to the layer-forming method already shown on the basis of the FIGS. 30 to 42 such that a repeated presentation of the production of a palletizable layer 12 (cf. FIG. 42 in this context) can be dispensed with here.

Generally, the arrangement shown in FIG. 83 can also work with only one row 1 and a single transport device 3, with two manipulators 5a and 5b being possibly used here, too, the seizing ranges 4a and 4b of which can preferably overlap even more than exemplarily indicated in FIG. 83. Preferably, the seizing ranges 4a and 4b can also completely overlap in this embodiment. With appropriately high supply speeds v3 of the transport device 3, such an apparatus 10 can ensure a correspondingly faster formation of layers than would be possible when using only one single manipulator 5.

In all of the apparatus variants and method variants (FIGS. 30 to 42 and 83), at least one of the plurality of manipulators 5, 5a, 5b is preferably designed as delta kinematic robot or in each instance as part of such. Typically, however, both manipulators 5a and 5b are formed by delta kinematic robots, in each instance of the same type. It is furthermore preferable that at least one section of the particular manipulator 5, 5a, 5b or of the particular delta kinematic robot, which section is suitable or provided for seizing the in each instance at least one piece good 2, 2a, 2b, 2c, 2d, is rotatable about an approximately vertical axis, in particular, by a rotation angle of at least 180°, whereby an even faster positioning of the piece goods 2, 2a, 2b, 2c, 2d or of groups of a plurality of piece goods 2, 2a, 2b, 2c, 2d can be enabled. Optionally, a rotatability by 360° or more can be expedient, whereby, in particular, a so-called "further rotation" of the manipulator 5, 5a, 5b after depositing the particular piece goods 2, 2a, 2b, 2c, 2d in their target positions P can be made possible. Hereby, a return rotation can be dispensed with, thus again saving time during positioning.

FIGS. 44A and 44B show the asymmetric loading of a manipulator 5, which can seize up to three piece goods 2* between the clamping jaws 22. If the manipulator 5 is loaded with only one or two piece goods 2, the arrangement of the piece goods 2* is carried out eccentrically in relation to the clamping jaws 22, that is to say, the first vertical symmetry plane S2* is spaced apart from the second vertical symmetry plane S5 of the manipulator 5. If the manipulator 5 is, in contrast, completely loaded with three piece goods 2*, then the first vertical symmetry plane S2* and the second vertical symmetry plane S5 of the manipulator 5 coincide.

If "vertical symmetry planes" is referred to in the present context, relating mainly to the positions of the piece goods 2, 2* or to their relative positions to the manipulator 5 or to the manipulator clamping elements and/or gripping elements these vertical symmetry planes are intended to be understood, according to the definition, as oriented perpendicular or approximately perpendicular to the horizontal conveying plane of a horizontal conveying device 6 (cf. FIG. 43). These symmetry planes, that is to say, the first symmetry plane, the second, and, if applicable, further symmetry planes, are expediently also oriented perpendicular to the horizontally extending transport direction TR and/or about perpendicular to a longitudinal extension direction of the closed formation F. If the reader imagines this transport direction TR as a horizontal vector arrow extending parallel to the horizontal support surface of the horizontal conveying device 6 as well as parallel to the transport device 3 that normally likewise extends horizontal or in sections horizontal, then this vector arrow pierces the perpendicular symmetry planes likewise essentially in perpendicular. As mentioned, these at least two symmetry planes—one is associated with the piece goods 2, the other with the manipulator 5—are located at a certain distance from one another if the manipulator 5 is loaded asymmetrically or one-sided. If the symmetry planes coincide or approximately coincide, this represents the special case of the completely loaded and/or symmetrically or centrally loaded manipulator 5, as is illustrated in FIG. 44C, for example.

The FIGS. 44D, 44E, and 44F illustrate the same connection once more with other denominations and in the context of the following equations and inequations. Let L22 thus be the total length of the clamping jaws 22 of the manipulator 5. Let L2 be the length of a piece good 2 or 2* that is currently located between the clamping jaws 22. Let LR accordingly be the particular residual length or vacant length between the clamping jaws 22 of the manipulator 5 that is not occupied by piece goods 2 or 2*. The FIGS. 44D, 44E, and 44F together illustrate that with a clamping jaw length L22 corresponding to the threefold length of a piece good length L2, the general relation applies:

$$LR=(3-x)\cdot L2,$$

with x being the number of the piece goods 2* clamped in each instance between the clamping jaws 22, that is, currently located in the manipulator 5. Accordingly, with only one piece good 2, 2* located in the manipulator 5:

$$x=1,$$

this corresponding to the presentation both of FIG. 44A and FIG. 44D, the following special case applies:

$$LR=(3-x)\cdot L2=2\cdot L2.$$

In a corresponding manner, with two piece goods 2, 2* located asymmetrically in the manipulator 5:

$$x=2,$$

this corresponding to the presentation both of FIG. 44B and FIG. 44E, the following special case applies:

$$LR=(3-x)\cdot L2=1\cdot L2=L2.$$

In the special case shown in FIG. 44F of the symmetric loading of the manipulator 5 with a total of three piece goods 2*, (cf. FIG. 44C with the coinciding symmetry planes S2* and S5) the following consequently applies:

$$x=3,$$

whereof a value of zero is calculated for the residual length LR:

$$LR=(3-x)\cdot L2=0\cdot L2=0.$$

The deliberations made in connection with the FIGS. 44A to 44F are generally based on an asymmetric loading of the manipulator 5 or, if applicable, on an asymmetric gripping, in which case the piece goods 2* located between the clamping jaws 22 are disposed at one edge of the clamping jaws 22 such that the non-occupied residual length LR only occurs on one side, not, however, on both sides of the piece goods 2* located between the clamping jaws 22. Therefore, it can be moreover determined that an asymmetric loading of the manipulator 5 or an asymmetric gripping exists if both of the following conditions apply:

$$L22>x\cdot L2,$$

and $$LR\geq(L22-x\cdot L2)\cdot \tfrac{1}{2},$$

where x can generally assume the values zero, one, two, or three, whereas x, in order to fulfill the above inequations with asymmetric loading or with asymmetric gripping, in the shown exemplary embodiment, may only assume the values one (x=1; cf. FIG. 44D) or two (x=2; cf. FIG. 44E), since otherwise, the manipulator 5 would be vacant (with x=0, not shown) or the manipulator 5 would be fully loaded and symmetrically loaded (with x=3; cf. FIG. 44F).

For the sake of completeness, it should be noted here that an instance of symmetric gripping with a non-fully-occupied manipulator 5 is conceivable such that between the clamping jaws 22, two piece goods 2* could be disposed centrally, for example, such that the particular symmetry planes S2* of the piece goods 2* and S5 of the manipulator 5 could also coincide. This instance is not representable in the above formulae, even though the above inequation (L22>x·L2) could apply. In such a gripping situation, however, the entire residual length LR would be distributed evenly to two edge sections between the clamping jaws 22 such that the lower inequation [LR≥(L22−x·L2)·½] would not be fulfilled.

FIGS. 43 and 45 to 47, for a start, generally describe an embodiment of a method for handling piece goods moved one after another in at least one row by a corresponding handling apparatus.

FIGS. 43 and 45 to 47 show a first method step for handling piece goods 2 moved one after another in at least one row 1, for example when forming a palletizable layer or a pre-group for a palletizable layer from piece goods 2, where, in the illustrated method step, a picking off from the formation F of two piece goods 2 disposed foremost in the closed formation F is carried out by a manipulator 5 that has a maximum reception capacity of three piece goods. The piece goods 2 of row 1 that are not seized by the manipulator 5 are further transported in the seizing range 4 of the manipulator 5 without interruption and at unchanged speed v6.

In the exemplary embodiment illustrated in FIGS. 43 and 45 to 47, two piece goods 2 of the formation F are asymmetrically seized by the manipulator 5, and are transferred into a target position P, in which process the seized group of two piece goods is additionally rotated by 90°. In particular in connection with the disclosure of the FIG. 44 it is clear to the expert that, according to the design of the manipulator 5 and the arrangement of the manipulator 5 at the arriving closed formation F, different numbers of piece goods 2, 2* can also be seized in each instance in temporally different method steps.

The receiving position of the manipulator 5 is shifted according to the number of piece goods 2* to be picked off/divided off. The product groups required on the layer to be formed are thus formed during the manipulation step uniting a grouping process and a positioning process in one single method step.

The possibility of seizing different numbers of piece goods 2, 2* in each instance in different method steps with the same manipulator 5 or gripper head, as applicable, makes it possible, in particular by an asymmetric receiving of piece goods 2, 2*, to divide off different groups of piece goods 2, 2* using one single manipulator 5 or gripper head, as applicable. This results in an increased variability of the apparatus 10; costs and storage space can moreover be saved, since it is then no longer necessary to provide appropriate manipulators 5 or gripper heads, as applicable, for each product. Since groups of piece goods can in each instance be picked off in the currently required number, it is potentially also possible to save method steps, whereby a higher throughput can be achieved.

FIGS. 43 and 45 to 47, furthermore, schematically describe a temporal procedure of a sixth embodiment of a method for handling piece goods moved one after another in at least one row by a corresponding handling apparatus.

FIG. 43 particularly shows the piece goods 2 arriving via the transport device 3 of the handling apparatus 10 as row 1 or in essentially unspaced formation F. In the illustrated exemplary embodiment, the piece goods 2 are bundles, in each instance of six beverage containers 8, which are held together, for example, by a shrink wrap 9.

The piece goods 2 are moved in transport direction TR at a preferably constant transport speed v3 toward a seizing range 4 of a movable, shiftable, and/or rotatable manipulator 5 of the handling apparatus 10, and they are, in particular, delivered unspaced from the transport device 3 to the horizontal conveying device 6, and they continue to be guided thereon at a constant speed v6, which, in particular, corresponds to the transport speed v3 of the transport device 3. In the context of the present description of the FIGS. 43 and 45 to 50, the seizing range 4 is merely indicated by an arrow, which is intended to show that the seizing range 4 is associated with the movement range of the manipulator 5 in the area of the horizontal conveying device 2 and/or approximately corresponds to this area or to this movement range. Furthermore illustrated in FIG. 43 is the movement path TB of the piece goods 2 arriving in formation F on the horizontal conveying device 6, which is located in alignment with the movement direction of the piece goods 2 on the transport device 3.

The description of the previous figures can be referred to regarding the characteristics of manipulator 5, transport devices 3a, 3b, seizing range 4, horizontal conveying device 6, and grouping module 20.

In a plurality of temporally consecutive steps, the manipulator 5 grips at least one, preferably at least two or three of the successively disposed piece goods 2, 2* arriving in closed formation F; separates the piece goods 2, 2* from the single-row formation F of piece goods 2; and transfers the separated piece good 2* or the separated group of two or three piece goods 2* disposed unspaced in a row, into a target position P1, P2 (cf. FIGS. 47, 50) and/or target alignment. In this case it can be provided that the piece good 2* or the group of piece goods 2* is laterally shifted in relation to the arriving formation F of piece goods 2, and/or that the seized piece good 2* or the seized group of piece goods 2* is spaced apart in transport direction TR from the formation F of piece goods 2 by the manipulator 5. In the exemplary embodiment illustrated in the FIGS. 43 and 45 to 50, it is additionally provided that the piece good 2* or the group of piece goods 2* is rotated in relation to the piece goods 2 of the formation F.

The manipulator 5 preferably has a specific reception capacity for a plurality of piece goods 2, 2*. It is, however, provided that the manipulator 5 in each instance seizes a specific number of piece goods 2 of the formation F in each method step, in each instance coordinated to the palletizable layer or the pre-group of a palletizable layer to be formed. This is controlled and/or regulated, in particular, by way of a control device (not illustrated). The number of seized piece goods in this context varies between one and the maximum number according to the reception capacity of the manipulator 5.

According to the FIG. 44, the schematically illustrated manipulator 5 has, for example, two clamping elements and/or gripping elements located opposite each other, in particular, two clamping jaws 22 or gripper paddles or the like, for receiving piece goods 2, 2* in a clamping and/or form-locking manner. The length L of the clamping jaws 22 is selected such that a maximum number of piece goods 2* forming a cycle for the layer can be picked off. The manipulator 5 illustrated in the FIG. 44 can, in particular, seize one piece good 2* (cf. FIG. 44A), two piece goods 2* (cf. FIG. 44B), or three piece goods 2* (cf. FIG. 44C).

Even if the description of the illustrated exemplary embodiments refers to a maximum reception capacity of up to three piece goods 2, 2* per manipulator 5 or per gripper head the mentioned deliberations nevertheless apply analogously to manipulators 5 with smaller or greater maximum reception capacity.

The method described in the Figures and 45 to 50 in particular serves for preventing collisions between the manipulator 5 and the piece goods 2 arriving in formation F and/or between the piece goods 2* seized by the manipulator 5 and the piece goods 2 arriving in formation F. Furthermore, a minimization can be possibly achieved for a path distance to be covered by the manipulator 5 and the piece goods 2* seized by the manipulator 5 up to the target position P1, P2 (cf. FIGS. 47, 48, 50) and/or to the target alignment.

In this context it is provided that a first vertical symmetry plane S2* defined by the at least one piece good 2* seized by the at least two clamping jaws 22 of the at least one manipulator 5 is spaced apart from a second vertical symmetry plane S5 that is defined by the manipulator 5 or by the manipulator clamping jaws 22. In this way it can be defined, in particular, that the at least one piece good 2* seized by the manipulator 5 is not seized and positioned there centrally or symmetrically in relation to the vertical central axis and/or axis of rotation of the manipulator 5 or of the manipulator clamping jaws 22 while it is being shifted and/or brought toward the target position P1, P2 (cf. FIGS. 47, 48, 50), if applicable, under simultaneous rotation. This applies likewise to two or more seized piece goods 2*, which can also be clamped in the manipulator 5 eccentrically or asymmetrically.

In the method steps illustrated in the FIGS. 45 to 50, which schematically show a temporal procedure of a method for handling piece goods 2 moved one after another in at least one row 1 by a corresponding handling apparatus 10, only two piece goods 2* are in each instance picked off by the manipulator 5. According to the desired layer formation, this can correspondingly vary in the different method steps.

FIGS. 45 to 50, in particular, show two temporally consecutive method steps in forming a palletizable layer or a pre-group for a palletizable layer from piece goods 2, where, in each method step, a picking off from the formation F of in each instance two piece goods 2 disposed foremost in the closed formation F is carried out by the manipulator 5. In particular, the manipulator 5 in each method step seizes in each instance the first two piece goods 2 of the formation F (cf. FIGS. 45, 48).

Figure 47:
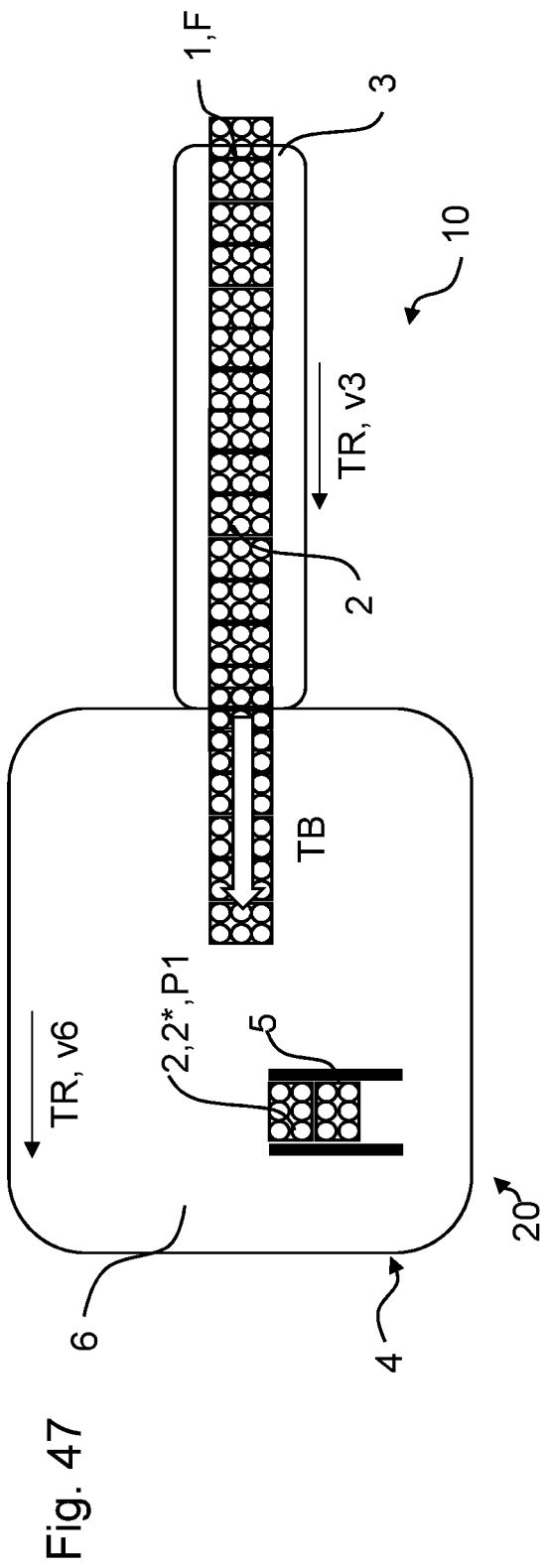

In a first method step illustrated in the FIGS. 45 to 47, two piece goods 2, 2* are conveyed onto a target position P1 to the left of an alignment of the transport device 3 and are rotated in the process. In a second method step illustrated in the FIGS. 48 to 50, two piece goods 2, 2* are conveyed onto a target position P2 to the right of an alignment of the transport device 3 and are rotated in the process.

The decision whether the rotation of the piece goods seized by the manipulator 5 is carried out as a left hand rotation or as a right hand rotation when positioning the at least one piece good 2* is made in terms of a collision prevention. The illustrated deliberations in this context apply both to a fully loaded manipulator 5 and also to an only partially, in particular, asymmetrically loaded manipulator 5.

The direction of rotation of the piece goods 2, 2* seized by the manipulator 5 depends on the target position P1, P2 to be assumed. If the piece goods 2, 2* are to be disposed to the left of the alignment of the transport device 3, as is illustrated in the FIGS. 45 to 47, then the piece goods 2, 2* are seized in a clamping and/or form-locking manner from the closed formation F by the manipulator 5, are in each instance spatially separated by a left hand rotation or by lateral counterclockwise rotation out of the straight movement path TB of the closed formation F, and are brought into a particular specified relative target position P1 and/or target alignment in relation to subsequent piece goods 2 of the formation F.

Figure 48:
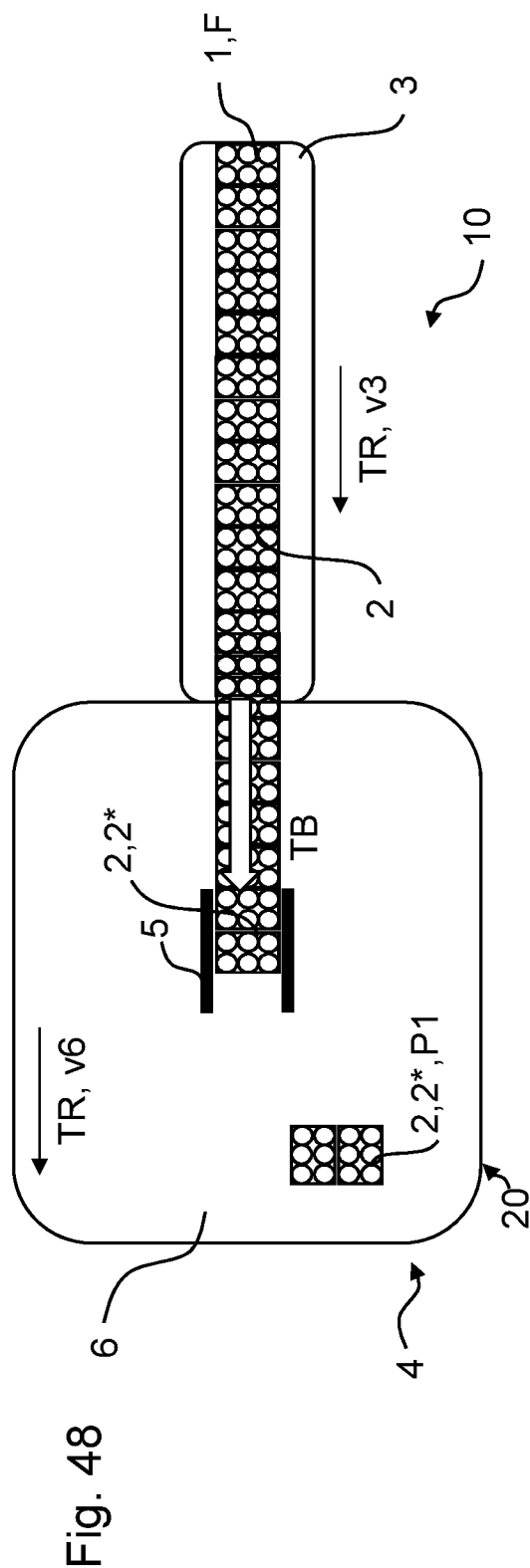

If the piece goods 2, 2* are, in contrast, to be disposed to the right of the alignment of the transport device 3 in a target position P2, as is illustrated in the FIGS. 48 to 50, then the piece goods 2, 2* are seized in a clamping and/or form-locking manner from the closed formation F by the manipulator 5, are in each instance spatially separated by a right hand rotation or by lateral clockwise rotation out of the straight movement path TB of the closed formation F, and are brought into a particular specified relative target position P2 and/or target alignment in relation to subsequent piece goods 2 of the formation F.

After the piece goods 2* have reached their target position P1, P2 and the manipulator 5 has in each instance disengaged from the piece goods 2*, the piece goods 2* are further moved on the horizontal conveying device 6 in transport direction TR and at the speed v6. In particular, the particular target position P1, P2 is likewise a position relative to the subsequent piece goods 2, the positions of which were not changed by the manipulator 5. The description of the previous figures can be referred to for further details of the method procedures, in particular relating to the manipulation of the seized piece goods 2* by the manipulator 5.

In the illustrated exemplary embodiment, in each instance two piece goods 2 of the formation F are seized by the manipulator 5 in each method step in temporally consecutive steps and are transferred into a target position P1, P2, with the seized groups of in each instance two piece goods being additionally rotated by 90° in each instance. In particular in connection with the disclosure of the FIG. 44 it is clear to the expert that, according to the design of the manipulator 5 and the arrangement of the manipulator 5 at the arriving closed formation F, different numbers of piece goods 2, 2* can also be seized in each instance in the different method steps.

An advantage of the handling apparatus 10 described here and of the method illustrated in the FIGS. 43 and 45 to 50, in particular, lies therein that the direction of rotation applied by the manipulator 5 to align the seized piece goods 2* according to their target alignment at the target position P1, P2 is in each instance selected based on the target position P1, P2 relative to the transport device 3. If the seized piece goods 2* are moved on the right side of the transport device 3, the manipulator 5, together with the seized piece goods 2*, performs a right hand rotation. If the seized piece goods 2* are, in contrast, moved on the left side of the transport device 3, the manipulator 5, together with the seized piece goods 2*, performs a left hand rotation. Thereby, a collision with piece goods 2* that are already disposed in a target position P1, P2, P3 and/or a collision with the subsequent piece goods 2 of the formation F can be prevented in a particular advantageous manner. Moreover, a reduction of the path distances that the manipulator 5 has to cover together with the seized piece goods 2* can potentially be achieved.

Prior to initiating the rotation of the manipulator 5, the manipulator 5 can be at least briefly accelerated together with the seized piece goods 2* in relation to the piece goods 2 of the formation F, for example, in order to separate the piece goods 2* seized by the manipulator 5 at least slightly from the subsequent piece goods 2 of the formation F. This acceleration of the seized piece goods 2* in relation to the formation F—as illustrated in FIG. 4—can be advantageous for preventing the collision between the seized piece goods 2* and the formation F; the acceleration is, however, usually not imperative.

FIGS. 51 to 59 schematically show a temporal procedure of three consecutive method steps of a seventh embodiment of a method for handling piece goods 2 moved one after another in at least one row 1 by a corresponding handling apparatus 10.

The method described in the FIGS. 51 to 59 serves, in particular, for reducing the distances, that is, for minimizing a path distance to be covered by the manipulator 5 and the piece goods 2* seized by the manipulator 5 up to the target position P1, P2, P3 (cf. FIGS. 54, 57, 59) and/or to the target alignment. The method described in the FIGS. 51 to 59 is particularly relevant when the manipulator has been loaded asymmetrically, according to FIG. 44A or 44B, such that the arrangement of the piece goods 2* is carried out eccentrically to the clamping jaws 22, that is to say that the first vertical symmetry plane S2* is spaced apart from the second vertical symmetry plane S5 of the manipulator 5.

FIGS. 51 to 59 show three temporally consecutive method steps in forming a palletizable layer or a pre-group for a palletizable layer from piece goods 2, where, in each method step, a picking off from the formation F of two piece goods 2 disposed foremost in the closed formation F is carried out by the manipulator 5. In particular, the manipulator 5 in each method step seizes in each instance the first two piece goods 2 of the formation F (cf. FIGS. 52, 55, 58). The piece goods 2 seized by the manipulator 5 are referred to below with the reference character 2* for the purpose of distinguishing them from the piece goods 2 disposed in the formation F. In a first method step illustrated in the FIGS. 52 to 54, two piece goods 2, 2* are conveyed onto a target position P1 to the left of an alignment of the transport device 3 and are rotated in the process by 90° by a right hand rotation or by lateral clockwise rotation out of the straight movement path TB. In a second method step illustrated in the FIGS. 55 to 57, two piece goods 2, 2* are conveyed onto a target position P2 to the right of an alignment of the transport device 3 and are rotated in the process by 90° by a left hand rotation or by lateral counterclockwise rotation out of the straight movement path TB. In a third method step illustrated in the FIGS. 57 to 59, two piece goods 2, 2* are conveyed onto a target position P3 between the target positions P1 and P2 and in an alignment to the transport device 3, and are in the process rotated by 180°.

The advantages of a 180° rotation are also described below in the context of the FIGS. 62 to 64. The corresponding description of figures is hereby referred to.

Before the piece goods 2* seized by the manipulator 5 are rotated, an at least minor spacing or distancing of the seized piece goods 2* is carried out by an at least brief acceleration of the manipulator 5 with a movement component parallel to the straight movement path TB of the closed formation F and toward an in each instance specified relative target position P1, P2, P3 and/or target alignment. The piece goods 2* clamped to the manipulator 5 are thereby spatially separated from the closed formation F of arriving piece goods 2. The brief acceleration of the separated group of piece goods 2* serves, in particular, for preparing the subsequent rotary movement.

The decision whether the rotation of the piece goods seized by the manipulator 5 is carried out as a left hand rotation or as a right hand rotation when positioning the at least one piece good 2* is made in terms of a path minimization. In particular, the rotary movements and/or shifting movements performed by the manipulator 5 or the overlapped rotary movements and shifting movements for the at least one piece good 2* are carried out under the boundary condition of a minimized path distance to be covered by the piece good 2*. In terms of minimizing the distance to be covered, it is advantageous to move the at least one piece good 2* seized by the manipulator 5 by a right hand rotation in the instance of being brought to the left side of the straight movement path TB of the closed formation F under the boundary condition of a minimized total distance between the seizing position and the target position P1 (cf. FIGS. 52 to 54).

In terms of minimizing the distance to be covered, it is furthermore also advantageous to move the at least one piece good 2* seized by the manipulator 5 by a left hand rotation in the instance of being brought to right side of the straight movement path TB of the closed formation F under the boundary condition of a minimized total distance between the seizing position and the target position P2 (cf. FIGS. 54 to 57). The direction of rotation of the piece goods 2, 2* seized by the manipulator 5 depends, in particular, on the target position P1, P2, P3 and/or the target alignment to be assumed and the rotation is always carried out under the boundary condition of a minimized total distance.

The 90° rotation of a unit of two piece goods 2, 2* seized by the manipulator 5, as illustrated in each instance in the FIGS. 52 to 54 and 55 to 57, as applicable, is optimized, in particular, in terms of saving paths and time, in particular, according to FIGS. 44A and 44B, in the context of an asymmetric seizing of piece goods 2, 2* or of an asynchronous picking off of piece goods 2, 2*.

Because the picking off of piece goods 2, 2* from the closed and/or cycled formation F of the piece good rows 1 being conveyed to the seizing range 4 is carried out asynchronously, it is possible to define specific expedient restrictions regarding the movement patterns of the manipulator 5 immediately following the picking off and seizing of piece goods 2 from the formation F. If the gripper head of the manipulator 5 is loaded with piece goods 2, 2* in the described asymmetric manner or in so-called asynchronous loading, by which the distancing of the particular first or second symmetry planes is meant, as the case may be—these are the particular vertical symmetry planes that are oriented approximately perpendicular to the transport direction TR or to the longitudinal extension direction of the piece good formation—, not every rotation direction variant is expediently performable in the instance of a shift to the left or to the right, which shift can in each instance be overlapped by a rotation, if applicable, because this could possibly lead to an unnecessarily long shift path that the manipulator 5 would altogether have to perform.

In a third method step illustrated in the FIGS. 57 to 59, the piece goods 2, 2* are conveyed onto a target position P3 between the target positions P1 and P2 and in an alignment to the transport device 3, and they are in the process rotated by 180°. In this context again, the two piece goods 2, 2* of the formation F disposed foremost in transport direction are seized in a clamping and/or form-locking manner by the manipulator 5, are separated from the closed formation by brief acceleration, and are spatially separated by a rotation out of the straight movement path TB of the closed formation F, and are brought into a particular specified relative target position P3 and/or target alignment in relation to subsequent piece goods 2 of the formation F.

The 180° rotation is optimized, in particular, in terms of saving paths and time, in particular in the context of an asymmetric seizing of piece goods 2, 2* or of an asynchronous picking off of piece goods 2, 2*. In the example illustrated in the FIGS. 57 to 59, an asymmetric picking off of a unit of two piece goods 2, 2* is carried out by a manipulator 5, which can seize up to three piece goods 2, according to the illustrated exemplary embodiment (cf. also FIG. 44).

The 180° rotation performed by the manipulator 5 is particularly advantageous in terms of reducing paths. The 180° rotation is carried out about an axis of rotation formed perpendicular to the horizontal support surface of the horizontal conveying device 6. The seized unit of two piece goods 2, 2* is thereby conveyed into a target position P3, which is located spaced apart in transport direction in an alignment upstream from formation F. In order to precisely adjust the specified target position P3, this rotation of the manipulator 5 is additionally overlapped by a shift of the manipulator 5 in transport direction TR.

Due to the rotation of the manipulator 5, a smaller path distance in transport direction TR has to be covered by the manipulator 5. This is advantageous because the manipulator 5 does not subsequently have to cover this path distance in the opposite direction in order to pick off further piece goods 2 from one of the arriving formations F. A further advantage of the 180° rotation lies therein that the manipulator 5 is already available in a configuration where it can immediately seize further piece goods 2 without having to first carry out a return rotation into an initial position. That is to say that in the subsequent method step it is now possible to pick off further piece goods 2 with the gripper end of the manipulator 5 that was unloaded in the described method step of the 180° rotation. This aspect likewise leads to a noticeable saving of time and thus to an increased throughput in product processing.

In the instance of the manipulator 5 being loaded asymmetrically according to FIGS. 51 to 59, in each instance with a unit of two piece goods 2, 2* of the formation F, the manipulator 5 is preferably briefly accelerated in transport direction TR in order to separate and at least slightly space apart the asymmetrically loaded manipulator 5 from the piece goods 2 of the formation F that continue to arrive. This space is necessary for disposing the unit of two seized piece goods 2, 2* in a particular target position P1, P2, P3 that is located laterally to the straight movement path TB of the closed formation F or largely in alignment to the right side of the straight movement path TB of the closed formation F, with the disposing taking place in the context of a rotational movement, which is additionally overlapped by a movement component in transport direction TR, if applicable. The spacing of the piece goods 2, 2* from the formation F by a brief acceleration of the manipulator prior to the rotation by 90° or by 180°—being carried out for producing a target alignment of the unit of two piece goods 2, 2* of the formation F—is necessary, in particular, in order to prevent a collision of the piece goods 2, 2* seized by the manipulator 5 with the succeeding piece goods 2 of the formation F. In the instance of the asymmetrically seized unit of two piece goods 2, 2* being moved along to the right side of the straight movement path TB of the closed formation F, a left hand rotation is advantageous for minimizing the path distance to be covered by the manipulator. In contrast, in the instance of the asymmetrically seized unit of two piece goods 2, 2* being moved along to the left side of the straight movement path TB of the closed formation F, a right hand rotation is advantageous for minimizing the path distance to be covered by the manipulator. This leads to a noticeable saving of time and thus to an increased throughput in product processing.

The description of the previous figures can be referred to regarding the characteristics of manipulator 5, transport devices 3*a*, 3*b*, seizing range 4, horizontal conveying device 6, and grouping module 20.

Preferably, the seized piece goods 2\* are in this context transferred, pushed, and in the process correspondingly rotated in one single, in particular, interruption-free manipulation step into the particular target position P1, P2, P3 and/or target alignment, in particular into a position P1, P2, P3 such that the piece goods 2\*, which have been manipulated and brought into particular target positions P1, P2, P3 in a plurality of temporally consecutive method steps, form a palletizable layer or a pre-group for a palletizable layer.

In the exemplary embodiment illustrated in the FIGS. 51 to 59, in each instance two piece goods 2 of the formation F are seized by the manipulator 5 in each method step in temporally consecutive steps and are transferred into a target position P1, P2, P3 with the seized groups of in each instance two piece goods being additionally rotated in each instance by 90° or 180°. In particular in connection with the disclosure of the FIG. 44 it is clear to the expert that, according to the design of the manipulator 5 and the arrangement of the manipulator 5 at the arriving closed formation F, different numbers of piece goods 2, 2\* can also be seized in each instance in the different method steps.

A particularly advantageous variant of the method shown in the FIGS. 51 to 59 can lie therein that, in at least one step of a plurality of temporally consecutive manipulation steps, in each instance at least one transported piece good 2 can be seized and in each instance spatially separated from its straight movement path in original transport direction TR by a rotation about a vertical axis by a rotation angle of at least 90°, in particular, however, by approximately 180°, and can be brought into a particular specified relative target position P1, P2, or P3 and/or target alignment in relation to the subsequent piece goods 2. A further advantage of such a method variant can lie therein that the manipulator 5 or the at least two manipulator clamping elements and/or gripping elements 22 after such a rotation about a vertical axis by about 180° and after reaching a particular target position P1, P2, P3 and/or target alignment, as well as after releasing the at least one piece good 2 positioned there, can be returned, without return rotation and/or without further rotation of the at least two clamping elements and/or gripping elements 22, in order to seize at least one further piece good 2 to be positioned and/or to be realigned from the row 1 or from the closed formation and in order to move toward a further target position P1, P2, P3 and/or target alignment within the seizing range for this piece good 2 or for these piece goods 2 with or without rotation about a vertical axis. The manipulator 5 requires significantly less space for its return movements with the clamping jaws 22 not having to be simultaneously rotated than when they are rotated and additional care must be taken to prevent collisions with piece goods 2 due to the relatively expansive rotating clamping jaws; and in this way, the cycle times for the positioning procedures can be further reduced.

An advantage of the handling apparatus 10 described here and of the corresponding method lies, in particular, therein that the direction of rotation applied by the manipulator 5 to align the seized piece goods 2\* according to their target alignment at the target position P1, P2, P3 is in each instance selected based on the target position P1, P2, P3 relative to the transport device 3 in the context of a path optimization.

By the described variation possibilities, it is possible to achieve in a particular advantageous manner that the path distances covered by the manipulator 5 together with the seized piece goods 2\* are reduced. A collision with the subsequent piece goods 2 of formation F is prevented by the likewise described initial acceleration, at least briefly, of the seized piece goods 2, 2\* in transport direction TR.

Figure 60:
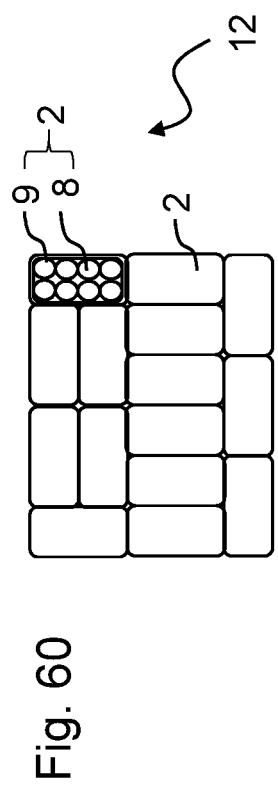
FIG. 60 schematically shows the assembly of piece goods as a layer.
Figure 61:
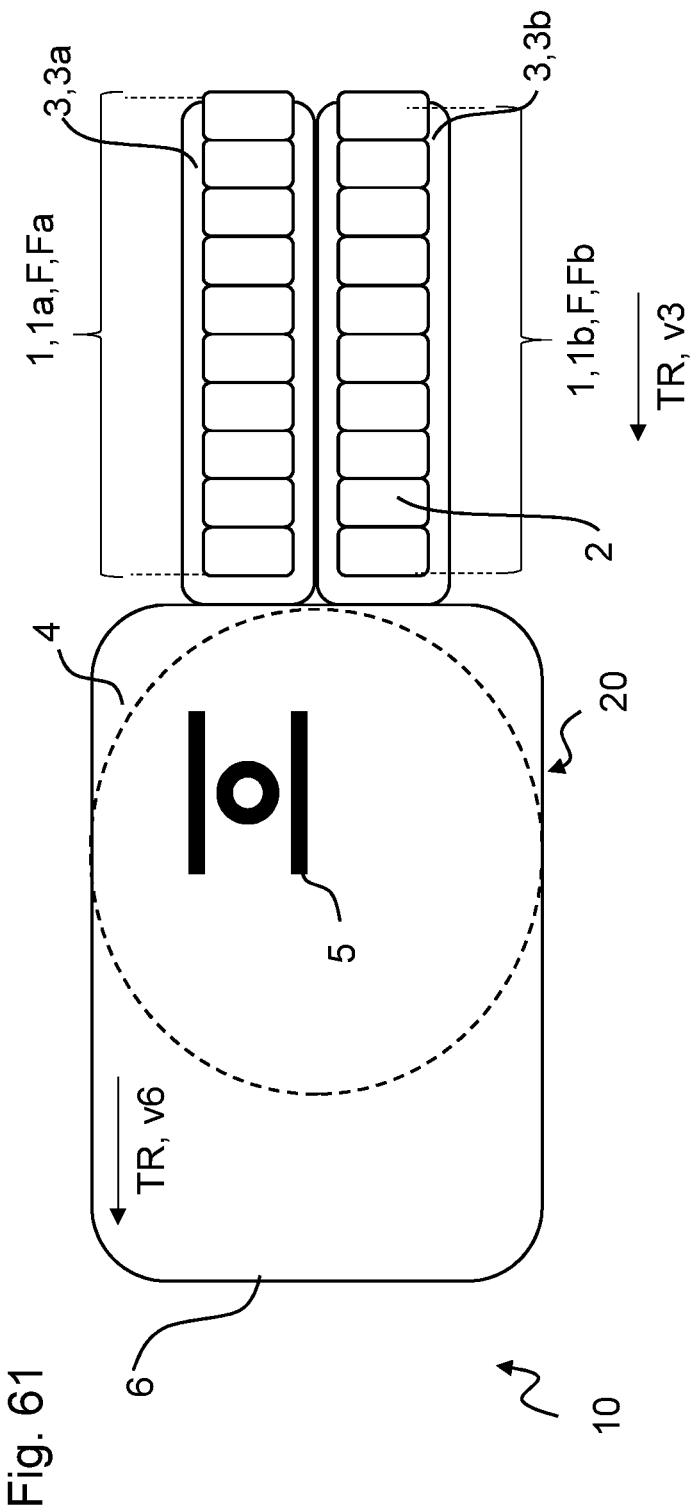

FIG. 60 schematically shows the assembly of piece goods 2 as layer 12, such as it is to be assembled, for example, for palletizing and further processing. In the illustrated exemplary embodiment, the piece goods 2 are formed by eight bottles 8 each, which are gathered together in bundles by a shrink film 9.

FIGS. 61 to 78 schematically show a temporal procedure of an eighth embodiment of a method for handling piece goods 2 moved one after another in two parallel rows 1, 1*a*, 1*b* by a corresponding handling apparatus 10 for preparing a layer 12 of piece goods 2 according to FIG. 60.

The handling apparatus 10 comprises two parallelly disposed first transport devices 3, 3*a*, 3*b*, by way of which immediately consecutive piece goods 2 in two parallel rows 1, 1*a*, 1*b* can be transported interruption-free and/or at continuous transport speed v3 into a seizing range 4 of at least one movable, shiftable, and/or rotatable manipulator 5 of the handling apparatus 10. In particular, it is provided that exactly one seizing range 4 of a manipulator 5 of the handling apparatus 10 is assigned to the two parallel first transport devices 3*a*, 3*b*.

The FIGS. 61 to 78, in particular, illustrate the transport, continued unspaced in transport direction TR, of the rows 1, 1*a*, 1*b* or formations F, Fa, Fb in the seizing range 4 of the handling apparatus 10. In particular, the piece goods 2 of the particular row 1*a*, 1*b* are further transported in the seizing range 4 without interruption and at unchanged transport speed. The description of the previous figures can also be referred to, in particular, regarding the characteristics of manipulator 5, transport devices 3*a*, 3*b*, seizing range 4, horizontal conveying device 6, and grouping module 20.

The manipulator 5 is designed for receiving piece goods 2, 2\* in a clamping and/or force-locking and/or form-locking manner within the seizing range 4. As illustrated in FIG. 62, the manipulator 5 first picks off a piece good 2 from the closed formation Fa arriving via the transport device 3*a*. The piece goods 2 seized by the manipulator 5 are referred to below with the reference character 2\* for the purpose of distinguishing them from the piece goods 2 disposed in the formation F. The manipulator 5 separates the seized piece good 2\* from the single-row formation Fa and transfers the separated piece good 2\* into a first target position P1 and/or target alignment, as illustrated in the FIGS. 63, 64. In this context, the seized piece good 2\* is, on the one hand, spaced apart in transport direction TR from the formation Fa of piece goods 2 by the manipulator 5; in addition, the seized piece good 2\* is rotated in relation to the piece goods 2 of the formation Fa. Preferably, the at least one piece good 2 arriving foremost is in this context seized from the closed formation Fa and brought into the specified relative target position P1 and/or target alignment in relation to the subsequent piece goods 2 of the formation Fa under simultaneous rotary movement by an angle of at least approximately 180°. The rotary movement is particularly carried out about a preferably approximately vertical axis located between the particular at least one piece good 2\* seized in a clamping and/or force-locking and/or form-locking manner and the target position P1.

The 180° rotation is optimized, in particular, in terms of saving paths and time, in particular, in the context of an asymmetric seizing of piece goods 2, 2\* or of an asynchronous picking off of piece goods 2, 2\*. In picking off a piece good 2, 2\* by a manipulator 5, as illustrated in the FIGS. 6 to 11, which manipulator 5 can seize up to three piece goods 2 according to the illustrated exemplary embodiment, at least one first vertical symmetry plane of the piece good 2, 2* seized by the manipulator 5 is spaced apart from a second vertical symmetry plane that is defined by the manipulator 5 or by the manipulator clamping elements and/or gripping elements; and this is in the present context also referred to as so-called asynchronous or asymmetric picking off.

If "vertical symmetry planes" is referred to in the present context, relating mainly to the positions of the piece goods 2, 2* or to their relative positions to the manipulator 5 or to the manipulator clamping elements and/or gripping elements these vertical symmetry planes are intended to be understood, according to the definition, as oriented perpendicular or approximately perpendicular to the horizontal conveying plane of a horizontal conveying device 6. These symmetry planes, that is to say, the first symmetry plane, the second, and, if applicable, further symmetry planes, are expediently also oriented perpendicular to the horizontally extending transport direction TR and/or about perpendicular to a longitudinal extension direction of the closed formation F. If the reader imagines this transport direction TR as a horizontal vector arrow extending parallel to the horizontal support surface of the horizontal conveying device 6 as well as parallel to the transport device 3 that normally likewise extends horizontal or in sections horizontal, then this vector arrow pierces the perpendicular symmetry planes likewise essentially in perpendicular. As mentioned, these at least two symmetry planes—one relates to the piece goods 2, the other to the manipulator 5—are located at a certain distance from one another if the manipulator 5 is loaded asymmetrically or one-sided. If the symmetry planes coincide or approximately coincide, this represents the special case of the completely loaded and/or symmetrically or centrally loaded manipulator 5.

Because the picking off of piece goods 2, 2* from the closed and/or cycled formation F of the piece good rows 1 being conveyed to the seizing range 4 is frequently carried out asynchronously, it is possible to define specific expedient restrictions regarding the movement patterns of the manipulator 5 immediately following the picking off and seizing of piece goods 2 from the formation F. If the gripper head of the manipulator 5 is loaded with piece goods 2, 2* in the described asymmetric manner or in so-called asynchronous loading, by which the distancing of the particular first or second symmetry planes is meant—these are the particular vertical symmetry planes that are oriented approximately perpendicular to the transport direction TR or to the longitudinal extension direction of the piece good formation—, not every rotation direction variant is expediently performable in the instance of a shift to the left or to the right, which shift can in each instance be overlapped by a rotation, if applicable, because this could possibly lead to an unnecessarily long shift path that the manipulator 5 would altogether have to perform.

For the manipulator 5 that is asymmetrically loaded with one piece good 2, 2* according to FIG. 62, it may be advantageous that the manipulator 5 does not shift the piece good 2, 2* by an acceleration in transport direction TR in order to space it apart in an alignment from the formation Fa. Instead—as illustrated in the FIGS. 62 to 64—, the manipulator 5 carries out a 180° rotation about an axis of rotation formed perpendicular to the horizontal support surface of the horizontal conveying device 6. The seized piece good 2, 2* is thereby conveyed into a target position P1, which is located spaced apart in an alignment upstream from formation Fa. In order to precisely adjust the specified target position P1, this rotation of the manipulator 5 is additionally overlapped, as required, by a shift of the manipulator 5 in transport direction TR or opposite to the transport direction TR. If required, a brief acceleration of the manipulator 5 is carried out in transport direction TR prior to the rotation setting in, in order to prevent a collision of the manipulator 5 and the piece goods 2, 2* seized by the manipulator with the subsequent piece goods 2 of the formation Fa.

Due to the rotation of the manipulator 5, no or only a very minor movement in or opposite to the transport direction TR has to be carried out by the manipulator 5. This is advantageous because the manipulator does not subsequently have to cover this path distance in the opposite direction in order to pick off further piece goods 2 from one of the arriving formations Fa, Fb. A further advantage of the 180° rotation lies therein that the manipulator 5 is already available in a configuration where it can immediately seize further piece goods 2 without having to first carry out a return rotation into an initial position. That is to say that in the subsequent method step it is now possible to pick off further piece goods 2 with the gripper end of the manipulator 5 that was unloaded in the described method step of the 180° rotation. This aspect likewise leads to a noticeable saving of time and thus to an increased throughput in product processing.

Figure 66:
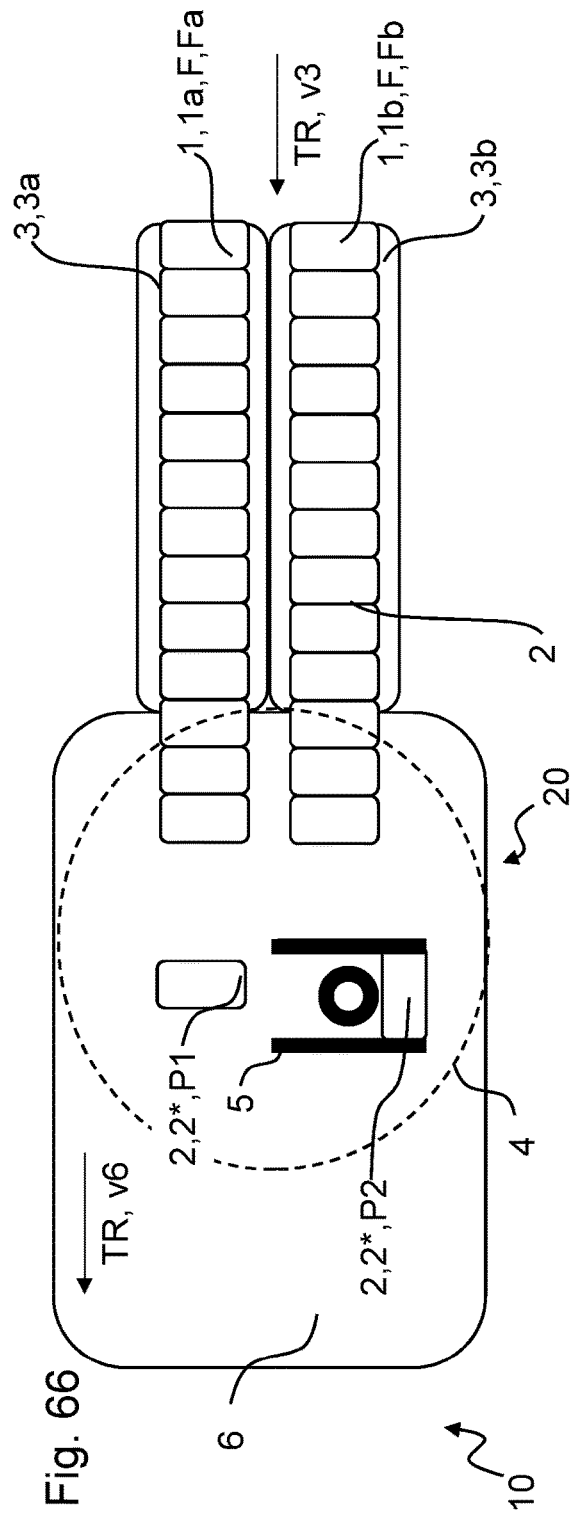

The manipulator 5 subsequently disengages from the piece good 2* that has been conveyed to the target position P1 in order to then pick off a piece good 2, 2* from the arriving formation Fb and to convey it into a target position P2 and corresponding target alignment, as illustrated in the FIGS. 65, 66. In this context, the transported piece good 2* is brought into the specified relative target position P2 and/or target alignment in relation to the subsequent piece goods 2 of the formation Fb under simultaneous rotary movement by an angle of at least approximately 90°. In this context again, a rotary movement about a preferably approximately vertical axis is carried out, in which case the axis of the rotary movement is additionally moved toward the specified target position P2, at least intermittently and/or in sections in the course of the rotary movement. It can be particularly provided that the axis is moved at least intermittently in the course of the rotary movement toward the particular specified target position P2 at a speed that is greater than the transport speed v3 of the arriving closed formation F. Alternatively or additionally, it can be provided that the axis remains in a specific position at least intermittently in the course of the rotary movement.

Figure 67:
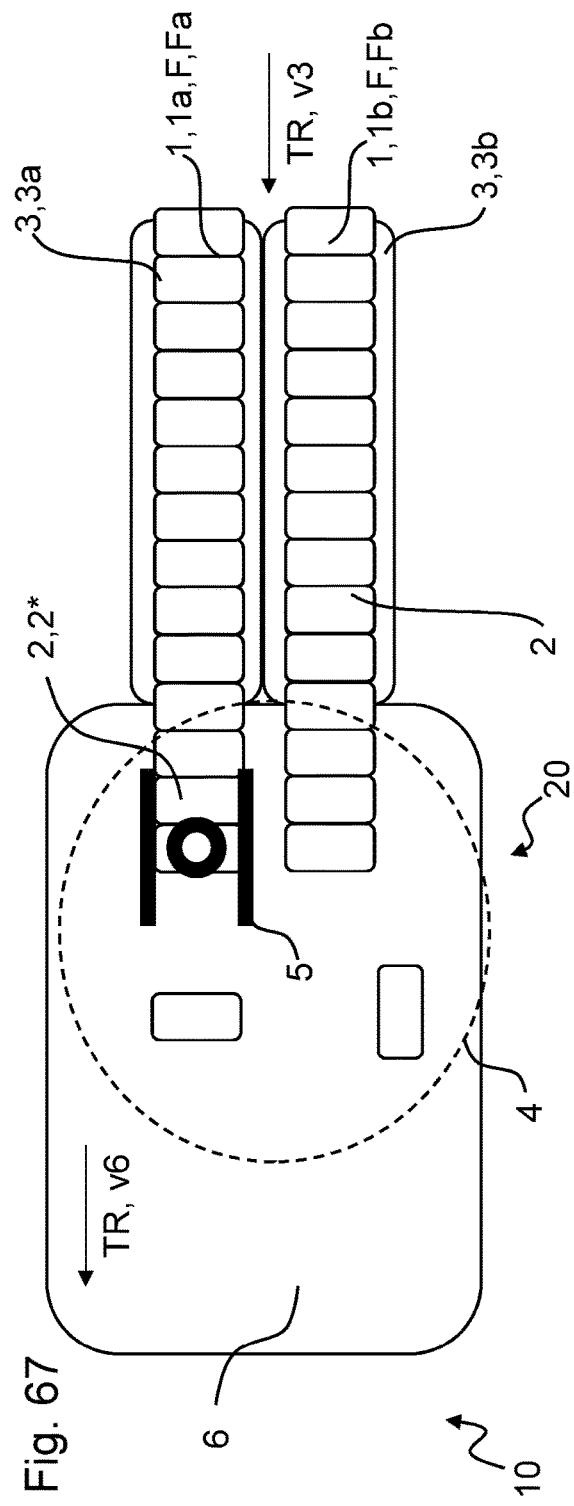

The manipulator 5 subsequently disengages from the piece good 2* that has been conveyed to the target position P2 in order to then pick off two piece goods 2, 2* from the arriving formation Fa and to convey them, under rotation by 90°, into a target position P3 and corresponding target alignment, as illustrated in the FIGS. 67, 68.

In FIG. 69 it is illustrated that the manipulator 5 then moves to the arriving closed formation Fa again and grips the two foremost piece goods 2, 2* from this formation Fa and conveys these piece goods 2, 2*—according to FIG. 70 under rotation by 90°—into a target position P4 and corresponding target alignment on the horizontal conveying device 6.

Figure 72:
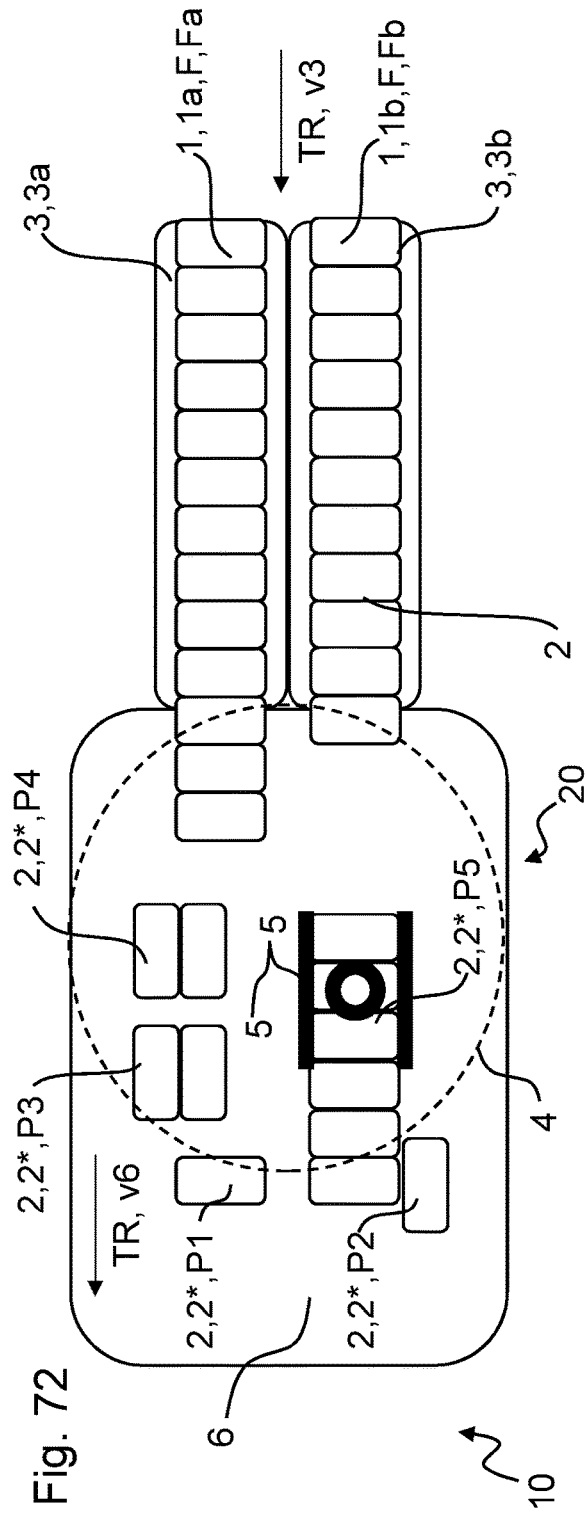

FIGS. 71 and 72 now illustrate a further manipulation step. Here, the manipulator 5 does not grip the foremost arriving piece goods 2 of the closed formation Fb. Instead, the manipulator 5 seizes the fourth, fifth, and sixth piece good 2 of the closed formation Fb. Thus, in particular, the piece goods 2* of the formation Fb that are seized by the manipulator 5 are preceded by three other piece goods 2. The three piece goods 2 seized in a clamping and/or force-locking and/or form-locking manner by the manipulator 5 are now spatially separated from the closed formation Fb and are brought into a specified relative target position P5 and/or target alignment in relation to subsequent piece goods 2 of the formation Fb. In this context, the three preceding piece goods are likewise repositioned. Thus, three piece goods 2, 2* are seized by the manipulator in this manipulation step, but a total of six piece goods 2, 2* are shifted into a target position P5, in which case the piece goods 2 that are not seized by the manipulator 5 are pushed into the target position P5 by a surface contact between a piece good 2* that is seized by the manipulator 5 and a piece good 2 that is not seized by the manipulator 5.

The total of six piece goods 2, 2* reach the target position P5, in particular, by a movement in linear direction by a straight acceleration in or approximately in a longitudinal extension direction of the closed formation Fb. Preferably, the total of six piece goods 2, 2* are disposed in their target position P5 in an alignment with the closed formation Fb.

After the target position P5 has been reached and the manipulator 5 has disengaged from the group of seized piece goods 2* (cf. FIG. 73), the surface contact between the piece good 2* seized by the manipulator and the piece good 2 not seized by the manipulator 5 is maintained.

Figure 73:
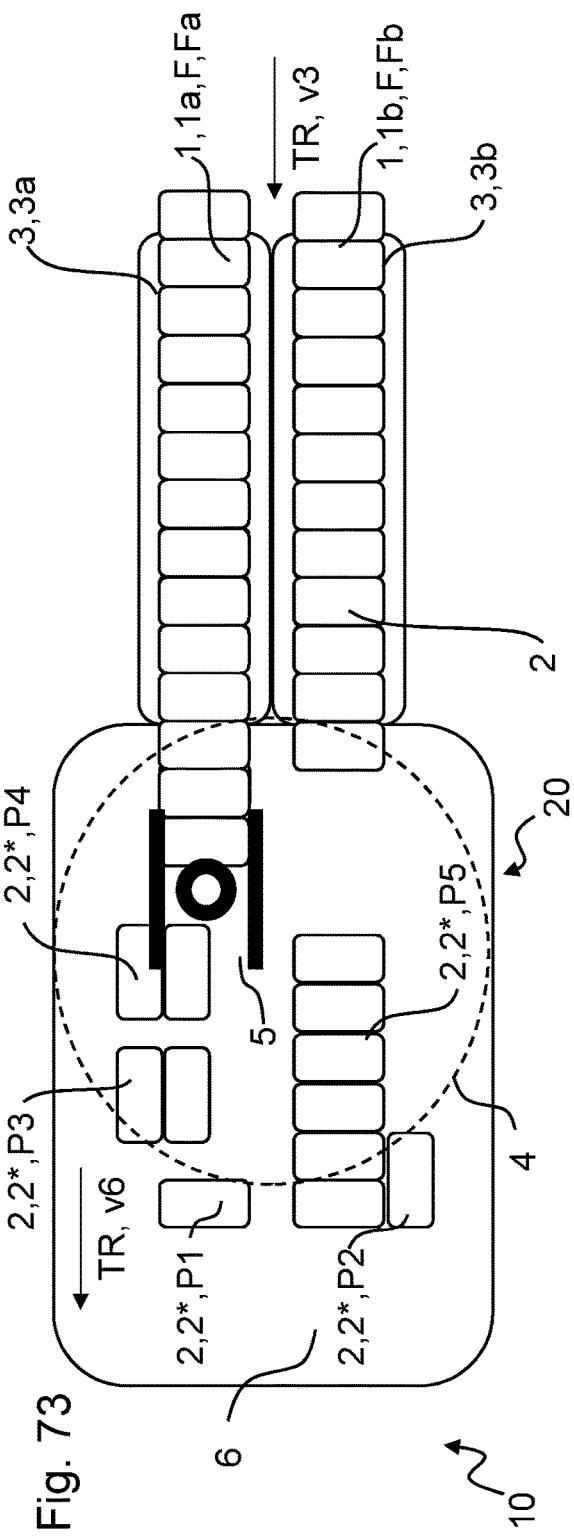

In FIGS. 73, 74 it is illustrated that the manipulator 5 then moves to the arriving closed formation Fa again and grips the foremost piece good 2, 2* from this formation Fa and conveys the piece good 2, 2* under rotation by 90° into a target position P6 and corresponding target alignment on the horizontal conveying device 6.

As illustrated in FIG. 75, 76, the manipulator 5 subsequently moves to the arriving closed formation Fa, grips the foremost piece good 2, 2* from it, and conveys it under rotation by 180° into a target position P7 and corresponding target alignment on the horizontal conveying device 6.

The manipulator 5 subsequently disengages from the piece good 2* disposed in target position P7 and, according to FIG. 77, seizes a further foremost disposed piece good 2, 2* of the formation Fb in order to convey it under rotation into a target position P8 according to FIG. 78 and corresponding target alignment on the horizontal conveying device 6.

The target layer 12 illustrated in FIG. 60 is thus prepared as a largely loose arrangement. By pushing together the arrangement with suitable sliders, the desired closed layer 12 is produced in a further, non-illustrated method step, which layer 12 can be transferred, for example, onto a pallet for further processing.

In the described manipulation steps, the seized piece goods 2* are in each instance preferably transferred, pushed, and/or rotated in one single, in particular, interruption-free manipulation step into the target position P1 to P8 and/or target alignment. The description of the previous figures can be particularly referred to regarding the manipulation steps carried out by the manipulator 5.

It can be furthermore provided that the manipulator rotates about an axis of rotation formed to be perpendicular to the plane of the horizontal conveying device 6 and thereby effects a corresponding repositioning of the seized piece goods 2*. Depending on whether additional movement components are applied to the manipulator 5, the piece goods 2* moved in such a manner are disposed in an alignment with the particular formation F (cf. FIGS. 62 to 64), or they are disposed laterally shifted in relation thereto.

According to a further non-illustrated embodiment, it can be provided that the manipulator 5—after shifting a group of seized piece goods 2* and at least one piece good 2 not seized by the manipulator 5, which non-seized piece good 2 is in surface contact with a seized piece good 2*—disengages from the group, then again seizes at least one piece good 2, 2* of this group, and rotates it and/or shifts it, or the like, in relation to the group. A manipulator 5 with seized piece goods 2* can also be used for shifting at least one piece good 2, which has already been disposed in a target position in a previous step, into a new target position by surface contact between the piece good 2* seized by the manipulator 5 and the piece good 2, which has already been disposed on the horizontal conveying device 6 in a first target position. The manipulator 5 subsequently releases the seized piece good 2* in the new target position such that a surface contact between the piece good 2 already disposed in a target position in a previous step and the further piece good 2* is maintained.

In particular, at least two parallel rows 1a, 1b of piece goods 2 are here continuously fed to a grouping module 20 consisting of the movable, shiftable, and/or rotatable manipulator 5 and the horizontal conveying device 6. The manipulator 5 processes the piece goods 2 of the arriving formations Fa, Fb, for example, sequentially by alternately seizing individual piece goods 2, 2* or groups of piece goods 2, 2* of the formations Fa, Fb and conveying them into their target positions P1 to P8. It can alternatively be provided that the manipulator twice in succession seizes in each instance at least one piece good 2, 2* from one of the formations Fa or Fb, separates it, and conveys it to the target position P1 to P8 and/or target alignment. This results in a significant increase of the throughput with a simultaneously compact design.

According to a non-illustrated embodiment of the invention, it can be provided that, in at least two consecutive steps for the particular moving along of piece goods 2, 2* from the closed formation into the in each instance provided target positions and/or target alignments, rotary movements of the at least one manipulator 5 can be carried out in each instance with the same sense of rotation, in particular, under further rotation of the manipulator beyond a rotation angle of 180°. It could be provided, for example (not illustrated) that the manipulator seizes a piece good 2, 2* or a group of two or three piece goods 2, 2* of the formation Fa and conveys it or them into a target position under rotation of 180° and under additional shifting of the manipulator 5 with movement components parallel and/or perpendicular to the transport direction TR of the formation Fa. After the manipulator 5 has disengaged from the one positioned piece good 2, 2* or the positioned group of piece goods 2, 2*, the manipulator 5 can rotate in the same sense of rotation by further 180° and subsequently pick off, for example, piece goods 2, 2* of the formation Fb and convey them into their particular target position, in which case the sense of rotation continues to be maintained. Alternatively, the manipulator 5 does not need to be rotated after disengaging from the piece good/piece goods 2, 2* of the formation Fa seized in the first described step, but can rather be directly used for picking off further piece goods 2, 2*. It is thus not imperative to rotate the manipulator 5; a movement with movement components opposite to the transport direction of the formations Fa, Fb and/or, if applicable, perpendicular to the transport direction of the formations Fa, Fb can instead be sufficient.

According to a further non-illustrated embodiment, it can be provided that the manipulator 5 in a first step at first seizes a piece good 2 or 2* and brings it into a first position or intermediate position whereupon this piece good 2 or 2* which is located in the intermediate position, is shifted optionally by a further piece good 2 or 2* or by a plurality of further piece goods 2, 2*, or it can also at first remain in the position or intermediate position specified by the manipulator 5, whereupon it can be brought into the finally predefined specified target position P1, P2, P3, P4, P5, P6, P7, P8 and/or target alignment, for example, by being seized again by the manipulator 5. The manipulator 5—between putting down this piece good 2 or 2* and seizing it again and relocating it so that it reaches the target position P1, P2, P3, P4, P5, P6, P7, P8—can, for example, seize, shift, rotate, etc. other piece goods 2, 2*; or it can also shift further piece goods 2, 2* by way of the meanwhile seized and/or gripped piece goods 2, 2*.

In the same manner, a plurality of piece goods 2, 2* can first be brought simultaneously into the first position or intermediate position and brought into the particular specified target position P1, P2, P3, P4, P5, P6, P7, P8 and/or target alignment by being seized again by the manipulator 5. In this context it is also conceivable that the manipulator 5—between putting down these piece goods 2 or 2* and seizing them again and relocating them in order to reach the particular target positions P1, P2, P3, P4, P5, P6, P7, P8—can seize, shift, rotate, etc. other piece goods 2, 2*, or it can also shift further piece goods 2, 2* by using the meanwhile seized and/or gripped piece goods 2, 2*.

According to a further non-illustrated embodiment of the method, it can be provided that at least one piece good 2 seized by the manipulator 5 is used for shifting at least one further piece good 2 into a specified target position P1, P2, P3, P4, P5, P6, P7, P8 and/or target alignment associated with this further piece good 2, and that the piece good 2 that is still located in the manipulator is subsequently brought into the particular specified target position P1, P2, P3, P4, P5, P6, P7, P8 and/or target alignment of the piece good 2. The method can optionally also provide that a plurality of piece goods 2 are seized simultaneously by the manipulator 5 and are used for shifting a further piece good 2 or further piece goods 2 into its particular specified target position P1, P2, P3, P4, P5, P6, P7, P8 and/or target alignment or into their particular specified target positions P1, P2, P3, P4, P5, P6, P7, P8 and/or target alignments; and subsequently, the piece goods 2 that are still located in the manipulator are brought into their particular specified target positions P1, P2, P3, P4, P5, P6, P7, P8 and/or target alignments. This method variant makes it possible to push two piece goods 2 by two other gripped piece goods 2 and to subsequently bring the gripped piece goods 2 without repositioning or releasing directly into their particular target positions or target alignments.

FIGS. 79A to 79C schematically show different embodiments of grippers or gripper heads of a manipulator.

FIGS. 79A to 79C schematically show different embodiments of grippers or gripper heads 21 of a manipulator 5. The schematically illustrated manipulator 5 or gripper head 21 has two clamping elements and/or gripping elements that are rigid, movable and/or advanceable toward each other and that are located opposite each other, in particular, two clamping jaws 22 or gripper paddles or the like, for receiving piece goods 2, 2* in a clamping and/or form-locking manner. The at least one piece good 2, 2* can be clamped between the clamping jaws 22 and can thereby be moved according to a desired target position (cf. in particular description of the previous figures). The length L of the clamping jaws 22 is selected such that a maximum number of piece goods 2* forming a cycle for the layer can be picked off. According to the FIGS. 44A to 44C, the manipulator 5 can, in particular, seize, for example, one piece good 2* (cf. FIG. 44A), two piece goods 2* (cf. FIG. 44B), or three piece goods 2* (cf. FIG. 44C).

The manipulator 5 or gripper head 21 is designed for changing the speed and/or the direction of the at least one seized piece good 2, 2*. Furthermore, the manipulator 5 or gripper head 21 can additionally be designed for rotating the at least one seized piece good 2, 2*. The above-described gripper head 21, for example, is located at a swivel joint and can change the alignment of the piece goods 2, 2* seized between the clamping jaws 22 via rotation by a specified angle of, for example, 90°.

In this instance, the part of the manipulator 5 provided for the transfer of the at least one piece good 2, 2* into the desired target position and/or target alignment can be a gripper head 21, which is, for example, attached and mounted on movably mounted cantilever arms, which in turn are typically mounted in a frame-fixed manner on a frame or the like. Such a manipulator suspension or manipulator arrangement—also known as parallel kinematic arrangement—enables the desired movability of the gripper head 21, which can seize, shift, position, place, rotate, etc. the piece goods 2, 2* in the desired manner for moving toward the target positions and/or target alignments for the piece goods 2, 2*.

Regarding the described rotary movements, it can be mentioned that the manipulator 5 or the manipulator gripper head 21 can optionally rotate by a desired alignment angle for the piece goods 2 or 2* optionally, for example, by 45°, by, for example, about 90°, or also by other rotation angles. An endless rotatability of the gripper head 21 of the manipulator 5 can be particularly advantageous because a fast further rotation during the return movement to the formation F can be carried out in this way in rotations, for example, by 180° or by 90°, where the further rotation possibly requires a shorter time than a return rotation in the opposite sense of rotation. By such an endless rotatability of the gripper head with, in principle, unlimited rotation angle, it is thus possible to always select the rotation directions that can be carried out faster in each particular case; this relates both to the positioning of the seized piece goods 2 or 2* and to "empty runs" in the return movements of the manipulator 5 toward the formation F in order to receive further piece goods 2 or at least one further piece good 2 there.

Clamping grippers with friction-increasing contact surfaces are known from the prior art, which prevent the gripped articles or piece goods from being dropped from the gripped position during the positioning. In very fast positioning speeds, the articles to be positioned are exposed to very high forces. The pure clamping force and the thereby generated friction is therefore no longer sufficient for securely holding the articles.

The gripper heads 21 illustrated in the FIG. 79 are modified such that a type of form lock is preferably generated while the articles or piece goods 2, 2* are gripped. The design can be carried out in different ways. In this context, the gripper head 21 can unite a combination of different elements.

The illustrated gripper heads 21 are particularly suitable for gripping piece goods 2, 2* in the form of bundles. According to the illustrated exemplary embodiment, a bundle comprises six bottles 8 arranged in two rows and wrapped into a shrink film 9 and held together by it. The gripper heads 21 are also suitable for gripping bundles of, for example, eight bottles 8 arranged in two rows, bundles consisting of two or three bottles 8 arranged in one row, bundles consisting of nine bottles 8 arranged in three rows, or the like.

The gripper heads 21 consist preferably of two gripper paddles or clamping jaws 22 located opposite each other. The gripper heads 21 can also consist of a plurality of clamping elements and/or gripping elements located pairwise opposite each other They are designed for seizing the particular at least one piece good 2, 2\* in a clamping and/or force-locking and/or form-locking manner, as well as for separating it, and transferring it into a target position and/or target alignment. In particular, the at least two gripper paddles or clamping jaws 22 interact in each instance pairwise and are, for example, movable toward each other in order to grip and, in particular, to clamp the articles or piece goods 2, 2\* between them. The force-locking and/or form-locking connection formed between the piece goods 2, 2\* and the clamping jaws 22 of the gripper head 21 is maintained for at least until the at least one piece good 2, 2\* has been brought into the desired target position and/or target alignment. If required, the force-locking and/or form-locking connection can alternatively be undone slightly earlier, for example when a sectional sliding of individual piece goods is to be carried out.

In the gripper head 21a illustrated in FIG. 79A, the two clamping jaws 22 located opposite each other each have contact surfaces 27 for the piece goods 2, 2\* on their inner sides 23 facing toward each other. The contact surfaces 27 are, in particular, formed as contour surface 25, which at least in some areas corresponds to the contours of the outer cover surface 13 or of a contact area 24 of the at least one piece good 2, 2\* to be seized in a clamping and/or force-locking and/or form-locking manner. The contour surface has, for example, concavely formed reception elements 29 with their curvatures corresponding to the curvatures of bottles 8 of the contact area 24 of a bundle to be manipulated. The at least one seized piece good 2, 2\* is held, in particular, by the form lock of the contour surface 25 with the contours of the outer cover surface 13 between the two clamping jaws 22 of the gripper head 21. The form lock is usually supported by a force lock that is applied onto the at least one seized piece good 2, 2\* by the advance movement of the clamping jaws 22 toward each other.

The contour surface 25 can be formed, for example, by appropriately formed rubber grommets or by foam rubber padding. By gripping the piece goods 2, 2\* in a form-locking manner, it is possible to increase the manipulation speed such that the piece goods 2, 2\* seized by the gripper head 21 can be positioned faster at the desired target position.

It is in particular provided that, for the purpose of seizing the at least one piece good 2, 2\* in a force-locking and/or form-locking manner, at least one of two clamping elements and/or gripping elements located opposite each other, in particular, clamping jaws 22, forms at least one contact surface 27 for the at least one piece good 2, 2\* to be seized in a force-locking and/or form-locking manner, which clamping elements and/or gripping elements, when seizing the at least one piece good 2, can be brought into abutment in a planar and/or strip-shaped and/or linear and/or punctual manner, on a contact area 24 of the cylindrical outer cover surface 13 of the piece good 2.

In the gripper head 21b illustrated in FIG. 79B, the two clamping jaws 22 located opposite each other each have contact surfaces 27 for the piece goods 2, 2\* on their inner sides 23 facing toward each other, the contact surfaces each being formed, in particular, by an elastic lining 26. The elastic lining 26 has, in particular, a thickness d that allows an at least partial compression of the elastic lining 26 when the at least one piece good 2, 2\* is seized in a clamping and/or force-locking and/or form-locking manner. The elastic lining 26 is, in particular, a reversibly elastically deformable functional element, and it provides an abutment area AB for seizing the at least one piece good 2, 2\* in a clamping, form-locking, and or force-locking manner. The contact with the at least one seized piece good 2, 2\* and the reversible elastic deformation of the elastic lining 26 is maintained for at least until the at least one seized piece good 2, 2\* has been brought into the target position and/or target alignment.

In this manner, a forced form lock with the seized piece good 2, 2\* results when advancing the clamping jaws 22 toward each other. The form lock is usually supported by a force lock that is applied onto the at least one seized piece good 2, 2\* by the advance movement of the clamping jaws 22 toward each other. This forced form lock is maintained at least for the time span necessary for bringing the at least one piece good 2, 2\* into the target position and/or target alignment.

After the gripper head 21b has moved the piece goods 2, 2\* into the desired target position and has released them there, the elastic lining 26 reassumes its original form with largely continuously even thickness d so that the gripper head 21b can be employed universally for gripping differently formed piece goods 2, 2\*.

The elastic lining 26 can be formed, for example, by a rubber layer or a foam rubber layer or the like. By selecting a suitable material for the elastic lining 26, it is additionally possible to establish an advantageous friction lock between the elastic lining 26 and the particularly seized piece good 2, 2\*, which friction lock supports the safe clamping and/or force-locking and/or form-locking seizing of the at least one seized piece good 2, 2\*.

FIG. 79C shows an embodiment of a gripper head 21c, where the gripper paddles or clamping jaws 22 each have a combination of friction lock elements and/or form lock elements. In this context, each of both oppositely located clamping jaws 22 have at least two contact surfaces 27 in the form of contour surfaces 25 (analogously to FIG. 79A) for the at least one piece good 2, 2\* to be seized in a force-locking and/or form-locking manner, which contact surfaces are disposed spaced apart from each other at oppositely located end sections 30 of the particular clamping jaw 22.

The area formed between the end sections 30 can be provided without contour surfaces 25 or with less developed contour surfaces 25, since the piece goods 2, 2\* support and stabilize each other laterally due to their mutual contact, in particular, when a plurality of piece goods 2, 2\* are seized simultaneously. According to the exemplary embodiment illustrated in FIG. 79C, the contact surface 27 for the piece goods 2, 2\* disposed between the end sections 30 is formed as elastic lining 26 analogously to FIG. 79B, the description of which is hereby referred to. Preferably, the abutment area AB of the at least one reversibly elastically deformable functional element or, if applicable, of the elastic lining 26, extends along a portion of at least 50% of a longitudinal extent L of the particular clamping jaw 22.

The described clamping elements and gripping elements of the manipulator 5 also comprise, for example, double grippers or multiple grippers or the like, which can have a plurality of gripping pairs or, if applicable, pairs of clamping jaws 22, which, however, particularly interact pairwise in order to be able to receive, seize, and/or grip piece goods 2, 2\*, for example, in a plurality of parallel, in particular, spaced-apart rows (not illustrated). It should thus be noted that the number of at least two clamping elements and/or gripping elements located opposite each other defines a minimum. It is therefore not ruled out that a plurality of clamping elements and/or gripping elements can be designed in the defined manner, if required; it is also not ruled out that two or more elements are present.

Figure 80:
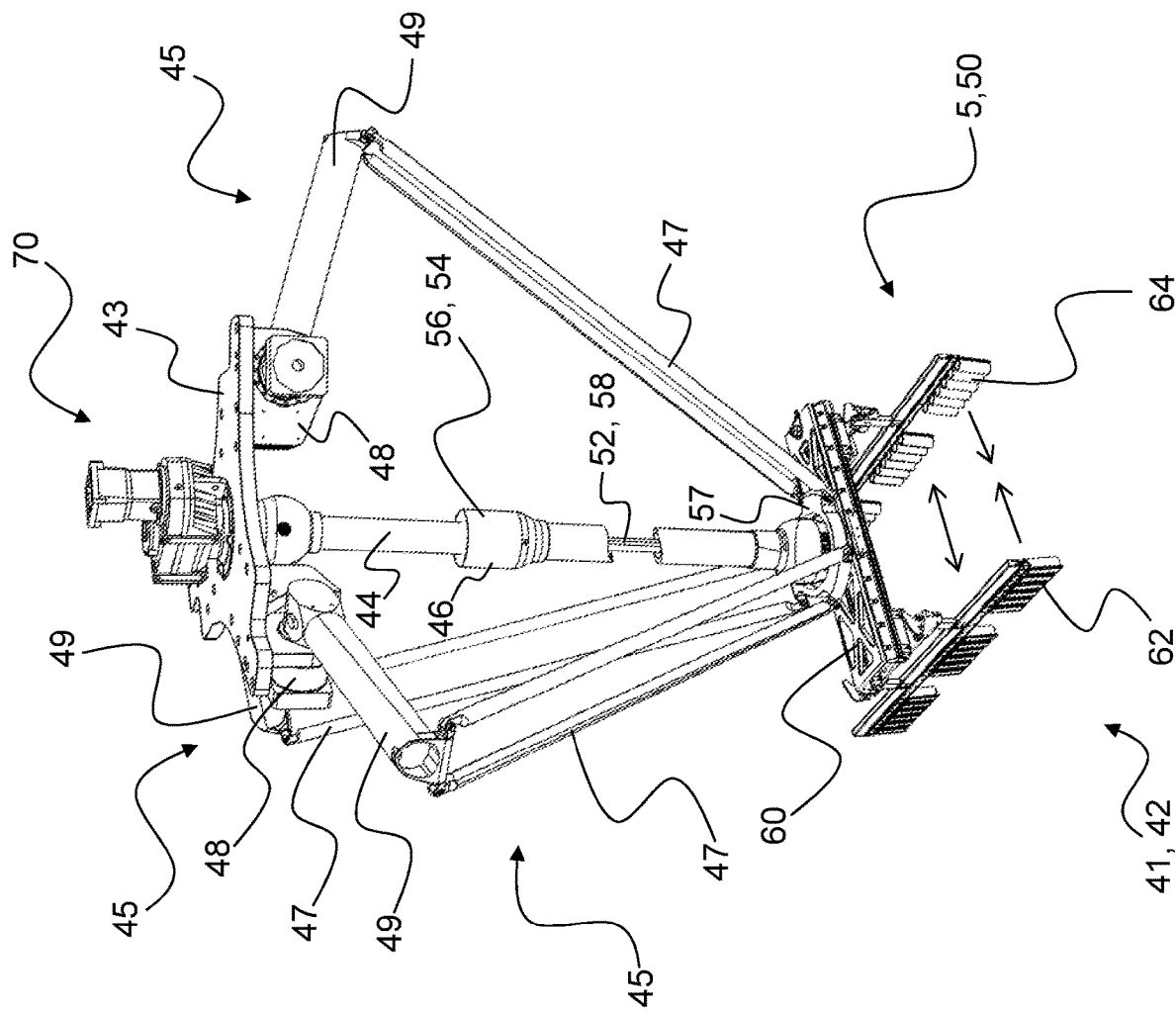
FIG. 80 shows a schematic perspective view of an embodiment of a handling apparatus and/or manipulation apparatus for carrying out a variant or a plurality of variants of the method according to the invention.
Figure 81:
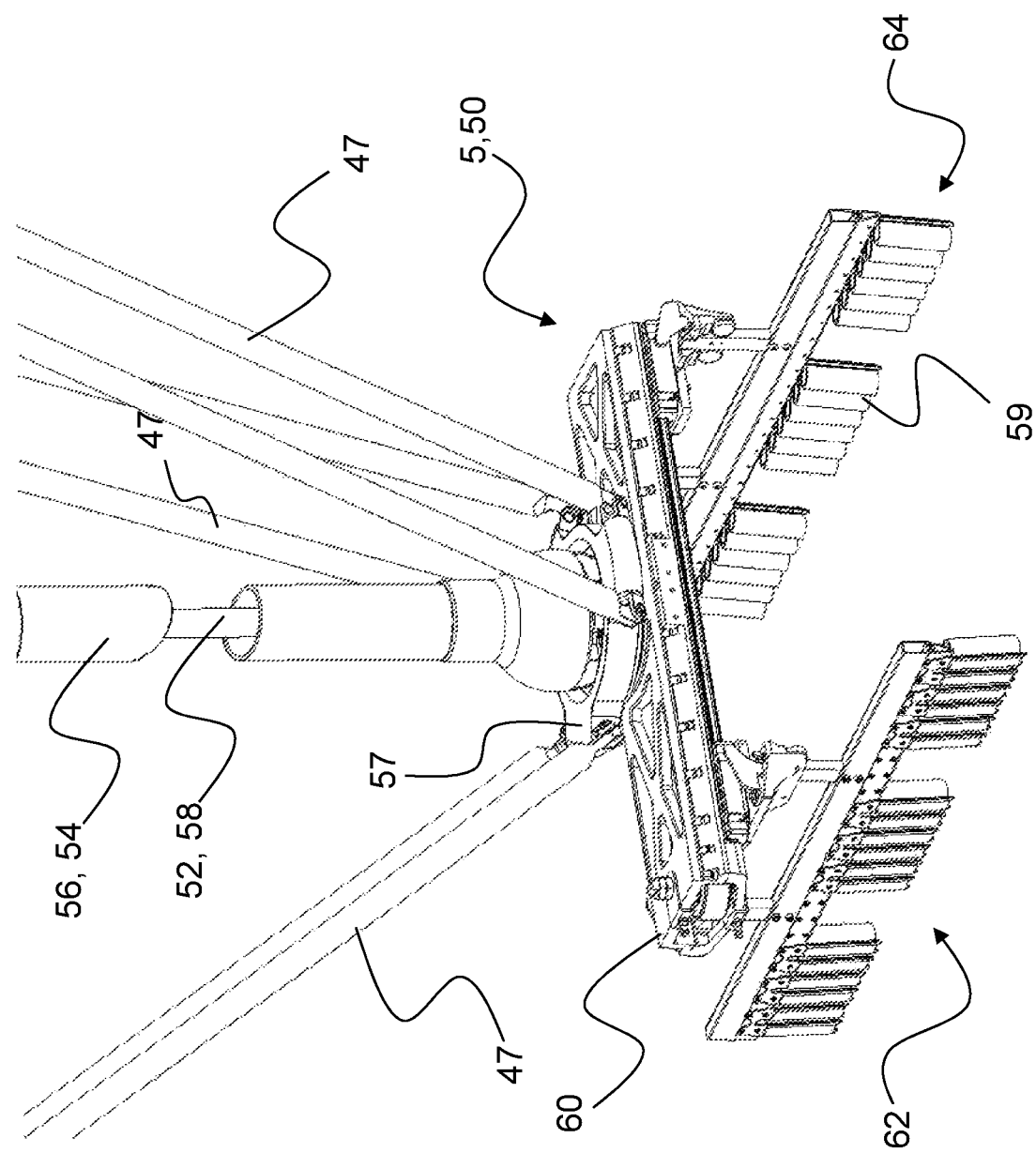
FIG. 81 shows a schematic detailed view of a lower part of the apparatus from FIG. 80.
Figure 82:
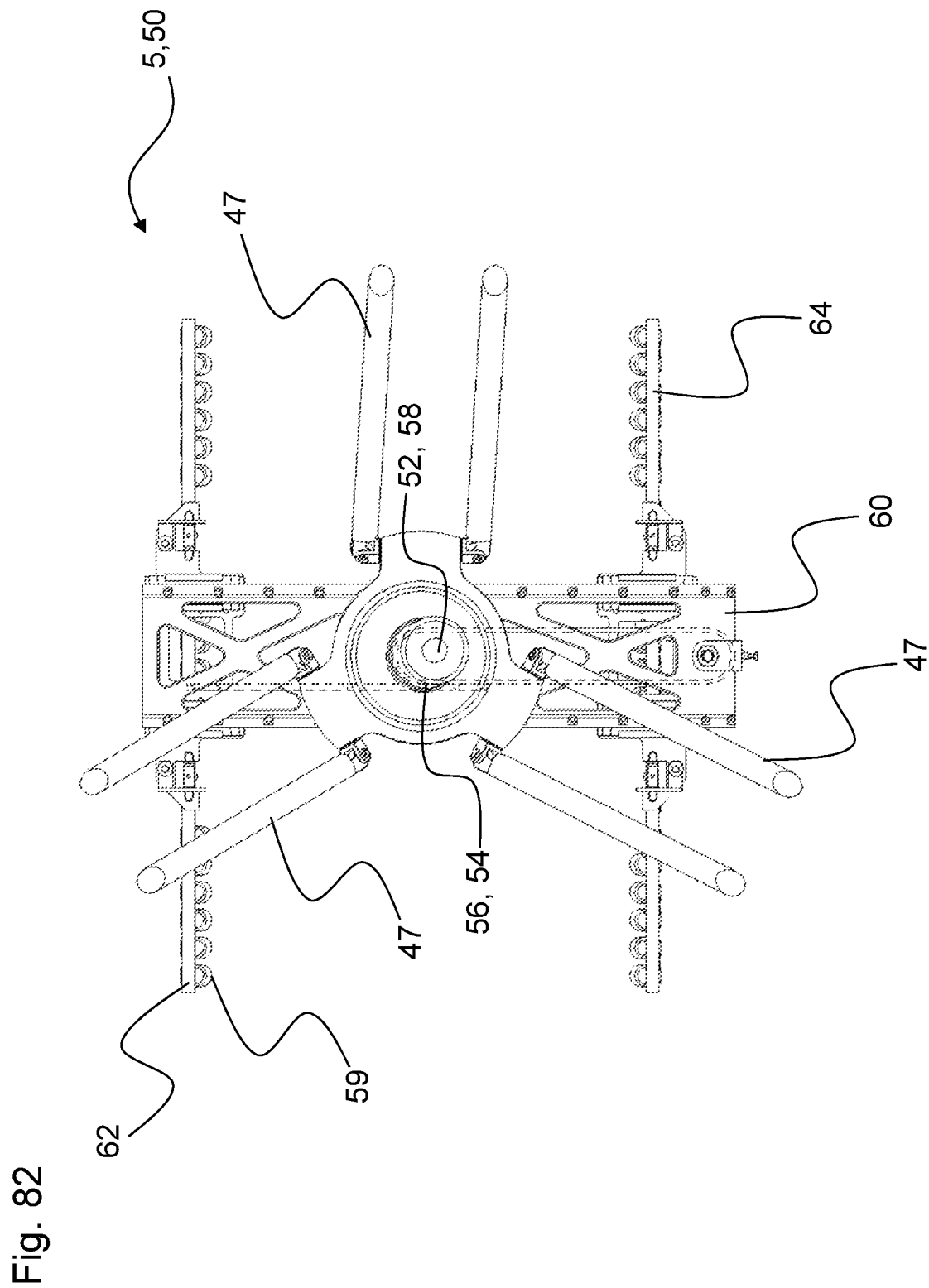
FIG. 82 shows a schematic cross-sectional illustration through the apparatus from the exemplary embodiment according to FIG. 80 and FIG. 81.

FIGS. 80 to 82 show different views of an embodiment of a manipulator 5, 50 of a handling apparatus 10 and/or manipulation apparatus (according to one of the previous figures) for carrying out a variant or a plurality of variants of the method according to the invention; in particular, FIG. 80 shows a schematic perspective view; FIG. 81 shows a schematic detailed view of a lower part of the apparatus from FIG. 80; and FIG. 82 shows a schematic cross-sectional illustration through the apparatus from the exemplary embodiment according to FIG. 80 and FIG. 81.

By way of introduction it is pointed out here that the embodiment variants of the apparatus for carrying out at least some variants of the method according to the invention as explained in the FIGS. 80 to 82 relate to a delta robot, a so-called tripod, or to a delta kinematic robot with three positioning arms of the same type which can form a part of a handling device or of a manipulator for handling, rotating, shifting, or receiving articles, piece goods, or bundles, or which can contain this handling device or this manipulator. In terms of a possible design for the delta robot or tripod of its construction, its mode of operation, and its movement range, the disclosure of DE 10 2013 106 004 A1 is referred to, with reference hereby being made to the full content of the disclosure. A detailed description of the movement modes, the drives for the three positioning arms, etc. is therefore dispensed with at this point. The apparatus 41 according to FIG. 80 to FIG. 82 could generally also have four positioning arms of the same type.

The robot forming or containing the apparatus 41, which robot at the same time contains or comprises the handling device or the manipulator, as applicable, or can form a part thereof is in the following generally referred to by the reference character 42. It should be noted that the robot referred to by the reference character 42 can also be referred to as delta robot 42, as delta kinematic robot 42, as parallel kinematic robot 42, or also as tripod 42 (cf. FIG. 80 in this connection).

FIG. 80 shows a schematic perspective view of an embodiment of an apparatus 41 or of the delta kinematic robot 42, as applicable, for carrying out the method according to the invention. The apparatus 41 or the delta kinematic robot 42, as applicable, is configured to grip, rotate, and relocate beverage containers, which have been assembled to bundles and which are not illustrated in FIG. 80. The apparatus 41 or the delta kinematic robot 42, as applicable, can however be used likewise for gripping, rotating, and relocating any type of articles or piece goods.

As is discernible in FIG. 80, the apparatus 41 or the delta kinematic robot 42, as applicable, has an upper suspension 43. Three positioning arms 45 are fastened to the upper suspension 43, each so as to be rotatable by an associated drive 48. The rotating movement of the positioning arms 45 in this context is carried out such that their axes of rotation run parallel to each other. Furthermore, the three positioning arms 45 consist of at least two arm sections 47 and 49, which are swivelable relative to each other, with the lower arm sections 47 or also lower arms 47 each being formed from two linkages oriented parallel to each other. The upper arm section 49 or also upper arm 49 is in each instance linked to its particularly associated drive 48 or is flange-mounted to its particularly associated drive 48. In addition, the three positioning arms 45 can be moved independently of one another. For this purpose, all drives 48 are linked to a control unit, which specifies the movement of the positioning arms 45 and controls the drives 48.

At the lower end of the three positioning arms 45, a manipulator 50 is linked to the three positioning arms 45 such that the manipulator 50 can be moved for handling articles by way of a movement of the three positioning arms 45. The control unit not illustrated in FIG. 80 therefore specifies the movement of the positioning arms 45 depending on a position provided for the manipulator 50 for gripping and handling articles. All of the three positioning arms 45 are mechanically coupled with a base 60 of the manipulator 50 by way of a support ring 57. The mechanical connection or coupling between the support ring 57 and the base 60 of the manipulator 50 is formed to allow a rotation of the manipulator 50 in relation to the support ring 57. The support ring 57 can also be referred to as tool center point of the apparatus 41.

The manipulator 50 is non-rotatingly flange-mounted approximately centrally to a linear guide 56, in which case the linear guide 56 is formed as first shaft 54; and the manipulator 50 can thus be rotated via the first shaft 54.

Furthermore provided is an actuating device 52 formed as second shaft 58, by which clamping jaws 62 and 64 can be controlled to close and open. The axes of rotation of the first shaft 54 and of the actuating device 52 formed as second shaft 58 are identical. The first shaft 54 and the second shaft 58 are oriented or disposed coaxially in relation to each other. Since the manipulator 50 or the manipulator clamping jaws 62 and 64 located opposite each other, as applicable, can be controlled via the actuating device 52 formed as second shaft 58, no pneumatic, hydraulic, or electrical line connections are necessary for connecting to the manipulator 50 for the purpose of controlling the manipulator 50 or the clamping jaws 62 and 64.

Herein lies the advantageous possibility of rotating the manipulator 50 together with the manipulator clamping jaws 62 and 64 via a first shaft 54 by more than 360°, since there are no line connections that would impede a complete rotation. Compared to the apparatuses known from the prior art, the throughput in handling articles can hereby be significantly improved, since the manipulator 50 does not need a return rotation in order to be transferred back into an initial orientation.

As just mentioned, the two clamping jaws 62 and 64 in the embodiment shown in FIG. 80 can be relocated relative to each other or also moved toward each other or away from each other by way of a rotation of the actuating device 52 formed as second shaft 58. In the present context, the particular movement of the clamping jaws 62 and 64 when controlling the actuating device 52 formed as second shaft 58 is indicated by arrow-based illustration. Both clamping jaws 62 and 64 are fastened to the base 60 of the manipulator 50 in a hanging and linearly movable manner. A control of the clamping jaws 62 and 64 is carried out by way of transmission steps of a gearing mechanism in contact with the second shaft 58, which transmission steps are not discernible in FIG. 80, and which transmit a torque of the second shaft 58 to a positioning movement of the clamping jaws 62 and 64.

The linear guide 56 or the first shaft 54, as applicable, comprises two housing parts 44 and 46, which are telescopically in contact with each other and each provide a hollow space for accommodating the actuating device 52 formed as second shaft 58. The actuating device 52 formed as second shaft 58 is coupled to the manipulator 50 and to an actuator 70 by way of a cardanic-type joint.

The actuator 70 is positioned non-rotatingly on the upper suspension 43. The actuating device 52 formed as second shaft 58 can be rotatingly moved by way of the actuator 70, whereby the clamping jaws 62 and 64 of the manipulator 50 are moved for gripping or releasing articles.

According to the method according to the invention, the second shaft 58, which serves for closing and opening the clamping jaws 62 and 64 of the manipulator 50 or, as applicable, of the gripper, has to perform a compensatory movement when the gripper or manipulator 50 is rotated by actuation of the first shaft 54. This compensatory movement is carried out as a relative movement in relation to the first shaft 54 in same sense (parallel) rotation, in counter rotation, or synchronously. The direction of the compensatory movement is to be carried out according to the desired mode of operation. If the clamping jaws 62 and 64 are closed, for example, by a counterclockwise rotary movement of the second shaft 58, and the manipulator 50 or, as applicable, the gripper is simultaneously rotated counterclockwise by rotation of the first shaft 54, then the second shaft 58 likewise has to perform a counterclockwise rotation, when the manipulator 50 rotates, in order to prevent an opening of the clamping jaws 62 and 64. A clockwise rotation is to be realized accordingly. The required rotation directions of the shafts 54 and 58 depend on the technical realization of carrying out the rotary movement of the second shaft 58 in a linear movement of the clamping jaws 62 and 64.

The schematic detailed view of FIG. 81 illustrates a lower part of the apparatus 41 or of the delta kinematic robot 42 from FIG. 80, as applicable, and in this context, in particular, shows in detail an embodiment of the manipulator 50 as it can be provided and used for the method according to the invention and, in particular, for carrying out the method according to the invention.

For gripping articles, the clamping jaws 62 and 64 have a plurality of flexible contact elements 59 on the side facing toward the in each instance oppositely located clamping jaw 62 or 64, as applicable. The flexible contact elements 59 are brought into abutment in a force-impinged manner on the particular articles by an advance movement of the clamping jaws 62 and 64, and they fasten the particular articles essentially immovably to the manipulator 50.

FIG. 81 also shows once more in detail the lower arm sections 47 of the positioning arms 45 (cf. FIG. 80), which are in each instance formed as linkage construction, and which are in each instance in an articulated connection with the support ring 57 (or the so-called tool center point) at their lower end. As already mentioned above, the manipulator 50 can be rotated relative to the support ring 57 via the first or outer shaft 54.

The schematic cross-sectional illustration of FIG. 82 shows further details of the apparatus 41 or, as applicable, of the delta kinematic robot 42 from the exemplary embodiment according to FIGS. 80 and 81. Again discernible in FIG. 82 are the actuating device 52 formed as second shaft 58 as well as the linear guide 56 formed as first shaft 54. The second shaft 58 and the first shaft 54 have a concentric orientation and an identical axis of rotation; that is to say, they are disposed coaxially in relation to each other. A rotation of the manipulator 50 can be effected by the linear guide 56 formed as first shaft 54, in which case the axis of rotation in FIG. 82 is oriented vertically or toward the image plane.

It was already mentioned that, in the instance of rotary movements of the manipulator 50 induced by rotations of the outer, first shaft 54, compensatory movements in the same sense or in the counter sense are required from the inner, second shaft 58 in order to prevent an undesirable actuation, that is to say, opening or further closing, of the clamping jaws 62 and 64. The extent of this compensatory movement is based, on the one hand, on the kinematic linkage of the actuating drives actuated by the second shaft 58, for example, based on the transmission of the actuating drives. According to transmission, different rotation angles of the compensatory movement may be required. The compensatory movement is moreover based on the direction of rotation of the first shaft 54, which, as needed, requires a compensatory movement of the second shaft 58 in the same sense or in the counter sense if the clamping jaws 62 and 64 are intended to remain unchanged, open or closed, in the rotation of the manipulator 50.

It should be additionally noted that the operative connections of the particular shafts 54 and 58 with the manipulator 50 or for the compensatory movements and/or positioning movements for the clamping jaws 62 and 64, can also be interchanged if the appropriate mechanical conditions therefor exist in the coupling sections within the support ring 57. Thus, the outer, first shaft 54 can optionally also actuate, that is to say open and close, the clamping jaws 62 and 64, whereas the inner, further shaft 58 can also be responsible or used for the rotary movements of the manipulator 50 or of the rotatable section of the apparatus 41 or of the delta kinematic robot 42.

In the different embodiments of methods for handling piece goods 2 conveyed nearly unspaced in rows as described in the context of the figures, groups of piece goods 2* are in each instance formed during a combined grouping and positioning process according to the arrangement to be formed by way of at least one manipulator 5 or groups or rows 11 of piece goods 2* are formed in such a manner as required for a following method step in a subsequent handling apparatus. In particular, group formation, row formation, and/or positioning is possible in one single method step and by one single appropriate apparatus 10 (in particular by the movable, shiftable, and/or rotatable manipulator 5 as part of the apparatus 10). This is an essential difference to the prior art, where, for example by the arrangement of suitable conveyors, which are in each instance driven at different speeds, a group is formed first and is subsequently positioned and/or rotated in a further method step according to the layer to be formed.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS 1, 1a, 1b, 1c, 1d Row
2,2*, 2a, 2a*, 2b, 2b*, 2c, 2c*, 2d, 2d* Piece goods
3, 3a, 3b, 3c, 3d Transport device
4, 4a, 4b Seizing range
5, 5a,5 b Manipulator
6 Horizontal conveying device
8 Beverage container/bottle
9 Shrink wrap/shrink film
10 Handling apparatus
11 Row 12 Partial layer/layer
13 Outer cover surface
15 Control device
20 Grouping module
21, 21a, 21b, 21c Gripper head
22 Clamping elements and/or gripping elements/clamping jaws
23 Inner side
24 Contact area
25 Contour surface
26 Elastic lining
27 Contact surface
29 Receiving element
30 End sections
41 Apparatus
42 Robot, delta robot, delta kinematic robot, parallel kinematic robot, tripod
43 Suspension, upper suspension
44 First housing part
45 Positioning arm
46 Second housing part
47 Lower arm section, lower arm
48 Drive
49 Upper arm section, upper arm
50 Manipulator
52 Actuating member, actuating device
54 Shaft, first shaft, outer shaft, outer first shaft
56 Linear guide
57 Support ring
58 Shaft, further shaft, second shaft, inner second shaft
59 Contact element
60 Base
62 Clamping jaw
64 Clamping jaw
70 Actuator
AB Abutment area
B Movement direction
b1, b2 Movement component
d Thickness
F, Fa, Fb, Fc, Fd Formation
L, L2, L22, LR Length
P, Pa, P1 to P9 Target position
S2*, S5 Symmetry plane
TB Movement path
TR Transport direction
Ü Overlap range
v3 Transport speed
v6 Speed

The invention claimed is:

1. A method for handling piece goods (2) moved one after another in at least one row (1), comprising:
transporting immediately consecutive piece goods (2) in a row (1) without spaces or with minimal spaces as a closed formation (F);
in a first step, seizing at least one transported piece good (2, 2*) by a manipulator (5) in a clamping and/or force-locking and/or form-locking manner from the closed formation (F);
spatially separating the at least one seized piece good (2, 2*) from the closed formation (F); and
transferring and releasing the at least one separated piece good (2, 2*) into a first target position (P) and/or target alignment; and
in a subsequent second step, seizing at least one transported piece good (2, 2*) by a manipulator (5) in a clamping and/or force-locking and/or form-locking manner from the closed formation (F); spatially separating the at least one seized piece good (2, 2*) from the closed formation (F); and transferring and releasing the at least one separated piece good (2, 2*) into a second target position (P) and/or target alignment in relation to the at least one piece goods located in the first target position (P) and/or target alignment to form a palletizable layer or a layer arrangement from a plurality of piece goods.

2. The method of claim 1, further comprising further transporting non-seized piece goods (2) of the closed formation (F) interruption-free and/or at unchanged transport speed (v3): (a) during the seizing steps; (b) during the spatial separating steps; and/or during transferring and releasing steps.

3. The method of claim 2, wherein the seizing steps further comprise seizing at least one transported piece good (2, 2*) from the foremost row of the closed formation (F).

4. The method of claim 1, wherein the seizing steps further comprise seizing two or more piece goods (2, 2*) from the closed formation (F).

5. The method of claim 4, further comprising further transporting piece goods (2) interruption-free and/or at unchanged transport speed and/or with unchanged direction upon and/or immediately after reaching their target position (P) and/or target alignment.

6. The method of claim 5, wherein the separating steps comprise imparting to the at least one seized piece good (2, 2*) at least one further velocity component and/or direction component relative to a transport speed (v3) of the closed formation (F).

7. The method of claim 6, further comprising transporting the immediately consecutive piece goods (2) by at least one transport device (3) into a seizing range (4) of the at least one manipulator (5), seizing at least one piece good (2, 2*) with the at least one manipulator (5); spatially separating the at least one seized piece good (2, 2*) with the at least one manipulator (5); and transferring the at least one separated piece good (2, 2*) into the first or second target position (P) and/or target alignment, wherein the at least one manipulator (5), at least upon seizing the at least one piece good (2, 2*) and/or upon its release in the first or second target position (P) and/or target alignment, moves at a speed that corresponds approximately or exactly to the transport speed (v3) at which the closed formation (F) is moving.

8. The method of claim 7, wherein the first step and the subsequent second steps are repeated in succession resulting in forming at least one row (11) from a plurality of piece goods (2, 2*).

9. The method of claim 7, wherein transporting the piece goods (2) to the seizing range (4) of the manipulator (5) and/or to the target position (P) and/or target alignment is accomplished by at least one horizontal conveying device (6) that is driven interruption-free and/or at continuous speed (v6).

10. The method of claim 9, wherein the at least one transport device (3) transports the piece goods (2) to the seizing range (4) and/or to the horizontal conveying device (6) is driven interruption-free and/or at a continuous transport speed (v3).

11. The method of claim 10, wherein the horizontal conveying device (6) produces a continuous feed in transport direction (TR) and/or runs at a constant speed (v6) that approximately or exactly corresponds to the transport speed (v3) of the closed formation (F).

12. The method of claim 11, wherein the at least one manipulator (5) or a part of the at least one manipulator (5), which part is provided for the transfer of the at least one piece good (2, 2*) into the first or second target position (P) and/or into the target alignment, moves at approximately the same speed or at the same speed as a speed (v6) of the at least one horizontal conveying device (6).

13. The method of claim 12, wherein the seizing range (4) of the at least one manipulator (5) is in the range of the at least one horizontal conveying device (6).

14. The method of claim 13, wherein the first step or the subsequent second step are performed in a single interruption-free step.

15. An apparatus (10) for handling piece goods (2) moved one after another in at least one row (1), the apparatus (10) comprising:
at least one manipulator (5) for piece goods (2, 2*);
at least one transport device (3), where immediately consecutive piece goods (2) of the row (1) are transportable nearly without spaces in a closed formation (F) into a seizing range (4) of the at least one manipulator (5);
wherein the at least one manipulator (5) successively seizes the at least one piece good (2, 2*) in a clamping and/or force-locking and/or form-locking manner, and separates, transfers and releases the at least one piece good (2, 2*) from the closed formation (F) to at least a first and a second target position (P) and/or target alignment to form a palletizable layer or a layer arrangement from a plurality of piece goods.

16. The apparatus (10) of claim 15, wherein the at least one manipulator (5) seizes a specific number of piece goods (2, 2*) from the foremost row in the closed formation (F).

17. The apparatus (10) of claim 16, wherein the at least one manipulator (5) rotates at least one of the seized piece goods (2, 2*).

18. The apparatus (10) of claim 17, wherein the at least one manipulator (5) is parallel kinematic robot or as a part thereof.

19. The apparatus (10) of claim 18, wherein the at least one manipulator (5) or a part thereof is movable in relation to the closed formation (F) at approximately the same speed or at the same transport speed (v3) as the closed formation (F).

20. The apparatus (10) of claim 19, further comprising at least one horizontal conveying device (6) that is driven interruption-free and transfers the at least one piece good (2, 2*) to the target position and/or the target alignment.

21. The apparatus (10) of claim 20, wherein the horizontal conveying device (6) is assigned to the seizing range (4) of the at least one manipulator (5) and/or corresponding to the seizing range (4), wherein the horizontal conveying device (6) produces a continuous feed in transport direction (TR) and/or runs at a constant speed (v6) that approximately or exactly corresponds to the transport speed (v3) of the transport device (3).

22. The apparatus (10) of claim 21, wherein the at least one manipulator (5) or a part thereof is movable at approximately the same speed or at the same speed as a speed (v6) of the at least one horizontal conveying device (6).

23. The apparatus (10) of claim 22, wherein the speeds (v3, v6) of the at least one horizontal conveying device (6) and of the at least one transport device (3) are approximately or exactly corresponding to each other.

24. The apparatus (10) of claim 15, further comprising a control device for the at least one manipulator (5), wherein the control device has information or has information stored on a group to be formed from a plurality of piece goods (2, 2*) for a palletizable layer, and on particular target positions (P) and/or target alignments of the piece goods (2, 2*) and wherein the control device assigns a specific position and/or a relative alignment in the particular group (12) to the particular at least one piece good (2, 2*).

25. The apparatus (10) of claim 15, further comprising a control device for the at least one manipulator (5), wherein the control device has information or has information stored on an arrangement with at least one row (11) of a plurality of piece goods (2, 2*) to be formed from a plurality of piece goods (2, 2*), and on target position (P) and/or target alignment and wherein the control device assigns a specific position and/or relative alignment to the particular at least one piece good (2, 2*) for the at least one row (11).

* * * * *